United States Patent [19]
Allen et al.

[11] Patent Number: 4,916,637
[45] Date of Patent: Apr. 10, 1990

[54] CUSTOMIZED INSTRUCTION GENERATOR

[75] Inventors: Linda May P. Allen; Ronald G. Elshaug; Carrie L. Harney; Wayne L. Lemmon; Irwin Miller, all of Rochester; Irving L. Miller, Pine Island; Gerald D. Murray, Rochester; Michael L. Nordstrom, Oronoco; LaVern F. Peterson; Glen E. Rollings, both of Rochester; James A. Schablitsky, Kasson; Johnnie D. Shanklin; Anthony V. Steinman, both of Rochester; Thomas W. Suther, III, Oronoco; Deanna C. Taylor, Rochester; Darrel C. Walberg, Rochester; Eugene P. Wojtczak, Rochester, all of Minn.

[73] Assignee: International Business Machines Corporation, Armonk, N.Y.

[21] Appl. No.: 122,295

[22] Filed: Nov. 18, 1987

[51] Int. Cl.⁴ ........................................... G06F 15/18
[52] U.S. Cl. .................................. 364/513; 364/468; 364/300
[58] Field of Search ............... 364/402, 300, 468, 513

[56] References Cited

U.S. PATENT DOCUMENTS

| | | | |
|---|---|---|---|
| 4,591,983 | 5/1986 | Bennett et al. | 364/468 |
| 4,628,434 | 12/1986 | Tashiro et al. | 364/300 |
| 4,628,435 | 12/1986 | Tashiro et al. | 364/300 |

Primary Examiner—Allen MacDonald
Attorney, Agent, or Firm—Bradley A. Forrest

[57] ABSTRACT

Customized instructions for installation of a device having multiple variable components is described, and are generated by an instruction generator program. A device description file lists a desired set of components for the device. Each of the components is broken down into one or more installation tasks, and the tasks are sequenced in a desired order for installation of the device. Text and graphic modules for inclusion in the instructions are varied based on the physical characteristics of the components, and their interconnection. Scaled line drawings are also generated based on information about each component and its placement in the device.

44 Claims, 25 Drawing Sheets

HPCS RECORD DESCRIPTION

FILE NAME: STSTOPOL      DESC NAME: SYSTEM TOPOLOGY DESCRIPTION

RECORD NAME: STDHEADR      DESC NAME: STD HEADER RECORD

| CHARACTER | ZONED DEC | PACKED DEC | DECIMALS | FIELD LENGTH | POSITIONS FR-TO | FIELD NAME | FIELD DESCRIPTIVE NAME |
|---|---|---|---|---|---|---|---|
| X | | | | 3 | 001-003 | ELMID | ELEMENT IDENTIFIER |
| X | | | | 2 | 004-005 | RCDTP | RECORD TYPE |
| X | | | | 4 | 006-009 | IDSYS | SYSTEM TYPE |
| X | | | | 7 | 010-016 | SYNUM | SYSTEM NUMBER |
| X | | | | 8 | 017-024 | DTELU | DATE LAST UPDATE |
| X | | | | 6 | 025-030 | TMENT | TIME LAST UPDATE |
| X | | | | 3 | 031-033 | WTCTN | WORLD TRADE COUNTRY |
| X | | | | 6 | 034-039 | RLLVL | RULES LEVEL |
| | | X | | 4 | 040-043 | BOXSD | BOX SHIP DATE |
| X | | | | 4 | 044-047 | UPCID | UPGRADE CONTROL ID |
| X | | | | 4 | 048-051 | PLUPC | PREV LEVEL UPCID |
| X | | | | 1 | 052-052 | SPTYP | SERVICE PROCESSOR TYPE |
| X | | | | 48 | 053-100 | FIL78 | EXPANSION AREA |

FIG. 3A

HPCS RECORD DESCRIPTION

FILE NAME: STSTOPOL  DESC NAME: SYSTEM TOPOLOGY DESCRIPTION

RECORD NAME: STDELEMT  DESC NAME: STD ELEMENT RECORD

| CHARACTER | ZONED DEC | PACKED DEC | DECIMALS | FIELD LENGTH | POSITIONS FR-TO | FIELD NAME | FIELD DESCRIPTIVE NAME |
|---|---|---|---|---|---|---|---|
| X | | | | 3 | 001-003 | ELMID | ELEMENT IDENTIFIER |
| X | | | | 2 | 004-005 | RCDTP | RECORD TYPE |
| X | | | | 3 | 006-008 | ELMFR | PARENT ELEMENT IDENTIFIER |
| X | | | | 4 | 009-012 | IDMAC | MACHINE TYPE |
| X | | | | 3 | 013-015 | IDSMN | SALES MODEL |
| X | | | | 6 | 016-021 | DVRPQ | DEVICE/RPQ CODE |
| X | | | | 10 | 022-031 | BMNUM | BILL OF MATERIAL NUMBER |
| X | | | | 4 | 032-035 | FIL04 | FILLER |
| X | | | | 1 | 036-036 | ELMTP | ELEMENT TYPE |
| X | | | | 1 | 037-037 | ELMST | ELEMENT SUBTYPE |
| X | | | | 1 | 038-038 | ELSCD | ELEMENT SOURCE CODE |
| X | | | | 9 | 039-047 | MACSR | MACHINE SERIAL#/ORDER# |
| | X | | | 5 | 048-052 | CORDX | X-COORDINATE LOCATION |
| | X | | | 5 | 053-057 | CORDY | Y-COORDINATE LOCATION |
| X | | | | 4 | 058-061 | LOCCD | LOCATION DESCRIPTION |
| X | | | | 1 | 062-062 | MGOFF | MOUNTING GROUP OFFSET |
| X | | | | 1 | 063-063 | DFSWA | DFCI SWITCH A SETTING |
| X | | | | 1 | 064-064 | DFSWB | DFCI SWITCH B SETTING |
| X | | | | 1 | 065-065 | DFTRA | DFCI TERMINATOR A STRING |
| X | | | | 1 | 066-066 | DFTRB | DFCI TERMINATOR B STRING |
| X | | | | 1 | 067-067 | DEVST | DEVICE STATUS |
| X | | | | 3 | 068-070 | DRIVA | DRIVER-'A' STRING OR ONLY |
| X | | | | 3 | 071-073 | DRIVB | DRIVER-'B' STRING |
| X | | | | 10 | 074-083 | SDATA | S/370 ADDRESS DATA |
| X | | | | 1 | 084-084 | IPLDC | IPL DEVICE |
| X | | | | 1 | 085-085 | PSDVC | PRIMARY/SECONDARY DEVICE CODE |
| X | | | | 15 | 086-100 | FIL16 | FILLER -- EXPANSION AREA |

FIG. 3B

HPCS RECORD DESCRIPTION

FILE NAME: SYSTOPOL    DESC NAME: SYSTEM TOPOLOGY DESCRIPTION
RECORD NAME: STDCABLE  DESC NAME: STD CABLE RECORD

| CHARACTER | ZONED DEC | PACKED DEC | DECIMALS | FIELD LENGTH | POSITIONS FR-TO | FIELD NAME | FIELD DESCRIPTIVE NAME |
|---|---|---|---|---|---|---|---|
| X |   |   |   | 3  | 001-003 | ELMID | ELEMENT IDENTIFIER |
| X |   |   |   | 2  | 004-005 | RCDTP | RECORD TYPE |
| X |   |   |   | 3  | 006-008 | MACID | ID OF MACHINE ORDER |
| X |   |   |   | 6  | 009-014 | DVRPQ | DEVICE/RPQ CODE |
| X |   |   |   | 10 | 015-024 | BMNUM | BILL OF MATERIAL NUMBER |
| X |   |   |   | 4  | 025-028 | FIL04 | FILLER |
| X |   |   |   | 1  | 029-029 | ELMTP | ELEMENT TYPE |
| X |   |   |   | 1  | 030-030 | ELMST | ELEMENT SUBTYPE |
| X |   |   |   | 1  | 031-031 | ELSCD | ELEMENT SOURCE CODE |

— 'FROM' LOC DATA —

| CHARACTER | ZONED DEC | PACKED DEC | DECIMALS | FIELD LENGTH | POSITIONS FR-TO | FIELD NAME | FIELD DESCRIPTIVE NAME |
|---|---|---|---|---|---|---|---|
| X |   |   |   | 3 | 032-034 | ELMFR | 'FROM' ELEMENT IDENTIFIER |
| X |   |   |   | 4 | 035-038 | LOCCD | LOCATION DESCRIPTION |
|   | X |   |   | 5 | 039-043 | CORDX | X- COORDINATE LOCATION |
|   | X |   |   | 5 | 044-048 | CORDY | Y- COORDINATE LOCATION |

— END 'FROM' LOC DATA —

— 'TO' LOC DATA —

| CHARACTER | ZONED DEC | PACKED DEC | DECIMALS | FIELD LENGTH | POSITIONS FR-TO | FIELD NAME | FIELD DESCRIPTIVE NAME |
|---|---|---|---|---|---|---|---|
| X |   |   |   | 3 | 049-051 | ELMTO | 'TO' ELEMENT IDENTIFIER |
| X |   |   |   | 4 | 052-055 | LOCCD | LOCATION DESCRIPTION |
|   | X |   |   | 5 | 056-060 | CORDX | X- COORDINATE LOCATION |
|   | X |   |   | 5 | 061-065 | CORDY | Y- COORDINATE LOCATION |

— END 'TO' LOC DATA —

— 2ND 'TO' LOC DATA —

| CHARACTER | ZONED DEC | PACKED DEC | DECIMALS | FIELD LENGTH | POSITIONS FR-TO | FIELD NAME | FIELD DESCRIPTIVE NAME |
|---|---|---|---|---|---|---|---|
| X |   |   |   | 3 | 066-068 | ELMTO | 'TO' ELEMENT IDENTIFIER |
| X |   |   |   | 4 | 069-072 | LOCCD | LOCATION DESCRIPTION |
|   | X |   |   | 5 | 073-077 | CORDX | X- COORDINATE LOCATION |
|   | X |   |   | 5 | 078-082 | CORDY | Y- COORDINATE LOCATION |

— END 2ND 'TO' LOC DATA —

| CHARACTER | ZONED DEC | PACKED DEC | DECIMALS | FIELD LENGTH | POSITIONS FR-TO | FIELD NAME | FIELD DESCRIPTIVE NAME |
|---|---|---|---|---|---|---|---|
| X |   |   |   |   | 083-083 | DEVST | DEVICE STATUS |
| X |   |   |   |   | 084-084 | PSDVC | PRIMARY/SECONDARY DEVICE CODE |
| X |   |   |   |   | 085-100 | FIL17 | FILLER -- EXPANSION AREA |

FIG. 3C

HPCS RECORD DESCRIPTION 1.1.6 FILE NAME: ELEMDESC   DESC NAME: ELEMENT DESCRIPTION FILE 1.1.6.1 RECORD NAME: LEVELCTL  DESC NAME: RELEASE LEVEL CONTROL RECORD

| CHARACTER | ZONED DEC | PACKED DEC | BINARY | SIGNED | DECIMALS | FIELD LENGTH | POSITIONS FR-TO | FIELD NAME | FIELD DESCRIPTIVE NAME |
|---|---|---|---|---|---|---|---|---|---|
| X | | | | | | 1 | 001-001 | RCDTP | RECORD TYPE |
| X | | | | | | 4 | 002-005 | FIL04 | FILLER- EXPANSION AREA |
| X | | | | | | 15 | 006-020 | FIL15 | FILLER- TEXT AREA |
| X | | | | | | 6 | 021-026 | RLLVL | RELEASE LEVEL |
| X | | | | | | 23 | 027-049 | FIL23 | FILLER- TEXT AREA |
| X | | | | | | 6 | 050-055 | DEVNU | RULES LEVEL SPECIFY |
| X | | | | | | 195 | 056-250 | FL195 | FILLER |

FIG. 4A

HPCS RECORD DESCRIPTION

FILE NAME: ELEMDESC    DESC NAME: ELEMENT DESCRIPTION FILE 1.1.6.2 RECORD NAME: DEVTABLE   DESC NAME: DEVICE TO B/M CONVERS TABLE

| CHARACTER | ZONED DEC | PACKED DEC | BINARY | SIGNED | DECIMALS | FIELD LENGTH | POSITIONS FR-TO | FIELD NAME | FIELD DESCRIPTIVE NAME |
|---|---|---|---|---|---|---|---|---|---|
| X |   |   |   |   |   | 1 | 001-001 | RCDTP | RECORD TYPE |
| X |   |   |   |   |   | 4 | 002-005 | FIL04 | FILLER- EXPANSION AREA |
| X |   |   |   |   |   | 4 | 006-009 | IDMAC | MACHINE TYPE |
| X |   |   |   |   |   | 3 | 010-012 | IDSMN | SALES MODEL |
|   | X |   |   |   |   | 2 | 013-014 | SEQNM | SEQUENCE NUMBER |
| X |   |   |   |   |   | 11 | 015-025 | FIL11 | EXPANSION AREA |
| ——— 225 BYTES——ARRAY OF 9 SETS OF DEVICE CODES ——— |||||||||||
| X |   |   |   |   |   | 6 | 026- | DVRPQ | DEVICE/RPQ CODE |
| X |   |   |   |   |   | 2 |   | BMSEQ | BILL OF MATERIAL SEQUENCE |
| X |   |   |   |   |   | 10 |   | BMNUM | BILL OF MATERIAL NUMBER |
| X |   |   |   |   |   | 7 | -250 | FIL07 | EXPANSION AREA |

FIG. 4B

HPCS RECORD DESCRIPTION

FILE NAME: ELEMDESC    DESC NAME: ELEMENT DESCRIPTION FILE
RECORD NAME: BASELEMT  DESC NAME: BASIC ELEMENT RECORD

| CHARACTER | ZONED DEC | PACKED DEC | DECIMALS | FIELD LENGTH | POSITIONS FR-TO | FIELD NAME | FIELD DESCRIPTIVE NAME |
|---|---|---|---|---|---|---|---|
| X |   |   |   | 1  | 001-001 | RCDTP | RECORD TYPE |
| X |   |   |   | 4  | 002-005 | FIL04 | FILLER - EXPANSION AREA |
| X |   |   |   | 10 | 006-015 | BMNUM | BILL OF MATERIAL NUMBER |
| X |   |   |   | 8  | 016-023 | FIL10 | EXPANSION AREA |
|   | X |   |   | 2  | 024-025 | FNLVL | FUNCTIONAL LEVEL |
| X |   |   |   | 1  | 026-026 | ELMTP | ELEMENT TYPE |
| X |   |   |   | 1  | 027-027 | ELMST | ELEMENT SUBTYPE |
| X |   |   |   | 10 | 028-037 | ELMNM | DESCRIPTIVE NAME |
| X |   |   |   | 10 | 038-047 | HPCDN | HPCS DEVICE NAME |
| X |   |   |   | 10 | 048-057 | ACCES | ACCESSORY PART NUMBER |
|   | X |   |   | 4  | 058-061 | EXWDT | EXTERNAL WIDTH |
|   | X |   |   | 4  | 062-065 | INWDT | INTERNAL WIDTH |
|   | X |   |   | 2  | 066-067 | EHGHT | HEIGHT (EIA UNITS) |
|   | X |   |   | 5  | 068-072 | MLGHT | LENGTH OR HEIGHT (MM) |
|   | X |   |   | 4  | 073-076 | MDPTH | DEPTH (MM) |
|   | X |   |   | 4  | 077-080 | KWGHT | WEIGHT (KILOGRAMS) |
|   | X |   | 1 | 3  | 081-083 | PWRVL | POWER VALUE (KVA) |
|   | X |   |   | 1  | 084-084 | MGOFF | MOUNTING GROUP OFFSET |
|   | X |   |   | 4  | 085-088 | MCBIN | CABLE LGTH INCREM (MM) |
|   | X |   |   | 2  | 089-090 | PWOCT | POWER OUTLETS COUNT |
|   | X |   |   | 2  | 091-092 | ARMCT | DASD ARMS COUNT |
|   | X |   |   | 2  | 093-094 | CPTCT | CONTROL OF PORT COUNT |
|   | X |   |   | 2  | 095-096 | DEVCT | COUNT OF DEVICES CARD CAN DRIVE |
|   | X |   |   | 1  | 097-097 | BUSCT | COUNT OF BUSES |
|   | X |   |   | 4  | 098-101 | INTWL | INTERNAL WIRING LENGTH |
| X |   |   |   | 3  | 102-104 | FIL03 | FILLER - EXPANSION AREA |
|   | X |   |   | 2  | 105-106 | FWCSN | FIRST WIDE CARD SLOT NUMBER |
| X |   |   |   | 1  | 107-107 | SWDEV | SWITCHED DASD DEVICE FLAG |
| X |   |   |   | 1  | 108-108 | TRMTP | TERMINATOR TYPE |
| X |   |   |   | 1  | 109-109 | HPADD | DEVICE ADDED BY HPCS |
| X |   |   |   | 4  | 110-113 | IDMAC | MACHINE TYPE (HPCS ADDS ONLY) |
| X |   |   |   | 3  | 114-116 | IDSMN | SALES MODEL (HPCS ADDS ONLY) |
| X |   |   |   | 6  | 117-122 | DVRPQ | DEVICE/RPQ CODE (HPCS ADDS ONLY) |
| X |   |   |   | 1  | 123-123 | CBEXL | CABLE EXIT LOCATION |
| X |   |   |   | 1  | 124-124 | TOWMT | TOWER MOUNTED DEVICE |
| X |   |   |   | 1  | 125-125 | DPOCD | DELAYED POWER OFF CODE |
|   | X |   |   | 3  | 126-128 | LVKVA | 110V RACK KVA OVERRIDE |
|   | X |   |   | 3  | 129-131 | COGRX | CENTER OF GRAVITY X COORDINATE |
|   | X |   |   | 3  | 132-134 | COGRY | CENTER OF GRAVITY Y COORDINATE |
|   | X |   |   | 3  | 135-137 | COGRZ | CENTER OF GRAVITY Z COORDINATE |
| X |   |   |   | 4  | 138-141 | STCAP | DASD STORAGE CAPACITY |
| X |   |   |   | 13 | 142-154 | FIL17 | FILLER - EXPANSION AREA |
| — 96 BYTES --- ARRAY OF 6 SETS OF COORDINATES — |
| X |   |   |   | 4  | 155- | LOCCD | LOCATION DESCRIPTION |
| X |   |   |   | 4  |      | JAKNM | JACK NUMBER FOR PLUG |
|   | X |   |   | 4  |      | CORDX | X- COORDINATE LOCATION |
|   | X |   |   | 4  | -250 | CORDY | Y- COORDINATE LOCATION |
| — END OF ARRAY — |

FIG. 4C

HPCS RECORD DESCRIPTION

FILE NAME: ELEMDESC    DESC NAME: ELEMENT DESCRIPTION FILE

RECORD NAME: COMMSPEC    DESC NAME: COMM SPECIFY CODE DEFINITION.

| CHARACTER | ZONED DEC | PACKED DEC | DECIMALS | FIELD LENGTH | POSITIONS FR-TO | FIELD NAME | FIELD DESCRIPTIVE NAME |
|---|---|---|---|---|---|---|---|
| X | | | | 1 | 001-001 | RCDTP | RECORD TYPE |
| X | | | | 4 | 002-005 | IDSYS | SYSTEM TYPE |
| X | | | | 2 | 006-007 | SEQNM | SEQUENCE NUMBER |
| X | | | | 35 | 008-042 | FIL35 | FILLER AREA FOR KEY |
| —— 208 BYTES——ARRAY OF 8 SETS OF COMMUNICATION LINES —— ||||||||
| X | | | | 3 | 043- | SPCPF | SPECIFY CODE PREFIX |
| X | | | | 1 | | FIL01 | FILLER - EXPANSION AREA |
| X | | | | 1 | | ELEIF | ELECTRICAL INTERFACE |
| X | | | | 1 | | PROTO | COMMUNICATIONS PROTOCOL |
| X | | | | 1 | | CNNCT | CONNECTION 'TO' PARAMETER |
| X | | | | 1 | | LSCAT | LINE SPEED CATEGORY |
| X | | | | 1 | | CSSTP | COMMUNICATION SUBSYSTEM TYPE |
| X | | | | 1 | | FIL02 | EXPANSION AREA |
| X | | | | 10 | | BMNUM | BILL OF MATERIAL NUMBER |
| X | | | | 06 | -250 | FIL06 | FILLER - EXPANSION AREA |
| —————— END OF ARRAY —————— ||||||||
| | | | | | | | |

FIG. 4D

HPCS RECORD DESCRIPTION

FILE NAME: ELEMDESC    DESC NAME: ELEMENT DESCRIPTION FILE
RECORD NAME: LNSPDCAT    DESC NAME: LINE SPEED CATEGORY RECORD

| CHARACTER | ZONED DEC | PACKED DEC | DECIMALS | FIELD LENGTH | POSITIONS FR-TO | FIELD NAME | FIELD DESCRIPTIVE NAME |
|---|---|---|---|---|---|---|---|
| X |   |   |   | 1  | 001-001 | RCDTP | RECORD TYPE |
| X |   |   |   | 4  | 002-005 | IDSYS | SYSTEM TYPE |
| X |   |   |   | 2  | 006-007 | SEQNM | SEQUENCE NUMBER |
| X |   |   |   | 18 | 008-025 | FIL18 | FILLER AREA FOR KEY |
| —220 BYTES——ARRAY OF 22 SETS OF LINE SPEED PARAMETERS— | | | | | | | |
| X |   |   |   | 1 | 026- | SPCSF | SPECIFY CODE PREFIX |
| X |   |   |   | 1 |      | LSCAT | LINE SPEED CATEGORY |
|   | X |   |   | 4 |      | LNSPD | LINE SPEED |
| X |   |   |   | 4 | -245 | FIL04 | FILLER - EXPANSION AREA |
| ———— END OF ARRAY ———— | | | | | | | |
| X |   |   |   | 05 | 246-250 | FIL05 | FILLER - EXPANSION AREA |

FIG. 4E

HIRS RECORD DESCRIPTION
FILE NAME: COMPON TASK   DESC NAME: COMPONENT TASK FILE
RECORD NAME: CPTASKII   DESC NAME: COMPONENT TASK INCLUDE

| CHARACTER | ZONED DEC | PACKED DEC | DECIMALS | FIELD LENGTH | POSITIONS FR-TO | FIELD NAME | FIELD DESCRIPTIVE NAME |
|---|---|---|---|---|---|---|---|
| X | | | | 2 | 001-002 | TTYPE | TASK TYPE TO EXECUTE |
| X | | | | 1 | 003-003 | HANCD | HANDLING CODE |
| X | | | | 10 | 004-013 | HPCDN | HPCS DEVICE NAME |
| X | | | | 1 | 014-014 | ELMTP | ELEMENT TYPE |
| X | | | | 1 | 015-015 | ELMST | ELEMENT SUBTYPE |
| X | | | | 1 | 016-016 | FILL1 | RESERVED -- EXPANSION AREA |
| X | | | | 1 | 017-017 | GROUP | TASK GROUP FLAG (GROUPED IF "G") |
| X | | | | 4 | 018-021 | TIXRF | TASK ID - CROSS REFERENCE NO. |
| X | | | | 3 | 022-024 | TIGRP | TASK ID - GENERAL GROUPING NO. |
| X | | | | 8 | 025-032 | FILL2 | RESERVED -- EXPANSION AREA |
| X | | | | 1 | 033-033 | PERSP | TASK PERSPECTIVE |
| | X | | | 3 | 034-036 | GLSQN | GOAL SEQUENCE STEP NUMBER |
| | X | | | 3 | 037-039 | UPDSQ | UPDATE SEQUENCE STEP NUMBER |
| X | | | | 1 | 040-040 | STATE | TASK STATE |
| X | | | | 1 | 041-041 | DIRET | TASK DIRECTION |
| X | | | | 1 | 042-042 | POWST | POWER STATUS |
| X | | | | 1 | 043-043 | SUBCP | SUB COMPONENT IDENTIFICATION |
| | | | | | 044- | TCMTM | TASK COMPLETION TIME |
| X | | | | 3 | 044-046 | TCMTP | PRIMARY TIME TO COMPLETE TASK |
| X | | | | 3 | 047-049 | TCMTA | ALTERNATE TIME IF TASK IS IN A GROUP |
| X | | | | 1 | 050-050 | MUPID | MODEL UPGRADE INDICATOR |
| X | | | | 10 | 051-060 | PHPDN | PARENT DEVICE NAME |
| X | | | | 1 | 061-061 | CABRL | CABLE RELATIONSHIP |
| X | | | | 1 | 062-062 | HANLR | HANDLER CODE |
| X | | | | 1 | 063-063 | CINTK | CHARACTERIZE INDEPENDENT TASK |
| X | | | | 1 | 064-064 | CLASS | CLASS OF VALUES TO BE SET FOR TASK |
| X | | | | 1 | 065-065 | SPCLS | SPECIAL CLASS OF VALUES TO BE SET |
| X | | | | 15 | 066-080 | FIL15 | RESERVED -- EXPANSION AREA |

FIG. 5

HIRS RECORD DESCRIPTION
FILE NAME: ITDELTAF    DESC NAME: INTERMEDIATE DELTA FILE
RECORD NAME: ITDELTAI    DESC NAME: INTERMEDIATE DELTA

| CHARACTER | ZONED DEC | PACKED DEC | DECIMALS | FIELD LENGTH | POSITIONS FR-TO | FIELD NAME | FIELD DESCRIPTIVE NAME |
|---|---|---|---|---|---|---|---|
| X |   |   |   | 2  | 001-002 | TTYPE | TASK TYPE TO EXECUTE |
| X |   |   |   | 1  | 003-003 | HANCD | HANDLING CODE |
|   |   | X |   | 5  | 004-008 | TSEQN | TASK SEQUENCE NUMBER |
|   |   |   |   |    | 009-    | TSKID | TASK IDENTIFICATION NUMBER |
| X |   |   |   | 4  | 009-012 | TIXRF | TASK ID- CROSS REFERENCE NUMBER |
| X |   |   |   | 3  | 013-015 | TIGRP | TASK ID- GENERAL GROUPING NUMBER |
| X |   |   |   | 1  | 016-016 | POWST | POWER STATUS |
| X |   |   |   | 1  | 017-017 | SUBCP | SUB COMPONENT CODE |
|   |   |   |   |    | 018-    | TCMTM | TASK COMPLETION TIME |
|   | X |   |   | 3  | 018-020 | TCMTP | PRIMARY TIME TO COMPLETE TASK |
|   | X |   |   | 3  | 021-023 | TCMTA | ALTERNATE TIME IF TASK IS IN A GROUP |
| X |   |   |   | 1  | 024-024 | RPERM | REMOVE PERMANENTLY FLAG |
| X |   |   |   | 1  | 025-025 | HANLR | HANDLER CODE |
| X |   |   |   | 1  | 026-026 | PERSP | TASK PERSPECTIVE |
| X |   |   |   | 3  | 027-029 | GLSQN | GOAL SEQUENCE STEP NUMBER |
| X |   |   |   | 3  | 030-032 | UPDSQ | UPDATE SEQUENCE STEP NUMBER |
| X |   |   |   | 1  | 033-033 | STATE | TASK STATE |
| X |   |   |   | 1  | 034-034 | DIRET | TASK DIRECTION |
| X |   |   |   | 1  | 035-035 | MUPID | MODEL UPGRADE INDICATOR |
|   |   |   |   |    | 036-    | HPAGE | PARENTAGE |
| X |   |   |   | 3  | 036-038 | ELIL1 | ELEMENT IDENTIFIER LEVEL 1 (RACK) |
| X |   |   |   | 4  | 039-042 | LOCL1 | LOCATION CODE LEVEL 1 |
| X |   |   |   | 3  | 043-045 | ELIL2 | ELEMENT IDENTIFIER LEVEL 2 (DEVICE) |
|   |   | X |   | 5  | 046-050 | CORY2 | COORDINATE Y LEVEL 2 |
| X |   |   |   | 4  | 051-054 | LOCL2 | LOCATION CODE LEVEL 2 |
| X |   |   |   | 3  | 055-057 | ELIL3 | ELEMENT IDENTIFIER LEVEL 3 (CARD) |
|   |   | X |   | 5  | 058-062 | CORY3 | COORDINATE Y LEVEL 3 |
| X |   |   |   | 4  | 063-066 | LOCL3 | LOCATION CODE LEVEL 3 |
| X |   |   |   | 3  | 067-069 | ELIL4 | ELEMENT IDENTIFIER LEVEL 4 (CABLE) |
|   |   | X |   | 5  | 070-074 | CORY4 | COORDINATE Y LEVEL 4 |
| X |   |   |   | 4  | 075-078 | LOCL4 | LOCATION CODE LEVEL 4 |
| X |   |   |   | 6  | 079-084 | CPFC4 | CABLE'S PARENT FEATURE CODE NUMBER |
| X |   |   |   | 1  | 085-085 | CABRL | CABLE RELATIONSHIP |
| X |   |   |   | 1  | 086-086 | NCBLE | NUMBER OF CABLE ENDS |
| X |   |   |   | 1  | 087-087 | GROUP | TASK GROUP FLAG (GROUPED IF "G") |
| X |   |   |   | 1  | 088-088 | CLASS | CLASS OF VALUES TO BE SET FOR TASK |
| X |   |   |   | 1  | 089-089 | SPCLS | SPECIAL CLASS OF VALUES TO BE SET |
| X |   |   |   | 31 | 090-120 | FILLR | RESERVED -- EXPANSION AREA |

THE REMAINDER OF THIS RECORD FORMAT CONSISTS OF THE STDELEMT RECORD FROM THE SYSTOPOL FILE. PLEASE REFER TO IT FOR THE REST OF THE FORMAT.

FIG. 6

NOVEMBER 3RD, 1987  4:52 P.M.                FILE: "TRANSLAT TABLE A"
XXXXXXXXXXXXXXXXXXX TASK MODULE CHARTS XXXXXXXXXXXXXXXXXXXXXXXX

"K" = KABLING CHART FOR PSEUDO TASKS

| | B1 | B3 | B6 |
|---|---|---|---|
| PNLC1K | 1C | 123 | 122 |
| PNLC2K | 2C | | |
| PNCL1K | 1C | | |

FIG. 7A (ELMTP & ELMST FIELDS)
B1 - DFCI OR BUS EXTEND CABLE
B3 - COMMUNICATIONS CABLE
B6 - TWIN-AX CABLE

"C" = CARD CHART FOR PSEUDO TASK EXTENSIONS

| | 6019 | 6018 | 6010 | |
|---|---|---|---|---|
| PNLC1C | 114 | 124 | 121 | 1P |
| PNLC2C | 214 | 224 | | 2P |
| PNCL1C | 114 | 124 | 121 | 1P |

FIG. 7B (DVRPQ FIELD OF PARENT ELEMENT)
6018 - BUS EXTEND DRIVER CARD
6019 - BUS EXTEND RECV'R CARD
---- - ELEMENTS WHICH ARE NOT CARDS

"P" = PORT CHART

| | PWSI | PWSO | DIO1 | DOO1 | DC01 | DC02 | DC03 | DC04 |
|---|---|---|---|---|---|---|---|---|
| PNLC1P | | | 111 | 121 | 111 | 111 | 111 | 111 |
| PNLC2P | | | 211 | 221 | 211 | 211 | 211 | 211 |
| PNCL1P | | | 111 | 121 | 111 | 111 | 111 | 111 |
| RDSC1P | | | | | 110 | 120 | 130 | 140 |
| ADSC1P | | | | | 110 | 120 | 130 | 140 |
| RDDC1P | | | 110 | 120 | | | | |
| ADDC1P | | | 110 | 120 | | | | |
| RDDC2P | | | 210 | 220 | | | | |
| ADDC2P | | | 210 | 220 | | | | |
| RDDC3P | | | 310 | 320 | | | | |
| ADDC3P | | | 310 | 320 | | | | |
| RDDC4P | | | 41L | 42L | | | | |
| ADDC4P | | | 41L | 42L | | | | |
| RRSC1P | 110 | 120 | | | | | | |
| ARSC1P | 110 | 120 | | | | | | |

(LOCFR/LOCTO FIELD)
PWSI - PWR SEQ (IN)
PWSO - PWR SEQ (OUT)
DIO1 - DFCI (IN)
DOO1 - DFCI (OUT)
DC01 - SIGNAL PORT 1
DC02 - SIGNAL PORT 1
DC03 - SIGNAL PORT 1
DC04 - SIGNAL PORT 1

FIG. 7C

"L" = LOCATION CHART

| | L | R |
|---|---|---|
| RDPC7L | 701 | 702 |
| ADPC7L | 701 | 702 |
| RDDT4L | 401 | 402 |
| ADDT4L | 401 | 402 |
| RDEV6L | 601 | 602 |
| ADEV6L | 601 | 602 |
| RDDC41L | 411 | 412 |
| ADDC41L | 411 | 412 |
| RDDC42L | 421 | 422 |
| ADDC42L | 421 | 422 |
| SDAS5L | 5S1 | 5S2 |
| VDCT4L | 401 | 402 |

(LOCCD FIELD)
L - LEFT MOUNTED LOCATION
R - RIGHT MOUNTED LOCATION

FIG. 7D

"M" = MODEL CHART

| | B10 | B20 | B30 | B40 | F10 | F20 | F30 | F40 | F50 |
|---|---|---|---|---|---|---|---|---|---|
| RDBC1M | | | 100 | 200 | | | | | |
| ADBC1M | | | 100 | 200 | | | | | |

(IDSMN FIELD)

FIG. 7E

XXXXXXXXXXXXXXXXXXXXXXXXXXXX TASK GRAPHICS CHARTS XXXXXXXXXXXXXXXXXXXXXXXXXXXX
"V", "W" & "G" CHARTS ARE ROTATED 90 DEGREES (DVRPQ FIELD)

FIG. 7F

"V" CHART

| | RCDT1V | ACDT1V | RCRT2V | ACDT2V | |
|---|---|---|---|---|---|
| 6030 | 110 | 110 | | | COMM CNTLR |
| XXXX | 111 | 111 | | | (ENHANCED) |
| 4004 | 112 | 112 | | | 4M STORAGE |
| 4008 | 113 | 113 | | | 8M |
| 4012 | 114 | 114 | | | 12M |
| XXXX | 115 | 115 | | | 16M |
| XXXX | 116 | 116 | | | 32M |
| XXXX | 117 | 117 | | | 64M |
| XXXX | 118 | 118 | | | 128M |
| XXXX | 119 | 119 | | | 256M STORAGE |
| 2500 | 120 | 120 | | | IMPI 1 |
| 2501 | 121 | 121 | | | IMPI 2 |
| 2502 | 122 | 122 | | | IMPI 3 |
| 2503 | 123 | 123 | | | IMPI 4 |
| XXXX | 124 | 124 | | | FA1 |
| XXXX | 125 | 125 | | | FA2 |
| XXXX | 126 | 126 | | | FA3 |
| XXXX | 127 | 127 | | | FA4 |
| XXXX | 128 | 128 | | | FA5 |
| 2504 | 129 | 129 | | | C1 (BA/SP1) |
| 2505 | 130 | 130 | | | C2 (BA/SP2) |
| 2506 | 131 | 131 | | | C3 (BA) |
| AF12 | | | 210 | 210 | AF 1.2 (4592) |
| AF04 | | | 211 | 211 | AF 0.7 (4591) |

FIG. 7G

"W" CHART

| | RCDT3W | ACDT3W | |
|---|---|---|---|
| 6018 | 316 | 316 | BUS EXT DVR |
| 6019 | 317 | 317 | BUS EXT RCV |
| 6010 | 310 | 310 | DFCI CNTLR |
| 6040 | 311 | 311 | W.S. CNTLR |
| 6034 | 312 | 312 | LAN ADPTR |
| 6050 | 313 | 313 | W.S. CNTLR |
| 6031 | 314 | 314 | SDLC COMM |
| 6032 | 315 | 315 | ASYC COMM |

FIG. 7H

"G" CHART

| | RCSC3G | ACSC3G | RCSC1G | ACSC1G | RCSC2G | ACSC2G | |
|---|---|---|---|---|---|---|---|
| 6019 | 610 | 610 | | | | | BUS EXT DVR |
| 6018 | 611 | 611 | | | | | BUS EXT RCV |
| 6010 | | | 410 | 410 | | | DFCI CNTLR |
| 6040 | | | 411 | 411 | | | W.S. CNTLR |
| 6034 | | | 412 | 412 | | | LAN ADPTR |
| 6050 | | | | | 51X | 51X | W.S. CNTLR |
| 6031 | | | | | 52X | 52X | SDLC COMM |
| 6032 | | | | | 53X | 53X | ASYC COMM |

FIG. 7I

"X" = EXTENSIONS CHART FOR PORTS

| | CC01 | CC02 | CC03 | CC04 |
|---|---|---|---|---|
| RCSC51X | 510 | 511 | | |
| ACSC51X | 510 | 511 | | |
| RCSC52X | 512 | 513 | | |
| ACSC52X | 512 | 513 | | |
| RCSC53X | 514 | 515 | 516 | 517 |
| ACSC53X | 514 | 515 | 516 | 517 |

(LOCFM FIELD)
CC01 - PORT 1
CC02 - PORT 2
CC03 - PORT 3
CC04 - PORT 4

FIG. 7J

"S" = SWITCH SETTING CHART

| | 0 | 1 | 2 | 3 | 4 | 5 | 6 | 7 |
|---|---|---|---|---|---|---|---|---|
| SDAS1S | 100 | 110 | 120 | 130 | 140 | 150 | 160 | 170 |
| SDAS2S | 100 | 110 | 120 | 130 | 140 | 150 | 160 | 170 |
| SDAS3S | 100 | 110 | 120 | 130 | 140 | 150 | 160 | 170 |
| SDAS4S | 400 | 410 | 420 | 430 | 440 | 450 | 460 | 470 |
| SDAS5S1 | 500 | 510 | 520 | 530 | 540 | 550 | 560 | 570 |
| SDAS5S2 | 500 | 510 | 520 | 530 | 540 | 550 | 560 | 570 |

(DFSWA FIELD)
0 - DFCI ADDRESS 0
1 - DFCI ADDRESS 1
2 - DFCI ADDRESS 2
3 - DFCI ADDRESS 3
4 - DFCI ADDRESS 4
5 - DFCI ADDRESS 5
6 - DFCI ADDRESS 6
7 - DFCI ADDRESS 7

HIRS RECORD DESCRIPTION

FILE NAME: DELTAHHF  DESC NAME: DELTA HARDWARE HANDLING FILE
RECORD NAME: DELTAHHI  DESC NAME: DELTA HARDWARE HANDLING

| CHARACTER | ZONED DEC | PACKED DEC | DECIMALS | FIELD LENGTH | POSITIONS FR-TO | FIELD NAME | FIELD DESCRIPTIVE NAME |
|---|---|---|---|---|---|---|---|
| X |   |   |   | 2 | 001-002 | TTYPE | TASK TYPE TO EXECUTE |
| X |   |   |   | 1 | 003-003 | HANCD | HANDLING CODE |
|   |   | X |   | 5 | 004-008 | TSEQN | TASK SEQUENCE NUMBER |
|   |   |   |   |   | 009-    | TSKID | TASK IDENTIFICATION NUMBER |
| X |   |   |   | 4 | 009-012 | TIXRF | TASK ID- CROSS REFERENCE NUMBER |
| X |   |   |   | 3 | 013-015 | TIGRP | TASK ID- GENERAL GROUPING NUMBER |
| X |   |   |   | 1 | 016-016 | POWST | POWER STATUS |
| X |   |   |   | 1 | 017-017 | SUBCP | SUB COMPONENT INDICATOR |
|   |   |   |   |   | 018-    | TCMTM | TASK COMPLETION TIME |
|   | X |   |   | 3 | 018-020 | TCMTP | PRIMARY TIME TO COMPLETE TASK |
|   | X |   |   | 3 | 021-023 | TCMTA | ALTERNATE TIME IF TASK IS IN A GROUP |
| X |   |   |   | 1 | 024-024 | RPERM | REMOVE PERMANENTLY FLAG |
| X |   |   |   | 1 | 025-025 | HANLR | HANDLER CODE |
|   |   |   |   |   | 026-    | HPAGE | PARENTAGE |
| X |   |   |   | 3 | 026-028 | ELIL1 | ELEMENT IDENTIFIER LEVEL 1 (RACK) |
| X |   |   |   | 4 | 029-032 | LOCL1 | LOCATION CODE LEVEL 1 |
| X |   |   |   | 3 | 033-035 | ELIL2 | ELEMENT IDENTIFIER LEVEL 2 (DEVICE) |
|   | X |   |   | 5 | 036-040 | CORY2 | COORDINATE Y LEVEL 2 |
| X |   |   |   | 4 | 041-044 | LOCL2 | LOCATION CODE LEVEL 2 |
| X |   |   |   | 3 | 045-047 | ELIL3 | ELEMENT IDENTIFIER LEVEL 3 (CARD) |
|   | X |   |   | 5 | 048-052 | CORY3 | COORDINATE Y LEVEL 3 |
| X |   |   |   | 4 | 053-056 | LOCL3 | LOCATION CODE LEVEL 3 |
| X |   |   |   | 3 | 057-059 | ELIL4 | ELEMENT IDENTIFIER LEVEL 4 (CABLE) |
|   | X |   |   | 5 | 060-064 | CORY4 | COORDINATE Y LEVEL 4 |
| X |   |   |   | 4 | 065-068 | LOCL4 | LOCATION CODE LEVEL 4 |
| X |   |   |   | 6 | 069-074 | CPFC4 | CABLE'S PARENT FEATURE CODE NUMBER |
| X |   |   |   | 1 | 075-075 | NCBLE | NUMBER OF CABLE ENDS |
| X |   |   |   | 3 | 076-078 | GRAPHID | GRAPHICS MODULE ID NUMBER FOR PUBS |
| X |   |   |   | 1 | 079-079 | GROUP | TASK GROUP FLAG (GROUPED IF "G") |
| X |   |   |   | 1 | 080-080 | CLASS | CLASS OF VALUES TO BE SET FOR TASK |
| X |   |   |   | 1 | 081-081 | SPCLS | SPECIAL CLASS OF VALUES TO BE SET |
| X |   |   |   | 19 | 082-100 | FILLR | RESERVED -- EXPANSION AREA |

THE REMAINDER OF THIS RECORD FORMAT CONSISTS OF THE STDELEMT RECORD FROM THE SYSTOPOL FILE.

FIG. 8

RCVRQST - RECEIVE THE NEXT FILE REQUEST

| RCVRQST | |
|---|---|
| SET UP CONTROL, REXPLI, AND CMSCMD DECLARES. DECLARE VARIABLES AND BUFFERS. | |
| READ THE FIRST/NEXT RECORD IN THE CONTROL FILE. | |
| YES \ IF END-OF-FILE WAS NOT REACHED. /NO | |
| CALL CMSCMD TO PERFORM A FILEDEF COMMAND FOR THE NEW INTERMEDIATE DELTA FILE. | CLOSE THE CONTROL FILE. |
| \ IF THE RETURN CODE FROM THE / YES \FILEDEF COMMAND IS ZERO (0) / NO | SET RETURN CODE TO 1. EOF. |
| SET RETURN CODE TO 0. OKAY. | SET RETURN CODE TO 1. ERROR. DISPLAY ERROR MESSAGE. | |
| RETURN TO THE REQUEST RULE. | |

CUSTOMIZED INSTRUCTION GENERATOR

Cross reference is made to U.S. Pat. No. 4,591,983 for "Hierarchical Knowledge System."

BACKGROUND OF THE INVENTION

The invention relates to instructions for installing and changing systems, and in particular to the generation of instructions for installing and changing or upgrading systems.

Computer systems are made up of multiple components which a customer may be required to assemble. Sometimes, a customer may desire to expand a computer system, and may be required to add components. The assembly or addition of components usually requires the placing of components in the correct physical position relative to other components and the cabling of the components together. It can be a complex task depending on the number of components making up the computer system.

Prior computer systems have been shipped to customers with instruction manuals for installation and upgrade. The instruction manuals may provide instructions for most of the components of a basic system, and may make reference to further instruction manuals relating to still more components. An example may be seen by looking at personal computers, where one component is the personal computer box containing a system board and a card for interfacing to a monitor. Another component is the monitor, and the customer is required to connect a cable between the monitor and the computer box. If the customer orders a disk drive device, a separate instruction manual may be needed, or a section in the manual for the computer box must be found in order to determine how to install the disk drive. The disk drive may consist of two components, such as a controller card and the drive itself. There may also be a need to set switches in both the system board and the controller card, with the switch setting being dependent on the rest of the components of the system and size of the drive. This procedure can be quite confusing when multiple options must be installed, or replacement components are required. A customer must search for the appropriate manual to determine how to install the option.

New computer systems in the mid range are much more complex to install than the simple example given above. The system may be made up of one or more racks into which a large variety of cards and devices are installed. The number of options available to customers in ordering such systems is so great that no two systems ordered may look alike, and be installable in the same manner. The use of a generic installation guide is not feasible. If an installation guide set forth instructions in order for one such system, installation of another, different system would cause skipping back and forth between sections of the guide during installation. Further, the guide would be extremely large if it provided sufficient detail for one to successfully install all possible varieties of system.

SUMMARY OF THE INVENTION

Customized instructions for a computer system installation or change are generated by an instruction generator program. A system description file describes a desired set of hardware components for the computer system. Each of the components is broken down by the generator into one or more installation tasks, and the tasks are sequenced in a desired order for installation of the components. The sequence of tasks is then assembled into an installation guide which is customized to each system.

The sequencing of the installation tasks is done by an expert system, which incorporates knowledge of installation experts into a series of rules. The experts have defined a detailed sequence of goals with associated tasks. The expert system sorts on the goals according to the list of desired components. It provides a list of all tasks required, sequenced in proper order.

The installation guide is put together using detailed graphic modules and text modules associated with the tasks, making installation of or change to a system very easy. Line drawings which are modified dependent on the components to be installed are also provided in the installation guide. Since the instructions are specifically tailored to the system which is to be installed or changed, all of the instructions are applicable. The instructions may be followed straight through to completion of the installation or change, thus drastically reducing the time and skill level required to install a system.

Since each task is described using its own graphic and text modules, an engineering change is not nearly as significant an event to the people involved in generating installation instruction manuals. In the past, an engineering change after the manuals were printed would result in either a reprinting of the manuals, or at the least an insert to the manuals. With the present invention, a few modules of text, and or graphics are revised. Since the instructions are generated uniquely for each installation or upgrade, the changes will automatically be incorporated in instructions generated after the changes. Once the system is installed or upgraded, the instructions are thrown away as each further change to the system will be described uniquely in a new set of instructions which is likely much smaller than the original set of instructions. There is no huge stockpile of manuals which need to be changed due to engineering changes.

The detail of instructions is also easily controlled. In one preferred embodiment, a very detailed level of instructions is generated. The graphics modules are very detailed, and are integrated with detailed text modules which refer to the graphics. In testing of instructions generated at this detail, it was found that a person with no prior installation skills could install a system in under an hour, where with prior art instructions some prior skills were usually required to even complete the installation. In further preferred embodiments, the instructions are drastically shortened for those which already have installation skills. One need merely have two sets of text and graphics modules to accomplish a variation in the skill level of the instructions generated.

DESCRIPTION OF THE DRAWINGS

FIGS. 3a through 3c are descriptions of topology file records which describe different types of components.

FIGS. 4a through 4e are descriptions of element description file records, which provide further information describing components.

FIG. 5 is a description of component task file records which identify tasks associated with a component.

FIG. 6 is a description of intermediate file record which identifies tasks and contains a field for a representation of the sequence in which a task is to be performed.

FIGS. 7a through 7j are tabular representations of translate table files which provide detailed positional and instruction presentation information for, and graphic artwork associated with, each task.

FIG. 8 is a description of a hardware handling file, which identifies each sequenced task, and components associated with the tasks.

FIGS. 10a-10c when placed end to end are a flow diagram of a sequencer for sequencing the tasks identified in FIGS. 9a-9d.

APPENDIX LIST

Appendix I is a description of records and an alphanumerical listing of names of fields used for these records, including definitions of the fields.

Figure 10A:
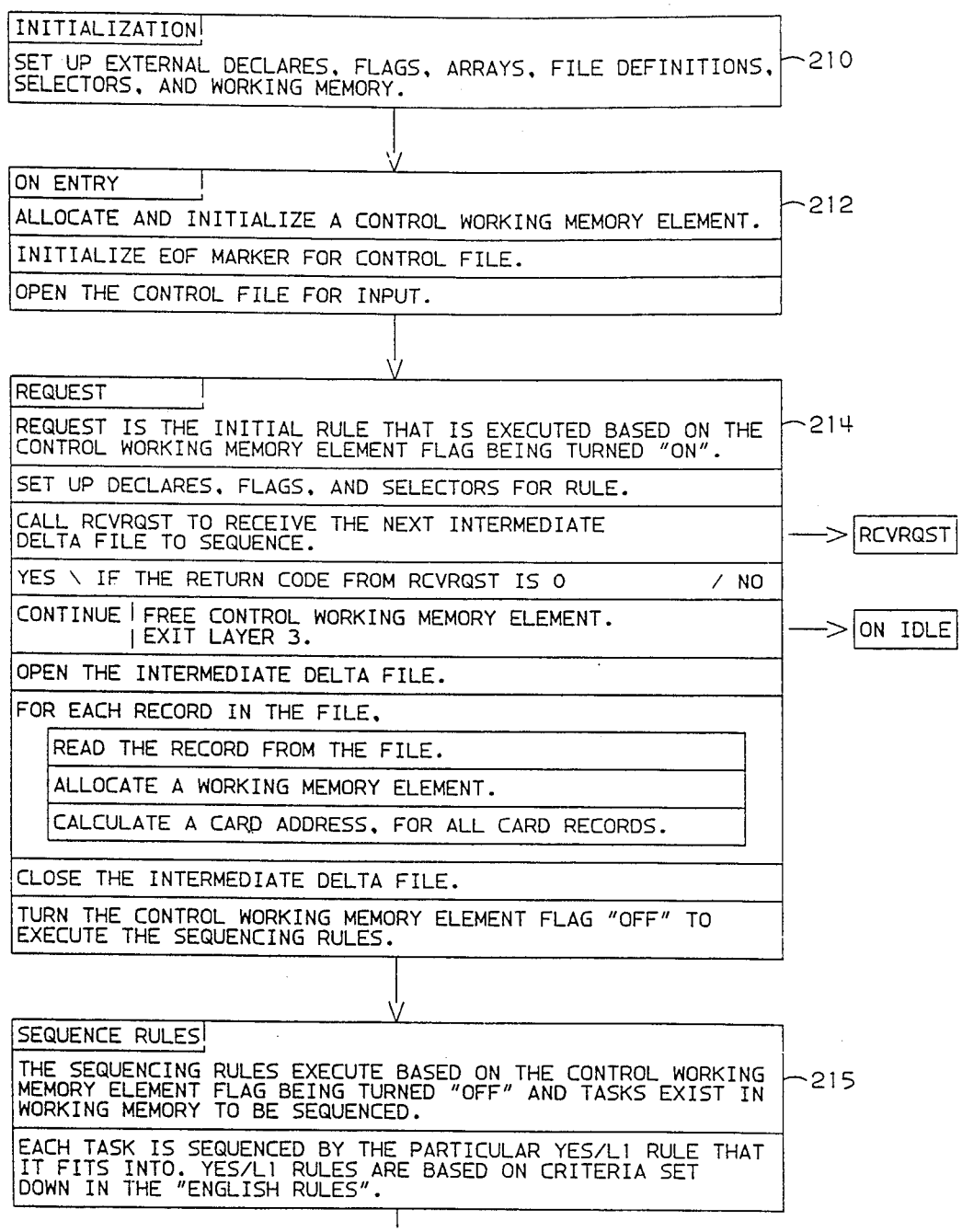
Figure 10B:
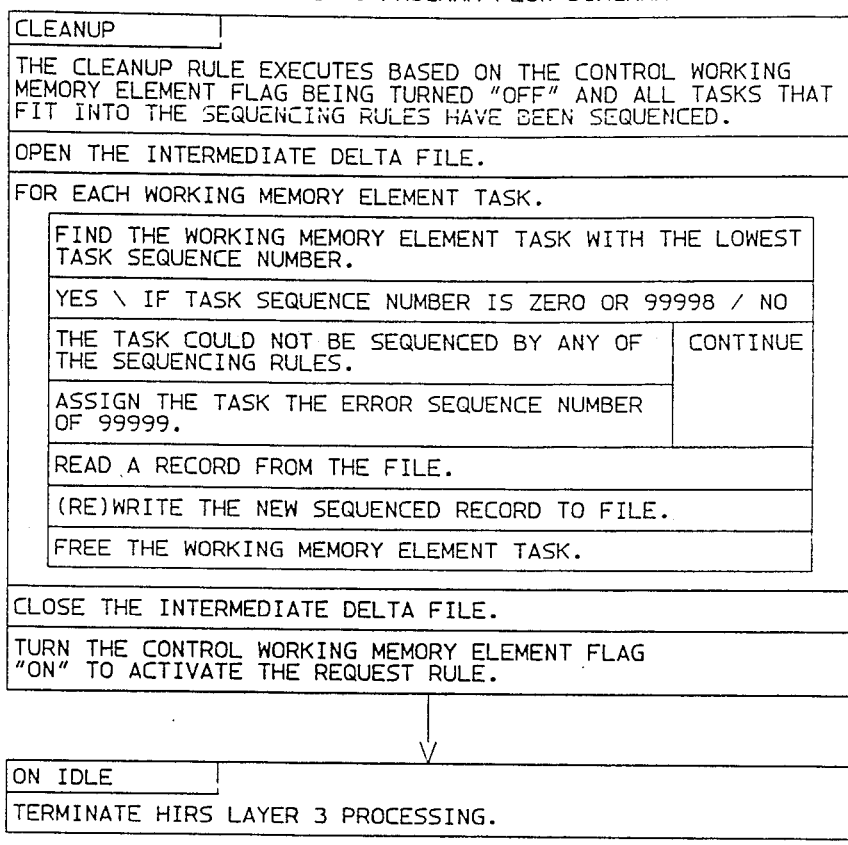

Appendix II is a compilation of English rules used by the sequencer of FIGS. 10a-10c in sequencing the tasks in a correct order for installation.

Appendix III is a list of variables and switches corresponding to selected tasks.

Appendix IV is a task summary table which lists tasks and task variations with corresponding components of the system.

Figure 2:
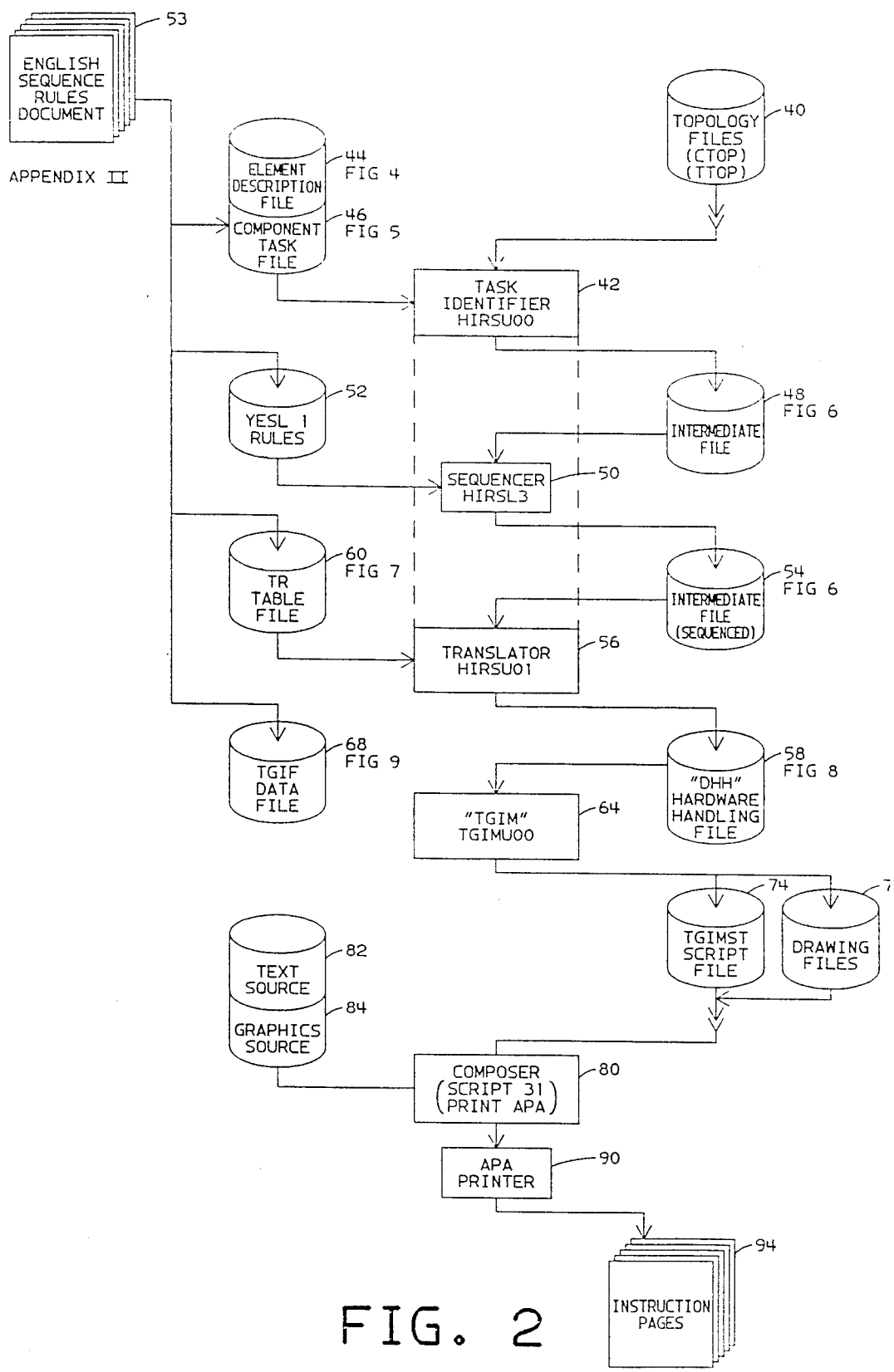
FIG. 2 a more detailed block flow diagram of the flow in FIG. 1.

Appendix V is a topology file for an order referred to as "0630100" and includes further files shown in FIG. 2 as well as the resulting installation instructions produced for that order.

DETAILED DESCRIPTION OF THE INVENTION

Figure 1:
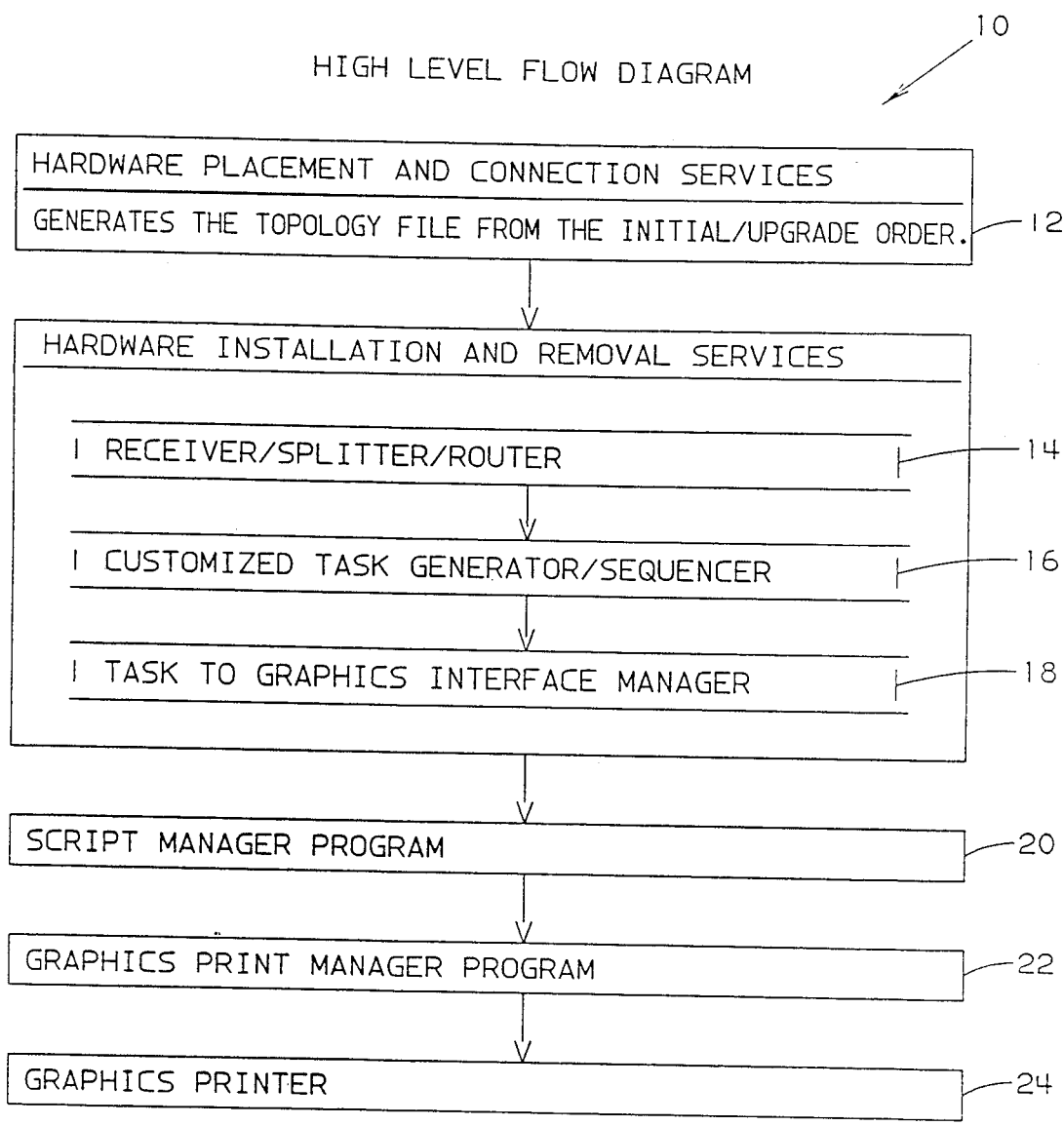
FIG. 1 is a block flow diagram of the facilities used to generate a detailed installation guide in accordance with the invention.

In FIG. 1, a flow diagram indicated generally at 10 provides an overview of a system for generating detailed, customized installation instructions for the installation, change, and upgrade of a computer system. A topology file is provided by a topology file generator block 12. The topology file is a list of hardware components making up a computer system. The components are preferably items such as processor cards, equipment racks, cables, power supplies, disk drives, and I/O controllers etc.. While the invention is applicable to components at a much more detailed level, such as nuts and screws, one of the objects of the invention is to make installation of a computer system easily performable by a customer where a customer is an end user, service engineer or value added retailer. The components were chosen at a level of granularity consistent with what different customers might desire to select.

The topology files contain placement and connection information for each component. In the instance of a component to be installed in an equipment rack, it identifies a slot in the equipment rack, and what the component is connected to. When a customer wishes to change an existing system for varying reasons including replacement of components or addition of components, two topology files are provided by file generator 12. The first file being a current configuration, and the second file being an upgraded configuration.

A receiver/splitter/router 14 receives multiple topology files from the topology file generator 12. Several topology files may be received corresponding to different system installations and upgrades. In the preferred embodiment, several topology files of systems to be built or upgraded are processed in a batch job. The receiver/splitter/router 14 is a conventional program that receives batches of topology files from the topology file generator 12 and splits the batch into individual topology files for initial installations, or into pairs of files for an upgrade of an existing system.

Topology files are sent from the receiver/splitter/router 14 to a task generator/sequencer program 16. The sequencing program 16 is a blend of conventional software technology and expert system software technology. In processing a topology file or topology file pair, parentage of components is established and a number of installation tasks are identified, sequenced and formatted into a hardware handling file. Tasks are small units of work required to install or update a system. The expert system software is used to sequence the tasks.

The hardware handling file is passed on to a task to graphics interface manager 18 which creates customized line drawings, and sets up variables and generates a master script imbed file for scripting and printing. Variables are values of items being specified in the text of instructions, such as: "set address to ____". Each variable is unique to a task and its associated component.

The line drawings and variables are integrated with selected text module names and graphics modules to create a master script imbed file.

The master script imbed file is passed on to a script manager program 20, which selects the graphics and text modules identified, and generates a formatted print file of complete, system unique, installation instructions. The instructions contain text and graphics in line with each other. A graphics print manager 22 routes the formatted print file to a graphics printer 24.

In FIG. 2, a more detailed block diagram of the instruction generating system is shown. The elements in the diagram will first be described in terms of the data it receives and the data that it produces. The manner in which the elements perform the data manipulations will be described later in this Description.

Topoloqy Files

The process of generating installation instructions for a particular system installation or upgrade of a system starts with one or two topology files at 40. As previously defined, the topology files contain lists of components or elements of the system. The lists are preferably generated by an expert system configurator, such as that shown in U.S. Pat. No. 4,591,983 for "Hierarchical Knowledge System." The configurator is used during initial order placement for a new system by the manufacturer of the system. A customer will order a particular model number and several options from standard literature about the computer system. The configurator will check the validity of the system and will generate the lists which include information on the physical placement of components and their connection to each other. If a customer has not specified required components, such as the case where a disk drive is specified, but the essential controller for that drive was not specified, the configurator will add it. In other embodiments, a human expert will provide the topology file based on the customer order. The human expert can provide the same topology file, but may not be able to process the volume that the expert system can.

A single topology file is used for defining the elements of a new installation. When an upgrade of an existing system is to be performed, a current topology file is first generated which describes the elements of the system as it presently exists. This information is obtained by manually inspecting the system, or preferably, the original topology file for the system as shipped from the factory is stored on the system in permanent storage. The customer will then specify new elements to add to the system, and a second, upgraded topology file is generated by the configurator, or an expert based on the current file and the additional elements ordered.

Examples of the format of records within topology files, and the information contained therein which is utilized in the present invention is shown in FIGS. 3a through 3c. In FIG. 3a, a system topology description header record is shown. The header record is shown as a field name and a field descriptive name, and actually consists of a series of fields containing information which describes a system. There is one header record per system which describes customer information and matches a topology file to the customer order. Appendix I provides a more detailed definition of each field based on the field name.

FIG. 3b shows an element record, which describes characteristics of an element such as racks, cards, devices and other elements except cables. It contains version, parentage information, location information and further information associated with each element. There is one element record per element in the topology file. Parentage information identifies a hierarchy of components. A card cage is the parent of a card. A rack is the parent of a card cage.

FIG. 3c shows a cable record. The cable record identifies a cable, and also defines where it is connected by the use of From and To fields. There is one cable record for every cable in the system.

A task identifier 42 is preferably a procedural software program "layer 2", which receives the topology files 40, identifies tasks associated with the elements described and establishes parentage for each component. The task identifier 42 uses data from an element description file 44 and a component task file 46 and produces an intermediate file 48, which identifies tasks for installing the system.

The format of, and information contained in the element description file 44 is further detailed in FIGS. 4a through 4e. File 44 contains further information on all of the elements available to be ordered for a system. Each record provides detailed information of the element or component which is not practicable to be provided in the topology files because of the large storage requirements. Each of the FIGS. in the FIG. 4 series of figures describes a type of record which may be used to describe a particular component. FIG. 4a contains release level control information. FIG. 4b contains information relative to device to bill of materials (B/M), and conversion tables which are used for generating a list of parts for cross-checking by the installer or upgrader.

FIG. 4c is a basic element record which all elements have. It provides more detail about the component itself, including part numbers, internal names and physical characteristics.

FIGS. 4d and e are used in combination to generate a chart of communication lines to enable a customer to associate a line resource name with particular line characteristics such as communications protocols.

The format of a component task file record 46 is shown in detail in FIG. 5. It contains descriptions of installation tasks which are cross referenced with the component described in the topology file 40 and the element description file 44. Each task file is stored in accordance with the list in FIG. 5, which includes fields identifying the task type to execute, and a number of task identifiers. It also includes fields for defining the amount of time to complete the task, a field for a sequence number of the task in the installation instructions and several other fields which are also defined in Appendix I.

A TTYPE field represents the type of task. The types are divided into adding a new rack, upgrading a system, removing a component, installing a component and a universal task, which is a task associated with every upgrade o installation.

The first digit represents the type of task being performed: add, remove, modify, or Universal Tasks.

The second digit represents the class of hardware being addressed: RACK, DEVICE, CARD, etc.

A HANCD field identifies the type of handling a component is to receive, such as adding the component, removing the component or moving the component.

A HPCDN field is the unique name for a hardware element as used in software.

An ELMTP field defines the general physical class of a device, such as a tower, a tower mountable unit, a card or a cable. A tower as used here is a rack within which other elements of the computer system are mounted.

An ELMST field defines the logical class of a device within a physical type. The type of tower unit is described, such as disk drives, power interfaces, OEM reserved space . . . The types of cards and cables ar also defined.

A FILL1 field describes an expansion area which is used for future use.

A GROUP field contains a task group flag. It is used to identify tasks that are similar to other tasks and should be performed as a group to cut down the time required to perform them.

TIXRF is a general task cross reference number, and TIGRP specifies a unique number for each task description for an element.

PERSP defines a perspective to take when selecting a group of components to work on for a given task. Several perspectives are available including system, rack, extra, card cage/tail gate and pseudo tasks, which are tasks which are any actions or preparations other than physical tasks to perform an installation such as checking to determine that all components were shipped.

GLSQN is used to define tasks which belong together within a major goal sequencing group UPDSQ is used to identify specific goal sequence points when specific tasks should be selected.

STATE defines the particular state of processing certain tasks. It has possible values of first, last, cabling, etc. Cabling is done only if cabling is required.

A DIRET field defines the direction of progressing through different perspectives of a system, rack, card cage etc. It can specify progressing from the highest location to the lowest location or from the lowest location to the highest location. It is used to sequence tasks so they do not interfere with future tasks.

POWST describes whether a system should be powered up or down when performing the task.

SUBCP identifies a particular sub component activity, such as terminator, address switch or voltage switch which is associated with installation of a component.

TCMTM is a field specifying an estimate of the task completion time. TCMTP is the primary time to complete the task, and TCMTA is an alternate time, if the task is in a group of tasks. TCMTA is usually less than TCMTP because it is assumed that performing similar tasks at the same time will reduce the time required per similar task.

MUPID is a model upgrade indicator. It identifies whether a component is related to a model upgrade.

PHPDN contains a descriptive name of the parent device of the component whose installation task is being described.

CABRL describes a cable end relationship to the location of the components the cable attaches to. The values are intra-rack or inter-rack.

HANLR is handler code which identifies whether the customer service person, etc. is doing the component handling.

CINTK identifies tasks which support the physical installation or removal of a component. The values are install task or disassemble task.

CLASS determines the values/variables to be set for a task.

SPCLS identifies a special class of values to be set for a task.

FIL15 is a reserved field.

The intermediate file 48 consists of a record as indicated in FIG. 6 for each task identified by the task identifier. The record is very similar to the component task file 46 records. The first few fields are exactly the same. Some fields are added from the topology file 40 and the element description file 44. Those are defined below:

TSEQN is a task sequence number. It specifies the task sequence number in relation to other tasks that must be performed.

TSKID is a task identification number which determines the task identification to graphics modules, and is made up of TIGRP and TIXRF from the component task file 46.

RPERM indicates whether a component is to be removed permanently, or temporarily if removed at all.

HPAGE identifies a hierarchical parentage of the component being handled. ELIL1-4 and LOCL1-4 are an element identifier and location code for a level 1, 2, 3 or 4 component. CORY 2-4 are vertical offsets of a device within a level. Levels refer to parent information. Level 1 is a rack, level 2 is a device, level 3, a card, and level 4 is a cable.

CPFC4 identifies a cable's parent feature code number. The feature code number corresponds to the cable's line speed, protocol, connection, and electrical interface.

The sequencer 50 is an expert system software program. It uses installation rules indicated at 52 which are written in expert system code. The rules are expressed as major task sequencing goals and detailed goal listings in Appendix II, the English sequence rules document 53. The goals embody a set of hierarchical rules. The only detailed rule is that the goals must be satisfied sequentially.

Sequencer 50 provides a sequenced intermediate file 54 consisting of records in FIG. 6 with the task sequence number field, TSEQN, filled in for each task. The file is organized with the lowest task sequence number first. The sequenced file 54 is then used by another conventional software program translator 56 to produce a hardware handling file 58. Translator 56 uses a translate table file 60 shown in FIG. 7 which contains multiple tables for translating the tasks obtained from the sequenced intermediate file 54.

The translate tables are used to enlarge the selection of text and/or graphics variations, based on record fields other than device type.

If a task requires a translation, it must have an alphabetic character in the second character position of the TIGRP field of the task ID, TSKID field in the intermediate file shown in FIG. 6. A PNLC task, as identified in a TSKID field, is used as an example. The PNLC task directs the installer to find a specified P/N cable, get 2 labels, write given information on the labels, put the labels on cable ends, select the proper end of the cable and route it into a rack.

The character in the second character position of the TIGRP field of the task ID selects an associated translate chart in the translate table. The actual task ID in this case is PNLC1K. In this case, it is given that the second character is a "K", so FIG. 7a, row 1 is used. The ELMTP and ELMST fields are then examined to select a column of the chart. If the examination yields a B6, the translated task is PNLC122, where 122 is a version of the task for the inbound end of an external workstation cable. The word external is defined as meaning a cable that has only one end inside a given rack.

If the examination of the ELMTP and ELMST fields yielded a B1, the translated task is PNLC1C, and the new character "C" causes a second translation to occur. This time the DVRPQ field is evaluated to select a column in the "C" chart in FIG. 7b. If the evaluation yields 6018, the translated task is PNLC124, which is for the inbound end of an extended CEC-CEU cable. If the evaluation yields blank, then PNLC1P is the translated task, and the port chart "P" is used. The fields used for each chart are indicated next to the charts in the Figures.

Charts in FIGS. 7a through 7e correspond to particular text modules to be used for generation of instructions. Graphic charts are similarly expanded in FIGS. 7f through 7j, which include charts identifying graphics which are rotated 90 degrees to provide a better view for installation. Further charts refer to port extensions, and switch setting graphics modules.

In Appendix III, task IDs TIGRP, and an abbreviated title are listed in the left column of a table of variables and switches. The variable and switch names are listed across the top of the tables, and the definitions of the names are given on the last page of Appendix III. Tasks which may have one of the variables, are identified with an "X".

In Appendix IV, tasks (TIGRP) are again listed, and this time the rack, device product numbers, and card numbers are listed across the top of a table. The table is filled in with version numbers (TIXRF) of the different versions of text associated with each task dependent on the device, rack or card. With respect to the PNLC task—Label the Cable—previously discussed, one can see that there are multiple versions of the text.

111 is for the outbound end of an external DFCI cable 114 is for the outbound end of an external CEC-CEU cable 121 is for the inbound end of an external DFCI cable 122 is for the inbound end of an external WS cable 123 is for the inbound end of an external COMM cable 124 is for the inbound end of an external CEC-CEU cable 211 is for the first encounter of the outbound end of an internal DFCI cable 214 is for the first encounter of the outbound end of an internal CEC-CEU cable 221 is for the first encounter of the inbound end of an internal DFCI cable 224 is for the first encounter of the inbound end of an internal CEC-CEU cable Each version has associated graphics/line drawings/lists.

111 uses RSLD208, 209, and 006
114 uses RSLD208, 210, and 202
121 uses RSLD208, 209, and 006
122 uses RSLD011, 208, 270, and 006
123 uses RSLD208, 209, and 006
124 uses RSLD208, 210, and 202
211, 214, 221, and 224 do not have any graphics.

The variables used with this PNLC task are RACK, CBLPN for cable part number, and CBLAB for cable label. These can be found in Appendix III.

An example of a task which uses switches is the PNSC—setup complete—task. Variables CTIE and MRACK are used to tell the installer when to install cable ties. The PNLA variable tells when to pack a hoist adapter tool used to lift some items into place, and the PLNR variable tells the installer to pack the hoist. All covers are closed, and some general housekeeping is identified. Version 100 is for initial install, 300 for upgrade where no reconfiguration is required, and 400 is for and upgrade where reconfiguration is required. Rack is a variable, and MRACK—multiple racks, CTIE—install cable ties, TCAW—more cables to install, PNLA (300/400)—lifter adapter required, and PNLR (300/400) lifter required are switches. All versions of this task use graphics/line drawings/lists RSLD154 and 184.

The hardware handling file 58 is shown in further detail in FIG. 8. Each task is now identified by a hardware handling record. Each record is comprised of the fields indicated in FIG. 8. Most of the fields have been previously identified in references to the element description file 44, the topology file 40, the component task file 46 and the intermediate file 48, from which the hardware handling file is derived. The hardware handling file 58 now contains a detailed set of fields most of which have been previously discussed. Subfields under the field HPAGE identify parentage of the component. The parentage includes what other components the component is attached to in the form of identifiers, ELIL 1-4, CORY 2-4 and a cables parent feature code number CPFC 4.

Some fields not described before include a NCBLE field which defines the number of cable ends to sequence, with up to three specifiable. A GRAPHID field is used to identify a graphics module for the instruction guide, and FIL13 identifies further expansion area. The record also includes the STDELEMT record from the topology file of FIG. 3b.

A task to graphic interface manager 64 then uses the hardware handling file 58, and further information from the element description file 44 and the TGIF data file 68.

The TGIF data file 68 is used to create customized line drawing files 72 and a script file 74 which contains names of customized line drawings of racks, card cages, and cable lists, and a sequential set of script module names and variables respectively to control generation of integrated in-line instructions by a task to graphics interface manger executive 80.

Information from the element description files are used in defining the line drawings. The line drawings are box-like drawings used to depict what an actual system will look like. One example of a line drawing is of a rack, with the devices drawn in as squares and rectangles. Size information for the devices is used to draw the squares and rectangles to size. Names of the devices are also obtained from the element description files, and are inserted into appropriate squares and rectangles. Similar line drawings are used for such things as a card cage, to show the location of cards, with the name of each card.

Script file 74 is simply a list of names or variables corresponding to text files to be incorporated into the instructions. It is based on the tasks identified, and is ordered in the correct sequence for installation of the system. The drawing files 72 are used to define drawings and graphics. Line drawings are used to illustrate things which are unique to each system and which do not require detailed graphics. Some examples as previously mentioned, include a line drawing of a rack, with names of other components positioned to correspond to the physical location of the actual component in the system. They are useful for showing the system before and after an upgrade. A further use is the identification of cards in a rack. The lines already exist, and the names are filled in by task to graphic interface manager 64 dependent on the configuration of the particular system to be installed. Drawing files 72 also include variables to select graphics files.

Text and Graphics sources are indicated at 82 and 84 respectively. The variables contained in the script file 74 and drawing files 72 are used to access the text for instructions and the graphics for the instructions. A composer 80 retrieves the instructions and graphics based on the variables, and integrates them with the customized line drawings to generate a formatted print file of complete, system unique, in-line sequential installation instructions. These are passed on to an all points addressable printer 94 which provides an instruction guide indicated at 94.

In Appendix V, a sample installation guide generated by the instruction generator is presented. Tasks are numbered in the upper left corner. This particular instruction is for a simple system installation. Most of the devices have already been installed in the rack, as seen in the line drawing used in task 3 to verify the content of the rack from the front. A back view of the rack is presented in task 12.

Figure 11:
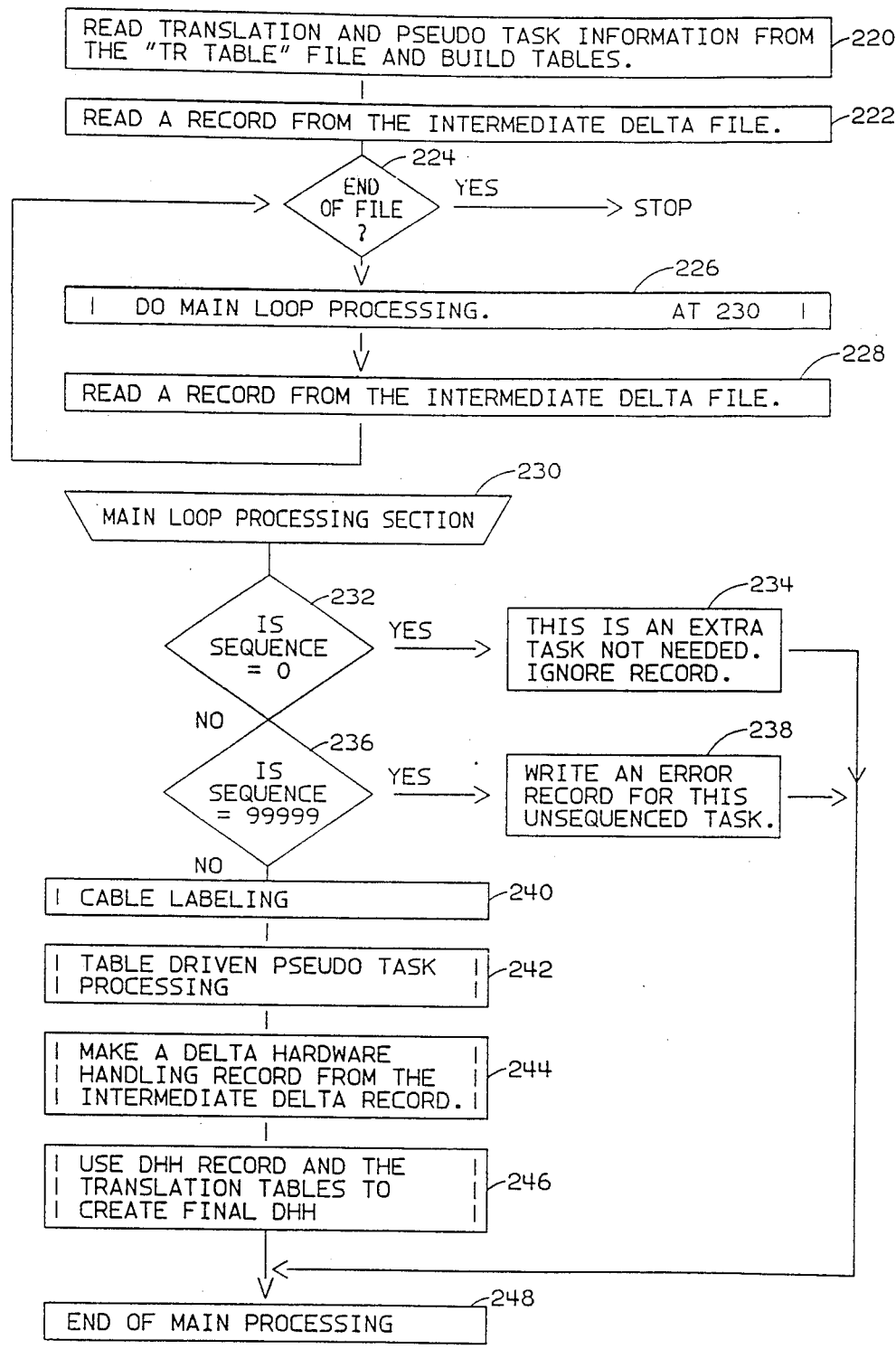
FIG. 11 is a flow diagram of a translator program which associates specific modules of text and graphics with the tasks.

Also in Appendix V, is an updated copy of the translate table, including information used to perform the pseudo task processing block 242 in FIG. 11.

Appendix V shows a topology file consisting of multiple records having the formats identified in FIGS. 3a, 3b, and 3c, and corresponding to components for a system. Each row of characters is a record. The first row, where the fourth and fifth digits are "10", is a header record. "10" is in the RCDTP field, which is the record type field. There is only one header record for the topology file. A number in the first row "0630100" corresponding to the SYNUM field, is the system number of the topology file.

The fourth and fifth characters of each record identify the record type, "40" being an element record, "44" being a cable record, and "60" being a specify record. The next file is the intermediate file for the same system. Each line of alphanumeric characters corresponds to a task identified by the task identifier 42. The format for each task is indicated in FIG. 6.

The hardware handling file for the system is shown next. Again, each task is represented by one line of characters having the format shown in FIG. 8. The script file is shown next in Appendix 5 having script commands such as SE for setting variables and IM for imbedding modules. Finally the instructions resulting are shown for the system identified as "0630100".

One can easily trace from the script commands what text and graphics resulted in the instructions. Commands 15–22 resulted in the System Identification, Processor type-model number, and processor serial number being inserted on page 1 of the instructions. The next two commands indicating that TIME =1.4 and STIM =1.4 resulted in estimates on page 1 of 1.5 hours to install, and 1.5 hours that the system will not be available during installation. The second time may be less than the first for upgrades, since some tasks may be performed while the system is still running, such as checking to determine if all the components are correct. 1 hours is added to time in the commands for a fudge factor.

Each text module imbedded further imbeds the associated graphics files and line drawings required by the text module.

PROGRAM FLOWS

Task Identifier 42

In FIGS. 9a through d, a flow diagram is detailed for task identifier 42. Task identifier 42 identifies tasks associated with elements described in topology files. It does this for both upgrades and initial installations, the difference being that two topology files are associated with an upgrade, and task identifier 42 determines which components are to be moved and which are merely to be added. It also establishes parentage for components. Then, it determines the tasks that need to be performed.

Figure 9A:
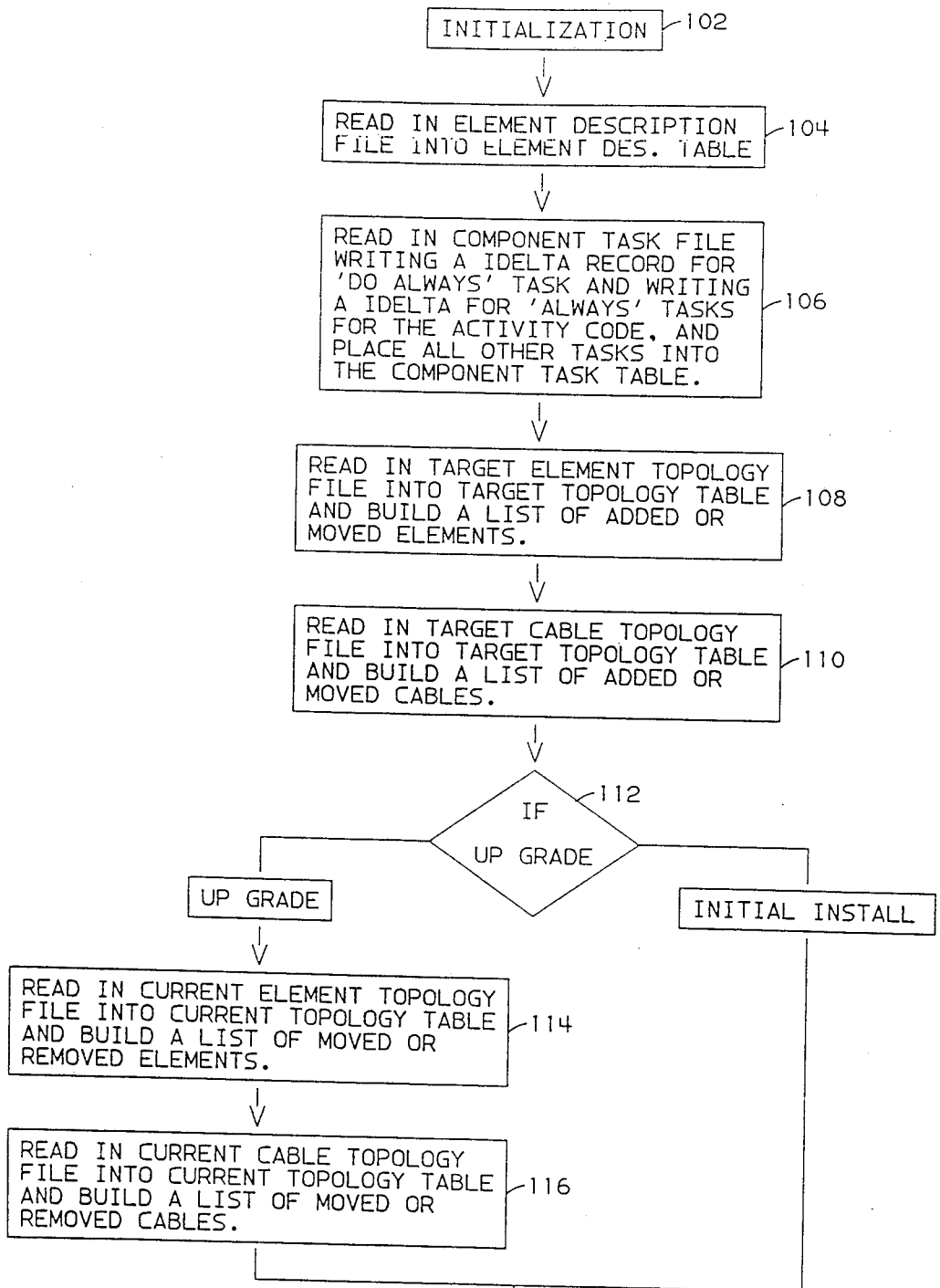
FIGS. 9a-9d when placed end to end are a logic flow diagram of a task identifier routine which identifies task associated with a component.

Initialization occurs at block 102 in FIG. 9a, including loading the program and allocating required resources. The element description file 44 is then read into an element description table at 104 from secondary storage. The element description file will be used from the element description table rather than from secondary storage to improve performance of the task identifier 42. There are easy references into a table format rather than from a straight file list and no further I/O activity is required.

The component task file 46 is also read at 106. An IDELTA (intermediate file 48) record is written for each "do always" task. "Do always" tasks are included, based on whether an upgrade, initial install or relocate is to be performed. All other tasks are placed into a component task table. At 108, the target element topology file is read from 40 and placed into a topology table. A list of added or moved elements is then built. The target cable topology file is read at 110, and a list of added or moved cables is built. If the instructions to be generated relate to an upgrade, as determined at 112, the current element and cable topology files (114–116) are read in and further lists of moved or removed elements and cables are determined.

Figure 9B:
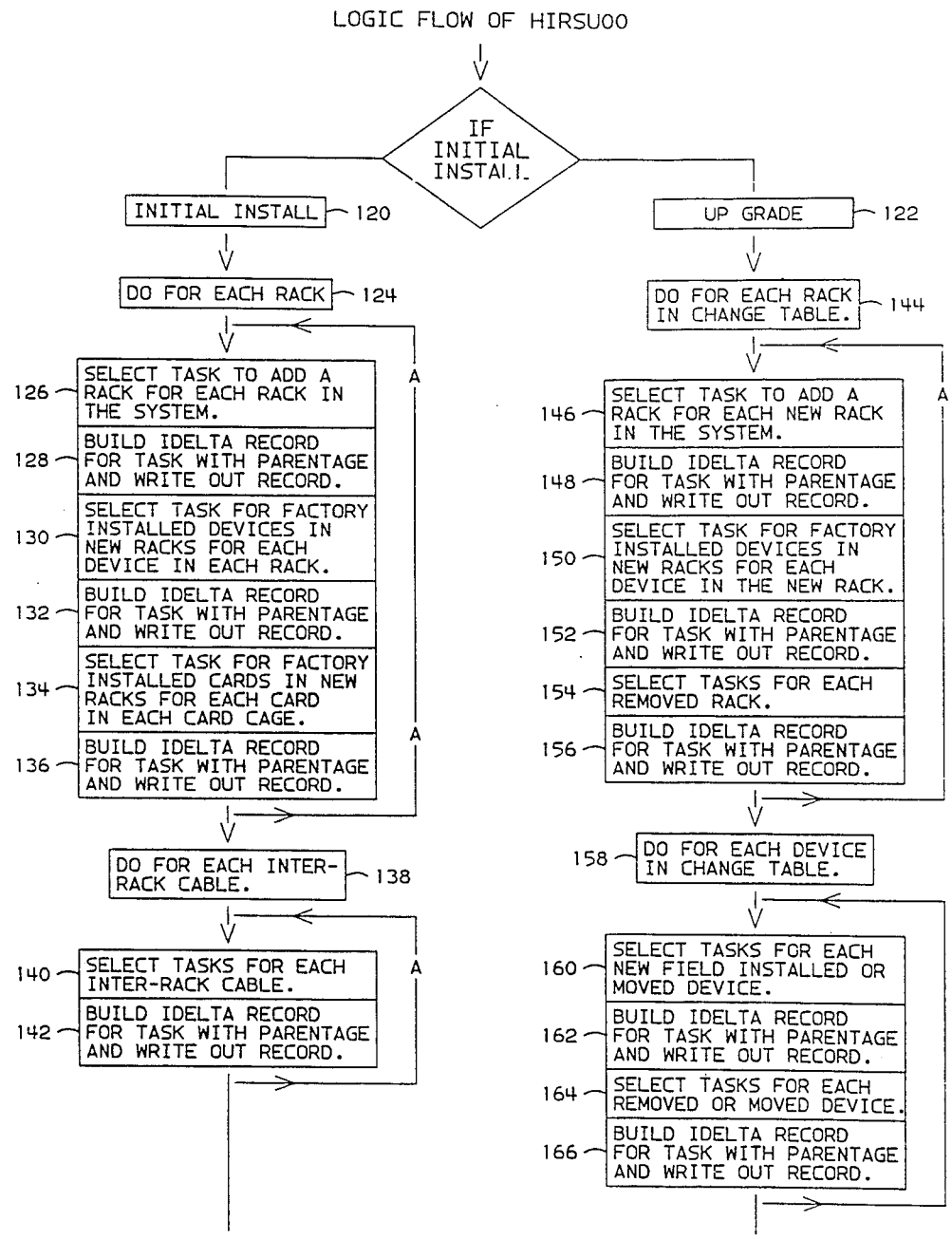
Figure 9C:
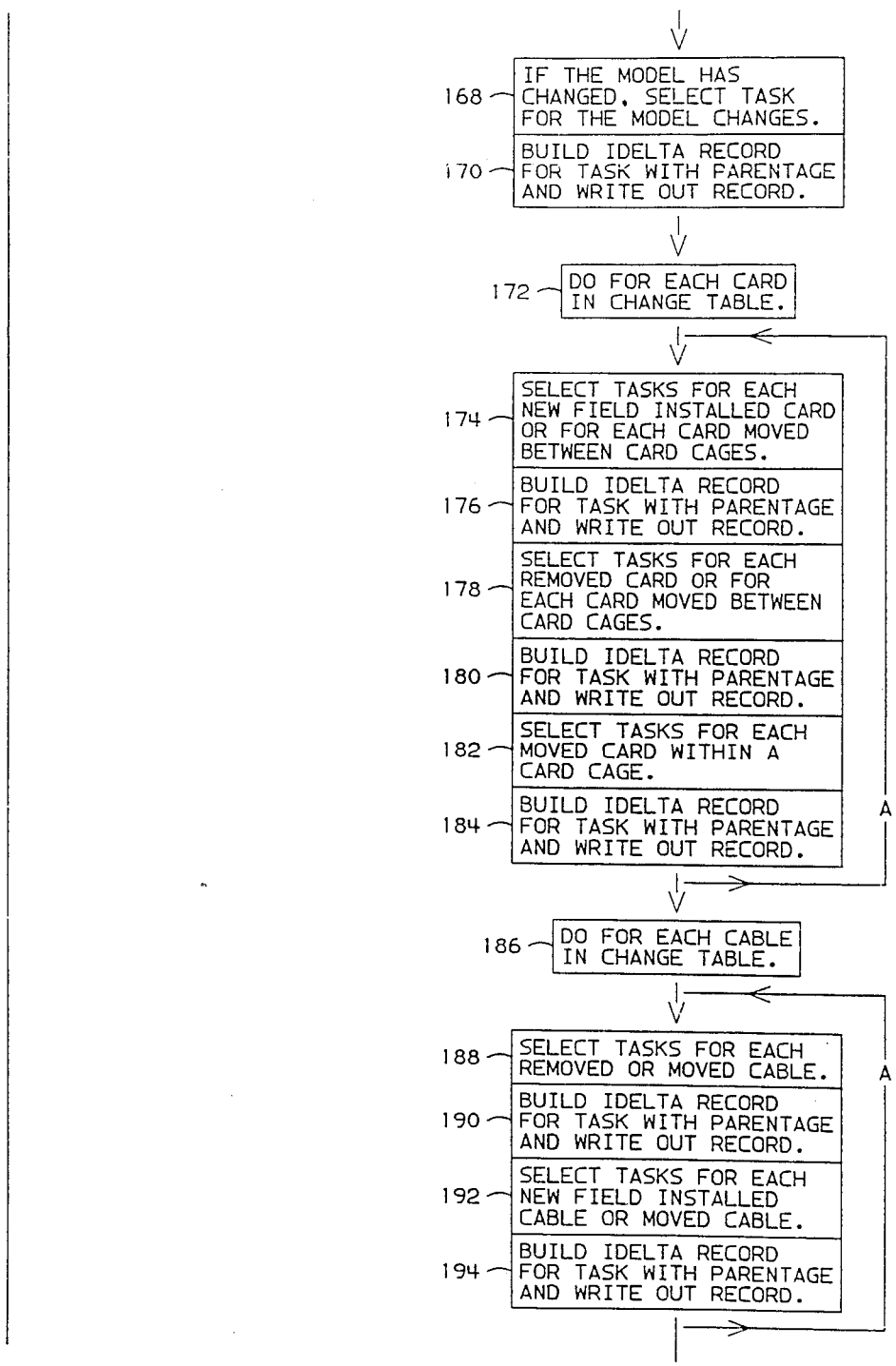
Figure 9D:
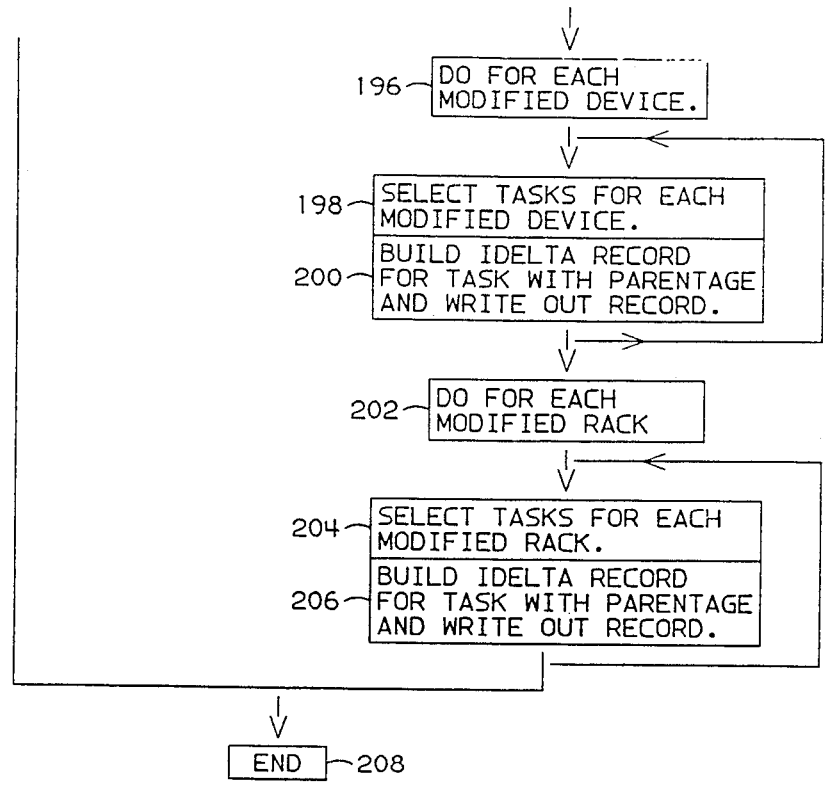

Flow continues in FIG. 9b with initial installation flow starting at 120, and upgrade flow at 122 in separate paths. Much of the function is similar for both paths. Initial installation will be described first. A series of blocks are performed for each rack as indicated at 124. Blocks 126, 128, 130, 132, 134 and 136 select tasks for adding racks, for factory installed devices in new racks and for factory installed cards in new racks for each card in each card cage. Factory simply refers to those components already installed prior to receipt by a customer. For each task, an IDELTA record with parentage is written out. Tasks are also identified for each inter-rack cable starting at 138, 140, and 142, with IDELTA records for each task with parentage being written.

The flow is more complex for upgrades starting at 122 in FIG. 9b. At 144, the lists created in 114, and 116, referred to as a change table, are used to perform steps 146, 148, 150, 152, 154, and 156 on each rack in the change table. Tasks are selected for adding a rack, for factory installed devices in new racks and for each removed rack. An IDELTA record is built for each task with parentage information included, and is written to the intermediate file 48. Starting at 158, the same is done for each device in the change table. Again, at 160, 162, 164, and at 166, tasks for each new field installed or moved device, each removed or moved device, and at 168 and 170 for model changes are selected, with an IDELTA record built and written.

The steps are repeated starting at 172 for each card in the change table. Task selecting and IDELTA record build and writing occurs at 174, 176, 178, 180, 182, and 184 for new field installed cards or each card moved between card cages, for each removed card or for each card moved between cages, and for each card moved within a card cage. Starting at 186, the same steps are done for cables identified in the change table. At 188, 190, 192, and 194, the IDELTA files are generated and written for removed or moved cables, and for new field installed o moved cables. At 196, 198, and 200, the IDELTA files are generated and written for each modified device, and at 202, 204, and 206 for each modified rack. At 208, the task identifier 42 is ended, and the sequencer 50 continues with processing of the intermediate file generated by the task identifier.

Sequencer 50

As previously stated, sequencer 50 is an expert system software program which uses installation rules indicated at 52. The English language rules embodied in the rules 52 are expressed as major task sequencing goals and detailed goal listings in Appendix II. A short flow diagram is also presented in FIG. 10, which shows initialization at 210 during which, as for any program, external declares, flags, arrays, file definitions, selectors, and working memory are set up. At block 212, an ON ENTRY expert system rule is done for initialization for further control rules, such as setting a control working memory element flag to "ON". This initialization includes initialization and allocation of working memory into which files will be written.

A REQUEST rule at 214 is a control rule that is executed based on the control working memory element flag being turned "ON". In block 214, a next intermediate file to sequence is read into an area of working memory, and card addresses are calculated. A subroutine RCVRQST, block 218 in FIG. 10c is used to retrieve the next intermediate file's name. REQUEST block 214 is written to process a batch of intermediate files, and after reading each file, the working memory element flag is set "OFF", and SEQUENCE RULES indicated at 215 are executed. Since the sequencing rules are set forth in detail in Appendix II, the flow is abbreviated in FIG. 10a.

After sequence numbers have been assigned, a CLEANUP block 216 in FIG. 10b searches for the lowest sequence numbered record, and writes it into the sequenced intermediate file. After all the records have been found and written, the intermediate file is closed, and flow is returned to REQUEST block 214 for the next intermediate file. If all are done, an ON IDLE block 217 terminates processing of sequencer 50.

In a further embodiment of the expert system software program the task identifier 42 and the formatter 56 are incorporated into the program to form one common program. This eliminates the intermediate files 48 and 54, the delta hardware handling file 58, the TGIF data file 68 and the translation files 60. The task to graphic interface manager 64 is also broken up into routines and pulled into the common program.

The flow is thus modified so that all flags, arrays, and variables associated with the routines pulled into the common program are initialized. On entry, the reading of the element description and component task files is done. The request reads in the topology files into working memory, and calls a new routine to create working memory element tasks. The sequencing rules then sequence the working memory element tasks as before, and a cleanup routine calls the TGIM routines to build the flat drawings from the topology file/working memory elements. Then the cleanup routine then calls the TGIM routing that builds the script imbed file from the working memory element tasks for scripting and printing of the resulting instructions.

The rules in Appendix II precisely define the operation in terms better than that which applicants can envision by means of more detailed flow charts. A shorter statement of the rules follows:

Hierarchical Rules

1. Tasks which can be performed without powering-off the system will precede the tasks which require system power-off.
a. Load any new code into the system before powering-down the system.
b. If a direct access storage device (DASD) is being removed from the system, instructions on how to 'back-up' the DASD are to be called out and the customer is to be advised to perform that function BEFORE taking the system down to make any changes.
c. If a change will require a system power-down, remove all AC power and remove the line cord from the outlet.

2. whenever possible, "Remove" tasks will precede "Add" tasks. This rule will facilitate an "Add" at a location previously occupied. (The "Move" task is accomplished by "a Remove followed by an Add".)

3. The task of "Power-On" and related steps will always be last. The only acceptable exceptions are tasks requiring an operational system.

4. A "Perspective" relationship will be established by Text and Graphics. The "Perspective" ordering is:
   a. System perspective.
   b. Rack perspective.
   c. Device perspective.
   d. Card Cage perspective.
   e. Extra perspective.
   f. Pseudo perspective.

5. Whenever possible, "Perspective" related tasks will be group together. (Do all tasks behind the RACK before moving to the front of the RACK)
   a. Tasks from a "System" related perspective will have precedence over tasks from a "RACK" related perspective.
      (1) IPL DASD back-up
      (2) RACK Positioning.
   b. For multi-RACK upgrades, RACKS will be sequenced beginning with the RACK farthest away from the RACK containing the CEC.
   c. For multi-RACK upgrades, tasks relating to the first RACK will be completed before beginning the next RACK in sequence.

6. Within a "perspective area", "positional" sequencing must avoid scheduling tasks that make subsequent tasks more difficult.
   a. When doing device REMOVES, work from the top to the bottom.
   b. When doing device ADDs, work from the bottom to the top.
   c. When doing card REMOVES, work from the right to the left.
   d. When doing card ADDs, work from the left to the right.

7. Within "positional" sequencing, "like" tasks should be grouped. (ie-within RACK E, Unlock all DASD shipping clamps.) This rule, when invoked, will temporarily override the "positional:" rule during the sequencing of one task only.

8. Cabling Rules:
All cables will be treated as two "connect/disconnect cable end" tasks associated with the appropriate device(s)/card(s).
All cable tasks must have the cable identified number (EID) supplied in the task text. (This is the same cable identifier number used in the cable chart)
Intra-RACK cables will be treated as RACK elements. ie - The two "connect cable end" tasks will be consecutively sequenced, following installation of the associated device(s)/card(s).
For Inter-RACK cables, the two tasks will of necessity fall into separate "perspective" areas. When the initial cable end is installed, the instructions must state that the other end will be installed at a ater step.
For each "Remove cable end" task, if the cable end will not be re-attached before another cable is encountered, suggest that the cable be labeled.
For each "Install cable end" task, if it is the first end, and the other end will not be installed before another cable is encountered, suggest that the cable be labeled.

Returning to the structure described in FIG. 2, sequencer 50 provides the sequenced intermediate file 54 to the translator 56.

TRANBLATOR PROGRAM 56

The translator program 56 flow is shown in FIG. 11. The translator program 56 is used to vary the text and graphics associated with the task. The text and graphics are varied dependent on the particular view desired, which end of a cable, and the type of cable to be installed. Further variation is dependent on the type of view desired in the graphics. Some views are rotated 90 degrees for better view for the installation of a component.

At 220 in the translator program 56 flow, the translation and pseudo task information from the translate table file 60 is read, and put into table form as seen in FIG. 7 for quicker access by the translator program. The pseudo task information is seen in a listing of the translate table file in Appendix V for a further preferred embodiment. A record corresponding to a task is then read from the intermediate file at 222 and it is determined if the last record has been read at 224. Processing is transferred for each record at 226 to a main loop processing section and then the next record is read at 228 and flow returns to 224 to check for the last record.

The main loop processing section starts at 230. Checks are made at 232 and 236 with the resulting actions indicated at 234 and 238. In both cases, nothing is done by the main processing section 230 with the task. If the task cleared the checks at 232 and 236, then cable labeling and table driven pseudo task processing is performed at 240 and 242. This is done substantially as described earlier, using different fields to cross reference into the tables to determine which variations of text and graphics to use for the task. At 244, the hardware handling record is made, and at 246, further translation tables are used to translate the task group's number and complete the graphic identification number, and output the result to the final hardware handling file.

Processing is then returned to 228 at 248.

Task to graphics interface manager TGIM 64

Figure 12A:
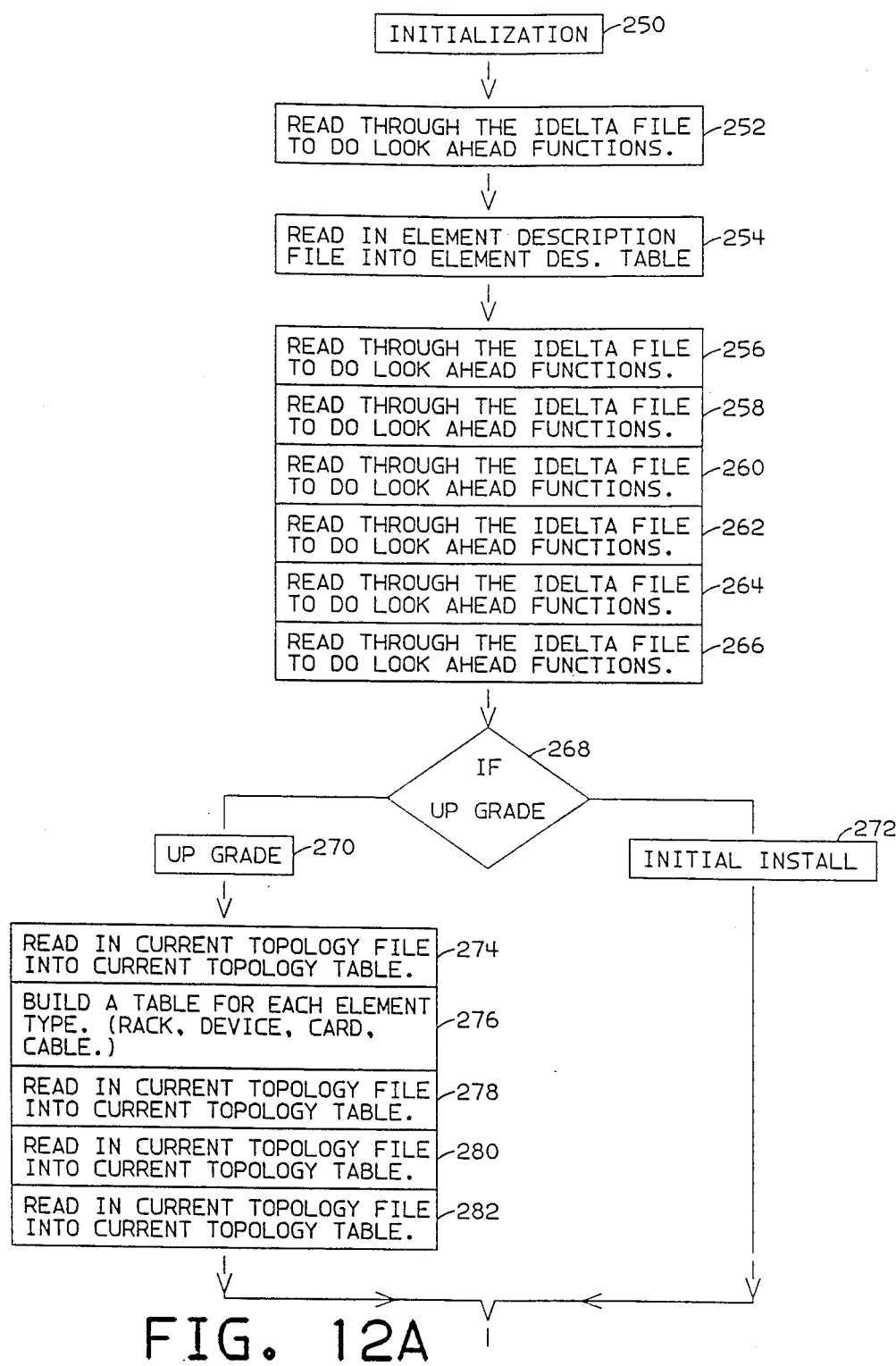
FIGS. 12a and 12b when placed end to end are a flow diagram of a task to graphics manager for generating line drawings and a script file for the customized instructions.
Figure 12B:
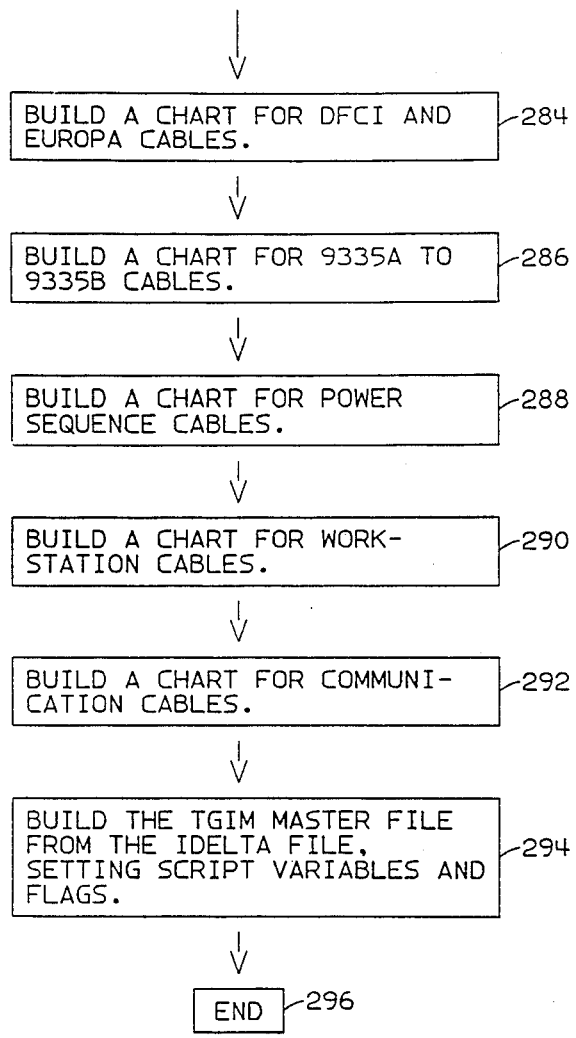

The TGIM 64 uses the hardware handling file 58, and further information from the element description file 44 and the TGIF data file 68 to create customized line drawing files 72 and a script file 74 which contains the names of customized line drawings, and a sequential set of script module names and variables to control generation of integrated in-line instructions by the composer 80. The logical flow of the procedural code used is shown in FIG. 12a and 12b.

Following initialization at 250, the IDELTA file is read through at 252 to perform look ahead functions (such as calculating the total installation time and system time, the number of people required, determine the special tools required, etc.).

At 254, an element description file is read into an element description table. Next, the target topology file is read into a target topology table, 256, a loose part list of field installed parts is built at 258, a flat drawing of the card cages is built at 260, both front and back drawings of each rack are built at 262 and 264, and a list of cards in each cage is built. The line drawings are done by building a script file which defines start and end points for lines to create different size boxes dependent on the size of the component. The boxes are then filled in using script commands with information such as name of the component, its location and logical address.

If the instructions are to be for an upgrade, 268, then the sequence of steps from 270 on is performed before flow is merged back together. There are no corresponding steps under 272 for initial install. At 274, the target topology file is read into the target topology table and a table is built at 276 for each element type such as rack, device card and cable. Flat drawings at 278, 280, and 282 are built for card cages and both the front and rear of each rack.

Both initial install and upgrade steps are the same for building charts for various cables at 284, 286, 288, 290, and 292. Finally the TGIM master file is built from the IDELTA file, setting script variables and flags. Flow is ended at 296, with the result being the list of script commands used to generate the customized instructions.

The customized installation instructions, as can be seen in Appendix V are very detailed, and provide even an installer with little technical experience sufficient guidance to install a system very quickly. By customizing the instructions to the particular system to be installed, an installer need not make any cross references to other manuals, thus reducing the chance for confusion and error. Detailed graphics of the components of the system are provided, clearly illustrating each step of the installation process. The line drawings are effectively utilized to give the installer positional information for installing specific components. In some cases, the graphic views are rotated dependent on which view more clearly illustrates the installation steps. Once the system is installed a rack configuration list, and cable list are provided for future reference, and the installation instructions are thrown away, as they only relate to the installation of the system they were generated for. Further upgrades, modifications, and even system moves will result in a new customized set of instructions detailing the steps involved in adding and removing components or moving the system.

APPENDIX I

Hardware Installation and Removal Services
Data Dictionary

HPCS Record Description.

File Name: STSTOPOL    Desc Name: System Topology Description

Record Name: STDHEADR    Desc Name: STD Header Record

| C H A R A C T E R I S T I C | Z O N E D D E C | P A C K E D D E C I M A L S | D E C I M A L D I G I T | F I E L D L E N G T H | POSITIONS FR-TO | FIELD NAME | FIELD DESCRIPTIVE NAME |
|---|---|---|---|---|---|---|---|
| x | | | | 3  | 001-003 | ELMID | Element Identifier |
| x | | | | 2  | 004-005 | RCDTP | Record Type |
| x | | | | 4  | 006-009 | IDSYS | System Type |
| x | | | | 7  | 010-016 | SYNUM | System Number |
| x | | | | 8  | 017-024 | DTELU | Date Last Update |
| x | | | | 6  | 025-030 | TMENT | Time Last Update |
| x | | | | 3  | 031-033 | WTCTN | World Trade Country |
| x | | | | 6  | 034-039 | RLLVL | Rules Level |
| | x | | | 4  | 040-043 | BOXSD | Box Ship Date |
| x | | | | 4  | 044-047 | UPCID | Upgrade Control ID |
| x | | | | 4  | 048-051 | PLUPC | Prev Level UPCID |
| x | | | | 1  | 052-052 | SPTYP | Service Processor Type |
| x | | | | 48 | 053-100 | FIL78 | Expansion Area |

HPCS Record Description.

File Name: SYSTOPOL    Desc Name: System Topology Description

Record Name: STDELEMT    Desc Name: STD Element Record

| C H A R A C T E R I S T I C | Z O N E D D E C | P A C K E D D E C I M A L S | D E C I M A L D I G I T | F I E L D L E N G T H | POSITIONS FR-TO | FIELD NAME | FIELD DESCRIPTIVE NAME |
|---|---|---|---|---|---|---|---|
| x | | | | 3  | 001-003 | ELMID  | Element Identifier |
| x | | | | 2  | 004-005 | RCDTP  | Record Type |
| x | | | | 3  | 006-008 | ELMFR  | Parent Element Identifier |
| x | | | | 4  | 009-012 | IDMAC  | Machine type |
| x | | | | 3  | 013-015 | IDSMN  | Sales Model |
| x | | | | 6  | 016-021 | DVRPQ  | Device/RPQ Code |
| x | | | | 10 | 022-031 | BMNUM  | Bill of Material Number |
| x | | | | 4  | 032-035 | FIL04  | Filler |
| x | | | | 1  | 036-036 | ELMTP  | Element Type |
| x | | | | 1  | 037-037 | ELMST  | Element Subtype |
| x | | | | 1  | 038-038 | ELSCD  | Element Source Code |
| x | | | | 9  | 039-047 | MACSR  | Machine Serial#/Order# |
| | x | | | 5  | 048-052 | CORDX  | X-Coordinate Location |
| | x | | | 5  | 053-057 | CORDY  | Y-Coordinate Location |
| x | | | | 4  | 058-061 | LOCCD  | Location Description |
| x | | | | 1  | 062-062 | MGOFF  | Mounting Group Offset |
| x | | | | 1  | 063-063 | DFSWA  | DFCI Switch A Setting |
| x | | | | 1  | 064-064 | DFSWB  | DFCI Switch B Setting |
| x | | | | 1  | 065-065 | DFTRA  | DFCI Terminator A String |
| x | | | | 1  | 066-066 | DFTRB  | DFCI Terminator B String |
| x | | | | 1  | 067-067 | DEVST  | Device Status |
| x | | | | 3  | 068-070 | DRIVA  | Driver-'A' String or only |
| x | | | | 3  | 071-073 | DRIVB  | Driver-'B' String |
| x | | | | 10 | 074-083 | SDATA  | S/370 Address Data |
| x | | | | 1  | 084-084 | IPLDC  | IPL device |
| x | | | | 1  | 085-085 | PSDVC  | Primary / Secondary Device Code |
| x | | | | 15 | 086-100 | FIL16  | Filler -- Expansion Area |

HPCS Record Description.

File Name: SYSTOPOL    Desc Name: System Topology Description

Record Name: STDCABLE   Desc Name: STD Cable Record

| C H A R A C T E R | Z O N E D E C | P A C K E D D E C | D E C I M A L S | F I E L D | L E N G T H | P O S I T I O N S FR-TO | FIELD NAME | FIELD DESCRIPTIVE NAME |
|---|---|---|---|---|---|---|---|---|
| x | | | | | 3 | 001-003 | ELMID | Element Identifier |
| x | | | | | 2 | 004-005 | RCDTP | Record Type |
| x | | | | | 3 | 006-008 | MACID | ID of Machine Order |
| x | | | | | 6 | 009-014 | DVRPQ | Device/RPQ Code |
| x | | | | | 10 | 015-024 | BMNUM | Bill of Material Number |
| x | | | | | 4 | 025-028 | FIL04 | Filler |
| x | | | | | 1 | 029-029 | ELMTP | Element Type |
| x | | | | | 1 | 030-030 | ELMST | Element Subtype |
| x | | | | | 1 | 031-031 | ELSCD | Element Source Code |
| - | - | - | - | | --- | ------- | ---------- | --'From' Loc Data------------------- |
| x | | | | | 3 | 032-034 | ELMFR | 'From' Element Identifier |
| x | | | | | 4 | 035-038 | LOCCD | Location Description |
| | x | | | | 5 | 039-043 | CORDX | X-Coordinate Location |
| | x | | | | 5 | 044-048 | CORDY | Y-Coordinate Location |
| - | - | - | - | | --- | ------- | ---------- | --End 'From' Loc Data--------------- |
| - | - | - | - | | --- | ------- | ---------- | --'To' Loc Data--------------------- |
| x | | | | | 3 | 049-051 | ELMTO | 'To' Element Identifier |
| x | | | | | 4 | 052-055 | LOCCD | Location Description |
| | x | | | | 5 | 056-060 | CORDX | X-Coordinate Location |
| | x | | | | 5 | 061-065 | CORDY | Y-Coordinate Location |
| - | - | - | - | | --- | ------- | ---------- | --End 'To' Loc Data----------------- |
| - | - | - | - | | --- | ------- | ---------- | --2nd 'To' Loc Data----------------- |
| x | | | | | 3 | 066-068 | ELMTO | 'To' Element Identifier |
| x | | | | | 4 | 069-072 | LOCCD | Location Description |
| | x | | | | 5 | 073-077 | CORDX | X-Coordinate Location |
| | x | | | | 5 | 078-082 | CORDY | Y-Coordinate Location |
| - | - | - | - | | --- | ------- | ---------- | --End 2nd 'To' Loc Data------------- |
| x | | | | | 1 | 083-083 | DEVST | Device Status |
| x | | | | | 1 | 084-084 | PSDVC | Primary / Secondary Device Code |
| x | | | | | 16 | 085-100 | FIL17 | Filler -- Expansion Area |

HPCS Record Description.

File Name: ELEMDESC   Desc Name: Element Description File
Record Name: BASELEMT   Desc Name: Basic Element Record

| CHARACTER | ZONED DEC | PACKED DEC | DECIMAL DIGITS | LENGTH | POSITIONS FR-TO | FIELD NAME | FIELD DESCRIPTIVE NAME |
|---|---|---|---|---|---|---|---|
| x |   |   |   | 1  | 001-001 | RCDTP | Record Type |
| x |   |   |   | 4  | 002-005 | FIL04 | Filler - Expansion Area |
| x |   |   |   | 10 | 006-015 | BMNUM | Bill of Material Number |
| x |   |   |   | 8  | 016-023 | FIL10 | Expansion Area |
|   | x |   |   | 2  | 024-025 | FNLVL | Functional Level |
| x |   |   |   | 1  | 026-026 | ELMTP | Element Type |
| x |   |   |   | 1  | 027-027 | ELMST | Element Subtype |
| x |   |   |   | 10 | 028-037 | ELMNM | Descriptive Name |
| x |   |   |   | 10 | 038-047 | HPCDN | HPCS Device Name |
| x |   |   |   | 10 | 048-057 | ACCES | Accessory Part Number |
|   | x |   |   | 4  | 058-061 | EXWDT | External Width |
|   | x |   |   | 4  | 062-065 | INWDT | Internal Width |
|   | x |   |   | 2  | 066-067 | EHGHT | Height (EIA Units) |
|   | x |   |   | 5  | 068-072 | MLGHT | Length or Height (MM) |
|   | x |   |   | 4  | 073-076 | MDPTH | Depth (MM) |
|   | x |   | 1 | 4  | 077-080 | KWGHT | Weight (Kilograms) |
|   | x |   |   | 3  | 081-083 | PWRVL | Power Value (KVA) |
|   | x |   |   | 1  | 084-084 | MGOFF | Mounting Group Offset |
|   | x |   |   | 4  | 085-088 | MCBIN | Cable Lgth Increm (MM) |
|   | x |   |   | 2  | 089-090 | PWOCT | Power Outlets Count |
|   | x |   |   | 2  | 091-092 | ARMCT | DASD Arms Count |
|   | x |   |   | 2  | 093-094 | CPTCT | Control Port Count |
|   | x |   |   | 2  | 095-096 | DEVCT | Count of Devices card can drive |
|   | x |   |   | 1  | 097-097 | BUSCT | Count of Buses |
|   | x |   |   | 4  | 098-101 | INTWL | Internal Wiring Length |
| x |   |   |   | 3  | 102-104 | FIL03 | Filler - Expansion Area |
|   | x |   |   | 2  | 105-106 | FWCSN | First Wide Card Slot Number |
| x |   |   |   | 1  | 107-107 | SWDEV | Switched DASD Device Flag |
| x |   |   |   | 1  | 108-108 | TRMTP | Terminator Type |
| x |   |   |   | 1  | 109-109 | HPADD | Device Added By HPCS |
| x |   |   |   | 4  | 110-113 | IDMAC | Machine type (HPCS Adds Only) |
| x |   |   |   | 3  | 114-116 | IDSMN | Sales Model (HPCS Adds Only) |
| x |   |   |   | 6  | 117-122 | DVRPQ | Device/RPQ Code (HPCS Adds Only) |
| x |   |   |   | 1  | 123-123 | CBEXL | Cable Exit Location |
| x |   |   |   | 1  | 124-124 | TOWMT | Tower Mounted Device |
| x |   |   |   | 1  | 125-125 | DPOCD | Delayed Power Off Code |
|   | x |   |   | 3  | 126-128 | LVKVA | 110 V Rack KVA Override |
|   | x |   |   | 3  | 129-131 | COGRX | Center of Gravity X Coordinate |
|   | x |   |   | 3  | 132-134 | COGRY | Center of Gravity Y Coordinate |
|   | x |   |   | 3  | 135-137 | COGRZ | Center of Gravity Z Coordinate |
| x |   |   |   | 4  | 138-141 | STCAP | DASD Storage Capacity |
| x |   |   |   | 13 | 142-154 | FIL17 | Filler - Expansion Area |

------96 Bytes---Array of 6 sets of Coordinates------

| | | | | | | | |
|---|---|---|---|---|---|---|---|
| x |   |   |   | 4 | 155- | LOCCD | Location Description |
| x |   |   |   | 4 |      | JAKNM | Jack Number for Plug |
|   | x |   |   | 4 |      | CORDX | X-Coordinate Location |
|   | x |   |   | 4 | -250 | CORDY | Y-Coordinate Location |

------End of Array------

HPCS Record Description.

File Name: ELEMDESC    Desc Name: Element Description File
Record Name: COMMSPEC  Desc Name: Comm Specify Code Definition.

| CHARACTER- | ZONED- | PACKED- | DEC DIMS | DECIMALS | FIELD LENGTH | POSITIONS FR-TO | FIELD NAME | FIELD DESCRIPTIVE NAME |
|---|---|---|---|---|---|---|---|---|
| x |   |   |   |   | 1  | 001-001 | RCDTP | Record Type |
| x |   |   |   |   | 4  | 002-005 | IDSYS | System Type |
| x |   |   |   |   | 2  | 006-007 | SEQNM | Sequence Number |
| x |   |   |   |   | 35 | 008-042 | FIL35 | Filler area for key |
| ------208 Bytes---Array of 8 sets of Communication Lines------ ||||||||||
| x |   |   |   |   | 3  | 043-    | SPCPF | Specify Code Prefix |
| x |   |   |   |   | 1  |         | FIL01 | Filler - Expansion Area |
| x |   |   |   |   | 1  |         | ELEIF | Electrical Interface |
| x |   |   |   |   | 1  |         | PROTO | Communications Protocol |
| x |   |   |   |   | 1  |         | CNNCT | Connection 'To' Parameter |
| x |   |   |   |   | 1  |         | LSCAT | Line Speed Catagory |
| x |   |   |   |   | 1  |         | CSSTP | Communication Subsystem Type |
| x |   |   |   |   | 1  |         | FIL02 | Expansion Area |
| x |   |   |   |   | 10 |         | BMNUM | Bill of Material Number |
| x |   |   |   |   | 06 |   -250  | FIL06 | Filler - Expansion Area |
| ---------------End of Array--------------- ||||||||||

HPCS Record Description.

File Name: ELEMDESC    Desc Name: Element Description File
Record Name: LNSPDCAT  Desc Name: Line Speed Category Record

| CHARACTER- | ZONED- | PACKED- | DEC DIMS | DECIMALS | FIELD LENGTH | POSITIONS FR-TO | FIELD NAME | FIELD DESCRIPTIVE NAME |
|---|---|---|---|---|---|---|---|---|
| x |   |   |   |   | 1  | 001-001 | RCDTP | Record Type |
| x |   |   |   |   | 4  | 002-005 | IDSYS | System Type |
| x |   |   |   |   | 2  | 006-007 | SEQNM | Sequence Number |
| x |   |   |   |   | 18 | 008-025 | FIL18 | Filler area for key |
| ------220 Bytes---Array of 22 Sets of line speed parameters ------ ||||||||||
| x |   |   |   |   | 1  | 026-    | SPCSF | Specify Code Suffix |
| x |   |   |   |   | 1  |         | LSCAT | Line Speed Category |
|   | x |   |   |   | 4  |         | LNSPD | Line Speed |
| x |   |   |   |   | 4  |   -245  | FIL04 | Filler - Expansion Area |
| ---------------End of Array--------------- ||||||||||
| x |   |   |   |   | 05 | 246-250 | FIL05 | Filler - Expansion Area |

HIRS Record Description.

File Name: DELTAHHF    Desc Name: Delta Hardware Handling File

Record Name: DELTAHHI   Desc Name: Delta Hardware Handling

| CHARACTERISTIC | ZONED DEC | PACKED DEC | DECIMAL DIGITS | FIELD LENGTH | POSITIONS FR-TO | FIELD NAME | FIELD DESCRIPTIVE NAME |
|---|---|---|---|---|---|---|---|
| x | | | | 2 | 001-002 | TTYPE | Task Type to Execute |
| x | | | | 1 | 003-003 | HANCD | Handling Code |
| | x | | | 5 | 004-008 | TSEQN | Task Sequence Number |
| | | | | | 009- | TSKID | Task Identification Number |
| x | | | | 4 | 009-012 | TIXRF | Task ID - Cross Reference Number |
| x | | | | 3 | 013-015 | TIGRP | Task ID - General Grouping Number |
| x | | | | 1 | 016-016 | POWST | Power Status |
| x | | | | 1 | 017-017 | SUBCP | Sub component indicator |
| | | | | | 018- | TCMTM | Task Completion Time |
| | x | | | 3 | 018-020 | TCMTP | Primary Time to Complete Task |
| | x | | | 3 | 021-023 | TCMTA | Alternate Time if Task is in a Group |
| x | | | | 1 | 024-024 | RPERM | Remove Permanently Flag |
| x | | | | 1 | 025-025 | HANLR | Handler Code |
| | | | | | 026- | HPAGE | Parentage |
| x | | | | 3 | 026-028 | ELIL1 | Element Identifier Level 1 (Rack) |
| x | | | | 4 | 029-032 | LOCL1 | Location Code Level 1 |
| x | | | | 3 | 033-035 | ELIL2 | Element Identifier Level 2 (Device) |
| | x | | | 5 | 036-040 | CORY2 | Coordinate Y Level 2 |
| x | | | | 4 | 041-044 | LOCL2 | Location Code Level 2 |
| x | | | | 3 | 045-047 | ELIL3 | Element Identifier Level 3 (Card) |
| | x | | | 5 | 048-052 | CORY3 | Coordinate Y Level 3 |
| x | | | | 4 | 053-056 | LOCL3 | Location Code Level 3 |
| x | | | | 3 | 057-059 | ELIL4 | Element Identifier Level 4 (Cable) |
| | x | | | 5 | 060-064 | CORY4 | Coordinate Y Level 4 |
| x | | | | 4 | 065-068 | LOCL4 | Location Code Level 4 |
| x | | | | 6 | 069-074 | CPFC4 | Cable's Parent Feature Code Number |
| x | | | | 1 | 075-075 | NCBLE | Number of Cable Ends |
| x | | | | 3 | 076-078 | GRAPHID | Graphics Module ID Number for Pubs |
| x | | | | 1 | 079-079 | GROUP | Task Group Flag (Grouped if "G") |
| x | | | | 1 | 080-080 | CLASS | Class of Values to be Set for Task |
| x | | | | 1 | 081-081 | SPCLS | Special Class of Values to be Set |
| x | | | | 19 | 082-100 | FILLR | RESERVED -- Expansion Area |

The remainder of this record format consists of the STDELEMT record from the SYSTOPOL file.

HIRS Record Description.

File Name: ITDELTAF  Desc Name: Intermediate Delta File

Record Name: ITDELTAI  Desc Name: Intermediate Delta

| CHARACTER | ZONED DEC | PACKED DECIMAL | DECIMAL | FIELD LENGTH | POSITIONS FR-TO | FIELD NAME | FIELD DESCRIPTIVE NAME |
|---|---|---|---|---|---|---|---|
| x | | | | 2 | 001-002 | TTYPE | Task Type to Execute |
| x | | | | 1 | 003-003 | HANCD | Handling Code |
| | x | | | 5 | 004-008 | TSEQN | Task Sequence Number |
| | | | | | 009- | TSKID | Task Identification Number |
| x | | | | 4 | 009-012 | TIXRF | Task ID - Cross Reference Number |
| x | | | | 3 | 013-015 | TIGRP | Task ID - General Grouping Number |
| x | | | | 1 | 016-016 | POWST | Power Status |
| x | | | | 1 | 017-017 | SUBCP | Sub Component Code |
| | | | | | 018- | TCMTM | Task Completion Time |
| | x | | | 3 | 018-020 | TCMTP | Primary Time to Complete Task |
| | x | | | 3 | 021-023 | TCMTA | Alternate Time if Task is in a Group |
| x | | | | 1 | 024-024 | RPERM | Remove Permanently Flag |
| x | | | | 1 | 025-025 | HANLR | Handler Code |
| x | | | | 1 | 026-026 | PERSP | Task Perspective |
| x | | | | 3 | 027-029 | GLSQN | Goal Sequence Step Number |
| x | | | | 3 | 030-032 | UPDSQ | Update Sequence Step Number |
| x | | | | 1 | 033-033 | STATE | Task State |
| x | | | | 1 | 034-034 | DIRET | Task Direction |
| x | | | | 1 | 035-035 | MUPID | Model Upgrade Indicator |
| | | | | | 036- | HPAGE | Parentage |
| x | | | | 3 | 036-038 | ELIL1 | Element Identifier Level 1 (Rack) |
| x | | | | 4 | 039-042 | LOCL1 | Location Code Level 1 |
| x | | | | 3 | 043-045 | ELIL2 | Element Identifier Level 2 (Device) |
| | x | | | 5 | 046-050 | CORY2 | Coordinate Y Level 2 |
| x | | | | 4 | 051-054 | LOCL2 | Location Code Level 2 |
| x | | | | 3 | 055-057 | ELIL3 | Element Identifier Level 3 (Card) |
| | x | | | 5 | 058-062 | CORY3 | Coordinate Y Level 3 |
| x | | | | 4 | 063-066 | LOCL3 | Location Code Level 3 |
| x | | | | 3 | 067-069 | ELIL4 | Element Identifier Level 4 (Cable) |
| | x | | | 5 | 070-074 | CORY4 | Coordinate Y Level 4 |
| x | | | | 4 | 075-078 | LOCL4 | Location Code Level 4 |
| x | | | | 6 | 079-084 | CPFC4 | Cable's Parent Feature Code Number |
| x | | | | 1 | 085-085 | CABRL | Cable Relationship |
| x | | | | 1 | 086-086 | NCBLE | Number of Cable ends |
| x | | | | 1 | 087-087 | GROUP | Task Group Flag (Grouped if "G") |
| x | | | | 1 | 088-088 | CLASS | Class of Values to be Set for Task |
| x | | | | 1 | 089-089 | SPCLS | Special Class of Values to be Set |
| x | | | | 31 | 090-120 | FILLR | RESERVED -- Expansion Area |

The remainder of this record format consists of the STDELEMT record from the SYSTOPOL file, please refer to it for rest of the format.

HIRS Record Description.

File Name: COMPON TASK    Desc Name: Component Task File

Record Name: CPTASKII    Desc Name: Component Task Include

| CHARACTERISTIC | ZONE DEC | PACKED DEC | ACKED DECIMID | DEFINED | FIELD | LENGTH | POSITIONS FR-TO | FIELD NAME | FIELD DESCRIPTIVE NAME |
|---|---|---|---|---|---|---|---|---|---|
| x | | | | | | 2 | 001-002 | TTYPE | Task Type to Execute |
| x | | | | | | 1 | 003-003 | HANCD | Handling Code |
| x | | | | | | 10 | 004-013 | HPCDN | HPCS Device Name |
| x | | | | | | 1 | 014-014 | ELMTP | Element Type |
| x | | | | | | 1 | 015-015 | ELMST | Element Subtype |
| x | | | | | | 1 | 016-016 | FILL1 | RESERVED -- Expansion Area |
| x | | | | | | 1 | 017-017 | GROUP | Task Group Flag (Grouped if "G") |
| x | | | | | | 4 | 018-021 | TIXRF | Task ID - Cross Reference No. |
| x | | | | | | 3 | 022-024 | TIGRP | Task ID - General Grouping No. |
| x | | | | | | 8 | 025-032 | FILL2 | RESERVED -- Expansion Area |
| x | | | | | | 1 | 033-033 | PERSP | Task Perspective |
| | x | | | | | 3 | 034-036 | GLSQN | Goal Sequence Step Number |
| | x | | | | | 3 | 037-039 | UPDSQ | Update Sequence Step Number |
| x | | | | | | 1 | 040-040 | STATE | Task State |
| x | | | | | | 1 | 041-041 | DIRET | Task Direction |
| x | | | | | | 1 | 042-042 | POWST | Power Status |
| x | | | | | | 1 | 043-043 | SUBCP | Sub Component Identification |
| | | | | | | | 044- | TCMTM | Task Completion Time |
| x | | | | | | 3 | 044-046 | TCMTP | Primary Time to Complete Task |
| x | | | | | | 3 | 047-049 | TCMTA | Alternate Time if Task is in a Group |
| x | | | | | | 1 | 050-050 | MUPID | Model Upgrade Indicator |
| x | | | | | | 10 | 051-060 | PHPDN | Parent device name |
| x | | | | | | 1 | 061-061 | CABRL | Cable Relationship |
| x | | | | | | 1 | 062-062 | HANLR | Handler Code |
| x | | | | | | 1 | 063-063 | CINTK | Characterize Independent Task |
| x | | | | | | 1 | 064-064 | CLASS | Class of Values to be Set for Task |
| x | | | | | | 1 | 065-065 | SPCLS | Special Class of Values to be Set |
| x | | | | | | 15 | 066-080 | FIL15 | RESERVED -- Expansion Area |

DATA ELEMENT DESCRIPTIONS

E: ACCES    D: ACCESSORY CODE

XREF: BASELEMT

| DEF: Contains the part number by which a device would be
    |      identified when ordered as an accessory.

E: ARMCT    D: DASD ARMS COUNT

XREF: BASELEMT

| DEF: Count of the number of DASD arms. For a DASD record,
    |      this represents the number of arms in the device.
    |      For a card record, this represents the number of arms
    |      which can be driven.

E: BMNUM    D: BILL OF MATERIAL NUMBER

XREF: STDELEMT STDCABLE BASELEMT COMMSPEC

| DEF: A top level number MFI number which identifies one piece
    |      for a Machine type or feature which is to be located by
    |      HPCS.

E: BOXSD     D: Box Ship Date

XREF: STDHEADR

| DEF: Date a System order is due to ship from manufacturing.
　　　　　　|      Provides identification to plant order processing
　　　　　　|      where they may have multiple system orders with the same
　　　　　　|      System Type / System Number and a different ship date.

E: BUSCT     D: BUS COUNT

XREF: BASELEMT

| DEF: The Number of busses which a specific CEC or Expansion
　　　　　　|      unit has.

E: CABRL     D: CABLE RELATIONSHIP

XREF: ITDELTAI CPTASKII

| DEF: Specifies the cable end relationship to the
　　　　　　|      location of the components they attach to.
　　　　　　|      Values: 'A'  = Intra-rack
　　　　　　|              'E'  = Inter-rack E: CBEXL     D: Cable Exit Location

XREF: BASELEMT

| DEF: Code to indicate the position on a device where the
　　　　　　|      cable will exit when properly installed.
　　　　　　|
　　　　　　|      Values: 'L' = Left
　　　　　　|              'M' = Middle
　　　　　　|              'R' = Right E: CINTK     D: Characterize Independent Task

XREF: CPTASKII

| DEF: Identifies tasks which support the
　　　　　　|      physical installation or removal of a component
　　　　　　|      Values 'I' =  Install Task
　　　　　　|             'D' =  Disassemble Task

E: CLASS     D: CLASS OF VALUES TO BE SET

XREF: DELTAHHI ITDELTAI CPTASKII

| DEF: Determines the Values/Variables to be set for the Task.

E: CPFC4     D: CABLE'S PARENT FEATURE CODE NUMBER

XREF: DELTAHHI ITDELTAI

| DEF: This is the Feature Code number of the Cable's Parent.

E: COGRx     D: CENTER OF GRAVITY COORDINATE (X,Y,Z)

XREF: BASELEMT

| DEF: This is the location of the center of gravity of a device.
　　　　　　|      Value is in millimeters from device point of origin.

E: CORDX     D: X-COORDINATE LOCATION

XREF: STDELEMT STDCABLE BASELEMT

| DEF: The horizontal offset of a device or connection within
　　　　　　|      another device or the entire system.
　　　　　　|      Value is carried in millimeters.

E: CORDY     D: Y-COORDINATE LOCATION

XREF: STDELEMT STDCABLE BASELEMT

| DEF: The vertical offset of a device or connection within
　　　　　　|      another device or the entire system.
　　　　　　|      Value is carried in EIA units for Units mounted in
　　　　　　|      a rack.  Carried in millimeters in all other cases.

E: CNNCT  D: CONNECT 'TO' PARAMETER

XREF: COMMSPEC

DEF: Code to identify the destination of the 'TO' end of
        a communication line.

Values: ' ' = Unknown or does not apply
                'A' = Switched Auto-Call
                'B' = Auto-Call Unit
                'C' = System to Workstation with Clock.
                'D' = System to Workstation without Clock.
                'E' = System to System with Clock.
                'F' = System to System without Clock
                'G' = BIS
                'H' = NonAuto-Call Switch or Non-Switch
                      with NonAuto-Call SNBU
                'I' = Nonswitched

E: CSSTP  D: COMMUNICATION SUBSYSTEM TYPE

XREF: COMMSPEC

DEF: For a communication line, CSSTP identifies the IOP type
        or subsystem type requirements.

Values: ' ' = No specific requirements.
                '1' = Line requires Communications Controller for IOP.

E: CPTCT  D: CONTROL PORT COUNT

XREF: BASELEMT

DEF: For a device controller this CPTCT contains a count of
        the number of ports to which cables can be attached.

E: DEVCT  D: COUNT OF DEVICES

XREF: BASELEMT

DEF: Count of the number of devices which have been placed in
        a tower or the number of devices a card can drive.

E: DEVST  D: DEVICE STATUS

XREF: STDELEMT STDCABLE

DEF: Code used to identify the status of parts on the
        Topology file during multiple iterations of an configurator
        conversation.
        Values:  O = Old (Existed on Topology prior to Conversation)
                 I = Implicitly added to Topology by HPCS.
                 E = Explicitly added to Topology by Layer 1.

E: DFSWA  D: DFCI SWITCH A SETTING

XREF: STDELEMT

DEF: This field is used for multiple purposes on the
        Topology File dependent upon Element Type.

- On DFCI Devices: (DASD and Tape driven by DASD Driver)

The value to which a physical switch on a I/O device is
          set to provide that device a unique address.

-- String 'A' or only switch.

-- Values: 0 to 7

- On DASD Device:

'A' String Driving Port on the DASD Controller.

- On a Communications IOA Card.

Sequence of card within the set of IOA's within the
          particular communication subsystem.

- On an Channel Adapter Card.

Channel Type Attached to Channel Adapter.
    (2 = Type A, 3 = Type B, 4 = Type C)

E: DFSWB   D: DFCI SWITCH B SETTING

XREF: STDELEMT

DEF: This field is used for multiple purposes on the Topology File dependent upon Element Type.

- On string switched DFCI Devices.

The value to which a physical switch on a I/O device is set to provide that device a unique address.

- String 'B' switch.

- Values: 0 to 7

- On DASD Device:

'B' String Driving Port on the DASD Controller.

- On a Communications IOP Card.

Protocol of one of the Comm Lines attached to one of the IOA cards driven by the IOP.

E: DFTRA   D: DFCI TERMINATOR A STRING

XREF: STDELEMT

DEF: Identifies whether or not the DFCI output port on string 'A' for an I/O device has a terminator plugged.

Values: '0' = No terminator    '1' = Terminator.

E: DFTRB   D: DFCI TERMINATOR B STRING

XREF: STDELEMT

DEF: Identifies whether or not the DFCI output port on string 'B' for an I/O device has a terminator plugged.

Values: '0' = No terminator    '1' = Terminator.

E: DIRET   D: DIRECTION

XREF: ITDELTAI CPTASKII

DEF: Defines the direction of progressing thru different perspectives of a system, rack, card cage, etc ...
      Values: 'H' = Highest location to lowest location
             'L' = Lowest location to highest location
      Proper choices of direction values ensure that tasks, when completed, will not interfere with succeeding tasks.

E: DPOCD   D: DELAYED POWER OFF CODE

XREF: BASELEMT

DEF: Code to identify a device which needs to have a delayed power off cord.

Values: 'T' = True (DPO Cord)    'F' = False (No DPO)

E: DRIVA   D: DRIVER/CONTROL ON A STRING

XREF: STDELEMT

DEF: Identifies the I/O Adapter Card which is the driver on String 'A' or the only string for an I/O Device.

E: DRIVB   D: DRIVER/CONTROL ON B STRING

XREF: STDELEMT

| DEF: Identifies the I/O Processor Card which is the driver
| on String 'B' for an I/O Device.

E: DTELU    D: DATE LAST UPDATE

XREF: STDHEADR

| DEF: Last date this file was updated - YYYYMMDD format.

E: DVRPQ    D: DEVICE/RPQ CODE

XREF: STDELEMT STDCABLE BASELEMT

| DEF: Code to identify a device which is feature offered on
           |        a machine type. Also can contain an informational
           |        specify code which further defines a machine type or
           |        a feature.

E: EHGHT    D: HEIGHT (EIA UNITS)

XREF: BASELEMT

| DEF: Vertical height of a tower mountable device in EIA units.
           |        One EIA unit equals 1 3/4 inches.

E: ELEIF    D: ELECTRICAL INTERFACE

XREF: COMMSPEC

| DEF: Code to identify the electrical interface for a
           |        communication line.
           |
           |        Values: ' ' = Not a communication line

```
                'A' = RS - 232
                'B' = RS - 422
                'C' = X.21
                'D' = V.35
                'E' = V.25 / RS - 366
                'F' = V.24
                'G' = 803.3
                'H' = 803.5
```

E: ELMFR    D: PARENT ELEMENT IDENTIFIER

XREF: STDELEMT STDCABLE

| DEF: Element identifier of the device within which the current
           |        device is mounted.
           |        For a cable this is the element identifier of the device to
           |        which the 'from' end of a cable is attached. (Toward CEC)

E: ELMID    D: ELEMENT IDENTIFIER

XREF: STDHEADR STDELEMT STDCABLE

| DEF: Code assigned to uniquely identify any device within a
           |        common hardware system.
           |
           |        Values: 001 - 999 and AAA - ZZZ.

E: ELMNM    D: DESCRIPTIVE NAME

XREF: BASELEMT

| DEF: Externally Visible name for a Common Hardware device.
           |        - Machine type / Model for a machine.
           |        - CCIN number for a Card.

E: ELMST    D: ELEMENT SUBTYPE

XREF: STDELEMT STDCABLE BASELEMT CPTASKII

DEF: Code to define the logical class of a device within a
     physical type.

Values:

| (ELMTP) Element Type | (ELMST) Element Subtype | Type of device |
|---|---|---|
| T | 1 | Tower |
| U | 1 | Unit - CEC |
| U | 2 | Unit - DASD Controller |
| U | 3 | Unit - DASD |
| U | 4 | Unit - Tape |
| U | 5 | Unit - Expansion Unit |
| U | 6 | Unit - Rack Mounted Modem |
| U | 7 | Unit - Cover |
| U | 8 | Unit - System Power Interface |
| U | 9 | Unit - Channel Adapter CSU Box |
| U | A | Unit - Mounting Rail |
| U | D | Unit - Diskette Unit |
| U | O | Unit - OEM Reserved Space |
| U | S | Unit - Sleeve for half wide units (Tape) |
| U | U | Unit - Device not supported by HPCS |
| C | 1 | Card - I/O Processor (Standalone) |
| C | 2 | Card - I/O Processor (Requires IOA) |
| C | 3 | Card - I/O Adapter. |
| C | 5 | Card - Transmitter to another Cage. |
| C | 6 | Card - Receiver from another Cage. |
| C | 7 | Card - Transmitter or Receiver. |
| C | 8 | Card - Memory |
| C | 9 | Card - Processor Unit |
| C | A | Card - Air Flow |
| B | 1 | Cable - Data Carriers. |
| B | 2 | Cable - Power Carriers. |
| B | 3 | Cable - Communications |
| B | 4 | Cable - Power Sequencing |
| B | 5 | Cable - S/370 Channel Adapter Cable |
| B | 6 | Cable - Twinaxial Workstation Cable |

E: ELMTO    D: 'TO' ELEMENT IDENTIFIER

XREF: STDCABLE

DEF: Element identifier of the device to which the 'to' end
        of a cable is attached (Away from CEC)

E: ELMTP    D: ELEMENT TYPE

XREF: STDELEMT STDCABLE BASELEMT CPTASKII

DEF: Code to define the general physical class of a device.
        Values:  'T' = Tower
                 'U' = Tower mountable unit
                 'C' = Card
                 'B' = Cable

E: ELSCD    D: ELEMENT SOURCE CODE

XREF: STDELEMT STDCABLE

DEF: Code to indicate at what point a device will be installed
        in a system.

Initial Order Values: 'P' = Installed at plant of control
                         'F' = Field installed
                         'O' = OEM device (installed in field)
                         'B' = Part of Base unit before integration

E: EXWDT    D: EXTERNAL WIDTH

XREF: BASELEMT

DEF: Width of a device in millimeters.

E: FNLVL    D: FUNCTIONAL LEVEL

XREF: BASELEMT

| DEF: Field is used to show that multiple devices which have
　　　　　|      the same HPCS device name (HPCDN) are at different
　　　　　|      functional levels.
　　　　　|
　　　　　|      Values:  00    = Initial Functional level for a device
　　　　　|               01 - 99 = Subsequent functional levels

E: FWCSN    D: FIRST WIDE CARD SLOT#

XREF: BASELEMT

| DEF: Numeric field populated for a processor to identify the
　　　　　|      first wide card slot number.  Used in assignment of
　　　　　|      Air Flow Cards. Values 01 - nn.

E: GLSQN    D: GOAL SEQUENCE STEP NUMBER

XREF: CPTASKII ITDELTAI

| DEF: Defines the Major goal groups which will install
　　　　　|      major parts of the installation.
　　　　　|      All element tasks necessary to be sequenced in order
　　　　　|      to accomplish a major subportion of an installation
　　　　　|      will have a common Goal Sequence Step Number.

E: GRAPHID  D: GRAPHICS MODULE ID NUMBER

XREF: DELTAHHI

| DEF: The Graphics Module ID Number of the Information Development
　　　　　|      Artwork the is associated with the Task.

E: GROUP    D: TASK GROUP FLAG

XREF: CPTASKII ITDELTAI DELTAHHI

| DEF: Determines if a Task is Groupable with other Tasks with
　　　　　|      the same Task ID Number (TSKID).
　　　　　|      Values:  'G' = Task is Groupable
　　　　　|               ' ' = Task is NOT Groupable

E: HANCD    D: HANDLING CODE

XREF: DELTAHHI ITDELTAI CPTASKII

| DEF: Identifies the type of handling the component
　　　　　|      is to receive.
　　　　　|      Values:  'A' = Adding component
　　　　　|               'R' = Removing component
　　　　　|               'M' = Moving component

E: HANLR    D: HANDLER

XREF: DELTAHHI ITDELTAI CPTASKII

| DEF: Identifies the Person doing component handling
　　　　　|      Values:  'C' = Customer
　　　　　|               'I' = IBM personnel

E: HPADD    D: DEVICE ADDED BY HPCS

XREF: BASELEMT

| DEF: Code to identify a device on the Element Description
　　　　　|      file which can potentially be added to an order by HPCS.
　　　　　|      Values:  'T' = Can be added
　　　　　|               'F' = Cannot be added E: HPAGE    D: Hierarchical Parentage
E:   ELILx  D: ELEMENT ID LEVEL X (1-4)
E:   CORYx  D: COORDINATE Y LEVEL X (1-4)
E:   LOCLx  D: LOCATION CODE LEVEL X (1-4)

XREF: DELTAHHI ITDELTAI

| DEF: Identifies the Hierarchical Parentage of the Component
    being Handled.
    Allowing for a maximum of 4 levels in the hierarchy
    the data for each component per level is defined below:

LEVEL 1 contains Rack    Information
    LEVEL 2 contains Device  Information
    LEVEL 3 contains Card    Information
    LEVEL 4 contains Cable   Information

E: HPCDN    D: HPCS DEVICE NAME

XREF: BASELEMT CPTASKII

| DEF: The unique name by which a Common Hardware device is
    known within the scope of HPCS layer 3 and HIRS.

E: IDMAC    D: MACHINE TYPE

XREF: STDELEMT BASELEMT

| DEF: Code by which a machine level device is known in the
    sales manual.

E: IDSMN    D: SALES MODEL

XREF: STDELEMT BASELEMT

| DEF: Model within machine type by which a device is known
    in the sales manual.

E: IDSYS    D: SYSTEM TYPE

XREF: STDHEADR COMMSPEC LNSPDCAT

| DEF: Code to identify the type of system. Usually the Machine
    Type of the highest level processor in the system.

937x = 9370 Processors
    9xxx = New X Processor

E: INWDT    D: INTERNAL WIDTH

XREF: BASELEMT

| DEF: Horizontal open interior space in a tower (millimeters).

E: INTWL    D: INTERNAL WIRING LENGTH

XREF: BASELEMT

| DEF: The length of the internal wiring within a device.

E: IPLDC    D: IPL Device

XREF: STDELEMT

| DEF: Identifies the system's IPL devices
        Values: 'P' = Primary IPL device
                'S' = Secondary IPL device
                'B' = Both Primary and Secondary IPL device

E: JAKNM    D: JACK NUMBER FOR PLUG LOC

XREF: BASELEMT

| DEF: The Number which is printed on the surface of a unit
    to visually name a plug location.

E: KWGHT    D: WEIGHT (KILOGRAMS)

XREF: BASELEMT

| DEF: Weight of a device in Kilograms (format xxx.x)

E: LNSPD    D: LINE SPEED

XREF: LNSPDCAT

| DEF: Speed of a communications line in 100's of Bits per second.

E: LOCCD   D: LOCATION DESCRIPTION

XREF: STDELEMT STDCABLE BASELEMT

DEF: Name applied to the position of one device within another device.

Values:

```
Tower Location Scheme
  X Y Z Z
  | | | |
  | | | |
  | | |  ----- Number of towers to left or right of the one containing
  | | |        the CEC.
  | | |
  | | |-------'C' = Tower which contains the CEC.
  | |         'R' = Right of Tower Containing the CEC.
  | |         'L' = Left of Tower Containing the CEC.
  | |
  | |---------Permanent identifier for a tower(Doesn't Change)(A - Z)
```

LMnn — Identifies a device mounted flush to the left edge of a tower. Since most devices extend the full width of a tower this will be the most common description for a tower mounted device. nn varies from 01 - Max.

RMnn — Identifies a device mounted to the right edge of a tower. This description would only be used with devices which extend less than full width of a tower. nn varies from 01 - Max.

CSss — Slot number for cards. ss = card slot number (01 - 99)

PWSI — Power Sense In - Attachment loc for the intertower power sensor cable.

PWSO — Power Sense Out - Attachment loc for intertower power sensor cable.

PInn — Power In - Attachment loc for Power input.

POnn — Power Out - Attachment loc for power outlet.

BMnn — Channel Adapter CSU box mounted at bottom of tower.
       nn = 01 - 08

VM01 — Vertical Mount - Assigned to a SPI box which is mounted vertically above the PCC unit in the rack.

PWSI — Power Sense In - Attachment loc for the intertower power sensor cable.

PWSO — Power Sense Out - Attachment loc for intertower power sensor cable.

CCnn — Cable Connection - Coordinates to identify the loc of cable connect- ions on the back of a card.
       (nn varies from 01 to device Max).

DInn — DFCI Input port - Coordinates to identify the loc of DFCI input ports on an I/O device.
       (nn = 01 or 02 for current devices)

DOnn — DFCI Output port - Coordinates to identify the loc of DFCI output ports on an I/O device.
       (nn = 01 or 02 for current devices)

DCnn — DFCI Control port - Coordinates to identify the loc of DFCI control ports on an DASD Controller or DASD Device.
       (nn = 01 to 04 for DASD Controller)
       (nn = 01 or 02 for DASD Device)

E: LSCAT    D: LINE SPEED CATEGORY

XREF: COMMSPEC LNSPDCAT

| DEF: Code to identify which category of line speeds applies
　　　　　　|      for a Communications specify code.
　　　　　　|
　　　　　　|      Values: '0' - '7'.

E: LVKVA    D: 110 VOLT RACK KVA OVERRIDE

XREF: BASELEMT

| DEF: Alternate KVA value which a device uses when it is
　　　　　　|      mounted in a 110 Volt Rack

E: MACID    D: ID OF MACHINE ORDER

XREF: STDCABLE

| DEF: Element identifier of the machine type on which a feature
　　　　　　|      cable is ordered.

E: MACSR    D: MACHINE SERIAL#/ORDER#

XREF: STDELEMT

| DEF: Contains the Machine order # assigned by AAS system until
　　　　　　|      a serial number for a machine type is known. After that
　　　　　　|      MACSR contains the serial number.

E: MCBIN    D: CABLE LGTH INCREM (MM)

XREF: BASELEMT

| DEF: Contains an additional length parameter which must be added
　　　　　　|      to the calculated length when determining the total
　　　　　　|      required cable length between two ports. This increment
　　　　　　|      is called for by unique characteristics of the device on
　　　　　　|      which it is found. An example is the length cable required
　　　　　　|      by the cable carrier arms on a DASD Device.

E: MDPTH    D: DEPTH    (MM)

XREF: BASELEMT

| DEF: Front to back depth of a device in millimeters.

E: MGOFF    D: MOUNTING GROUP OFFSET

XREF: STDELEMT BASELEMT

| DEF: Vertical distance from the bottom edge of a tower mounted
　　　　　　|      device to where the mounting group is positioned.
　　　　　　|
　　　　　　|      Value carried in EIA units.

E: MLGHT    D: LENGTH OR HEIGHT (MM)

XREF: BASELEMT

| DEF: Length of a cable or height of a device in millimeters.

E: MUPID    D: MODEL UPGRADE INDICATOR

XREF: ITDELTAI CPTASKII

| DEF: Identifies components relating to a Model Upgrade
　　　　　　|      Values: 'M' = Model Upgrade Component
　　　　　　|             ' ' = not related to Model Upgrade

E: NCBLE    D: NUMBER OF CABLE ENDS

XREF: ITDELTAI DELTAHHI

| DEF: Defines the number of cable ends to sequence
　　　　　　|      Values: '1' = only 1 end to sequence
　　　　　　|              '2' = 2 ends to sequence
　　　　　　|              '3' = 3 ends to sequence

E: PERSP    D: PERSPECTIVE

XREF: ITDELTAI CPTASKII

| DEF: Defines the perspective to take when selecting the
|      group of components to work on for a given task
|      Values: 'S' = System
|              'R' = Rack
|              'X' = Extra
|              'C' = Card Cage / Tail Gate
|              'P' = Pseudo

E: PHPDN    D: PARENT HPCS DEVICE NAME

XREF: CPTASKII

| DEF: Contains the component being handled's parent device
|      descriptive name (see HPCDN for details)

E: PLUPC    D: PREV LVL UPCID

XREF: STDHEADR

| DEF: Upgrade control level code from the input Topology File.

E: POWST    D: POWER STATUS

XREF: DELTAHHI ITDELTAI CPTASKII

| DEF: Status the power to the machine must be in for a task
|      to be performed.
|      Values: 'U' = System can be Power Up
|              'D' = System is Powered Down

E: PROTO    D: PROTOCOL

XREF: COMMSPEC

| DEF: Code to identify the protocol for a
|      communication line.
|
|      Values: ' ' = Not a Communication line
|              'A' = BSC
|              'B' = ASC
|              'D' = SDLC - NRZI
|              'E' = X.25
|              'F' = ECL
|              'I' = Ethernet
|              'J' = SDLC - NON-NRZI
|              'K' = HIFAS Character Mode
|              'L' = HIFAS Block Mode

E: PSDVC    D: PRIMARY/SECONDARY DEVICE CODE

XREF: STDELEMT STDCABLE

| DEF: Code to indicate whether or not a component is the
|      primary piece for an orderable machine type or feature
|      power sequence jack.
|
|      Values: 'P' = Primary piece for device
|              'S' = Secondary piece

E: PWOCT    D: POWER OUTLETS COUNT

XREF: BASELEMT

| DEF: Total number of power outlets on a tower.

E: PWRVL    D: POWER VALUE

XREF: BASELEMT

| DEF: Total amount of power required by a device. For a tower
|      PWRVL represents the total power that can be drawn by the
|      set of devices mounted in the tower.

E: RCDTP   D: RECORD TYPE

XREF: STDHEADR STDELEMT STDCABLE BASELEMT COMMSPEC LNSPDCAT

DEF: Code to identify the record format which maps the contents
        of a record. Values vary by file.

Values:  File SYSTOPOL - System Topology
                 STDHEADR  - System Header   = '10'
                 STDELEMT  - Element         = '40'
                 STDCABLE  - Cable           = '44'
                 STDSPCFY  - Specify Codes   = '60'
                 STDOEMCH  - OEM Character   = '70

File ELEMDESC - Element Description
                 LEVELCTL  - Level Control    = 'A'
                 COMMSPEC  - Communic Spec Df= 'C'
                 DEVTABLE  - Dev to B/M Conv  = 'D'
                 LNSPDCAT  - Line Speed Categ= 'L'
                 SPECDEFN  - Spec Code Def    = 'S'
                 BASELEMT  - Base Elements    = '1'
                 EXTCOORD  - Extended Coord's= '3'

E: RLLVL   D: RULES LEVEL

XREF: STDHEADR

DEF: The maintenance level of the rules file which was used
        to create the Topology file.

E: RPERM   D: REMOVE PERMANENTLY STATUS FLAG

XREF: DELTAHHI ITDELTAI

DEF: Indicated components removal status
        Values: 'P' = permanent removal
                ' ' = temporary removal or not removed

E: SDATA   D: S/370 ADDRESS DATA

XREF: STDELEMT

DEF: For VM systems, SDATA contains the logical device address.

Card Format (ELMTP = 'C')

Byte(1)      = Length
                       - 1 for IOP
                       - 2 for single Address IOA
                       - 3 - 9 for multiple address IOA,s.

Byte(2)      = Channel
        Byte(3-10)   = UU(1).........UU(8)

Unit Format (ELMTP = 'U')

Byte(1)      = Length
                       - 3 for unswitched devices
                       - 6 for switched devices.

Byte(2)      = Channel 1
        Byte(3)      = Address 1 on Channel 1
        Byte(4)      = Address 2 on Channel 1

Byte(5)      = Channel 2
        Byte(6)      = Address 1 on Channel 2
        Byte(7)      = Address 2 on Channel 2

E: SPCLS   D: SPECIAL CLASS OF VALUES TO BE SET

XREF: DELTAHHI ITDELTAI CPTASKII

DEF: Determines any special Values/Variables to be set for
        the Task.

E: STATE   D: TASK STATE

XREF: ITDELTAI CPTASKII

| DEF: Particular state of processing certain tasks
|      Values: 'F' = First, task precedes all others
|              'L' = Last, task follows all others
|              'C' = Cabling, task done only if cabling
|                    required
|              'A' = Add, only if NOT added previously
|              'R' = Remove, only if NOT used again
|              0-9 = Perform, only if Digits do NOT match
|              'P' = PSEUDO Task, NOT to be sequenced

E: STCAP   D: DASD STORAGE CAPACITY

XREF: BASELEMT

| DEF: Storage Capacity of a DASD device in megabytes

E: SUBCP   D: SUB COMPONENT CODE

XREF: ITDELTAI CPTASKII DELTAHHI

| DEF: Identifies a particular sub component activity
|      Values: 'T' = Terminator
|              'S' = DFCI address switch
|              'V' = voltage switch

E: SYNUM   D: SYSTEM NUMBER

XREF: STDHEADR

| DEF: Number assigned by AAS to uniquely identify and tie together
|      the components of a system order.

E: TCMTM   D: TASK COMPLETION TIME

XREF: DELTAHHI ITDELTAI CPTASKII

| DEF: Amount of time required to accomplish task in minutes. (99.9)
|
|      TCMTP is the primary time to complete the task.
|      TCMTA is the alternate time, if the task is in a group.
|      (TCMTA is always a fraction of TCMTP. It measures the higher
|       task efficiency within the "Roll n times" grouping.)

E: TIGRP   D: TASK GROUP NUMBER

XREF: ITDELTAI CPTASKII DELTAHHI

| DEF: Specifies the unique number for each task description
|      for a Rack, Device, Card, or Cable.

E: TIXRF   D: TASK CROSS REFERENCE

XREF: ITDELTAI CPTASKII DELTAHHI

| DEF: Specifies the general task cross reference number

E: TSEQN   D: TASK SEQUENCE NUMBER

XREF: ITDELTAI DELTAHHI

| DEF: Specifies the task sequence number in relation to
|      other tasks that must be performed.

E: TSKID   D: TASK IDENTIFICATION NUMBER

XREF: DELTAHHI ITDELTAI

| DEF: Determines the unique task identification.
|      Made up of TIGRP & TIXRF.

E: TMENT   D: TIME LAST UPDATE

XREF: STDHEADR

| DEF: System time when the previous update was made to a Topology.

E: TRMTP     D: TERMINATOR TYPE

XREF: BASELEMT

| DEF: Code to indicate the type of terminator associated with a
|      device.
|
|      Values: 'D' = DFCI String Terminator.
|              P  = Power Sequencing Terminator

E: TTYPE    D: TASK TYPE TO EXECUTE

XREF: DELTAHHI ITDELTAI CPTASKII

| DEF: Identifies the Command to be processed.
|      Values for the First Digit are:
|              '0' = Add Task
|              '1' = Remove Task
|              '4' = Modify Task
|      Values for the Second Digit are:
|              '1' = Rack Task
|              '2' = Device Task
|              '3' = Card Task
|              '4' = Model Change Task
|              '5' = Cable Task
|              '6' = Terminator Task
|      Other Values:
|              '97' = Universal Upgrade Task
|              '98' = Universal Initial Install Task
|              '99' = Universal Task

E: UPCID    D: UPGRADE CONTROL ID

XREF: STDHEADR

| DEF: Code to uniquely identify the Order List and Topology File
|      which are to be used in a upgrade pass through HPCS.

E: UPDSQ    D: UPDATE SEQUENCE STEP NUMBER

XREF: CPTASKII ITDELTAI

| DEF: Defines the goal point within a major goal group when a
|      specific task for a set of elements must be sequenced.

E: WTCTN    D: WORLD TRADE COUNTRY

XREF: STDHEADR

| DEF: The World Trade Country in which a system is to be
|      installed.

1.0 Major Task Sequencing Goals
1.1 *Major Goals for Initial Install*
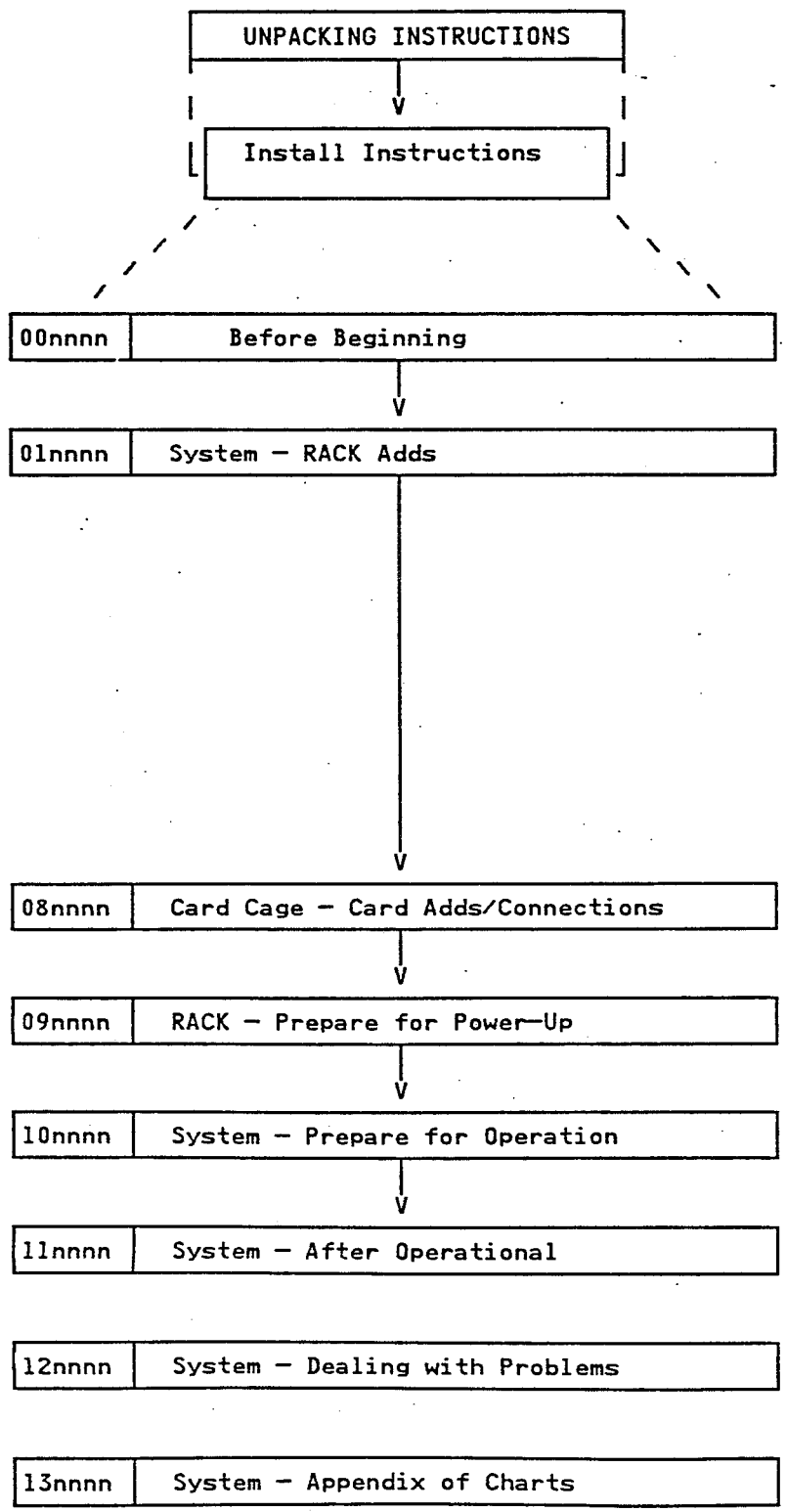

1.2 Major Goals for Upgrades

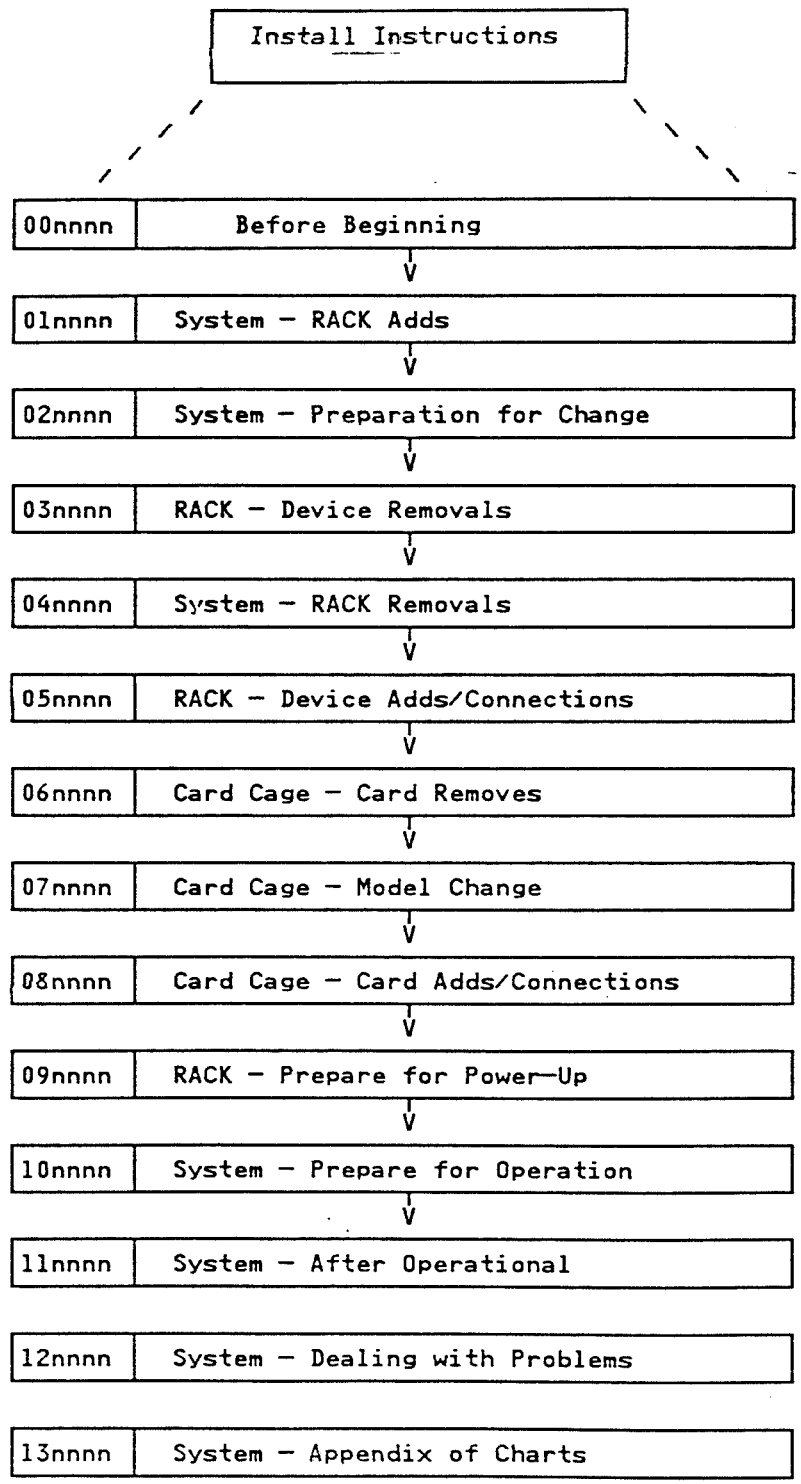

| | |
|---|---|
| | Install Instructions |
| 00nnnn | Before Beginning |
| 01nnnn | System — RACK Adds |
| 02nnnn | System — Preparation for Change |
| 03nnnn | RACK — Device Removals |
| 04nnnn | System — RACK Removals |
| 05nnnn | RACK — Device Adds/Connections |
| 06nnnn | Card Cage — Card Removes |
| 07nnnn | Card Cage — Model Change |
| 08nnnn | Card Cage — Card Adds/Connections |
| 09nnnn | RACK — Prepare for Power-Up |
| 10nnnn | System — Prepare for Operation |
| 11nnnn | System — After Operational |
| 12nnnn | System — Dealing with Problems |
| 13nnnn | System — Appendix of Charts |

1.3 Tasks for Initial Install only

| | | |
|---|---|---|
| 0. | Entry Module - Before Beginning | SETM1 |
| 1. | GOAL: System - RACK Adds | |
| | ■ Position RACK | ASRP1 |
| | ■ Set-Up RACK | ASRH1 |
| 2. | GOAL: System - Prepare for Change | |
| | ■ (Not used for Initial Install) | |
| 3. | GOAL: RACK - Device Removes | |
| | ■ (Not used for Initial Install) | |
| 4. | GOAL: System - RACK Removal | |
| | ■ (Not used for Initial Install) | |
| 5. | GOAL: RACK - Device Adds | |
| | ■ Prepare Device(s) for running: | |
| | ■ Unlock Shipping Wedges | UDSW1 |
| | ■ Unlock Shipping Clamps | UDCH1 |
| | ■ Open Cable Guide Arm | ODGH_ |
| | ■ Verify Cable Terminator | VDCT_ |
| | ■ Verify/Set Voltage Switches | SDVS_ |
| | ■ Unlock Shock Protection | UDSH_ |
| | ■ Set Address Switches | SDAS_ |
| | ■ Set Device CB "ON" & chk pwr cbl | SDCB_ |
| | ■ Connect Device cables ends: | |
| |    Install Device Signal Cable End(s) | ADSC_ |
| |    Install Device end DFCI Cable End(s) | ADDC_ |
| | ■ Install Cables to Guide Arm | ADGH_ |
| | ■ Close Cable Guide Arm | C_GH_ |
| 6. | GOAL: Card Cage - Card Removal | |
| | ■ (Not used for Initial Install) | |
| 7. | GOAL: Card Cage - Model Change | |
| | ■ (Not used for Initial Install) | |
| 8. | GOAL: Card Cage - Card Adds/Connections | |
| | ■ Install Card end Signal Cable(s) | ACSC_ |
| | ■ Install Console Cable to Loon | ASLC1 |
| | ■ Install ECS Modem to Line | ASEM1 |
| 9. | GOAL: RACK - Prepare for Power | |
| | ■ Install Power Sequence Cable | ARSC1 |
| | ■ Install Power Cable | ARPC1 |
| | ■ Set Circuit breakers "ON" | SRCB1 |
| | ■ Set Device(s) to READY/ON | SDSR_ |
| | ■ Install SHORE Battery | ADSB1 |
| 10. | GOAL: System - Pepare for Operation | |
| | ■ Provide AC Power | ASAC1 |
| | ■ Power Up System Console | ASCP1 |
| | ■ Power Up System | ASYP1 |
| | ■ Verify POR sequence | VPOR_ |
| | ■ Perform IPL & verify sequence | AIPL_ |
| | ■ Verify Tape Drive Operation | VSTD1 |
| | ■ Verify ECS Modem Operation | VSEM1 |
| 11. | GOAL: System - After Operational | |
| | ■ Install remaining W.W. Cables | AWSC1 |
| | ■ Install remaining Comm Cables | ACMC1 |
| 12. | GOAL: System - Dealing with problems | |
| | ■ Power-Up problems | SPUP1 |
| | ■ IPL problems | SIPP1 |

Appended Charts

■ RACK Configuration list      RCKCL
■ Cable Charts      DCABCT

1.4 Tasks for Upgrade/Install

| 0. | Entry Module – Before Beginning | SETM2 |

1. GOAL: System – RACK Adds
   - Position RACK — ASRP1
   - Set-Up RACK — ASRH1
2. GOAL: System – Prepare for Change
   - Power Down System — RSYP1
   - Remove all AC Power — RSAC1
3. GOAL: RACK – Device Removes
   - Open Cable Guide Arm — ODGH_
   - Disconnect Device Cables:
     - Remove Device Power Cable(s) — RDPC1
     - Remove Device Signal Cable End(s) — RDSC_
     - Remove Device end DFCI Cable End(s) — RDDC_
     - Remove DFCI Cable Terminator — RDDT_
   - Prepare Device(s) for remove:
     - Lock Shock Protection — LDSH_
     - Lock Shipping Wedges — LDSW1
     - Remove cables from Guide Arm — RDGH_
     - Close Cable Guide Arm — CDGH_
     - Lock Shipping Clamps — LDCH1
   - Mechanically remove Device:
     - Assemble lifting tool — ALDH1
     - Assemble adapter tool — ALDH1
     - Assemble mounting tool — ALDH1
     - Remove Device from RACK — RLEV_
   - Remove mounting hardware — RDMH_
   - Install RACK Filler(s) — ARFH1
4. GOAL: System – RACK Removal
   - Disconnect RACK cables:
     - Remove Power Cable(s) — RRPC1
     - Remove Power Sequence Cable end — RRSC1
     - Remove Pwr Seq Cbl Terminator — RRST1
   - Remove RACK — RSRH1
5. GOAL: RACK – Device Adds
   - Remove RACK Filler(s) — RRFH1
   - Mechanically Install Device:
     - Install mounting hardware — ADMH_
     - Install Device in RACK — ADEV_
     - Disassemble mounting tool — RLDH1
     - Disassemble adapter tool — RLDH1
     - Disassemble lifting tool — RLDH1
   - Prepare Device(s) for running:
     - Unlock Shipping Wedges — UDSW1
     - Unlock Shipping Clamps — UDCH1
     - Open Cable Guide Arm — ODGH_ (dup)
     - Verify Cable Terminators — VDCT_
     - Verify/Set Voltage Switches — SDVS_
     - Unlock Shock Protection — UDSH_
     - Set Address Switches — SDAS_
     - Set Device CB "ON" & chk pwr cbl — SDCB_
     - Connect Device cables ends:
       - Install Device Pwr Cbl & set CB "ON" — ADPC1
       - Install Device Signal Cable End(s) — ADSC_
       - Remove DFCI Cable Terminator — RDDT_ (dup)
       - Install Device end DFCI Cable End(s) — ADDC_
       - Install DFCI Cable Terminator — ADDT_
     - Install Cables to Guide Arm — ADGH_
     - Close Cable Guide Arm — CDGH_ (dup)
6. GOAL: Card Cage – Card Removal
   - Remove Card end Signal Cable(s) — RCSC_
   - Remove Card — RCDT_
7. GOAL: Card Cage – Model Change
   - Remove Bus Cable — RDBC1
   - Remove Card Cage — RDCG1
   - Install Card Cage — ADCG1
   - Install Bus Cable(s) — ADBC1
8. GOAL: Card Cage – Card Adds/Connections
   - Add Card — ACDT_
   - Install Card end Signal Cable(s) — ACSC_
   - Install Console Cable to Loon — ASLC1
   - Install ECS Modem to Line — ASEM1

9. GOAL: RACK - Prepare for Power
   - Remove Pwr Seq Cbl Terminator         RRST1 (dup)
   - Install Power Sequence Cable          ARSC1
   - Install Pwr Seq Cbl Terminator        ARST1
   - Install Power Cable                   ARPC1
   - Set Circuit breakers "ON"             SRCB1
   - Set Device(s) to READY/ON             SDSR_
   - Install SHORE Battery                 ADSB1
10. GOAL: System - Pepare for Operation
    - Provide AC Power                     ASAC1
    - Power Up System Console              ASCP1
    - Power Up System                      ASYP1
    - Verify POR sequence                  VPOR_
    - Perform IPL & verify sequence        AIPL_
    - Verify Tape Drive Operation          VSTD1
    - Verify ECS Modem Operation           VSEM1
11. GOAL: System - After Operational
    - Install remaining W.W. Cables        AWSC2
    - Install remaining Comm Cables        ACMC2
12. GOAL: System - Dealing with problems
    - Power-Up problems                    SPUP1
    - IPL problems                         SIPP1
    - Cable label problems                 SPCL1

Appended Charts
- RACK Configuration list                  RCKCL
- Cable Charts                             DCABCT

1.5 Pseudo Tasks

Definition - Any actions or preparations other than the physical tasks required to perform an installation are "Pseudo Tasks".

- Verify that the order list is complete and correct.           PVOL_
- Verify that Reference Material callouts are available.        PVRM1
- Verify that RACK contents match displayed view.               PVRF_
- Verify that Card Cage contents match displayed view.          PVCC_
- Notify installer to lable the cable <P/N> with cable ID <EID>. PNLC_
- Notify installer that cable to be installed is labled <EID>.  PNCL1
- Notify installer to package removed components for shipment.  PNPS1
- Notify installer to run IMA option for Upgrade Topology.      PNUT1
- Notify installer that installation is complete.               PNSC1
- Notify installer of "System Down Time" <STIME>.               PNST1
- Provide Education of "how to Handle Cards".                   PNHC1
- Provide Education of "how to Add Cards".                      PNAC_
- Provide Education of "how to Remove Cards".                   PNRC1
- Display RACK front view.                                      PDRF_
- Display RACK rear view.                                       PDRR_
- Display Card Cage rear view.                                  PDCC1

1.6 Interpreting the Goal Flow Sequencing Charts

1. There are two types of Goal Flow sequencing relationships. Horizontal sequencing - where the "TASK" is selected and elements are sub-sequenced by position. Vertical sequencing - where the "ELEMENT" is selected by its position and the tasks are sub-sequenced.

- Goals with numbers ending with "nn" trigger all tasks on the horizontal line simultaneously (horizontal sequencing). The secondary sequencing relationships for the triggered tasks are established by the positional rule for the goal section.

- Goals with numbers ending in numeric digits may only trigger a single task sequence number (vertical sequencing). For those goals, the primary sequencing relationships are established by the positional rule for the section.

2. Goals with a "G" flag suffixed with the goal number allow grouping of identical tasks. When appropriate, the statement "Repeat this task for "N" elements" will be printed by SUU or "Inline" print processor.

3. Perspective relationships:

a. When goals deal with System perspective, the following abbreviations have been used:
      - R  - RACK
      - S  - System Card cage b. When goals deal with RACK perspective, the following abbreviations have been used:
      - B  - Expansion Card cage
      - KA - DASD Controller device
      - KB - DASD device
      - A  - DASD device
      - P  - Diskette device
      - F  - Tape device
      - K  - Tape device
      - N  - Tape device
      - BS - Tape device c. When goals deal with Card Cage perspective, the following abbreviations have been used:
      - V  - "Vanilla" cards w/o tailgate assemblies
      - AF - Air Flow Cards
      - E  - Expansion Bus extender Cards
      - SK - Cards w/ Single cable
      - MK - Cards w/ Multi-cables 4. Pseudo tasks have goals beginning with "Xnnnnn". They have no associated entries in the component task file.
   - The first digit of the pseudo task names will always be "P" (Pseudo)
   - The second digit of the pseudo task names define sub-type:
     - "D" - Display information or diagram.
     - "V" - Verify that correct conditions are met.
     - "N" - Notify installer of some process related activity.
   - The remaining digits of the pseudo task names provide uniqueness.

2.0 Detailed Goal listings

2.1 General - Before Beginning

| Goal No | Pseudo Task description | Name | II | UG |
|---------|-------------------------|------|----|----|
| X001nnn | Display Entry information: Verify SHORE (System) Ser No. Display "Time" information. 3 CE's req'd (PNCE) Lifter req'd (PNLR,PNLA) ESD kit req'd & Handling Cards (PNKR) Back-Up DASD (PNBD) Erase DASD (PNED) | SETM | 1 | 2 |

If "Parentage" fields indicate that RACK(s) will be affected by a component ADD or REMOVE upgrade change or Initial Install. Work from RACK A to RACK Z.

| Goal No | Pseudo Task description | Name | II | UG |
|---------|-------------------------|------|----|----|
| X00211n | Display a line drawing of the RACK front view. (Ask for verification of RACK configuration) | PVRF | 2 | 1 |

If "Parentage" fields indicate that Card Cage(s) in the above RACK will be affected by the upgrade change or Initial Install. Work from top to bottom of the RACK.

| Goal No | Pseudo Task description | Name | II | UG |
|---------|------------------------|------|----|----|
| X00212n | Display a line drawing of the Card Cage view. (Ask for verification of Card Cage contents) | PVCC | 2 | 1 | repeat step X00212n until last Card Cage is done.
repeat steps X00211n through X00212n until last RACK is done

| Goal No | Pseudo Task description | Name | II | UG |
|---------|------------------------|------|----|----|
| X0031nn | Display Entry information, Order parts list is complete. | PVOL | 1 | 2 |
| X0032nn | Ask Customer/Installer to verify that all SUU Ref material call-outs are available. | PVRM | 1 | 1 |

Go to 010nnn

2.2 System - RACK Adds

010nnn  If no new RACK or RACKS are on the order; go to 020nnn.
        Else; Add new RACK(s)
        Establish sub-sequence according to the following priority:
            Work from RACK A to RACK Z.
(For RACK Positioning, use System planning forms as Reference.)

| Goal No | Task Description | Name | R | BS |
|---------|------------------|------|---|----|
| 011nnn G | Position RACK(s) | ASRP | 1 | 2 |
| 012nnn G | Setup RACK(s) | ASRH | 1 | 2 |

If no RACK(s) contain devices w/ Element Source field = "P";
Go to 020nnn.
Else; "Prepare for running" any devices with Element Source
field = "P" (only for goals 013nnn, all of the other goals
are written for components with Element Source code = "F")
For goals 013nnn through 016nnn, establish sub-sequencing
according to the following priorities:
    Work from RACK Z to RACK A.

| Goal No | Pseudo Task description | Name | II | UG |
|---------|------------------------|------|----|----|
| X013nnn | Display a line drawing of RACK rear view for perspective. | PDRR | 2 | 2 |

For goals 0131nn through 0136nn, establish sub-sequencing
according to the following priorities:
    Work from bottom to top of RACK

| Goal No | Task Description | Name | B | KA | KB | A | P | N | BS | F | K |
|---------|------------------|------|---|----|----|---|---|---|----|----|----|
| 0131nn G | Unlock Shipping Wedges | UDSW | | | | | | | | 1 | |
| 0132nn G | Unlock Shipping Clamps | UDCH | | 1 | 2 | | | | | 3 | |
| 01331n G | Open Cable Guide Arm | ODGH | | 1 | | | | | | | |
| 01332n | Verify Cable Terminators | VDCT | | 1 | | 2 | 2 | | | 3 | 4L |
| 01341n G | Verify/Set voltage switches | SDVS | | | | 1 | | | | 2 | |
| 01342n G | Unlock Shock protection | UDSH | | | | 1 | | | | | |
| 0135nn | Set address switches | SDAS | | 1S | | 2S | 3S | | | 4S | 5L |
| 0136nn G | Set CB "ON" & chk Pwr Cbl | SDCB | 1 | 5 | 2 | 6 | 7 | 7 | 8 | 3 | 4 |

| Goal No | Pseudo Task description | Name |
|---|---|---|
| X015nnn | For each Inter-RACK cabling task, If it is the first end; label the cable with cable ID No. | PNLC |
| X015nnn | For each Inter-RACK cabling task, If it is the second end; Supply the cable ID No. previously labeled. | PNCL |

For goals 0151nn through 016nnn, establish sub-sequencing according to the following priorities:
Work from bottom to top of RACK

| Goal No | Task Description | Name | KA | KB | A | P | N | BS | F | K |
|---|---|---|---|---|---|---|---|---|---|---|
| 0151nn | Open Cable Guide Arm | ODGH | | 2 | | | | | 3 | |
| 0152nn | Install Device Signal Cbl End | ADSC | 1P | 2 | | | 3 | 4 | | |
| 0153nn | Install Device DFCI Cable End | ADDC | 1P | | 2P | 2P | | | 3P | 4P |
| 0154nn G | Install cables to Guide Arm | ADGH | 1 | 2 | | | | | 3 | |

| Goal No | Task Description | Name | KA | KB | A | P | N | BS | F | K |
|---|---|---|---|---|---|---|---|---|---|---|
| 016nnn G | Close Cable Guide Arm | CDGH | 1 | 2 | | | | | 3 | |

Repeat steps 013nnn through 016nnn until last RACK is done.

If Initial Installation; go to 0851nn.
Else; Go to 020nnn.

2.3 System - Preparation for change

020nnn    If a RACK with "P" element status devices have been added;

| Goal No | Pseudo Task description | Name | II | UG |
|---|---|---|---|---|
| X020nnn | Notify Installer that the next task will require the system for <STIME> hours. (Note - This is a good time for a break) | PNST | — | 1 |

| Goal No | Task Description | Name | R | BS | S |
|---|---|---|---|---|---|
| 021nnn | Power Down the System | RSYP | | | X |
| 022nnn | Remove all AC System Power | RSAC | 1 | 1 | |

Go to 030nnn.

2.4 RACK - Device removals

030nnn   If no RACK mounted Device(s) will be added or removed, and if no RACKs will be removed; Go to 060nnn. Else; Go to 031nnn.

Establish RACK sequencing according to the following priority: Work from RACK A toward RACK Z.

| Goal No | Pseudo Task description | Name | II | UG |
|---|---|---|---|---|
| X031nnn | Display a line drawing of RACK rear view for perspective. | PDRR | — | 1 |
| X031nnn | For each Device remove cable end task, if it is the first end; label it with the cbl ID No. | PNLC | — | — |

Establish sub-sequence according to the following priorities: work from top to bottom of RACK

| Goal No | Task Description | Name | B | KA | KB | A | P | N | BS | F | K |
|---|---|---|---|---|---|---|---|---|---|---|---|
| 0311nn | Open Cable Guide Arm | ODGH | | 1 | 2 | | | | | 2 | |
| 0312nn | Remove Device Sig cbl end | RDSC | | 1P | 2 | | | 3 | 4 | | |
| 0313nn | Remove Device DFCI cbl end | RDDC | | 1P | | 2P | 2P | | | 3P | 4P |
| 0314nn | Remove Device power cables | RDPC | 1 | 2 | 3 | 4 | 5 | 5 | | 6 | 7L |
| 0315nn | Remove DFCI Terminator(s) | RDDT | | 1 | | 2 | 2 | | | 3 | 4L |
| 03161n | Lock Shock Protection | LDSH | | | 1 | 2 | 3 | 5 | 6 | 4 | |
| 0317nn | Remove cables in Guide Arm | RDGH | | 1 | 2 | | | | | 3 | |
| 0318nn | Close Cable Guide Arm | CDGH | | 1 | 2 | | | | | 3 | |
| 0319nn | Lock Shipping clamps | LDCH | | 1 | 2 | | | | | 3 | |
| 03201n | Assemble lifter to RACK | ALDH | 1 | | 1 | | | | | | |
| 03202n | Assemble adapter to lifter | ALAH | 1 | | | | | | | | |
| 03203n | Assemble guiding hardware | ALMH | 1 | | | | | | | | |
| 0321nn | Remove Device(s) from RACK | RDEV | 1 | 2 | 3 | 4 | 4 | 4 | | 5 | 6L |

If no similar Device(s) will be added back in the open location;

| Goal No | Task Description | Name | B | KA | KB | A | P | N | BS | F | K |
|---|---|---|---|---|---|---|---|---|---|---|---|
| 03221n | Remove guiding hardware | RLMH | 1 | | | | | | | | |
| 03222n | Remove adapter from lifter | RLAH | 1 | | | | | | | | |
| 03223n | Remove lifter from RACK | RLDH | 1 | | 1 | | | | | | |
| 0323nn | Remove Mounting hardware | RDMH | 1 | 2 | 5 | 1 | 1 | 1 | | 3 | 4 |

| Goal No | Task Description | Name | R |
|---|---|---|---|
| 0324nn G | Remove RACK Filler(s)—— | RRFH | 1 |

If any devices are being permanently removed;

| Goal No | Pseudo Task description | Name | II | UG |
|---|---|---|---|---|
| X033nnn | Notify the CE to package the components appropriately for shipment or storage. | PNPS | — | 1 |

Go to 040nnn.

2.5 System - RACK Removals

040nnn  If no RACK(s) are to be removed; Go to 050nnn.

If this is a "Relocate" remove only one end of any Inter-RACK cables. Do not remove any Intra-RACK cables. Establish sub-sequence according to the following priorities: work from top to bottom of RACK

| Goal No | Task Description | Name | KA | KB | A | P | N | BS | F | K |
|---|---|---|---|---|---|---|---|---|---|---|
| 0411nn G | Open Cable Guides | ODGH | 1 | 2 | | | | | 3 | |
| 0412nn | Remove Device Signal Cable | RDSC | 1P | 2 | | | 3 | 4 | | |
| 0413nn | Remove Device DFCI Cable | RDDC | 1P | | 2P | 2P | | | 3P | 4P |
| 04141n G | Lock Shock Protection | LDSH | | 1 | 2 | 3 | 5 | 6 | 4 | |
| 04142n G | Lock Shipping Wedges | LDSW | | | | | | | 1 | |
| 0415nn G | Close Cable Guides | CDGH | 1 | 2 | | | | | 3 | |
| 0416nn G | Lock Shipping clamps | LDCH | 1 | 2 | | | | | 3 | |

| Goal No | Task Description | Name | R | BS |
|---|---|---|---|---|
| 0417nn | Remove AC Pwr cable end | RRPC | 1 | 1 |
| 0418nn | Remove Pwr Seq cable end | RRSC | 1P | 1P |
| 0419nn | Remove RACK | RSRH | 1 | 2 |

If this is not the last RACK; Go to 0310nn.

If this process is a system "tear-down"; End here.
Else; Go to 050nnn.

2.6 RACK - Device Adds/Connections

050nnn  If any Device(s) are to be ADDed to RACK(s);
(Devices being moved to a RACK qualify as ADDs)

Establish sub-sequence according to the following priorities:
work from bottom to top of RACK
If no previous remove has left mounting hardware in place;

| Goal No | Task Description | Name | B | KA | KB | A | P | N | BS | F | K |
|---|---|---|---|---|---|---|---|---|---|---|---|
| 0521nn | Install mounting hardware | ADMH | 1 | 2 | 5 | 1 | 1 | 1 | | 3 | 4 |

If no previous remove has left lifter in place;

| Goal No | Task Description | Name | B | KA | KB | A | P | N | BS | F | K |
|---|---|---|---|---|---|---|---|---|---|---|---|
| 05221n | Assemble lifter to RACK | ALDH | 1 | | 1 | | | | | | |
| 05222n | Assemble adapter to lifter | ALAH | 1 | | | | | | | | |
| 05223n | Assemble guiding hardware | ALMH | 1 | | | | | | | | |

If any Device(s) are to be added to RACK(s);

| Goal No | Task Description | Name | B | KA | KB | A | P | N | BS | F | K |
|---|---|---|---|---|---|---|---|---|---|---|---|
| 0523nn | Install device(s) to RACK | ADEV | 1 | 2 | 3 | 4 | 4 | 4 | | 5 | 6L |
| 05241n | Remove guiding hardware | RLMH | 1 | | | | | | | | |
| 05242n | Remove adapter from lifter | RLAH | 1 | | | | | | | | |
| 05243n | Remove lifter from RACK | RLDH | 1 | | 1 | | | | | | |
| 0525nn | Unlock Shipping clamps | UDCH | | 1 | 2 | | | | | 3 | |
| 05261n | Open Cable Guides | ODGH | | 1 | 2 | | | | | 3 | |
| 05262n | Verify Cable Terminator | VDCT | | 1 | | 2 | 2 | | | 3 | 4L |
| 0527nn | Unlock Shock Protection | UDSH | | | 1 | | | | | | |
| 0528nn | Verify/Set voltage switches | SDVS | | | 1 | | | | | 2 | |
| 0529nn | Set address switch | SDAS | | 1S | | 2S | 3S | | | 4S | 5L |
| 0531nn | Install Power Cbl & set CB | ADPC | 1 | 2 | 3 | 4 | 5 | 5 | | 6 | 7L |

If there are Intra-RACK Signal cable ends to install;
(Note - A DFCI cable to a DASD Controller card must be treated as an Inter-RACK cable.)
When one cable end of an Intra-RACK cable is installed,
sequence the other end next.
Establish sub-sequence according to the following priority:
work from bottom to top of RACK

| Goal No | Task Description | Name | KA | KB | A | P | N | BS | F | K |
|---|---|---|---|---|---|---|---|---|---|---|
| 0541nn | Install Device Signal Cbl End | ADSC | 1P | 2 | | | 3 | 4 | | |

If the DFCI terminator will be moved in the same RACK;

| Goal No | Task Description | Name | KA | KB | A | P | N | BS | F | K |
|---|---|---|---|---|---|---|---|---|---|---|
| 0542nn | Remove Device DFCI Terminator | RDDT | 1 | | 2 | 2 | | | 3 | 4L |
| 0543nn | Install Device DFCI Terminator | ADDT | 1 | | 2 | 2 | | | 3 | 4L |

If the DFCI terminator will be moved to another RACK;

| Goal No | Task Description | Name | KA | KB | A | P | N | BS | F | K |
|---|---|---|---|---|---|---|---|---|---|---|
| 0544nn | Remove Device DFCI Terminator | RDDT | 1 | | 2 | 2 | | | 3 | 4L |

If there are Intra-RACK DFCI cable ends to install;

| Goal No | Task Description | Name | KA | KB | A | P | N | BS | F | K |
|---|---|---|---|---|---|---|---|---|---|---|
| 0545nn | Install Device DFCI Cable End | ADDC | 1P | | 2P | 2P | | | 3P | 4P |

Connect Device Inter-RACK cable ends.

| Goal No | Pseudo Task description | Name |
|---|---|---|
| X055nnn | For each Inter-RACK cabling task, If it is the first end; label the cable with cable ID No. | PNLC |
| X055nnn | For each Inter-RACK cabling task, If it is the second end; Supply the cable ID No. previously labeled. | PNCL |

Establish sub-sequence according to the following priority: work from bottom to top of RACK

| Goal No | Task Description | Name | KA | KB | A | P | N | BS | F | K |
|---|---|---|---|---|---|---|---|---|---|---|
| 0551nn | Install Device Signal Cbl End | ADSC | 1P | 2 | | | 3 | 4 | | |
| 0553nn | Install Device DFCI Cable End | ADDC | 1P | | 2P | 2P | | | 3P | 4P |
| 0554nn | Install cables to Guide Arm | ADGH | 1 | 2 | | | | | 3 | |

| Goal No | Task Description | Name | KA | KB | A | P | N | BS | F | K |
|---|---|---|---|---|---|---|---|---|---|---|
| 056nnn | Close Cable Guide Arm | CDGH | 1 | 2 | | | | | 3 | |

| Goal No | Task Description | Name | R |
|---|---|---|---|
| 0571nn | Install RACK Filler (1 HI) | ARFH | 1 |
| 0572nn | Install RACK Filler (3 HI) | ARFH | 2 |
| 0573nn | Install RACK Filler (5 HI) | ARFH | 3 |

If last RACK is not done; Go to 0310nn.

If Inter-RACK DFCI cable ends were installed, the DFCI terminator may need to be re-added.
Work from Top to Bottom of Rack.
Work from RACK Z to RACK A.

| Goal No | Task Description | Name | KA | KB | A | P | N | BS | F | K |
|---|---|---|---|---|---|---|---|---|---|---|
| 058nnn | Install Device DFCI Terminator | ADDT | 1 | | 2 | 2 | | | 3 | 4L |

Go to 060nnn.

2.7 Card Cage - Card Removes

If no model change or card change upgrades remain;
Go to 0851nn.

060nnn   If any Card(s) are to be Added or Removed;
(Cards being moved qualify as Remove then Add)

| Goal No | Pseudo Task description | Name | II | UG |
|---|---|---|---|---|
| X06001n | Educate installer how to Remove cards | PNRC | - | 1 |
| X060021 | Educate installer how to Add cards w/ports | PNAC | - | 3 |
| X060022 | Educate installer how to Add cards w/o ports | PNAC | - | 1 |
| X060023 | Educate installer how to Add airflow cards | PNAC | - | 2 |

(When earliest PNAC task is triggered by associated "ACDTn—" task, the remaining PNAC task(s) must be discarded)
Establish sub-sequence according to the following priorities: work from RACK Z to RACK A.

| Goal No | Pseudo Task description | Name | II | UG |
|---|---|---|---|---|
| X0601nn | Display a line drawing of RACK rear view for perspective. | PDRR | - | 1 |

Establish sub-sequence according to the following priorities: work from top to bottom of RACK.

| Goal No | Pseudo Task description | Name | II | UG |
|---|---|---|---|---|
| X0602nn | Display a line drawing of Card Cage rear view for perspective. | PDCC | - | 1 |

Establish primary sequence according to the following priority: work from left to right of Card cage.

| Goal No | Pseudo Task description | Name |
|---|---|---|
| X061nnn | For each card remove cabling task; label the cable with cable ID No. | PNLC |

If any card(s) will be permanently removed from this Card Cage;
For card cabling tasks, establish sub-sequence according to the following priority:
Work from top to bottom of Card Tail Gate.

| Goal No | Task Description | Name | V | AF | E | SK | MK |
|---|---|---|---|---|---|---|---|
| 061nn2 | Remove Card Signal Cable end | RCSC | | | 1G | 2G | 3G |
| 061nn3 | Remove Card | RCDT | 1V | 2V | 3W | 3W | 3W |

2.8 Card Cage - Model Change

If this is a model change from "650" to "660":

| Goal No | Task Description | Name | B |
|---|---|---|---|
| 071nnn | Remove Bus Cable | RDBC | 1M |
| 072nnn | Remove Card Cage | RDCG | 1 |
| 073nnn | Install Card Cage | ADCG | 1 |
| 074nnn | Install Bus Cable | ADBC | 1M |

If this is a model change from "630 or 640" to "660":

| Goal No | Task Description | Name | B |
|---|---|---|---|
| 072nnn | Remove Card Cage | RDCG | 1 |
| 073nnn | Install Card Cage | ADCG | 1 |
| 074nnn | Install Bus Cable | ADBC | 1M |

Reminder note — How will we handle the cables for:
    a) Continuous power
    b) Remote power-on If this is a model change from "630 or 640" to "650":

| Goal No | Task Description | Name | B |
|---|---|---|---|
| 074nnn | Install Bus Cable | ADBC | 1M |

Note — A model change from "630" to "640" will be accomplished by a Card Remove/Add in group 080nnn.

2.9 Card Cage - Card Adds/Connections

If any cards will be relocated in the same Card Cage;

| Goal No | Pseudo Task description | Name |
|---|---|---|
| X08nnnn | For each card cabling task, If it is the second end; supply the cable ID No. | PNCL |

Establish PRIMARY sequence according to the following priority:
  If cards are being relocated to higher number card slots; work from right to left in Card cage.
  If cards are being relocated to lower number card slots; work from left to right in Card cage.

| Goal No | Task Description | Name | V | AF | SK | MK | E |
|---|---|---|---|---|---|---|---|
| 080nn1 | Remove Card Signal Cable end | RCSC |  |  | 1G | 2G | 3G |
| 080nn2 | Remove Card | RCDT | 1V | 2V | 3W | 3W | 3W |
| 080nn3 | Install Card | ACDT | 1V | 2V | 3W | 3W | 3W |
| 080nn4 | Install Card Signal Cable end | ACSC |  |  | 1G | 2G | 3G |

If any cards are to be ADDed;
Establish primary sequence according to the following priority:
work from right to left in Card cage.

| Goal No | Task Description | Name | V | AF | SK | MK | E |
|---|---|---|---|---|---|---|---|
| | | | | | | | |
| 084nnn | Install Card | ACDT | 1V | 2V | 3W | 3W | 3W |

| Goal No | Pseudo Task description | Name | II | UG |
|---|---|---|---|---|
| X0842nn | Display a line drawing of the Card Cage view. (Ask for verification of Card Cage contents) | PVCC | - | 3 |

Repeat Steps 0602nn through 084nnn until last card cage is done.

Repeat Steps 0601nn through 084nnn until last RACK is done.

0851nn   If no cable ends need to be attached to card connectors;
         Go To 088nnn.

0852nn   If the previous parentage was RACK A; Go To 0861nn.

Establish sub-sequence according to the following priorities:
work from RACK A to RACK Z.

| Goal No | Pseudo Task description | Name | II | UG |
|---|---|---|---|---|
| X0852nn | Display flat drawing of RACK rear view for perspective. | PDRR | 2 | 2 |

0861nn   If the previous parentage was the lowest Card Cage;
         Go To 087nnn.

Establish sub-sequence according to the following priorities:
work from bottom to top of RACK.

| Goal No | Pseudo Task description | Name | II | UG |
|---|---|---|---|---|
| X0861nn | Display flat drawing of Card Cage rear view for perspective. | PDCC | 2 | 2 |

Establish primary sequence according to the following priority:
work from left to right of Card cage.

| Goal No | Pseudo Task description | Name |
|---|---|---|
| X087nnn | For each card DFCI Inter-RACK cabling task; supply the previously labeled cable ID No. | PNCL |

Establish sub-sequence according to the following priority:
work from bottom to top of Card Tail Gate.
(For Initial Install, install only one ECS Comm cable)

| Goal No | Task Description | Name | V | AF | SK | MK | E |
|---|---|---|---|---|---|---|---|
| | | | | | | | |
| 0872nn | Install Card Signal Cable end | ACSC | | | 1G | 2G | 3G |

Repeat steps 0861nn through 0872nn for next cage.
Continue until last cage is done.

Repeat steps 0852nn through 0872nn for next RACK.
Continue until last RACK is done.

088nnn     If this is an Initial Installation;

| Goal No | Task Description | Name | |
|---------|------------------|------|---|
| 0881nn | Install Console Cable to Loon | ASLC | 1 |
| 0882nn | Install ECS Modem to Line | ASEM | 1 |

2.10  RACK - *Prepare for Power-Up*

If no RACK ADDs or removes have been done; Go to 092nnn.
09000n    If the previous parentage was RACK A; Go To 0901nn.

Establish sub-sequence according to the following priorities: work from RACK A to RACK Z.

| Goal No | Pseudo Task description | Name | II | UG |
|---------|--------------------------|------|----|----|
| X09001n | Display flat drawing of RACK rear view for perspective. | PDRR | 2 | 2 |

| Goal No | Task Description | Name | R | BS |
|---------|------------------|------|---|----|
| 0901nn | Remove Pwr Seq cbl Terminator | RRST | 1 | 1 |
| 0902nn | Install Pwr Seq cable end | ARSC | 1P | 1P |
| 0903nn | Install Pwr Seq cbl Terminator | ARST | 1 | 1 |
| 0911nn | Install AC pwr Cable end | ARPC | 1 | 1 |
| 0913nn | Set RACK C.B.s "ON" | SRCB | 1 | 1 |

Repeat Steps 09001n through 0913nn until last RACK is done.

092nnn    If RACK(s) contain new devices;
Establish sub-sequence according to the following priorities: work from RACK Z to RACK A.

| Goal No | Pseudo Task description | Name | II | UG |
|---------|--------------------------|------|----|----|
| X092nnn | Display flat drawing of RACK front view for perspective. | PDRF | 2 | 2 |

Establish sub-sequence according to the following priority: work from top to bottom of RACK

| Goal No | Task Description | Name | R | B | KA | KB | A | P | N | BS | F | K |
|---------|------------------|------|---|---|----|----|---|---|---|----|---|---|
| 0921nn G | Unlock Shock protection | UDSH | | | | | 2 | 3 | 5 | 6 | 4 | |
| 09221n G | Set Device to READY/ON | SDSR | 1 | | | | | | | 2 | | |
| 09222n G | Set Device to READY/ON | SDSR | | | 2 | 3 | 4 | 5 | 7 | 8 | 6 | |
| 0923nn | Install Shore Battery | ADSB | | 1 | | | | | | | | |

Repeat Steps 092nnn until last RACK is done.

2.11 System - Prepare for Operation

Provide AC Power to all Units of the system.

| Goal No | Task Description | Name | II | UG |
|---|---|---|---|---|
| 1001nn G | Provide AC Power | ASAC | 1 | 1 |
| 1002nn | Power Up the System Console | ASCP | 1 | - |
| 1003nn | Power Up the System | ASYP | 1 | 2 |

If any new RACKs or Devices have been added;
Sequence from RACK A to RACK Z.
Sequence from Top to Bottom of RACK.
(Group the VPORn tasks by RACK for now)

| Goal No | Task Description | Name | R | B | KA | KB | A | P | N | BS | F | K |
|---|---|---|---|---|---|---|---|---|---|---|---|---|
| 1011nn G | Verify POR Sequence | VPOR | 1 | | | | | | | 2 | | |
| 1012nn G | Verify POR Sequence | VPOR | | 2 | 3 | 4 | 5 | 6 | 9 | A | 7 | 8 |

Note: Invalid POR indications will reference remedial action task (SPUP)

| Goal No | Task Description | Name | B | KA | KB | A | P | N | BS | F | K |
|---|---|---|---|---|---|---|---|---|---|---|---|
| 1021nn G | Verify Tape Drive | VSTD | | | | | | 3 | 4 | 1 | 2 |
| 1022nn | Perform System IPL | AIPL | 1* | | | | | | | | |
| 1023nn | Verify ECS Modem | VSEM | 1 | | | | | | | | |

Note: Failure to IPL properly will reference remedial action task (SIPP)

| Goal No | Pseudo Task description | Name | II | UG |
|---|---|---|---|---|
| X1031nn | Notify Installer to run "IMA" option of SUU to update the system topology file. (Print out new system diagrams and cbl charts, Replace the old versions in PAR library) | PNUT | - | 1 |
| X1032nn | Notify customer of system availability. | PNSA | 1 | 1 |

2.12 System - After Operational

| Goal No | Pseudo Task description | Name | II | UG |
|---|---|---|---|---|
| X111nnn | Add remaining Work Station cables. (TCAW) | AWSC | 1 | 2 |
| X112nnn | Add remaining Communications cables. (TCAW) | ACMC | 1 | 2 |
| X113nnn | Notify CE of Parts Disposition (MODEL) | PNPS | | 1 |
| X114nnn | Notify CE that installation is complete. Replace all reference materials in the appropriate library. Tie all loose cables as required. (CTIE) Close all open RACK covers. Throw away the Installation Instructions. | PNSC | 1 | 1 |

2.13 System - Dealing with Problems

| Goal No | Pseudo Task description | Name | II | UG |
|---|---|---|---|---|
| X121nnn | Deal with Power-On problems. | SPUP | 1 | 1 |
| X122nnn | Deal with failure to IPL problems. | SIPP | 1 | 1 |
| X123nnn | Deal with cable labeling problems. (iff RDSC or RDDC or RCSC) | SPCL |  | 1 |

1.0 HIRS Layer 3 Low Level Design (I1)

The HIRS Layer 3 Low Level Design is based off the "SILVERLAKE HARDWARE CHANGE SEQUENCE" Document, Number ROC-SLS-R0001-002. Refer to this document for information on tasks and task sequencing goals.

1.1 HIRSL3 for Upgrades

The following describes the control flow of the HIRS Layer 3 Sequencing Rules for Upgrades/Initial Install.

RULE  DEFINITION

INITIALIZE Declare Variables, Files, and Buffers.

ON ENTRY
1. Allocate a Control Working Memory Element.
2. Turn the Control flag "ON" to retrieve the first/next Intermediate Delta file.
3. Open the HIRS Control file.

REQUEST Retrieve the first/next HIRS Sequencing Request

1. Call RCVRQST to retrieve the first/next Intermediate Delta file.
2. If there are NO more Intermediate Delta files to be processed:
   a. Free the Control Working Memory Element.
   b. Terminate HIRS Layer 3 processing.
3. Open the Intermediate Delta file.
4. For each record in the Intermediate Delta file:
   a. Read the record from the Intermediate Delta file.
   b. Allocate a Working Memory Element for the record.
   c. For all Card records, calculate the Card Address.
5. Close the Intermediate Delta file.
6. Turn the Control flag "OFF" to execute the Layer 3 Sequencing Rules.

PSEUDOF Process the preliminary Pseudo Tasks

- The following characteristics govern the selection of Working Memory Elements for this Rule:
  - The type of Task must be:
    - Universal Task
    - Universal Initial Install Task
    - Universal Upgrade Task
    - Adding of a New Rack
    - Modifying an Old Rack
    - Modifying an Old Device

- The Task Perspective must be "PSEUDO"
- The Task State must be "Task Precedes All Others"
- The Task Sequence Number must NOT be assigned yet
* The following characteristics govern the ordering of the Working Memory Elements for this Rule:
  1. The Goal Sequence Step Number is in ascending order
  2. Work from Rack A to Rack Z
  3. The Update Sequence Step Number is in ascending order
  4. Work from the Top to the Bottom of the Rack
* The following characteristics govern the removing of the Working Memory Elements for this Rule:
  - The Task must be "PVRF2"
  - The Rack Location (LCNL) must be "00" (Rack A)

RACKADD  Process Rack Add Tasks

* The following characteristics govern the selection of Working Memory Elements for this Rule:
  - The type of Task must be Adding of a New Rack
  - The Task Perspective must be "SYSTEM"
  - The Task State must be "Task Precedes All Others"
  - The Task Direction must be from Lowest to Highest
  - The Task Sequence Number must NOT be assigned yet
* The following characteristics govern the ordering of the Working Memory Elements for this Rule:
  1. The Goal Sequence Step Number is in ascending order
  2. The Update Sequence Step Number is in ascending order
  3. Work from Rack A to Rack Z PIDFIDC  Process Rack Add Tasks for Plant Installed Devices and Field Installed Device Cables

* The following characteristics govern the selection of Working Memory Elements for this Rule:
  - The type of Task must be Adding of a New Rack
  - The Task Perspective must be "RACK"
  - The Task State must be BLANK or "Only if Cabling Required".
  - The Task Direction is ignored
  - The Task Sequence Number must NOT be assigned yet
  - The WME must be one of the following types:
      A Tower Element
      A Plant Installed Device
      A Field Installed Device Cable
* The following characteristics govern the ordering of the Working Memory Elements for this Rule:
  1. Work from Rack Z to Rack A
  2. The Goal Sequence Step Number is in ascending order
  3. The Update Sequence Step Number is in ascending order
  4. For Plant Installed Devices, work from the Bottom to the Top of the Rack
  5. For Field Installed Device Cables, work from the Bottom to the Top of the Rack
  6. When A Task is sequenced and it is a Group Task (GROUP = 'G'), find all similar Tasks in Its' Group and sequence them next.
* The following characteristics govern the removing of the Working Memory Elements for this Rule:
  - The Task State must be "Only if Cabling Required".
  - There is NOT a Field Installed Device Cable for the particular Device SYSPREP  System Preparation for Change

- The following characteristics govern the selection of Working Memory Elements for this Rule:
  - The type of Task must be:
    - Universal Upgrade Task
    - Modifying an Old Rack
  - The Task Perspective must be "SYSTEM"
  - The Task State must be BLANK
  - The Task Direction must be BLANK
  - The Power Status will be Ignored
  - The Task Sequence Number must NOT be assigned yet
- The following characteristics govern the ordering of the Working Memory Elements for this Rule:
  1. The Goal Sequence Step Number is in ascending order
  2. Work from Rack A to Rack Z
  3. The Update Sequence Step Number is in ascending order RACKCHGS  Process Rack Changes for Device Removes, Rack Removes, and Device Adds/Connections

- The following characteristics govern the selection of Working Memory Elements for this Rule:
  - The type of Task must be:
    - Add a Device
    - Add a Cable
    - Add a Terminator
    - Remove a Rack
    - Remove a Device
    - Remove a Cable
    - Remove a Terminator
  - The Task Perspective must be "RACK"
  - The Task State must be:
    - BLANK
    - Add Only if NOT Added Previously
    - Remove Only if NOT used Again
    - A Numeric value 0-9
  - The Task Direction is Ignored
  - The Power Status must be DOWN
  - The Task Sequence Number must NOT be assigned yet
- The following characteristics govern the ordering of the Working Memory Elements for this Rule:
  1. Work from Rack A to Rack Z
  2. For Removes, work from the Top to the Bottom of the Rack
  3. For Adds, work from the Bottom to the Top of the Rack
  4. The Goal Sequence Step Number is in ascending order
  5. The Update Sequence Step Number is in ascending order
  6. Group All Sequenced Tasks with the same Task ID together
- The following characteristics govern the removing of the Working Memory Elements for this Rule:
  - When the STATE is "Add Only if NOT Added Previously" and there is a matching Device Task that was done previously, remove the Working Memory Element.
  - When the STATE is "Remove Only if NOT used Again" and there is a matching Device Task that will be done later, remove the Working Memory Element.
  - When the STATE is "A Numeric value 0-9" and there is a matching Add/Remove Device Mounting Hardware Task for the same EIA Location, remove both Working Memory Elements.

TERMADDS   Process Terminator Adds to a Rack

- The following characteristics govern the selection of Working Memory Elements for this Rule:
    - The type of Task must be:
        Add a Terminator
    - The Task Perspective must be "SYSTEM"
    - The Task State must be BLANK
    - The Task Direction is Low to High
    - The Power Status must be DOWN
    - The Sub Component Code must be T (Terminator)
    - The Task Sequence Number must NOT be assigned yet
- The following characteristics govern the ordering of the Working Memory Elements for this Rule:
    1. Work from Rack Z to Rack A
    2. Work from the Top to the Bottom of the Rack CARDMOVE   Process Card Moves

- The purpose of this Rule is to assign a Card Movement Direction for the shifting of Cards in a Card Cage and any Cables associated with the Cards.
- The following characteristics govern the selection of Working Memory Elements for this Rule:
    - The type of Task must be "Removing Cards"
    - The Associated type of Task must be
        Adding Cards
        Adding Cables
        Removing Cables
    - The Handling Code is MOVE
    - The Task Perspective must be "CARD CAGE"
    - The Task State must be BLANK
    - The Task Direction must be BLANK
    - The Power Status must be DOWN
    - The Task Sequence Number must NOT be assigned yet
- The following characteristics govern the assigning of a Direction for the Working Memory Elements for this Rule:
    1. If there is an Associated Add Card Task, assign the direction based on the following criteria:
        - If the Card is being added into a Higher Card Slot location, assign a direction of High (H).
        - If the Card is being added into a Lower Card Slot location, assign a direction of Low (L).
    2. If there are Associated Add/Remove Cable Tasks for the Card being moved, assign the direction to be the same as the Associated Add/Remove Card Task.

PCHNDL   Process Card Handling Information Tasks

- The following characteristics govern the selection of Working Memory Elements for this Rule:
    - The type of Task must be:
        Universal Upgrade Only
    - The Task Perspective must be "PSEUDO"
    - The Task State must be BLANK
    - The Task Direction is Low to High
    - The Power Status must be DOWN
    - The Task Sequence Number must NOT be assigned yet
- The following characteristics govern the ordering of the Working Memory Elements for this Rule:
    1. The Goal Sequence Step Number is in ascending order
    2. The Update Sequence Step Number is in ascending order

- The following characteristics govern the removing of the Working Memory Elements for this Rule:
    1. If there are Remove Card (RCDTxxx) Tasks, then sequence the Remove Card Info (PNRC1) Task, otherwise remove it from WM.
    2. If there are Add Card 300 (ACDT3xx) Tasks, then sequence the Add Card 300 Info (PNAC3) Task, otherwise remove it from WM.
    3. If there are Add Card 100 (ACDT1xx) Tasks and the PNAC3 Task was NOT sequenced, then sequence the Add Card 100 Info (PNAC1) Task, otherwise remove it from WM.
    4. If there are Add Card 200 (ACDT2xx) Tasks and the PNAC3 and PNAC1 were NOT sequenced, then sequence the Add Card 200 Info (PNAC2) Task, otherwise remove it from WM.

CCUPGDS   Process Card Cage Upgrades

- The following characteristics govern the selection of Working Memory Elements for this Rule:
    - The type of Task must be:
        Removing Cards
        Model Upgrade
        Adding Cards
        Cable Remove
        Cable Add
        Modified Card Cage
    - The Task Perspective must be "CARD CAGE"
    - The Task State must be BLANK
    - The Task Direction is High or Low
    - The Power Status must be DOWN
    - The Task Sequence Number must NOT be assigned yet
    - The WME must be one of the following types:
        A Card to be removed
        A Signal Cable to be removed from a Card
        A Card to be added
- The following characteristics govern the ordering of the Working Memory Elements for this Rule:
    1. Work from Rack Z to Rack A
    2. Work from the Top to the Bottom of the Rack
    3. The Goal Sequence Step Number is in ascending order
    4. Work from Left to Right of the Card Cage, if the Direction is LOW
    5. Work from Right to Left of the Card Cage, if the Direction is HIGH
    6. Work from the Top to the Bottom of the Card Tail Gate
    7. The Update Sequence Step Number is in ascending order
    8. For Move Tasks, Group All Associated Add/Remove Card/Cable Tasks together.
    9. For Remove Card/Cable Tasks, Group All Associated Remove Card/Cable Tasks together.

FLRCRD    Find the System Console LYNX Card and the ECS MODEM REEF Card

- The following characteristics govern the selection of Working Memory Elements for this Rule:
    - The type of Task must be Rack Add
    - The Handling Code must be Add
    - The Task Perspective must be "PSEUDO"
    - The Task State must be "PSEUDO"
    - The Task Direction must be BLANK
    - The Power Status must be BLANK
    - The Task Sequence Number must NOT be assigned yet

- The following characteristics govern the ordering of the Working Memory Elements for this Rule:
    1. Lowest Bus Number
    2. Lowest Board Number
    3. Lowest Card Number
    4. The Specify Code (DVRPQ) must be 9641 for the ECS MODEM Cable.
- If the previous ordering characteristics were NOT met, the Working Memory Element will be removed.

CEATCRD  Process Cable End Attachment to Card Connector Tasks

- The following characteristics govern the selection of Working Memory Elements for this Rule:
    - The type of Task must be Installing Cables
    - The Task Perspective must be "CARD CAGE"
    - The Task State must be "Last Card Cage Task"
    - The Task Direction must be from Lowest to Highest
    - The Task Sequence Number must NOT be assigned yet
- The following characteristics govern the ordering of the Working Memory Elements for this Rule:
    1. Work from Rack A to Rack Z
    2. Work from the Bottom to the Top of the Rack
    3. Work from the Left to the Right of the Card Cage
    4. Work from the Bottom to the Top of the Card Tail Gate
    5. The Goal Sequence Step Number is in ascending order
    6. The Update Sequence Step Number is in ascending order
- The following characteristics govern the removing of the Working Memory Elements for this Rule:
    - Remove all REEF Cabling Tasks except for the Reef Cable which hooks up to the ECS Modem to be installed. This REEF Cable attaches to the REEF Card found in Rule FLRCRD. Set the MORCOMM flag "ON" if any Cabling Tasks were removed.
    - Remove all LOON Cabling Tasks except for the Loon Cable which hooks up to the System Console to be installed. This LOON Cable attaches to the LYNX Card found in Rule FLRCRD. Set the MORLOON flag "ON" if any LOON Cabling Tasks were removed.

UNIVII  Process Universal Initial Install Tasks

- The following characteristics govern the selection of Working Memory Elements for this Rule:
    - The type of Task must be Rack Add
    - The Handling Code must be Add
    - The Task Perspective must be "EXTRA"
    - The Task State must be BLANK
    - The Task Direction must be BLANK
    - The Power Status must be "DOWN"
    - The Task Sequence Number must NOT be assigned yet
- The following characteristics govern the ordering of the Working Memory Elements for this Rule:
    1. The Goal Sequence Step Number is in ascending order
    2. The Update Sequence Step Number is in ascending order
    3. Work from Top to Bottom of the Card Tail Gate
- The following characteristics govern the removing of the Working Memory Elements for this Rule:
    - Remove any Communications Cables that don't have a Specify Code of 9641.
    - Remove any Tasks that don't have a matching REEF or LYNX Card.
    - Remove the REEF and LYNX Card Tasks after the matching cables have been sequenced.

PRACPUP1    Process RACK (System) Prepare for Power-Up Tasks for Rack Adds

- The following characteristics govern the selection of Working Memory Elements for this Rule:
  - The type of Task must be "Add a New Rack"
  - The Task Perspective must be "SYSTEM"
  - The Task State must be BLANK
  - The Task Direction must be from Lowest to Highest
  - The Task Sequence Number must NOT be assigned yet
- The following characteristics govern the ordering of the Working Memory Elements for this Rule:
  1. Work from Rack A to Rack Z
  2. The Goal Sequence Step Number is in ascending order
  3. The Update Sequence Step Number is in ascending order
  4. Work from Left to Right for Power Sequence Cable Connectors PRACPUP2    Process RACK Prepare for Power-Up Tasks for Rack Adds

- The following characteristics govern the selection of Working Memory Elements for this Rule:
  - The type of Task must be:
    Add a New Rack
    Add a New Device
  - The Task Perspective must be "RACK"
  - The Task State must be "Task Follows All Others"
  - The Task Direction must be from Highest to Lowest
  - The Task Sequence Number must NOT be assigned yet
- The following characteristics govern the ordering of the Working Memory Elements for this Rule:
  1. Work from Rack Z to Rack A
  2. The Goal Sequence Step Number is in ascending order
  3. The Update Sequence Step Number is in ascending order
  4. Work from the Top to the Bottom of the Rack
  5. Group All Tasks with the same Task ID together PREFOP1     Process Prepare for Operation (Provide Power) Tasks

- The following characteristics govern the selection of Working Memory Elements for this Rule:
  - The type of Task must be:
    Add a New Rack
    Modify a Rack
  - The Task Perspective must be "SYSTEM"
  - The Task State must be "Task Follows All Others"
  - The Task Direction must be from Lowest to Highest
  - The Power Status must be "DOWN"
  - The Task Sequence Number must NOT be assigned yet
- The following characteristics govern the ordering of the Working Memory Elements for this Rule:
  1. The Goal Sequence Step Number is in ascending order
  2. The Update Sequence Step Number is in ascending order
  3. Work from Rack A to Rack Z PREFOP2     Process Prepare for Operation (Power Up) Tasks

- The following characteristics govern the selection of Working Memory Elements for this Rule:
  - The type of Task must be:
    Add a New Rack
    Universal Task
    Universal Initial Install Task
    Universal Upgrade Task
  - The Task Perspective must be "EXTRA"

- The Task State must be "Task Follows All Others"
- The Task Direction must be BLANK
- The Power Status must be "DOWN"
- The Task Sequence Number must NOT be assigned yet
* The following characteristics govern the ordering of the Working Memory Elements for this Rule:
    1. The Goal Sequence Step Number is in ascending order
    2. The Update Sequence Step Number is in ascending order PREFOP3    Process Prepare for Operation (Verify) Tasks

* The following characteristics govern the selection of Working Memory Elements for this Rule:
    - The type of Task must be:
        Add a New Rack
        Add a New Device
        Model Upgrade
    - The Task Perspective must be "SYSTEM"
    - The Task State must be "Task Follows All Others"
    - The Task Direction must be from Highest to Lowest
    - The Power Status must be "UP"
    - The Task Sequence Number must NOT be assigned yet
* The following characteristics govern the ordering of the Working Memory Elements for this Rule:
    1. The Goal Sequence Step Number is in ascending order
    2. Work from Rack A to Rack Z
    3. The Update Sequence Step Number is in ascending order
    4. Work from the Top to the Bottom of the Rack
    5. Group all similar Devices together PREFOP4    Process Prepare for Operation (Extra Universal) Tasks

* The following characteristics govern the selection of Working Memory Elements for this Rule:
    - The type of Task must be:
        Universal Upgrade
        Universal Initial Install
        Rack Add Task
    - The Task Perspective must be "EXTRA"
    - The Task State must be "Task Follows All Others"
    - The Task Direction is ignored
    - The Power Status must be "UP"
    - The Task Sequence Number must NOT be assigned yet
* The following characteristics govern the ordering of the Working Memory Elements for this Rule:
    1. The Goal Sequence Step Number is in ascending order
    2. The Update Sequence Step Number is in ascending order PSEUDOL    Process the Final Pseudo Tasks

* The following characteristics govern the selection of Working Memory Elements for this Rule:
    - The type of Task must be:
        Universal Task
        Universal Upgrade Task
        Universal Initial Install Task
    - The Task Perspective must be "PSEUDO"
    - The Task State must be "Task Follows All Others"
    - The Task Direction is ignored
    - The Power Status must be "UP"
    - The Task Sequence Number must NOT be assigned yet

- The following characteristics govern the ordering of the Working Memory Elements for this Rule:
    1. The Goal Sequence Step Number is in ascending order
    2. The Update Sequence Step Number is in ascending order
- The following characteristics govern the removing of the Working Memory Elements for this Rule:
    - If there are NO more LOON and COMM Cables to be Attached and there is a Notify Customer of System Availability (PNSA1) Task, remove it from WM.

Note: The MORLOON and MORCOMM flags will be "OFF".

- If there are NO more LOON Cables to be Attached and there is an Add Workstation Cable (AWSCx) Task, remove it from WM.

Note: The MORLOON flag will be "OFF".

- If there are NO more COMM Cables to be Attached and there is an Add Communications Cable (ACMCx) Task, remove it from WM.

Note: The MORCOMM flag will be "OFF".

CLEANUP  Update the Intermediate Delta file with the Sequenced Tasks.

This is the lowest level rule. It will be activated, when there are no more Sequencing rules to be run.
1. Open the Intermediate Delta file, again.
2. For each Working Memory Element Task:
    a. Find the Working Memory Element Task with the Lowest Task Sequence Number.
    b. If the Task Sequence Number is Zero "00000", the Task has not been Sequenced. The Task Sequence Number is set to "99999", to flag the Task as being non-sequenced (did NOT fit into any Rules).
    c. If the Task Sequence Number is "99998", the LYNX or REEF Task has not been Sequenced. The Task Sequence Number is set to "99999", to flag the Task as being non-sequenced (A LOON or ECS MODEM Cable was NOT found).
    d. Read a record out of the Intermediate Delta file.
    e. (Re)Write the New Sequenced record to the Intermediate Delta file.
    f. Free the Working Memory Element Task.
3. Close the Intermediate Delta file.
4. Turn the Control flag "ON" to activate the REQUEST rule.

ON IDLE
- Terminate HIRS Layer 3 processing.

1.2 RCVRQST

The following describes the control flow of HIRS Layer 3 Receive Request, RCVRQST.

1. Include REXPLI, CMSCMD, and CONTROL Declare.

2. Declare Variables and Buffers.

3. Read the first/next record in the Control File.

4. If End-Of-File was reached:

a. Close the Control File.
    b. Set the Return Code for RCVRQST to 1. (End-Of-File)

5. If End-of-File was NOT reached:

a. Call CMSCMD to perform a FILEDEF Command for the Intermediate Delta file.
    b. If the Return Code from the FILEDEF Command is Zero, set the Return Code for RCVRQST to 0. (New Intermediate Delta file to process)
    c. If the Return Code from the FILEDEF Command is NOT Zero:
        1) Display an Error Message to tell the User of the Error.
        2) Set the Return Code for RCVRQST to 2. (Error from FILEDEF)

6. Return to the REQUEST rule.

APPENDIX III

High End SYSTEM -- List of Variables and Switches

SYSTEM Setup/Upgrade Tasks Summary

Column headers (read vertically, abbreviated):
RACK, DLOC, DEVAD, PPLOC, DPORT, CBLPN, CSLOT, CTYPE, CPOPT, CBRAB, SYSMT, SYSMN, TIME, STIME, TYPE, LTRMG, ACNMG, LCNPT, CCLPM, CBLOC2, SLOT, DLORK1, DORCN1, RACCE, RASK1, SSRNM, SCSCD, CECT, CCEM

| ID / Task Title | Variables marked (X) |
|---|---|
| ACCB — Inst/Conn Cable | cols 1,2,6,7,8,9,13 |
| ACDT — Inst Card | cols 1,2,6,7,13 |
| ACMC — Inst Rem Comm Cbls | (none) |
| ACSC — Inst Cable on Card | cols 1,2,6,7,9,13 |
| ADBC — Inst Bus Cable | cols 1,2,5 |
| ADCG — Inst Card Cage | cols 1,2 |
| ADDC — Inst Dv DFCI Cbl End | cols 1,2,8 |
| ADDT — Inst Dv DFCI Cbl Trm | cols 1,2 |
| ADEV — Inst Device | cols 1,2 |
| ADGH — Inst Cables to Arm | cols 1,2,15 |
| ADMH — Inst Mounting Hdwe | cols 1,2 |
| ADPC — Inst Dev Pwr Cable | cols 1,2,4,17 |
| ADSB — Connect Bat Cable | cols 1,2 |
| ADSC — Inst Dev Sig Cable | cols 1,2,8 |
| AIPL — Perf IPL | (none) |
| ALAH — Inst Hoist Adapt | col 1 |
| ALDH — Inst Hoist | col 1 |
| ALMH — Inst Hoist Adapt Bar | cols 1,2 |
| ARCT — Inst Cbl Ties | col 1 |
| ARFH — Inst RACK Filler | cols 1,2,15 |
| ARPC — Install RACK Pwr Cbl | col 1 |
| ARSC — Inst RK PwrSeqCblEnd | cols 1,4 |
| ARST — Inst PwrSeqCbl Term | col 1 |
| ASAC — Provide AC Power | cols 1,15 |
| ASCP — Power On Sys Console | (none) |
| ASEM — Inst ECS Modem | col 8 |

SYSTEM Setup/Upgrade Tasks Summary

Variables (column headers read vertically; each column is a 4-5 letter variable name):

| ID / Task Title | RACK | DLVD | EPAD | PPLR | DBLP | CSYO | CTYP | CPRA | CBSM | SSIT | SSYN | TITM | STYE | RTAG | LACT | ACNM | CLPO | CBLC | BSLD | SLKD | DLRT | DOAR | RACK | RCED | SCKY | SCRS | SESC | CCCM | | |
|---|---|---|---|---|---|---|---|---|---|---|---|---|---|---|---|---|---|---|---|---|---|---|---|---|---|---|---|---|---|---|
| ASLC-.-Inst System Console | | | | | | | | X | | | | | | | | | | | | | | | | | | | | | | |
| ASRH-.-Set-Up RACK | X | | | | | | | | | | | | | | X | | | | | | | | | | | | | | | |
| ASRP-.-Position RACK | | | | | | | | | | | | | | X | X | | | | | | | | | | | | | | | |
| ASYP-.-Turn System Power ON | | | | | | | | | | | | | | | | | X | | | | | | | | | | | | | |
| AHSC-.-Inst Rem HS Cbls | | | | | | | | | | | | | | | | | | | | | | | | | | | | | | |
| CDGH-.-Close Cbl Guide Arm | X | X | | | | | | | | | | | | | X | | | | | | | | | | | | | | | |
| LDCH--Lock Ship Clamps | X | X | | | | | | | | | | | | | X | | | | | | | | | | | | | | | |
| LDSH--Lock Shock Protect | X | X | | | | | | | | | | | | | X | | | | | | | | | | | | | | | |
| LDSH--Inst Ship Bracket | X | X | | | | | | | | | | | | | X | | | | | | | | | | | | | | | |
| ODGH-.-Open Cbl Guide Arm | X | X | | | | | | | | | | | | | X | | | | | | | | | | | | | | | |
| PDCC-.-Look at Inst Cards | X | X | | | | | | | | | | | | | | X | | | | | | | | | | | | | | |
| PDRF-.-Go to the Front | X | | | | | | | | | | | | | | | | | | | | | | | | | | | | | |
| PDRR-.-Go to the Back | X | | | | | | | | | | | | | | | | | | | | | | | | | | | | | |
| PNAC--How to Inst Cards | | | | | | | | | | | | | | | | | | | | | | | | | | | | | | |
| PNCL-.-Find Labeled Cable | X | | | | | | X | | | | | | | | | | | | | | | | | | | | | | | |
| PNHC--How to Handle Cards | | | | | | | | | | | | | | | | | | | | | | | | | | | | | | |
| PNLC-.-Label the Cable | X | | | | X | | | X | | | | | | | | | | | | | | | | | | | | | | |
| PNPS--Dispose Upgrd Parts | | | | | | | | | | | | | | | | | | | | | | | | | | | | | | |
| PNRC--How to Rem Cards | | | | | | | | | | | | | | | | | | | | | | | | | | | | | | |
| PNSA-.-Tell Cust Sys Avail | | | | | | | | | | | | | | | | | | | | | | | | | | | | | | |
| PNSC-.-Setup Complete | X | | | | | | | | | | | | | | | | | | | | | | | | | | | | | |
| PNST--Notify of Sys Tkover | | | | | | | | | | | | X | | | | | | | | | | | | | | | | | | |
| PNUT--Update Tplgy File | | | | | | | | | | | | | | | | | | | | | | | | | | | | | | |
| PVCC-.-Verify Proper Cards | X | X | | | | | | | | | | | | | | X | | | | | | | | | | | | | | |
| PVOL-.-Verify Loose Parts | | | | | | | | | | | | | | X | | | | | | | | | | | | | | | | |
| PVRF-.-Verify Rack Content | X | | | | | | | | | | | | | | | | | | | | | | | | | | | | | |
| PVRM-.-Verify Ref Material | | | | | | | | | | | | | | | | | | | | | | | | | | | | | | |

SYSTEM  
Setup/Upgrade  
Tasks Summary

Column header variables (read vertically, top to bottom):

1. RACK
2. DECO(D/L/O/C)
3. DEVLAD(D/E/L/V/A/D)
4. PPLOC(P/P/L/O/C)
5. DPLORT(D/P/L/O/R/T)
6. CBLPN(C/B/L/P/N)
7. CSLYOT(C/S/L/Y/O/T)
8. CTYYPE(C/T/Y/Y/P/E)
9. CPPOYRT(C/P/P/O/Y/R/T)
10. CBYOAB(C/B/Y/O/A/B)
11. SSYSST(S/S/Y/S/S/T)
12. SIYIMN(S/Y/I/M/N)
13. TTIEM(T/T/I/E/M)
14. LSYTPM(L/S/Y/T/P/M)
15. ATYTNE(A/T/Y/T/N/E)
16. RATMN(R/T/A/N/M)
17. LCA(N)G (L/C/A/N/G)
18. CCNUT(C/N/U/T)
19. BLPCM(B/L/P/N/C/M)
20. SLPT2(S/L/P/N/T/2)
21. DLOCT(D/L/O/C/T)
22. DLOCT(D/L/O/C/T)
23. LORD1(L/O/R/D/1)
24. RACKN(R/A/C/K/N)
25. RACKT(R/A/C/K/T)
26. SCER1(S/C/E/R/1)
27. SEYSN(S/E/Y/S/N)
28. CYSM(C/Y/S/M)
29. CESCD(C/E/S/C/D)
30. CECT(C/E/C/T)
31. M

| ID Task | Abbreviated Task Title | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|---|
| RCCB | Rem/Discon Cbls | x | x | | | | x | x | x | x | | | | | x | | | | | | | | | | | | | | | | | |
| RCDT | Rem Card | x | x | | | | x | x | | | | | | | x | | | | | | | | | | | | | | | | | |
| RCSC | Rem Cable from Card | x | x | | | | x | x | | | | | | | x | | | | | | | | | | | | | | | | | |
| RDBC | Rem Bus Cable | x | x | | | | | | | | | | | | | | | | | | | | | | | | | | | | | |
| RDCG | Rem Card Cage | x | x | | | | | | | | | | | | | | | | | | | | | | | | | | | | | |
| RDDC | Rem Dev DFCI Cbl End | x | x | | | | | | | | | | | | | | | | | | | | | | | | | | | | | |
| RDDT | Rem Dv DFCI Cbl Term | x | x | | | | | | | | | | | | | | | | | | | | | | | | | | | | | |
| RDEV | Rem Device | x | x | | | | | | | | | | | | | | | | | | | | | | | | | | | | | |
| RDGH | Rem Cables from Arm | x | x | | | | | | | | | | | | | | | | | | | | | | | | | | | | | |
| RDMH | Rem Mounting Hdwe | x | x | | | | | | | | | | | | | | | | | | | | | | | | | | | | | |
| RDPC | Rem Dev Pwr Cable | x | x | | | | | | | | | | | | | | | | | | | | | | | | | | | | | |
| RDSC | Rem Dev Sig Cable | x | x | | | | | | | | | | | | | | | | | | | | | | | | | | | | | |
| RLAH | Rem Hoist Adapt | x | | | | | | | | | | | | | | | | | | | | | | | | | | | | | | |
| RLDH | Rem Hoist | x | | | | | | | | | | | | | | | | | | | | | | | | | | | | | | |
| RLMH | Rem Hoist Adapt Bar | x | x | | | | | | | | | | | | | | | | | | | | | | | | | | | | | |
| RRCT | Rem Cbl Ties | x | | | | | | | | | | | | | | | | | | | | | | | | | | | | | | |
| RRFH | Rem RACK Filler | x | x | | | | | | | | | | | | | | | | | | | | | | | | | | | | | |
| RRPC | Rem RACK Power Cable | x | | | | | | | | | | | | | | | | | | | | | | | | | | | | | | |
| RRSC | Rem RK PwrSeqCblEnd | x | | | | | | | | | | | | | | | | | | | | | | | | | | | | | | |
| RRST | Rem PwrSeqCbl Term | x | | | | | | | | | | | | | | | | | | | | | | | | | | | | | | |
| RSAC | Rem all AC Power | x | | | | | | | | | | | | | | | x | | | | | | | | | | | | | | | |
| RSRH | Rem RACK | x | | | | | | | | | | | | | | | | | | | | | | | | | | | | | | |
| RSYP | Turn Sys Power Off | | | | | | | | | | | | | | | | | | | | | | | | | | | | | | | |
| SDAS-. | Verify/Set Address | x | x | x | | | | | | | | | | | | | x | | | | | | | | | | | | | | | |
| SDCB-. | Set Device CB ON | x | x | | | | | | | | | | | | | | | | x | | | | | | | | | | | | | |
| SDSR-. | Set Device Switches | x | x | | | | | | | | | | | | | | | | x | | | | | | | | | | | | | |
| SDVS-. | Verify/Set Voltage | x | x | | | | | | | | | | | | | | x | | | | | | | | | | | | | | | |

SYSTEM Setup/Upgrade Tasks Summary

| ID / Task | Abbreviated Task Title | RACK | DEVLOC | DPVLAD | PPOROPT | DPLPCT | CBSYLNT | CTYOPRT | CPLRBT | CSYSMT (?) | (v9) | (v10) | (v11) | LRACT | ACNMG | (v14) | CBLPOCT | BLLOCDT | SLLODKT | DORKT (?) | DACENT1 (?) | RASCY1NM (?) | RSYRSNM (?) | SCESDCM (?) | CCCT | CEM |
|---|---|---|---|---|---|---|---|---|---|---|---|---|---|---|---|---|---|---|---|---|---|---|---|---|---|
| SETM-. | Entry Module | x | x | | | | | | | x | x | x | x | | x | | | | | x | | x | x | x | x | x |
| SIPP-. | IPL Prob . . . | | | | | | | | | | | | | x | | | | x | | | | | | | | |
| SMAC— | Move Card | x | x | | | x | x | | | | | | x | | | x | x | | x | | | | | | | |
| SMCE— | Move a cable end | x | x | | | x | | | | | | | | | | | | | | | | | | | | |
| SMCT— | Move Dev Sig Cbl Trm | x | x | | | | | | | | | | | | | | | | | | | | | | | |
| SMPT— | Move Pwr Seq Term | x | | | | | | | | | | | | | | | | | x | | | | | | | |
| SMTP— | Modem Test Prob . . . | | | | | | | | | | | | | | | | | | | | | | | | | |
| SPUP-. | Power Up Prob . . . | | | | | | | | | | | | | | | | x | | x | | | | | | | |
| SRCB-. | Vrfy Dev Pwr Cbl/CBs | x | | | | | | | | | | | | | | | | | | | | | | | | |
| SSCF— | Turn SysCons Pwr OFF | | | | | | | | | | | | | | | | | | | | | | | | | |
| UDCH-. | Unlk Shipping Clamps | x | x | | | | | | | | | | x | | | | | | | | | | | | | |
| UDSH-. | Unlk Shock Protect | x | x | | | | | | | | | | x | | | | | | | | | | | | | |
| UDSW-. | Rem Ship Wedges | x | x | | | | | | | | | | x | | | | | | | | | | | | | |
| VDCT-. | Verify Cbl Term | x | x | | | | | | | | | | | | | | | | | | | | | | | |
| VPOR-. | Verify POR Ind | x | x | | | | | | | | | | x | | | | | | | | | | | | | |
| VSEM-. | Test ECS Modem | | | | | | | | | | | | | | | | | | x | | | | | | | |
| VSTD-. | Verify Tape Load | x | x | | | | | | | | | | x | | | | | | | | | | | | | |
| PARHDR-. | PAR header | | | | | | | | | | | | | | | | | | | | | | | | | |
| RCKCL-. | PAR module 1 | x | | | | | | | | | | | | | | | | | | | | | | | | |
| DCABCT-. | PAR module 2 | | | | | | | | | | | | | | | | | | | | | | | | | |

SYSTEM Setup/Upgrade Tasks Summary

Switches Set to 'YES or to OFF

| ID Task — Abbreviated Task Title | SICE | MRACK | MODEL | ROLLR | PNLLR | PNCED | PNBDD | PNEDE | FCTIE | LRACK | RACKW | TCAR | PNLAR | UPGR | NPKRR | RFACK | FNLLR | FNLA |
|---|---|---|---|---|---|---|---|---|---|---|---|---|---|---|---|---|---|---|
| ACCB——Inst/Conn Cable | | | | | | | | | | | | | | | | | | |
| ACDT——Inst Card | | | | | | | | | | | | | | | | | | |
| ACMC-.-Inst Rem Comm Cbls | | | | | | | | | | | | | | | | | | |
| ACSC-.-Inst Cable on Card | | | | | | | | | | | | | | | | | | |
| ADBC——Inst Bus Cable | | | | | | | | | | | | | | | | | | |
| ADCG——Inst Card Cage | | | | | | | | | | | | | | | | | | |
| ADDC-.-Inst Dv DFCI Cbl End | X | | | | | | | | | | | | | | | | | |
| ADDT——Inst Dv DFCI Cbl Trm | | | | | | | | | | | | | | | | | | |
| ADEV——Inst Device | | | | | | | | | | | | | | | | | | |
| ADGH-.-Inst Cables to Arm | | | X | | | | | | | | | | | | | | | |
| ADMH——Inst Mounting Hdwe | | | | | | | | | | | | | | | | | | |
| ADPC——Inst Dev Pwr Cable | | | | | | | | | | | | | | | | | | |
| ADSB-.-Connect Bat Cable | | | | | | | | | | | | | | | | | | |
| ADSC-.-Inst Dev Sig Cable | X | | | | | | | | | | | | | | | | | |
| AIPL-.-Perf IPL/Verify Ind | | | | | | | | | | | | | | | | | | |
| ALAH——Inst Hoist Adapt | | | | | | | | | | | | | | | X | | | |
| ALDH——Inst Hoist | | | | | | | | | | | | | | X | | | | |
| ALMH——Inst Hoist Adapt Bar | | | | | | | | | | | | | | | | | | |
| ARCT——Install Cbl Ties | | | | | | | | | | | | | | | | | | |
| ARFH——Inst RACK Filler | | | X | | | | | | | | | | | | | | | |
| ARPC-.-Install RACK Pwr Cbl | | | | | | | | | | | | | | | | | | |
| ARSC-.-Inst RK PwrSeqCblEnd | | | | | | | | | X | X | | | | | | | | |
| ARST——Inst PwrSeqCbl Term | | | | | | | | | X | | | | | | | | | |
| ASAC-.-Provide AC Power | | | X | | | | | | | | | | | | | | | |
| ASCP-.-Power On Sys Console | | | | | | | | | | | | | | | | | | |
| ASEM-.-Inst ECS Modem | | | | | | | | | | | | | | | | | | |

SYSTEM Setup/Upgrade Tasks Summary

Switches Set to 'YES or to OFF

| ID Task | Abbreviated Task Title | SICE | MRACK | MODEL | RPOLL | PNLRE | PNCED | PBEDE | PCIEK | CTICE | RACK | RACKW | TCAW | PNLAR | UPGR | PNKR | RACK | FNLR | FNLA |
|---|---|---|---|---|---|---|---|---|---|---|---|---|---|---|---|---|---|---|---|
| ASLC-. | Inst System Console | | | | | | | | | | | | | | | | | | |
| ASRH-. | Set-Up RACK | | | X | | | | | | | | | | | | | | | |
| ASRP-. | Position RACK | X | | | | | | | | | | | | | | | | | |
| ASYP-. | Turn System Power ON | | | | | | | | | | | | | | | | | | |
| AWSC-. | Inst Rem WS Cbls | | | | | | | | | | | | | | | | | | |
| CDGH-. | Close Cbl Guide Arm | | | X | | | | | | | | | | | | | | | |
| LDCH— | Lock Ship Clamps | | | X | | | | | | | | | | | | | | | |
| LDSH— | Lock Shock Protect | | | X | | | | | | | | | | | | | | | |
| LDSW— | Inst Ship Bracket | | | X | | | | | | | | | | | | | | | |
| ODGH-. | Open Cbl Guide Arm | | | X | | | | | | | | | | | | | | | |
| PDCC-. | Look at Inst Cards | | | | | | | | | | | | | | | | | | |
| PDRF-. | Go to the Front | | | | | | | | | | | | | | | | | | |
| PDRR-. | Go to the Back | | | | | | | | | | | | | | | | | | |
| PNAC— | How to Inst Cards | | | | | | | | | | | | | | | | | | |
| PNCL-. | Find Labeled Cable | | | | | | | | | | | | | | | | | | |
| PNHC— | How to Handle Cards | | | | | | | | | | | | | | | | | | |
| PNLC-. | Label the Cable | | | | | | | | | | | | | | | | | | |
| PNPS— | Dispose Upgrd Parts | | | X | | | | | | | | | | | | | | | |
| PNRC— | How to Rem Cards | | | | | | | | | | | | | | | | | | |
| PNSA-. | Tell Cust Sys Avail | | | | | | | | | | | | | | | | | | |
| PNSC-. | Setup Complete | X | | X | | | X | | | X | X | | | | | | | | |
| PNST— | Notify of Sys Tkover | | | | | | | | | | | | | | | | | | |
| PNUT— | Update Tplgy File | | | | | | | | | | | | | | | | | | |
| PVCC-. | Verify Proper Cards | | | | | | | | | | | | | | | | | | |
| PVOL-. | Verify Loose Parts | X | | | | | | | | | | | | | X | X | | | |
| PVRF-. | Verify Rack Content | | | | | | | | | | | | | | | | | | |
| PVRM-. | Verify Ref Material | | | | | | | | | | | | | | | | | | |

SYSTEM
Setup/Upgrade
Tasks Summary

Switches Set to 'YES or to OFF

| ID Task | Abbreviated Task Title | SICE | MRACK | MODEL | ROLLR | PNLLR | PNLCE | PNBED | PNEDE | CTIE | FRAK | LACKW | RACKW | TCAAR | PNGR | UPCKR | PNCLR | NALR | FNLA |
|---|---|---|---|---|---|---|---|---|---|---|---|---|---|---|---|---|---|---|---|
| RCCB | Rem/Disconn Cbls | | | | | | | | | | | | | | | | | | |
| RCDT | Rem Card | | | | | | | | | | | | | | | | | | |
| RCSC | Rem Cable from Card | | | | | | | | | | | | | | | | | | |
| RDBC | Rem Bus Cable | | | | | | | | | | | | | | | | | | |
| RDCG | Rem Card Cage | | | | | | | | | | | | | | | | | | |
| RDDC | Rem Dev DFCI Cbl End | X | | | | | | | | | | | | | | | | | |
| RDDT | Rem Dv DFCI Cbl Term | | | | | | | | | | | | | | | | | | |
| RDEV | Rem Device | | | | | | | | | | | | | | | | | | |
| RDGH | Rem Cables from Arm | | | | | | | | | | | | | | | | | | |
| RDMH | Rem Mounting Hdwe | | | | | | | | | | | | | | | | | | |
| RDPC | Rem Dev Pwr Cable | | | | | | | | | | | | | | | | | | |
| RDSC | Rem Dev Sig Cable | X | | | | | | | | | | | | | | | | | |
| RLAH | Rem Hoist Adapt | | | | | | | | | | | | | | | | | | |
| RLDH | Rem Hoist | | | | | | | | | | | | | | | | | | |
| RLMH | Rem Hoist Adapt Bar | | | | | | | | | | | | | | | | | | |
| RRCT | Remove Cbl Ties | | | | | | | | | | | | | | | | | | |
| RRFH | Rem RACK Filler | | | X | | | | | | | | | | | | | | | |
| RRPC | Rem RACK Power Cable | | | | | | | | | | | | | | | | | | |
| RRSC | Rem RK PwrSeqCblEnd | | | | | | | | | X | X | | | | | | | | |
| RRST | Rem PwrSeqCbl Term | | | | | | | | | X | | | | | | | | | |
| RSAC | Rem all AC Power | | | X | | | | | | | | | | | | | | | |
| RSRH | Rem RACK | | | | | | | | | | | | | | | | | | |
| RSYP | Turn Sys Power Off | X | | | | | | | | | | | | | | | | | |
| SDAS-. | Verify/Set Address | | | | | | | | | | | | | | | | | | |
| SDCB-. | Set Device CB ON | | | X | | | | | | | | | | | | | | | |
| SDSR-. | Set Device Switches | | | X | | | | | | | | | | | | | | | |
| SDVS-. | Verify/Set Voltage | | | X | | | | | | | | | | | | | | | |

```
SYSTEM                    |            Switches              |
  Setup/Upgrade           |       Set to 'YES or to OFF      |
  Tasks Summary           |----------------------------------|
                          | |M|M| | | | | |F|L| | | |N| | | |
                          |S|R|O|R|P|P|P|P|C|R|R|T|P|U|P|R|F|F|
                          |I|A|D|O|N|N|N|N|T|A|A|C|N|P|N|A|N|N|
  ID       Abbreviated    |C|C|E|L|L|C|B|E|I|C|C|A|L|G|K|C|L| |
  Task     Task Title     |E|K|L|L|R|E|D|D|E|K|K|H|A|R|R|K|R|A|
--------------------------|-|-|-|-|-|-|-|-|-|-|-|-|-|-|-|-|-|-|
SETM-.-Entry Module       | | | |X|X|X|X| | | |X| |X| | | | | |
SIPP-.-IPL Prob . . .     | | | | | | | | | | | | | | | | | | |
SMAC---Move Card          | | | | | | | | | | | | | | | | | | |
SMCE---Move a cable end   | | | | | | | | | | | | | | | | | | |
SMCT---Move Dev Sig Cbl Trm| | | | | | | | | | | | | | | | | | |
SMPT---Move Pwr Seq Term  | | | | | | | |X| | | |X| | | | | | |
SMTP---Modem Test Prob... | | | | | | | | | | | | | | | | | | |
SPUP-.-Power Up Prob . . .|X| | | | | | | | | | |X| | | | | | |
SRCB-.-Vrfy Dev Pwr Cbl/CBs| | | | | | | | | | | | | | | | | | |
SSCF---Turn SysCons Pwr OFF| | | | | | | | | | | | | | | | | | |
UDCH-.-Unlk Shipping Clamps| | |X| | | | | | | | | | | | | | | |
UDSH-.-Unlk Shock Protect | | |X| | | | | | | | | | | | | | | |
UDSW-.-Rem Ship Wedges    | | |X| | | | | | | | | | | | | | | |
VDCT-.-Verify Cbl Term    | | | | | | | | | | | | | | | | | | |
VPOR-.-Verify POR Ind     | | |X| | | | | | | | | | | | | | | |
VSEM-.-Test ECS Modem     | | | | | | | | | | | | | | | | | | |
VSTD-.-Verify Tape Load   | | |X| | | | | | | | | | | | | | | |
PARHDR-.-PAR header       | | | | | | | | | | | | | | | | | | |
RCKCL-.-PAR module 1      | | | | | | | | | | | | | | | | | | |
DCABCT-.-PAR module 2     | | | | | | | | | | | | | | | | | | |
```

| VARIABLE/SWITCH [1] | SYMBOL CODED | ALLOWABLE VALUES |
| --- | --- | --- |
| Art Number | &ARTNM. | 3-digits; numbers assigned |
| Cable Label | &CBLAB. | 3-digit element ID |
| Cable P/N | &CBLPN. | NNNNNN |
| Cable P/N (2nd) | &CBLPN2. | NNNNNN |
| Card Cage Number | &CCNUM. | 01 - 18 |
| CEC Type | &CECT. [3] | NNNN |
| CEC Model | &CECM. [3] | NNN |
| Count of devices | &CNT. | 2-N |
| Card Port | &CPORT. | 1 - 4 |
| Card Slot | &CSLOT. | 1 - 14 |
| Card Slot (to) | &CSLOTT. | 1 - 14 |
| Card Type | &CTYPE. | XXXX |
| Device Address [2] | &DEVAD. | 0-7 |
| Device Location | &DLOC. | 1 - 32; string of values |
| Device Location (to) | &DLOCT. | 1 - 32 |
| CEC Loc in Rack A | &DLOC1. [3] | 1 - 32 |
| Device Port | &DPORT. | In, Out, 1, 2, 3, 4 |
| Language | &LANG. [3] | 0-9; A-Z (1-digit/lang) |
| Line Type | <YPE. | AAAAAAAAAAAAAAAAAAAAA |
| Order Number | &ORDN. [3] | NNNNNNNN |
| Pwr Plug Location | &PPLOC. | J1 - J10 |
| Rack | &RACK. | A, B, C, D, etc. |
| Rack (to) | &RACKT. | A, B, C, D, etc. |
| Last Rack | &RACK1. [3] | B, C, D, etc. |
| Release Version | &RELVER. [3] | NNNN |
| CEC Serial Number | &SERN. [3] | NN-NNNNNNN |
| Dedicated Sys Time | &STIM. [3] | NN.N (hours) |
| System Date (build) | &SYSD. [3] | YYYYMMDD |
| System Type | &SYSM. [3] | NNNN |
| System Model | &SYSN. [3] | ANNNNNN |
| System Time (build) | &SYST. [3] | HHMMSS |
| Time to complete | &TIME. [3] | NN.N (hours) |
| | | |
| Install cable ties | CTIE [3] | 'YES/OFF |
| First hoist adapt use | FNLA | 'YES/OFF |
| First hoist use | FNLR | 'YES/OFF |
| First Rack | FRACK | 'YES/Off |
| Last Rack | LRACK | 'YES/OFF |
| Model Upgrade | MODEL [3] | 'YES/OFF |
| Multiple Racks | MRACK [3] | 'YES/OFF |
| New Rack | NRACK [3] | 'YES/OFF |
| Back up DASD | PNBD [3] | 'YES/OFF |
| 2-people Required | PNCE [3] | 'YES/OFF |
| Erase Sens Matl | PNED [3] | 'YES/OFF |
| ESD Kit Required | PNKR [3] | 'YES/OFF |
| Lifter Adapter Req'd | PNLA [3] | 'YES/OFF |
| Lifter Required | PNLR [3] | 'YES/OFF |
| Rollup | ROLL | 'YES/OFF |
| 2nd Int cable end | SICE | 'YES/OFF |
| More Cables to Install | TCAM [3] | 'YES/OFF |
| Upgrade | UPGR [3] | 'YES/OFF |

NOTES:
[1] Variables symbols start with &. Set variable to allowed value.
   Set switch to 'YES before task; to OFF after task
   (The apostrophe is CRUCIAL)
[2] The DASD IPL device must be at address 0 on Bus 0.
   The TAPE IPL device must be at address 7 on Bus 0.
[3] Can be set at beginning of run; does not change during processing Totals: VARIABLES = 32; SWITCHES = 18

APPENDIX IV

SYSTEM Setup/Upgrade Tasks Summary

| ID Task | Abbreviated Task Title | SYSTEM | RACK | CEC | CEU | 9335-A | 9335-B | 9332 | 9331 | 9347 | 9348 | 6110 | 6040 | 6034 | 604X | 6031 | 6032 | 6018/9 | VANILA | |
|---|---|---|---|---|---|---|---|---|---|---|---|---|---|---|---|---|---|---|---|---|
| ACCB | Inst/Conn Cable [1] [1] | | | | | | | | | | | 100 | 100 | 100 200 101 | 200 101 | 200 101 | 300 101 | | | SP MP Grp |
| ACDT | Inst Card [1] | | | | | | | | | | | | | 300 | 300 | 300 | 300 | 300 300 300 | 100 200 201 | LC AFC Grp TGC |
| ACMC- | Inst Rem Comm Cbls | | | | | | | | | | | | 100 200 | | 100 200 | 100 200 | 100 200 | | | II UPG |
| ACSC- | Inst Cable on Card | | | | | | | | | | | 100 | 100 | 100 200 | 200 | 200 | | 300 | | SP MP EUR |
| ADBC | Inst Bus Cable | | 100 200 | | | | | | | | | | | | | | | | | A30 A40 |
| ADCG | Inst Card Cage | | 100 | | | | | | | | | | | | | | | | | |
| ADDC- | Inst Dv DFCI Cbl End | | | 110 120 | | 210 220 | 210 220 | 310 320 | 411 421 412 422 | | | | | | | | | | | I-L O-L I-R O-R |
| ADDT | Inst Dv DFCI Cbl Trm | | | 100 | | 200 | 200 | 300 | 401 402 | | | | | | | | | | | L R |
| ADEV | Inst Device | | 100 111 121 | 200 | 300 | 400 | 700 | 500 | 601 602 | | | | | | | | | | | L R |
| ADGH- | Inst Cbls to Arm [2] | | | 100 | 200 | | | 300 | | | | | | | | | | | | |
| ADMH | Inst Mounting Hdwe | | 100 | 200 | 500 | 100 | 100 | 300 | 400 | | | | | | | | | | | |
| ADPC | Inst Dev Pwr Cbl [2] | | 100 800 | 200 | 300 | 400 | 500 | 600 | 701 702 | | | | | | | | | | | L R |
| ADSB- | Connect Bat Cable | | 100 | | | | | | | | | | | | | | | | | |
| ADSC- | Inst Dev Sig Cbl | | | 110 120 130 140 | 200 | | | | | | | | | | | | | | | P 1 P 2 P 3 P 4 |
| AIPL- | Perf IPL/Verify Ind | 100 200 300 | | | | | | | | | | | | | | | | | | TSP DISK TAPE |
| ALAH | Inst Hoist Adapt | | 100 | | | | | | | | | | | | | | | | | |
| ALDH | Inst Hoist | | 100 | | 100 | | | | | | | | | | | | | | | |
| ALMH | Inst Hoist Adapt Bar | | 100 | | | | | | | | | | | | | | | | | |

| SYSTEM Setup/Upgrade Tasks Summary | | | | Devices | | | | | | | Cards | | | | | | | |
|---|---|---|---|---|---|---|---|---|---|---|---|---|---|---|---|---|---|---|
| ID Abbreviated Task Task Title | SYSTEM | RAC K | CEC | CEU | 9335-A | 9335-B | 9332 | 9331 | 9334 | 9348 | 6110 | 6040 | 6034 | 604X | 6031 | 6032 | 6018/9 | VANILA |
| ARCT—Inst Cable Ties | 100 | | | | | | | | | | | | | | | | | |
| ARFH—Inst RACK Filler [2] | 100 200 300 | | | | | | | | | | | | | | | | | 1 3 5 |
| ARPC-.-Inst RACK Pwr Cbl | 100 | | | | | | | | | | | | | | | | | |
| ARSC-.-Inst RK PwrSeqCblEnd | 110 120 | | | | | | | | | | | | | | | | | J9 J10 |
| ARST—Inst PwrSeqCbl Term | 100 | | | | | | | | | | | | | | | | | |
| ASAC-.-Provide AC Power [2] | 100 | | | | | | | | | | | | | | | | | |
| ASCP-.-Pwr on Sys Cons | 100 | | | | | | | | | | | | | | | | | |
| ASEM-.-Inst ECS Modem | 100 | | | | | | | | | | | | | | | | | |
| ASLC-.-Inst System Console | 100 | | | | | | | | | | | | | | | | | - |
| ASRH-.-Set-Up RACK [2] | 100 | | | | | | | | | | | | | | | | | |
| ASRP-.-Position RACK [2] | 100 | | | | | | | | | | | | | | | | | |
| ASYP-.-Turn Sys Power ON | 100 200 | | | | | | | | | | | | | | | | | |
| AWSC-.-Inst Rem WS Cbls | | | | | | | | | | | 100 200 | 100 200 | | 100 200 | | | | II UPG |
| CDGH-.-Close Cbl Gd Arm [2] | | | 100 | 200 | | | 300 | | | | | | | | | | | |
| LDCH—Lock Ship Clamps [2] | | | 100 | 200 | | | 300 | | | | | | | | | | | |
| LDSH—Lock Shock Prot [2] | | | | 100 | 200 | 300 | 400 | | | | | | | | | | | |
| LDSW—Inst Ship Brkt [2] | | | | | | | 100 | | | | | | | | | | | |
| ODGH-.-Open Cbl Gd Arm [2] | | | 100 | 200 | | | 300 | | | | | | | | | | | |
| PDCC-.-Look at Inst Cards [1] | | 100 200 | | | | | | | | | | | | | | | | BEF AFT |
| PDRF-.-Go to the Front [1] | 100 200 | | | | | | | | | | | | | | | | | BEF AFT |
| PDRR-.-Go to the Back [1] | 100 200 | | | | | | | | | | | | | | | | | BEF AFT |
| PNAC—How to Inst a Card | 100 200 300 | | | | | | | | | | | | | | | | | Log Fil TG |

| SYSTEM Setup/Upgrade Tasks Summary | | Devices | | | | | | | | Cards | | | | | | | |
|---|---|---|---|---|---|---|---|---|---|---|---|---|---|---|---|---|---|
| ID Task | Abbreviated Task Title | SYSTEM | RACK | CEC | CEU | 9335-A | 9335-B | 9332 | 9331 | 9347 | 9348 | 6110 | 6040 | 6034 | 604X | 6031 | 6032 | 6018/9 | VANILLA |
| PNCL-.- | Find Labeled Cable | 111<br>113<br>114<br>121<br>124 | | | | | | | | | | | | | | | | | DF-I<br>CO-I<br>EU-I<br>DF-O<br>EU-O |
| PNHC--- | How to Handle Cards | 100 | | | | | | | | | | | | | | | | | |
| PNLC-.- | Label the Cable [4] | 111<br>114<br>121<br>122<br>123<br>124<br>211<br>221<br>214<br>224 | | | | | | | | | | | | | | | | | DF-I<br>EU-I<br>DF-O<br>LN-O<br>CO-O<br>EU-O<br>1DFI<br>1DFO<br>1EUI<br>1EUO |
| PNPS--- | Disp Upgrd Parts [1] | 100 | | | | | | | | | | | | | | | | | |
| PNRC--- | How to Rem a Card | 100 | | | | | | | | | | | | | | | | | All |
| PNSA--- | Tell Cust Sys Avail | 100 | | | | | | | | | | | | | | | | | |
| PNSC-.- | Setup Complete | 100<br>300<br>400 | | | | | | | | | | | | | | | | | II<br>UPG<br>UPG |
| PNST--- | Notify of Sys Tkover | 100 | | | | | | | | | | | | | | | | | |
| PNUT--- | Update Tplgy File | 100 | | | | | | | | | | | | | | | | | |
| PVCC-.- | Verify Proper Cds [1] | | | 100<br>200<br>300 | | | | | | | | | | | | | | | BEF<br>II<br>AFT |
| PVOL-.- | Verify Loose Parts [1] | 100<br>200 | | | | | | | | | | | | | | | | | II<br>UPG |
| PVRF-.- | Verify Rk Cont [1] | | 100<br>200<br>300 | | | | | | | | | | | | | | | | BEF<br>II<br>AFT |
| PVRM-.- | Verify Ref Matl [1] | 100 | | | | | | | | | | | | | | | | | |
| RCCB--- | Disconn/Rem Cable [1] [1] | | | | | | | | | | | 100<br>101 | 100<br>200<br>101 | 100<br>200<br>101 | 101 | 200<br>101 | 200<br>101 | 300<br>101 | SP<br>MP<br>Grp |
| RCDT--- | Rem Card [1] | | | | | | | | | | | | | | | 300 | 300 | 300 | 300 | 300 | 300 | 300 | 100<br>200<br>201 | LC<br>AFC<br>Grp<br>TGC |

SYSTEM Setup/Upgrade Tasks Summary

| ID Abbreviated Task Title | SYSTEMK | RACK | Devices | | | | | | | | Cards | | | | | | | VANILLA | |
|---|---|---|---|---|---|---|---|---|---|---|---|---|---|---|---|---|---|---|---|
| | | | CEC | CEU | 9335-A | 9335-B | 9332 | 9331 | 9347 | 9348 | 6110 | 6040 | 6034 | 604X | 6031 | 6032 | 6018/9 | | |
| RCSC—Rem Cable from Cd | | | | | | | | | | | 100 | 100 | 100 | 200 | 200 | 200 | 300 | | SP MP EUR |
| RDBC—Rem Bus Cable | | 100 200 | | | | | | | | | | | | | | | | | A30 A40 |
| RDCG—Rem Card Cage | | 100 | | | | | | | | | | | | | | | | | |
| RDDC—Rem Dev DFCI Cbl End | | | 110 120 | | | | 210 220 | 210 220 | 310 320 | 411 421 421 422 | | | | | | | | | I-L O-L I-R O-R |
| RDDT—Rem Dv DFCI Cbl Trm | | | 100 | | | | 200 | 200 | 300 | 401 402 | | | | | | | | | L R |
| RDEV—Rem Device | | | 100 111 121 | | 200 | 300 | 400 | 700 | 500 | 601 602 | | | | | | | | | L R |
| RDGH—Rem Cbls from Arm | | | 100 | | 200 | | | | 300 | | | | | | | | | | |
| RDMH—Rem Mounting Hdwe | | | 100 | | 200 | 500 | 100 | 100 | 300 | 400 | | | | | | | | | |
| RDPC—Rem Dev Pwr Cable | | | 100 800 | | 200 | 300 | 400 | 500 | 600 | 701 702 | | | | | | | | | L R |
| RDSC—Rem Dev Sig Cable | | | 110 120 130 140 | | 200 | | | | | | | | | | | | | | P 1 P 2 P 3 P 4 |
| RLAH—Rem Hoist Adapt | | | 100 | | | | | | | | | | | | | | | | |
| RLDH—Rem Hoist | | | 100 | | 100 | | | | | | | | | | | | | | |
| RLMH—Rem Hoist Adapt Bar | | | 100 | | | | | | | | | | | | | | | | |
| RRCT—Remove Cable Ties | 100 | | | | | | | | | | | | | | | | | | |
| RRFH—Rem RACK Filler | 100 | | | | | | | | | | | | | | | | | | |
| RRPC—Rem RACK Power Cbl | 100 | | | | | | | | | | | | | | | | | | |
| RRSC—Rem RK PwrSeqCblEnd | 110 120 | | | | | | | | | | | | | | | | | | J9 J10 |
| RRST—Rem PwrSeqCbl Term | 100 | | | | | | | | | | | | | | | | | | |
| RSAC—Rem all AC Power [2] | 100 | | | | | | | | | | | | | | | | | | |
| RSRH—Rem RACK | 100 | | | | | | | | | | | | | | | | | | |
| RSYP—Turn Sys Power Off | 100 | | | | | | | | | | | | | | | | | | |

SYSTEM Setup/Upgrade Tasks Summary

| ID Abbreviated Task Task Title | SYSTEM | RACK | CEC | CEU | 9335-A | 9335-B | 9332 | 9331 | 9347 | 9348 | 6110 | 6040 | 6034 | 6034X | 6031 | 6032 | 6018/9 | VANILLA | |
|---|---|---|---|---|---|---|---|---|---|---|---|---|---|---|---|---|---|---|---|
| SDAS-.-Verify/Set Address | | | 100 | | 200 | 300 | | 501 502 400 | | | | | | | | | | | L R RC4D |
| SDCB-.-Set Dev CB ON [2] | | | 100 | 500 | 200 | 600 | 700 | 300 | 400 | | | | | | | | | | |
| SDSR-.-Set Dev Switches [2] | | 100 | | | 200 | 300 | 400 | 500 | 600 | | | | | | | | | | |
| SDVS-.-Verify/Set Voltage [2] | | | | 100 | | | 200 | | | | | | | | | | | | |
| SETM-.-Entry Module [1,3] | 100 200 | | | | | | | | | | | | | | | | | | II UPG |
| SIPP-.-IPL Prob . . . | 100 | | | | | | | | | | | | | | | | | | |
| SMAC——Move Card [1] | | | | | | | | | | | | | | | | | 300 301 | | One Grp |
| SMCE——Move a cable end [5] | | | | | | | | | | | | | | | | | | | |
| SMCT——Move Dv Sig Cbl Trm[5] | | | | | | | | | | | | | | | | | | | |
| SMPT——Move Pwr Seq Term | 100 | | | | | | | | | | | | | | | | | | |
| SMTP-.-Modem Test Prob. . . | 100 | | | | | | | | | | | | | | | | | | |
| SPUP-.-Power Up Prob . . . | 100 | | | | | | | | | | | | | | | | | | |
| SRCB-.-Vrfy Dv Pwr Cbl/CBs | 100 | | | | | | | | | | | | | | | | | | |
| SSCF——Turn SysCons Pwr OFF | 100 | | | | | | | | | | | | | | | | | | |
| UDCH-.-Unlk Ship Clamps [2] | | | 100 | 200 | | | 300 | | | | | | | | | | | | |
| UDSH-.-Unlk Shock Prot [2] | | | | 100 | 200 | 300 | 400 | | | | | | | | | | | | |
| UDSH-.-Rem Ship Bracket [2] | | | | | | | 100 | | | | | | | | | | | | |
| VDCT-.-Verify Cbl Term | 500 | | 100 | | 200 | 200 | 300 | 401 402 | | | | | | | | | | | L R |
| VPOR-.-Verify POR Ind [2] | | 100 | 200 | 300 | 400 | 500 | 600 | 700 | 800 | | | | | | | | | | |
| VSEM-.-Test ECS modem | 100 | | | | | | | | | | | | | | | | | | |
| VSTD-.-Verify Tape Load [2] | | | | | | | 100 | 200 | | | | | | | | | | | |
| PAR header [6] RCKCL——PAR module 1 [6] DCABCT——PAR module 2 [6] | | | | | | | | | | | | | | | | | | | |

NOTES:

[1] Flat line drawing or list required.
[2] Rollup multiples in sequence; set ROLL variable to YES
[3] Uses variables &SYSD, &SYSM, &SYSN, &SYST, &CECM, &CECT, &SERN, &ORDN, &TIME, &STIM, and &RELVER; and switches PNLA, PNKR, PNLR, PNCE, PNBD, and PNED.
[4] Both ends of the cable get labeled.
[5] Tasks needed only if we do the MOVE tasks; not firm yet; not counted in totals
[6] Automatically added at end; count as 1 task, 1 version

APPENDIX V

```
K1 04 02 M|B1   |B6   |B3   |B7   |
K2 PNLC1K0| 1C0|  122| 123|  1C0|
K2 PNLC2K0| 2C0|     |    |  2C0|
K2 PNCL1K0| 1C0|  991| 113|  1C0|
C1 04 04 M|6019|6018|6110|
C2 PNLC1C0| 114|  124| 121|  1P1|
C2 PNLC2C0| 214|  224|    |  2P1|
C2 PNCL1C0| 114|  124| 121|  1P1|
P1 16 04 M|DI01|D001|DC01|DC02|DC03|DC04|PWSI|PWSO|CC01|CC02|CC03|CC04|CC05|CC06|CC07|CC08|
P2 PNLC1P1| 111|  121| 111|  111| 111|  111|    |  888|    |    |    |    |    |    |    |    |
P2 PNLC2P1| 211|  221| 211|  211| 211|  211|    |  887|    |    |    |    |    |    |    |    |
P2 PNCL1P1| 111|  121| 111|  111| 111|  111|    |  886|    |    |    |    |    |    |    |    |
P2 RDSC1P0|    |     | 110|  120| 130|  140|    |     |    |    |    |    |    |    |    |    |
P2 ADSC1P0|    |     | 110|  120| 130|  140|    |     |    |    |    |    |    |    |    |    |
P2 RDDC1P0| 110|  120|    |     |    |     |    |     |    |    |    |    |    |    |    |    |
P2 ADDC1P0| 110|  120|    |     |    |     |    |     |    |    |    |    |    |    |    |    |
P2 RDDC2P0| 210|  220|    |     |    |     |    |     |    |    |    |    |    |    |    |    |
P2 ADDC2P0| 210|  220|    |     |    |     |    |     |    |    |    |    |    |    |    |    |
P2 RDDC3P0| 310|  320|    |     |    |     |    |     |    |    |    |    |    |    |    |    |
P2 ADDC3P0| 310|  320|    |     |    |     |    |     |    |    |    |    |    |    |    |    |
P2 RDDC4P0| 41L|  42L|    |     |    |     |    |     |    |    |    |    |    |    |    |    |
P2 ADDC4P0| 41L|  42L|    |     |    |     |    |     |    |    |    |    |    |    |    |    |
P2 RRSC1P0|    |     |    |     |    |     | 110|  120|    |    |    |    |    |    |    |    |
P2 ARSC1P0|    |     |    |     |    |     | 110|  120|    |    |    |    |    |    |    |    |
L1 02 01 M|L   |R    |
L2 RDPC7L0| 701|  702|
L2 ADPC7L0| 701|  702|
L2 RDDT4L0| 401|  402|
L2 ADDT4L0| 401|  402|
L2 RDEV6L0| 601|  602|
L2 ADEV6L0| 601|  602|
L2 RDDC41L| 411|  412|
L2 ADDC41L| 411|  412|
L2 RDDC42L| 421|  422|
L2 ADDC42L| 421|  422|
L2 SDAS5L0| 5S1|  5S2|
L2 VDCT4L0| 401|  402|
M1 09 03 M|630 |640 |650 |660 |F10 |F20 |F30 |F40 |F50 |
M2 RDBC1M0|    |    | 100| 200|    |    |    |    |    |
M2 ADBC1M0|    |    | 100| 200|    |    |    |    |    |
V1 24 04 G|6030|6130|3054|3055|3030|2500|2501|2502|2503|2504|2505|2506|AF12|AF04|
V2 RCDT1V0| 110| 111| 112| 113| 114| 120| 121| 122| 123| 129| 130| 131|    |    |
V2 ACDT1V0| 110| 111| 112| 113| 114| 120| 121| 122| 123| 129| 130| 131|    |    |
V2 RCDT2V0|    |    |    |    |    |    |    |    |    |    |    |    | 210| 211|
V2 ACDT2V0|    |    |    |    |    |    |    |    |    |    |    |    | 210| 211|
W1 08 04 G|6019|6018|6110|6040|6034|6050|6031|6032|
W2 RCDT3W0| 316| 317| 310| 311| 312| 313| 314| 315|
W2 ACDT3W0| 316| 317| 310| 311| 312| 313| 314| 315|
G1 08 04 G|6019|6018|6110|6040|6034|6050|6031|6032|
G2 RCSC3G0| 610| 611|    |    |    |    |    |    |
G2 ACSC3G0| 610| 611|    |    |    |    |    |    |
G2 RCSC1G0|    |    | 410| 411| 412|    |    |    |
G2 ACSC1G0|    |    | 410| 411| 412|    |    |    |
G2 RCSC2G0|    |    |    |    |    | 51X| 52X| 53X|
G2 ACSC2G0|    |    |    |    |    | 51X| 52X| 53X|
X1 04 04 G|CC01|CC02|CC03|CC04|
X2 RCSC51X| 510| 511|    |    |
X2 ACSC51X| 510| 511|    |    |
X2 RCSC52X| 512| 513|    |    |
X2 ACSC52X| 512| 513|    |    |
X2 RCSC53X| 514| 515| 516| 517|
X2 ACSC53X| 514| 515| 516| 517|
S1 08 01 G|0   |1   |2   |3   |4   |5   |6   |7   |
S2 SDAS1S0| 100| 110| 120| 130| 140| 150| 160| 170|
S2 SDAS2S0| 100| 110| 120| 130| 140| 150| 160| 170|
S2 SDAS3S0| 100| 110| 120| 130| 140| 150| 160| 170|
S2 SDAS4S0| 400| 410| 420| 430| 440| 450| 460| 470|
S2 SDAS5S1| 500| 510| 520| 530| 540| 550| 560| 570|
S2 SDAS5S2| 500| 510| 520| 530| 540| 550| 560| 570|
PS PDRR200 061*     YN
PS PDCC100 061*     NY
PS PDRR100 07*      YN
PS PDCC100 07*.     NY
PS PDRR200 087*     YN
PS PDCC200 087*     NY
PS PDRR100 031*     YN
PS PDRR200 090*     YN
```

*TOPOLOGY FILE*
*063010Ø*

```
00110939006301001987081210415    010316    IVT1
00240001930900      0000375989    T1PNEW000005000000000AC000  1 E       O
00340002933220      0008265500    U3PNEW0000020000000004LM0201 00E021
00444003            0008265527    B2P002P003000095006700003PI010004500025    0000000000E
028440039803        0006495301    B1P007D001002220006003DI010042500057      00000000000I
00540002933220      0008265500    U3PNEW0000030000000001LM0100 10E021                 P
00664005            0008265527    B2P002P002000095006000005PI010004500025    0000000000E
030440059801        0006495304    B1P003D001004000057005DI010042500057      00000000000I
00740002934700      0006370462    U4PNEW00000400000000015LM0417 00E021                 S
00844007            0006200478    B2P002P004000095007400007PI010022500120    0000000000E
029440079803        0006495301    B1P021CC010000000000007DI010022200085     00000000000I
019400099396630     0006369639    C9BNEW0000010013100062CS0409    E
020400099396630     0006369640    C9BNEW0000010016100062CS0508    E
017400099396630     00066X4124    C8BNEW0000010011100062CS0302    E
009400029396630     00092X4601    U1PNEW0000010000008007LM03     00E
010440009          0008265527    B2P002P001000095005300009PI010002500150    0000000000E
018400993966303055  00066X4125    C8PNEW0000010009100062CS0200    E
032400099396630459  0006369617    CAPNEW0000010040100062CS1308    I
031400099396630459  0006369616    CAPNEW0000010007100062CS0108    I
024400099396630603  0006258601    C3PNEW0000010028100062CS0902    I023
026400099396630603  0006258605    C3PNEW0000010034100062CS1101    I025    -
022400099396630603  0006258604    C3PNEW0000010025100062CS0801    I023
011400099396630604  0002438495    C1PNEW0000010037100062CS1200    E
012440096040        00059X3872    B6F011CC010000000000    0000000000     0000000000E
021400099396630611  0005563616    C1PNEW0000010019100062CS0600    I                     B
0?54000993966306130 00085X2075    C2PNEW0000010031100062CS1000B   I         ı
0?34000993966306130 00085X2075    C2PNEW0000010022100062CS0700A   I
013440099200        0006240648    B3F022CC010000000000    0000000000     0000000000E
014440099410        00092X2815    B3F026CC010000000000    0000000000     0000000000E
015440099540        0006240593    B3F024CC020000000000    0000000000     0000000000E
016440099661        0006240646    B3F024CC010000000000    0000000000     0000000000E
00260 9111    0019201    0019951    001999X   001       000       000       000       000       000       000
00360 9951    001999X    001        000       000       000       000       000       000       000       000
00560 9951    001999X    001        000       000       000       000       000       000       000       000
00760 9951    001999X    001        000       000       000       000       000       000       000       000
00960 5503    001999X    0019951    001       000       000       000       000       000       000       000
02260 C19200001         000        000       000       000       000       000       000       000       000
02460 C29540001C19661001 000       000       000       000       000       000       000       000       000
02660 C19410001         000        000       000       000       000       000       000       000       000
```

*1Ø  – HEADER RECORD*
*4Ø  – ELEMENT RECORD*
*44  – CABLE RECORD*
*60  – SPECIFY RECORD*

INTERMEDIATE DELTA FILE
0630XX

```
98 00001SETM1   000      P001000F                        00000         00000
01A00002PVCC2   025      P002120F  002AC0000900007LM03   00000         00000        BG
98 00003PVOL1   050      P003100F            00000       00000         00000
99 00004PVRM1   005      P003200F            00000       00000         00000
01A00005ASRP1   020010   S011000FL 002AC00   00000       00000         00000        G
01A00006ASRH1   080060   S012000FL 002AC00   00000       00000         00000        GA
01A00007PDRR2   005      R013000 H 002AC00   00000       00000         00000        A
01A00008UDSW1   010050   R013100 H 002AC0000700015LM04   00000         00000        GB
01A00009UDCH3   008005   R013200 H 002AC0000700015LM04   00000         00000        GB
01A00010VDCT2   T001     R013320 H 002AC0000500001LM01   00000         00000        B
01A00011SDVS2   007003   R013410 H 002AC0000700015LM04   00000         00000        GB
01A00012SDAS2S  007      R013500 H 002AC0000500001LM01   00000         00000        D
01A00013SDAS2S  007      R013500 H 002AC0000300004LM02   00000         00000        D
01A00014SDAS4S  010      R013500 H 002AC0000700015LM04   00000         00000        D
01A00015SDCB6   007002   R013600 H 002AC0000500001LM01   00000         00000        GB
01A00016SDCB6   007002   R013600 H 002AC0000300004LM02   00000         00000        GB
01A00017SDCB1   007002   R013600 H 002AC0000900007LM03   00000         00000        GB
01A00018SDCB3   007002   R013600 H 002AC0000700015LM04   00000         00000        GB
01A00019ACSC2G D 010     C087200LL 002AC0000900007LM0302400062CS0901600000CC016031  FD
01A00020ACSC1G D 030     C087200LL 002AC0000900007LM0301100062CS1201200000CC016040  FD
01A00021ASLC1  D 050     X088100   002AC0000900007LM0301100062CS1201200000CC016040  A
01A00022ASEM1  D 080     X088200   002AC0000900007LM0302400062CS0901600000CC016031  A
01A00023ARPC1  D 025     S091100 L 002AC00   00000       00000         00000        A
01A00024SRCB1  D 010     S091300 L 002AC00   00000       00000         00000        A
01A00025PDRF2  D 000     R092000LH 002AC00   00000       00000         00000        A
01A00026UDSH4  D 050040  R092100LH 002AC0000700015LM04   00000         00000        GB
01A00027UDSH2  D 012001  R092100LH 002AC0000300004LM02   00000         00000        GB
01A00028UDSH2  D 012001  R092100LH 002AC0000500001LM01   00000         00000        GB
01A00029SDSR1  D 010001  R092210LH 002AC00   00000       00000         00000        GB
01A00030SDSR6  D 010001  R092220LH 002AC0000700015LM04   00000         00000        GB
01A00031SDSR4  D 010001  R092220LH 002AC0000300004LM02   00000         00000        GB
01A00032SDSR4  D 010001  R092220LH 002AC0000500001LM01   00000         00000        GB
01A00033ADSB1  D 010     R092300LH 002AC0000900007LM03   00000         00000        B
01A00034ASAC1  D 012008  S100100LL 002AC00   00000       00000         00000        GA
01A00035ASCP1  D 020     X100200L  002AC0000900007LM03   00000         00000
98A00036ASYP1  D 010     X100300L            00000       00000         00000
01A00037VPOR1  U 008001  S101100LH 002AC00   00000       00000         00000        GB
01A00038VPOR7  U 008001  S101200LH 002AC0000700015LM04   00000         00000        GB
01A00039VPOR5  U 008001  S101200LH 002AC0000300004LM02   00000         00000        GB
01A00040VPOR5  U 008001  S101200LH 002AC0000500001LM01   00000         00000        GB
01A00041VSTD1  U 050050  S102100LH 002AC0000700015LM04   00000         00000        GB
01A00042AIPL1  U 040     X102200L  002AC0000900007LM03   00000         00000
98A00043VSEM1  U 030     X102300L            00000       00000         00000
99A00044PNSA1  U 005     P103200L            00000       00000         00000
98A00045ACMC1  U 000     P112000L            00000       00000         00000
99A00046PNSC1  U 050     P114000L            00000       00000         00000
99A00047SPUP1  U 000     P121000L            00000       00000         00000
99A00048SIPP1  U 000     P122000L            00000       00000         00000
01A00000AIPL1  U 040     X102200L  002AC0000900007LM03   00000         00000
01A00000REEF     100     P000000P  002AC0000900007LM0302400062CS09      00000
01A00000LYNX     100     P000000P  002AC0000900007LM0301100062CS12      00000
01A00000ACSC1G D 030     C087200LL 002AC0000900007LM0301100062CS1201200000CC016040  FD
01A00000ASLC1  D 050     X088100   002AC0000900007LM0301100062CS1201200000CC016040  A
01A00000ACSC1G D 010     C087200LL 002AC0000900007LM0302200062CS0801300000CC016034  FD
01A00000ACSC2G D 010     C087200LL 002AC0000900007LM0302600062CS1101400000CC016032  FD
01A00000ACSC2G D 010     C087200LL 002AC0000900007LM0302400062CS0901500000CC026031  FD
01A00000ASEM1  D 080     X088200   002AC0000900007LM0302400062CS0901500000CC026031  A
01A00000ACSC2G D 010     C087200LL 002AC0000900007LM0302400062CS0901600000CC016031  FD
01A00000ASEM1  D 080     X088200   002AC0000900007LM0302400062CS0901600000CC016031  A
```

*DELTA HARDWARE HANDLING FILE*
*0630100*

```
98 00001SETM100  000              00000      00000      00000      000
01A00002PVCC200  025   002AC0000900007LM03   00000      00000      000 BG
98 00003PVOL100  050             00000      00000 —     00000      000
99 00004PVRM100  005             00000      00000       00000      000
01A00005ASRP100  020010 002AC00   00000      00000      00000      000G
01A00006ASRH100  080060 002AC00   00000      00000      00000      000GA
01A00007PDRR200  005    002AC00   00000      00000      00000      000 A
01A00008UDSH100  010050 002AC0000700015LM04  00000      00000      000GB
01A00009UDCH300  008005 002AC0000700015LM04  00000      00000      000GB
01A00010VDCT200  T001   002AC0000500001LM01  00000      00000      000 B
01A00011SDVS200  007003 002AC0000700015LM04  00000      00000      000GB
01A00012SDAS200  007    002AC0000500001LM01  00000      00000      100 D
01A00013SDAS200  007    002AC0000300004LM02  00000      00000      110 D
01A00014SDAS400  010    002AC0000700015LM04  00000      00000      470 D
01A00015SDCB600  007002 002AC0000500001LM01  00000      00000      000GB
01A00016SDCB600  007002 002AC0000300004LM02  00000      00000      000GB
01A00017SDCB100  007002 002AC0000900007LM03  00000      00000      000GB
01A00018SDCB300  007002 002AC0000700015LM04  00000      00000      000GB
01A00019PDCC200D 010    002AC0000900007LM0302400062CS0901600000CC016031  000 BG
01A00019PNLC123D 010    002AC0000900007LM0302400062CS0901600000CC016031  000 CA
01A00019ACSC200D 010    002AC0000900007LM0302400062CS0901600000CC016031  512 FD
01A00020PNLC122D 030    002AC0000900007LM0301100062CS1201200000CC016040  000 CA
01A00020ACSC100D 030    002AC0000900007LM0301100062CS1201200000CC016040  411 FD
01A00021ASLC100D 050    002AC0000900007LM0301100062CS1201200000CC016040  000 A
01A00022ASEM100D 080    002AC0000900007LM0302400062CS0901600000CC016031  000 A
01A00023ARPC100D 025    002AC00   00000      00000      00000      000 A
01A00024SRCB100D 010    002AC00   00000      00000      00000      000 A
01A00025PDRF200D 000    002AC00   00000      00000      00000      000 A
01A00026UDSH400D 050040 002AC0000700015LM04  00000      00000      000GB
01A00027UDSH200D 012001 002AC0000300004LM02  00000      00000      000GB
01A00028UDSH200D 012001 002AC0000500001LM01  00000      00000      000GB
01A00029SDSR100D 010001 002AC00   00000      00000      00000      000GB
01A00030SDSR600D 010001 002AC0000700015LM04  00000      00000      000GB
01A00031SDSR400D 010001 002AC0000300004LM02  00000      00000      000GB
01A00032SDSR400D 010001 002AC0000500001LM01  00000      00000      000GB
01A00033ADSB100D 010    002AC0000900007LM03  00000      00000      000 B
01A00034ASAC100D 012008 002AC00   00000      00000      00000      000GA
01A00035ASCP100D 020    002AC0000900007LM03  00000      00000      000
98A00036ASYP100D 010             00000      00000      00000      000
01A00037VPOR100U 008001 002AC00   00000      00000      00000      000GB
01A00038VPOR700U 008001 002AC0000700015LM04  00000      00000      000GB
01A00039VPOR500U 008001 002AC0000300004LM02  00000      00000      000GB
01A00040VPOR500U 008001 002AC0000500001LM01  00000      00000      000GB
01A00041VSTD100U 050050 002AC0000700015LM04  00000      00000      000GB
01A00042AIPL100U 040    002AC0000900007LM03  00000      00000      000
98A00043VSEM100U 030             00000      00000      00000      000
99A00044PNSA100U 005             00000      00000      00000      000
98A00045ACMC100U 000             00000      00000      00000      000
99A00046PNSC100U 050             00000      00000      00000      000
99A00047SPUP100U 000             00000      00000      00000      000
99A00048SIPP100U 000             00000      00000      00000      000
```

*TGIMST SCRIPT*
*0630100*

```
.SE LANG = 0
.SE MRACK OFF
.SE MODEL OFF
.SE NRACK OFF
.SE UPGR OFF
.SE ROLL OFF
.SE PNLR OFF
.SE PNLA OFF
.SE TCAW 'YES
.SE PNCE OFF
.SE PNBD OFF
.SE PNED OFF
.SE PNKR OFF
.SE CTIE 'YES
.SE SYSM = '9390'
.SE SYSN = '0630100'
.SE ORDN = 'IVT1'
```

```
.SE SYSD = '19870812'
.SE SYST = '104157'
.SE CECT = '9396'
.SE CECM = '630'
.SE SERN = 'NE-W000001'
.SE TIME = '1.4'
.SE STIM = '1.4'
.SE RACK = 'A'
.SE RACK1 = 'A'
.SE DLOC1 = '07'
.IM RELEAS
.SE ARTNM = 100
.IM SETM100
.SE RACK = 'A'
.SE DLOC = '07'
.SE CCNUM = '01'
.IM PVCC200
.IM PVOL100
.IM PVRM100
.SE CNT = '1'
.IM ASRP100
.SE RACK = 'A'
.SE CNT = '1'
.IM ASRH100
.SE RACK = 'A'
.IM PDRR200
.SE RACK = 'A'
.SE DLOC = '15'
.SE CNT = '1'
.IM UDSW100
.SE RACK = 'A'
.SE DLOC = '15'
.SE CNT = '1'
.IM UDCH300
.SE RACK = 'A'
.SE DLOC = '01'
.IM VDCT200
.SE RACK = 'A'
.SE DLOC = '15'
.SE CNT = '1'
.IM SDVS200
.SE RACK = 'A'
.SE DLOC = '01'
.SE DEVAD = '0'
.SE ARTNM = '100'
.IM SDAS200
.SE RACK = 'A'
.SE DLOC = '04'
.SE DEVAD = '1'
.SE ARTNM = '110'
.IM SDAS200
.SE RACK = 'A'
.SE DLOC = '15'
.SE DEVAD = '7'
.SE ARTNM = '470'
.IM SDAS400
.SE RACK = 'A'
.SE ROLL 'YES
.SE CNT = '2'
.IM SDSR400
.SE ROLL OFF
.SE RACK = 'A'
.SE DLOC = '07'
.IM ADSB100
.SE RACK = 'A'
.SE CNT = '1'
.IM ASAC100
.IM ASCP100
.IM ASYP100
.SE RACK = 'A'
.SE DLOC = '00'
.SE CNT = '1'
.IM VPOR100
.SE RACK = 'A'
.SE DLOC = '15'
.SE CNT = '1'
.IM VPOR700
.SE RACK = 'A'
.SE DLOC = '04'
.SE ROLL 'YES
```

```
.SE CNT = '2'
.IM VPOR500
.SE ROLL OFF
.SE RACK = 'A'
.SE DLOC = '15'
.SE CNT = '1'
.IM VSTD100
.IM AIPL100
.IM VSEM100
.IM PNSA100
.IM ACMC100
.IM PNSC100
.IM SPUP100
.IM SIPP100
.IM PARHDR
.SE RACK = 'A'
.IM RCKCL
.IM DCABCT
.SE DLOC = '01'
.SE ROLL 'YES
.SE CNT = '2'
.IM SDCB600
.SE ROLL OFF
.SE RACK = 'A'
.SE DLOC = '07'
.SE CNT = '1'
.IM SDCB100
.SE RACK = 'A'
.SE DLOC = '15'
.SE DLOC = '15'
.SE CNT = '1'
.IM SDCB300
.SE RACK = 'A'
.SE DLOC = '07'
.SE CCNUM = '01'
.IM PDCC200
.SE RACK = 'A'
.SE DLOC = '07'
.SE CBLPN = '70X8659'
.SE CBLAB = '016'
.IM PNLC123
.SE RACK = 'A'
.SE DLOC = '07'
.SE CSLOT = '09'
.SE CPORT = '01'
.SE CBLAB = '016'
.SE ARTNM = '512'
.SE CTYPE = '6031'
.IM ACSC200
.SE RACK = 'A'
.SE DLOC = '07'
.SE CBLPN = '2438316'
.SE CBLAB = '012'
.IM PNLC122
.SE RACK = 'A'
.SE DLOC = '07'
.SE CSLOT = '12'
.SE CPORT = '01'
.SE CBLAB = '012'
.SE ARTNM = '411'
.SE CTYPE = '6040'
.IM ACSC100
.SE CBLAB = '012'
.IM ASLC100
.SE CBLAB = '016'
.IM ASEM100
.SE RACK = 'A'
.IM ARPC100
.SE RACK = 'A'
.IM SRCB100
.SE RACK = 'A'
.IM PDRF200
.SE RACK = 'A'
.SE DLOC = '15'
.SE CNT = '1'
.IM UDSH400
.SE RACK = 'A'
.SE DLOC = '04'
.SE ROLL 'YES
```

```
.SE CNT = '2'
.IM UDSH200
.SE ROLL OFF
.SE RACK = 'A'
.SE DLOC = '00'
.SE CNT = '1'
.IM SDSR100
.SE RACK = 'A'
.SE DLOC = '15'
.SE CNT = '1'
.IM SDSR600
.SE RACK = 'A'
.SE DLOC = '04'
```

(SETM100)

---

System Installation Guide

F System identification:        9390-O630100-19870812-104157
F Processor type-model number:  9396-630
F Processor serial number:     NE-W000001

F The job of installing a system has been divided into small units of work, named
F tasks. Most tasks have several steps. Each task in these instructions has a small
F box beside the task number. Read and follow all steps in each task carefully.
F Mark the box when a task has been completed. Perform all tasks in sequence.

One service representative is needed to install this system.

The approximate service representative time needed to install this system is 1.5 hours. The approximate system time needed is 1.5 hours.

DANGER
An incorrectly wired outlet could place hazardous voltage on metal parts of the system and/or the products that attach to the system. It is the customer's responsibility to ensure that the outlet is properly grounded to prevent an electrical shock.

1. When installing the system do not plug in any power cables until instructed to do so. All signal connections must be made first.
2. When adding any hardware products to the system (additional racks, work stations, printers, modems, etc.), do not plug in the power cables for that hardware until ALL signal connections have been made.

F Before starting the installation, check that the customer-supplied power receptacle
F is correctly grounded. Then, measure the voltage at that receptacle and record that
voltage here: _____volts.

(SETM100)

F The number in the upper right corner of each page is the task identification
F number; make reference to it when requesting aid.

The numbers at the bottom right of illustrations are publishing control numbers and are not part of the technical content of these instructions.

CAUTION:
These instructions will tell you how to install a stabilizer to the front bottom of each rack to prevent the rack from tipping over when you slide or pull out the system units. DO NOT try to slide out or install any system units until the stabilizer is properly installed. Use caution when moving the rack and its system units.

DANGER
Never handle cables (communications, workstation, printer, or phone), connectors, or station protectors during an electrical storm.

Federal Communications Commission (FCC) Statement

Warning: This equipment generates, uses, and can radiate radio frequency energy and if not installed and used in accordance with the instruction manual, may cause interference to radio communications. It has been tested and found to comply with the limits for a Class A computing device pursuant to Subpart J of Part 15 of FCC Rules, which are designed to provide reasonable protection against such interference when operated in a commercial environment. Operation of this equipment in a residential area is likely to cause interference in which case the user at his own expense will be required to take whatever measures may be required to correct the interference.

(SETM100)

☐ 1   Getting started -- How to identify racks.

Identification from the front of the rack is done by rack serial number.

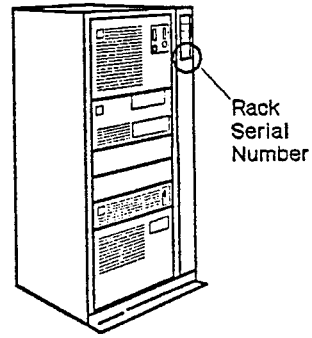

F From the back, racks are
F identified by a letter,
F located inside the rack.

F To open the back cover:

1. Put your fingers between the upper left corner of the cover and the rack, or under the lower left corner.

2. Pull the cover open.

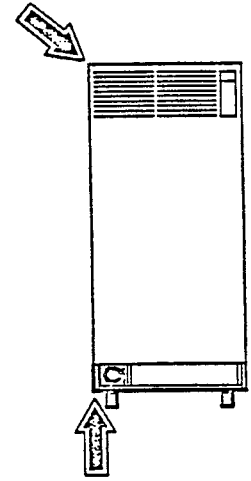

On the right side, near the top is a square patch with a black letter.

- The primary rack is always identified by the letter A.

- Additional racks are identified by the letters B, C, D, and so on. They should be physically installed in the same sequence.

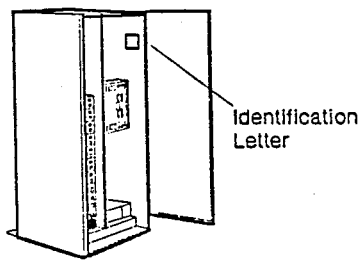

(SETM100)

☐ 2  How to locate devices.

Inside each rack, there are four strips (named EIA Unit Labels), numbered from bottom to top. Two of the strips are visible
F from the back of the rack
F (one on each side) when the cover is open; two are visible from the front (one on each side) when a filler cover (a cover with no device behind it) is removed.

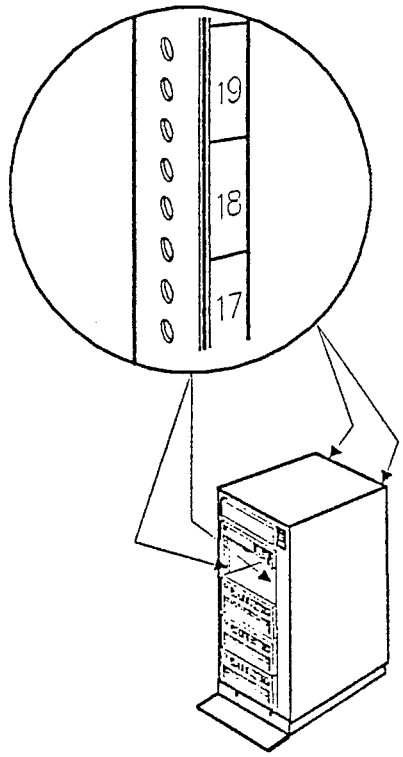

Each number represents a vertical space equal to one Electronics Industries Associates (EIA) unit. Each EIA unit has three holes, spaced at a constant distance, as shown.

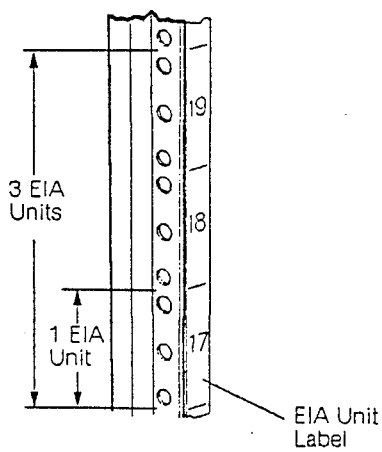

(SETM100)

The EIA number at the bottom of a device is used to specify the EIA location of that device.

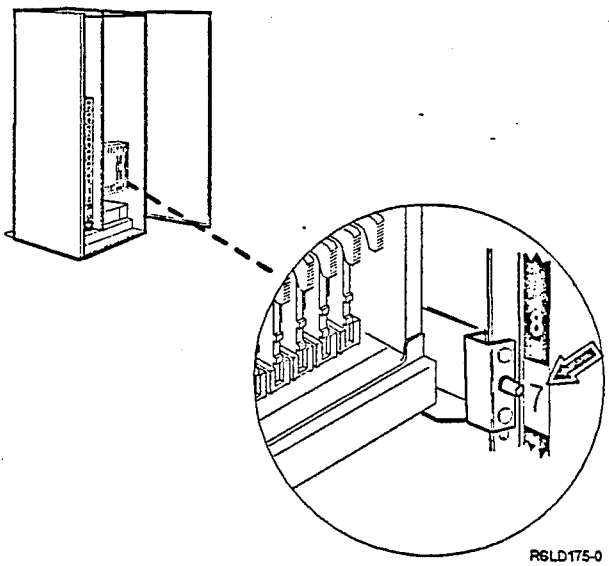

F For example, if an
F instruction said "Find the
F 9396 unit at EIA 7.", that
F means you should look
F for a 9396 unit, the
F bottom of which is at
F EIA number 7, as shown.
F (This is an example only;
F do not try to verify it on
F your system hardware.)

Some devices are small enough to be placed side-by-side, so two devices can have the same EIA number. In this case, the
F devices are identified as
F the rightmost and leftmost
F device, from where you
F are standing.

F ☐ 3 Verify the content of rack A from the front.

F From the front, verify
F that rack A has contents
F as shown.

The machine type is
located in the upper left
corner of each device.

F The numbers to the right
F in this figure are the EIA
F values, indicating the
F device locations. These
F numbers are shown in this
F view for reference only;
F these numbers are
F normally visible only
F from the back of the rack.

If the content of your
rack does not match what
is shown here, you cannot
go any farther with this
F installation. Inform your
F sales representative.

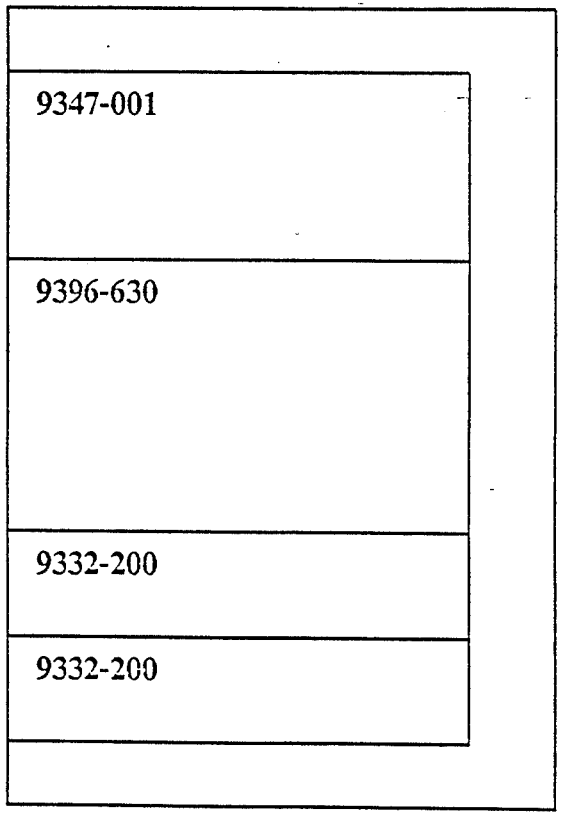

Front View -- Rack A

9309 Rack Enclosure (SETM100)

☐ 4   Verify the serial number.

These installation
instructions were printed
F for a specific system. To
F verify that you have the
F correct system for these
F instructions, do the fol-
F lowing:

F 1. Locate the device at
F     EIA 07 in rack A that
F     has 9396 on the Unit
F     ID Plate in the upper
F     left corner of the
F     device cover.

F 2. Locate the control
F     panel on that device.

F 3. Compare the serial
F     number on that
F     control panel with
F     this number:
F     NE-W000001.

The numbers must match
exactly. If they do not,
you cannot go any farther
F with this installation.
F Inform your sales repre-
F sentative.

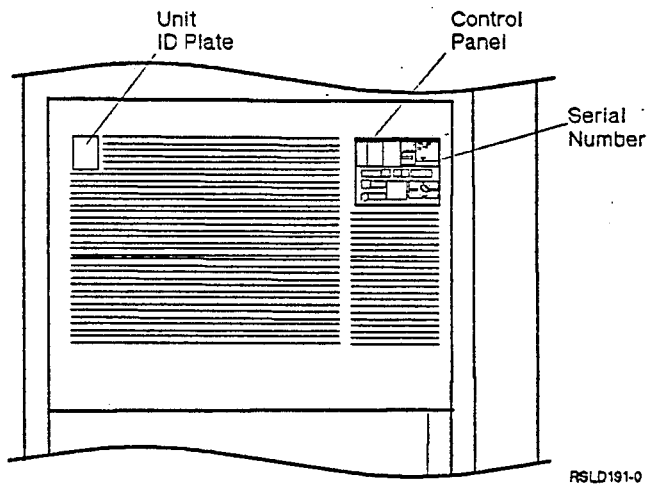

(PVCC200)

F ☐ 5  From the back of rack A, verify that the correct cards
F  are installed in the card enclosure located at EIA 07.

Compare the cards in the
card enclosure to this
F chart. Verify that each
F slot has the correct card
F installed.

Back View

| A F 0 4 | 3 0 5 5 | 3 0 5 4 | 2 5 0 0 | 2 5 0 4 | 6 0 1 0 | 6 1 3 0 | 6 0 3 4 | 6 0 3 1 | 6 1 3 0 | 6 0 3 2 | 6 0 4 0 | A F 1 2 |
|---|---|---|---|---|---|---|---|---|---|---|---|---|
| 1 | 2 | 3 | 4 | 5 | 6 | 7 | 8 | 9 | 10 | 11 | 12 | 13 |

9396-630

F Slot numbers ⟶
F are found across the
F bottom of the enclosure.

Card Enclosure

If the cards in the card
enclosure do not match
this chart, do not go any
farther with this installa-
F tion. Inform your sales
F representative.

F ☐ 6   Verify the shipping group parts.

CAUTION:
Be careful when moving the boxes in the ship group; some boxes are heavy. The stabilizer weighs approximately 9 kilograms (20 pounds).

F For each rack, you should
F have the following parts:

F Stabilizer (1)
F Stabilizer screws (2)
F Tightening rod (1)
F Wrench (1)
F Acoustic panels (2)
F Cable ties (25)
F Rack power cord (1)
F Clamp (1)
F Thumbscrews (2)

F If the stabilizer or
F stabilizer screws are
F missing, do not start the
F installation. Inform your
F sales representative.

F If any other parts are
F missing, you can start the
F installation, but you can
F not complete it until you
F get the missing parts.
F Inform your sales repre-
F sentative.

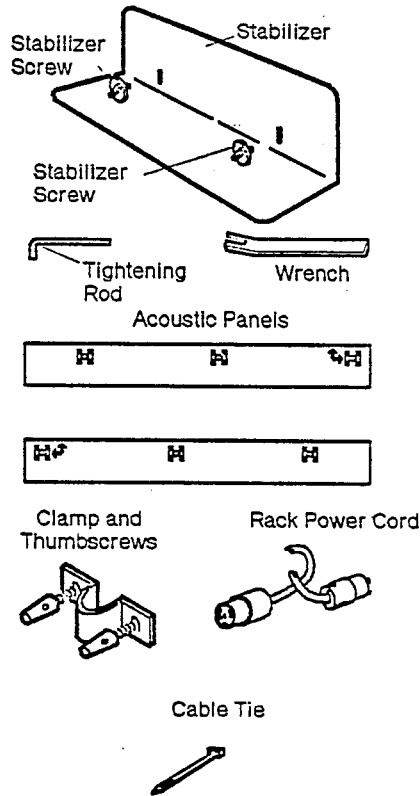

| | | | (PVOL100) |
|---|---|---|---|
| For the total system, you should have one box with these parts. ⟶ | ---P/N--- | ---CABLE NAME--- | QTY |
| | 02438316 | WORK STATION ATT | 1 |
| | 06165837 | COMMUNICATIONS | 1 |
| | 092X2785 | COMMUNICATIONS | 1 |
| | 070X8655 | COMMUNICATIONS | 2 |

F If any parts are missing,
F you can not complete the
F installation until you get
F the missing parts. Inform
F your sales representative.

(PVRM100)

F ☐ 7  Verify the system reference material.

F Check all items listed on
F the shipping group to
F ensure that all required
F parts have been received.

(ASRP100)

F ☐ 8  Move the rack to its planned location.

F CAUTION:
F If the system is on a raised floor, be careful around cable cutouts in the floor.

F See the *High End Olympic Planning Guide*, GA21-9913 for service clearance space
F needed.

☐ 9  Lock the casters.

1. Lock each caster by turning the screw clockwise until it is finger tight.

2. Ensure that you lock all casters.

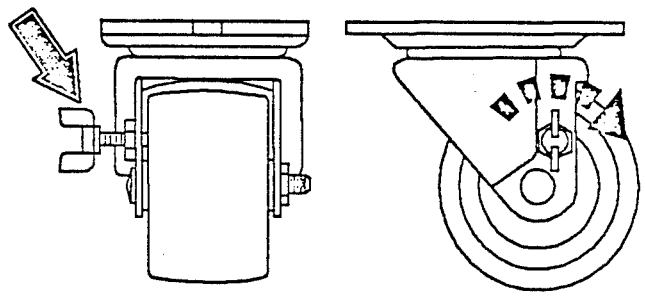

(ASRH100)

F ☐ 10  Install the stabilizer on rack A.

F 1. From the ship group
F   parts, get the
F   stabilizer, the
F   stabilizer screws, the
F   wrench, and the tight-
F   ening rod.

F 2. Line up the stabilizer
F   holes with the holes
F   in the front of the
F   rack, as shown.

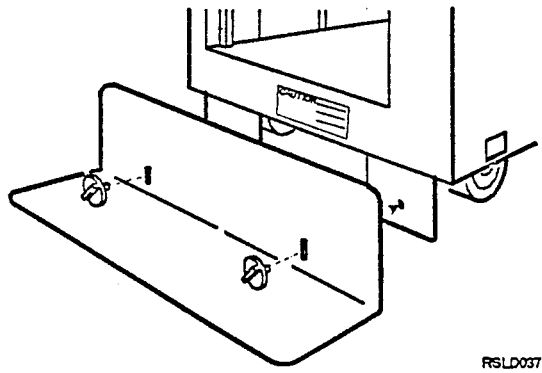

. 3. Ensure that the base
   of the stabilizer is on
   the floor.

4. Use the two screws to
   fasten the stabilizer to
F   the frame. Turn the
F   screws clockwise. Use
F   the wrench to get
F   these screws VERY
F   TIGHT. (Do not
F   stand on the wrench).

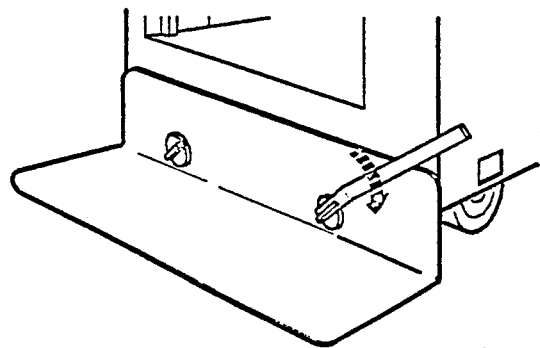

F 5. Put the wrench and
F   the tightening rod in
F   their holder inside the
F   rear cover, as shown.

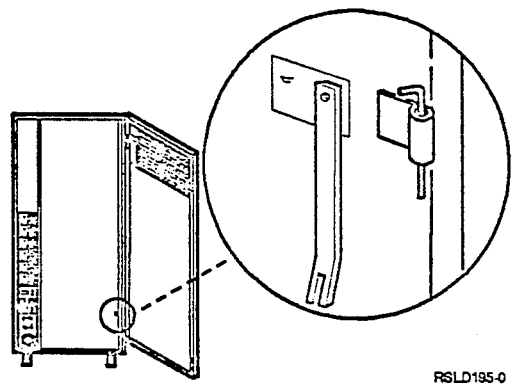

(ASRH100)

F ☐ 11  Install the side panels on rack A

Note: If the location of the rack prevents installa-
F tion of one or both of
F these side panels, you can
F leave the panel(s) off.

The arrows inside the frame of each panel indicate the top and front of the panel.

1. Identify the side of the rack to which each panel attaches.

F 2. Line up the clips on
F    the side panel with
F    the holes on the side
     of the rack, as shown.

3. Press the panel clips against the rack until they seat.

4. Repeat steps 2 and 3 for the other side of the rack.

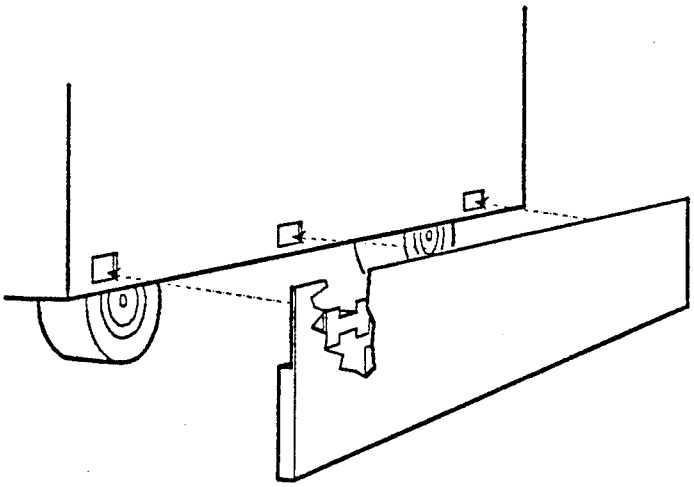

RSLD035-0

(PDRR200)

F ☐ 12  Go to the back of rack A for the next tasks.

F Detailed verification of the
F rack contents is not neces-
F sary.

F However, to become
F familiar with the rack
F contents, observe where
F each device is located;
F note the EIA numbers on
F the strips on both sides of
F the rack.

F The machine type number
F is indicated on the back
F of each device.

F Go to the next task.

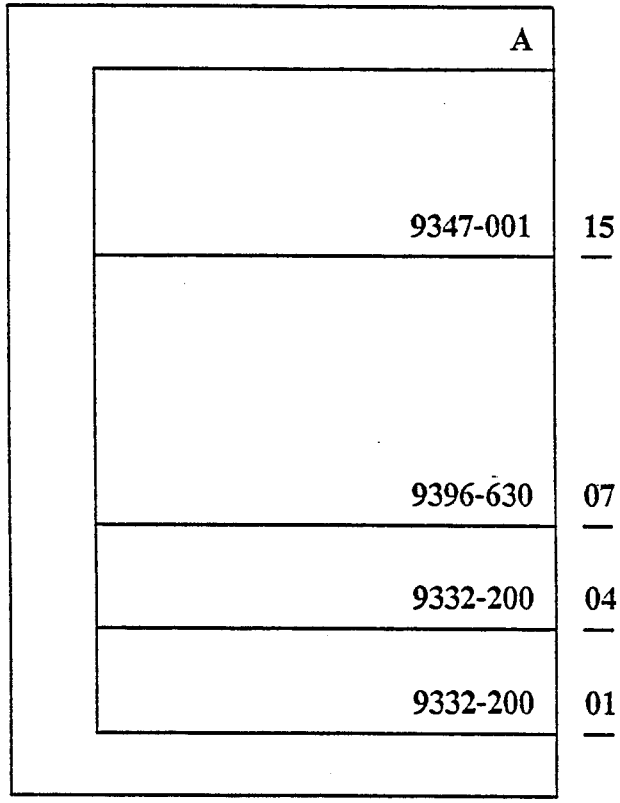

9309 Rack Enclosure (UDSW100)

F ☐ 13  Remove the shipping blocks from the 9347 device
F          located at EIA 15 in rack A.

F Pull up and remove the
F shipping blocks, as shown.
F They may be discarded.

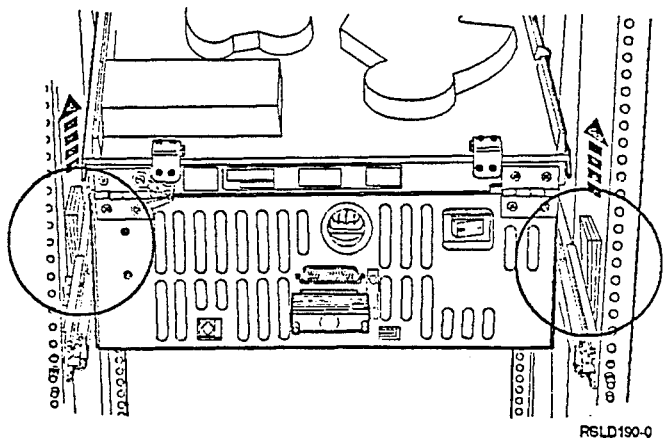

(UDCH300)

F ☐ 14 Unlock the shipping clamp bar for the 9347 at EIA 15 in rack A.
F

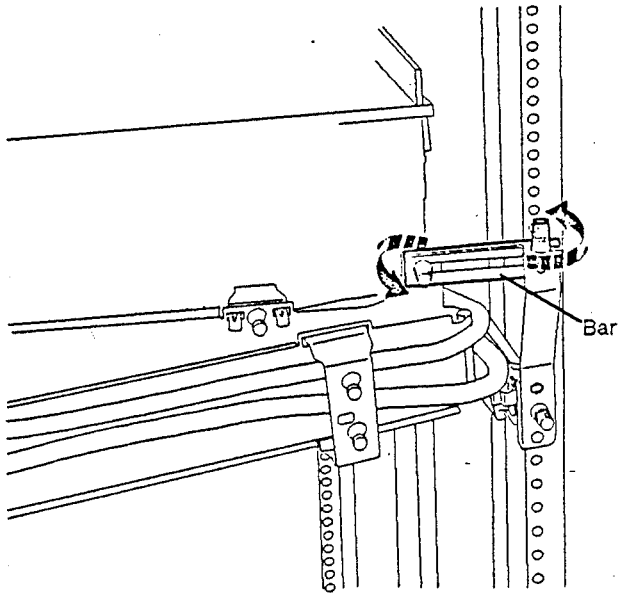

F 1. Loosen the two
F    thumbscrews from the
F    shipping clamp bar
F    on the right side of
F    the rack. (Use the
F    tightening rod.)

Note: Do not remove
   the thumbscrews; just
   loosen them enough
   so the bar can slide.

F 2. Slide the bar to the
F    left, turn it counter-
F    clockwise, and let it
     slide down.

3. Tighten the two
     thumbscrews finger
     tight.

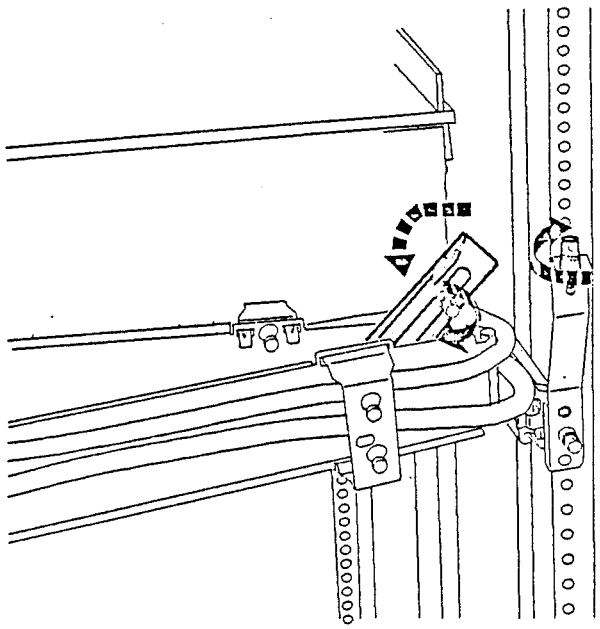

(VDCT300)

F ☐ 15  Verify that a cable terminating plug is present in the
F          9347 device located at EIA 15 in rack A.

There must be a cable terminating plug present as shown for correct system operation.

F  If the cable terminating
F  plug is missing, you can
F  not complete this installa-
F  tion. Inform your sales
F  representative.

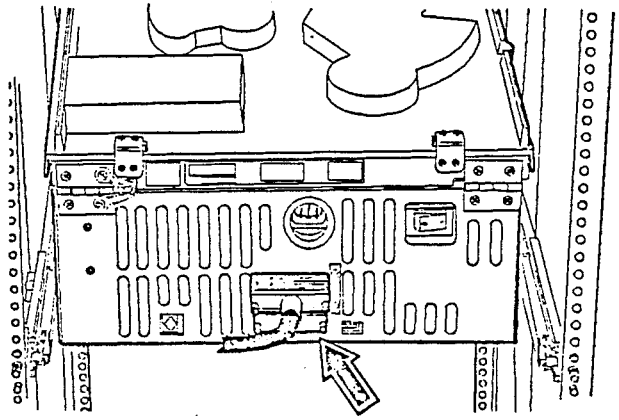

(SDVS200)

F ☐ 16  Set the voltage switches for the 9347 at EIA 15 in rack
F          A.

F  1. Locate the voltage
F     switches at the back
F     of the unit.

F  2. In the chart shown,
F     find the voltage range

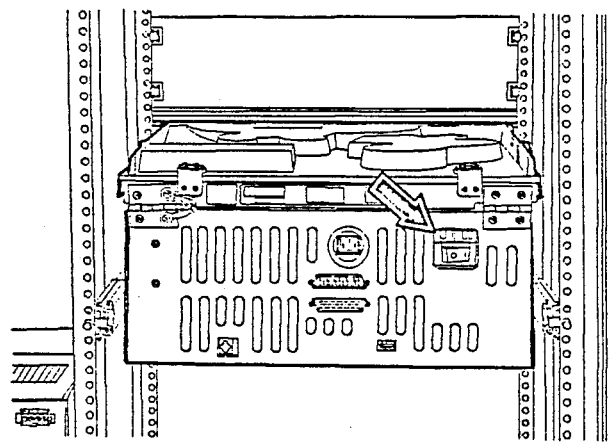

F that includes the
F voltage you recorded
F on the first page of
F these instructions.

F 3. Set the switches, as
F shown in the chart for
F that voltage range.
F Use a ball point pen
F or other pointed
F object and press the
F switch to the right or
F to the left, as neces-
F sary.

| Recorded Voltage | Switch Settings |
|---|---|
| 95 to 110 Volts | 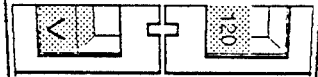 |
| 111 to 126 Volts | 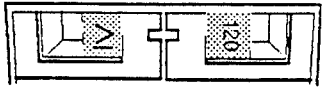 |
| 190 to 225 Volts | 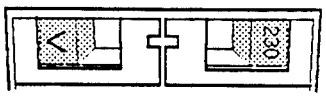 |
| 226 to 252 Volts |  |

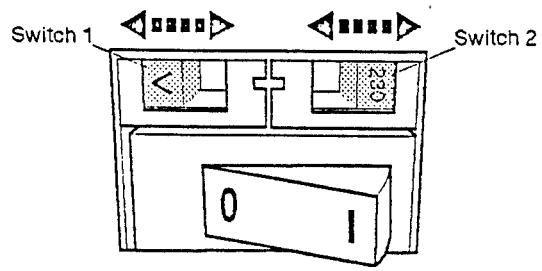

(SDAS200)

F ☐ 17  Set the address of the 9332 at EIA 01 in rack A to 1.

F 1. Locate the address
F switch at the back of
F the unit.

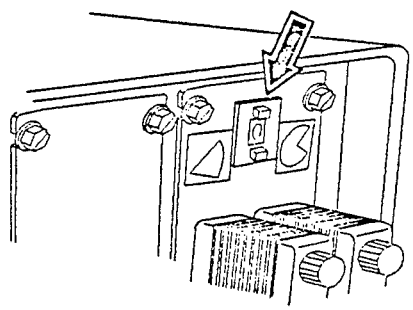

F 2. Set the address to 1
by pressing one of the
pushbuttons (above or
below the displayed
number) as often as
necessary.

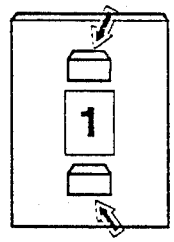

(SDAS200)
F ☐ 18  Set the address of the 9332 at EIA 04 in rack A to 0.
F 1. Locate the address
F    switch at the back of
F    the unit.
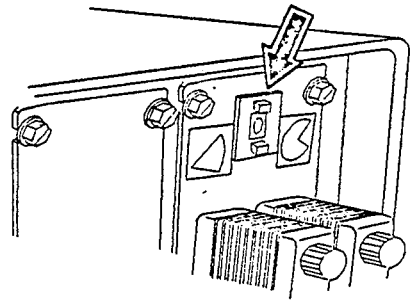
F 2. Set the address to 0
     by pressing one of the
     pushbuttons (above or
     below the displayed
     number) as often as
     necessary.
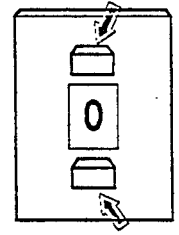
(SDAS400)
F ☐ 19  Set the address of the 9347 at EIA 15 in rack A to 7.
F 1. Locate the address
F    switches at the back
F    of the unit.
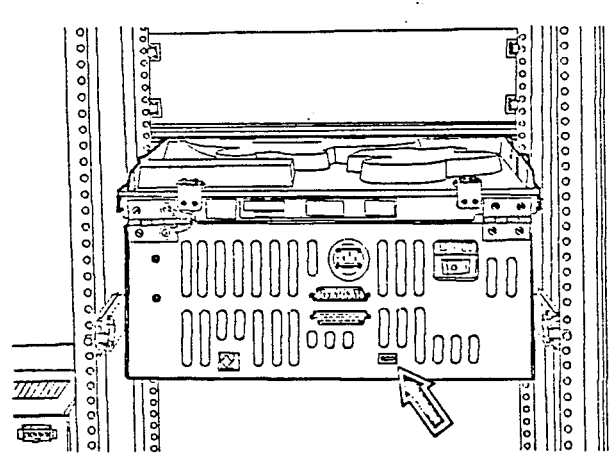

F 2. Set the switches as
F    shown for an address
F    of 7. Use a ball point
     pen to slide the
     switches up or down.
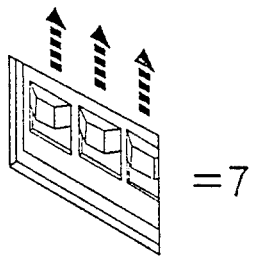
RC4D470-1
(SDCB600)
F ☐ 20 Verify correct seating of the power cables for all 9332s
F      in rack A.
F 1. For the 9332 at EIA
F    01, push in the power
     cable to ensure that it
     is correctly seated.
  2. Perform this task for
     each 9332 unit in this
F    rack; there are 2.
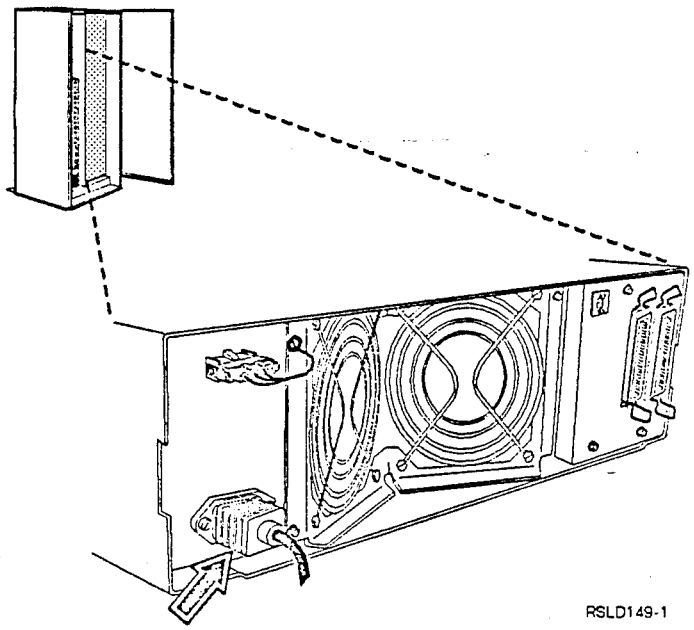
RSLD149-1

(SDCB100)
F ☐ 21  Check the circuit breaker and power cable of the card
F           enclosure at EIA 07 in rack A.
1. Locate the circuit breaker on the card enclosure.
2. Verify that the circuit breaker is set to the On (|) position. If it is not on, set it to the On (|) position.
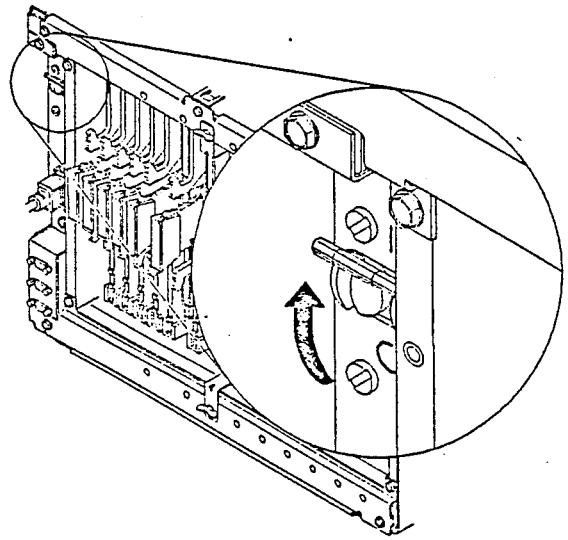
3. Push in the power cable to ensure that it is correctly seated.
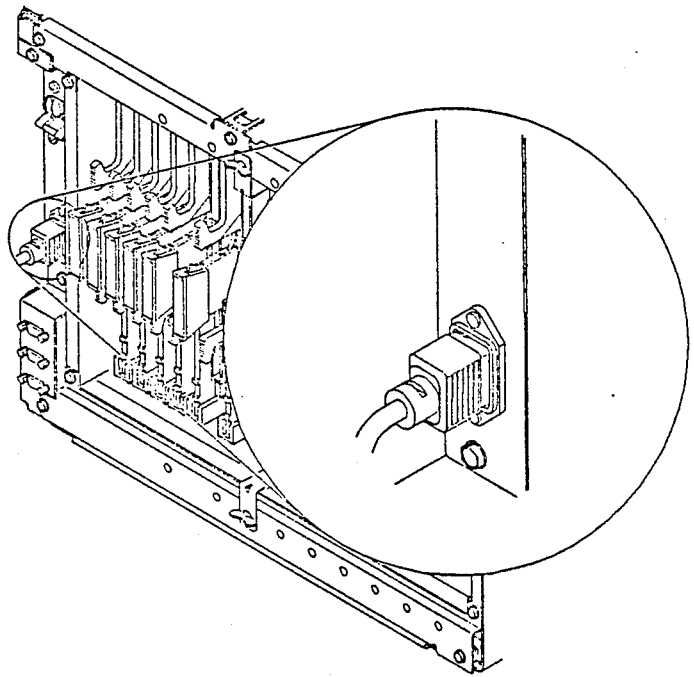

(SDCB300)
F ☐ 22 Check the circuit breaker and power cable of the 9347
F  at EIA 15 in rack A.
1. Locate the circuit breaker on the 9347.
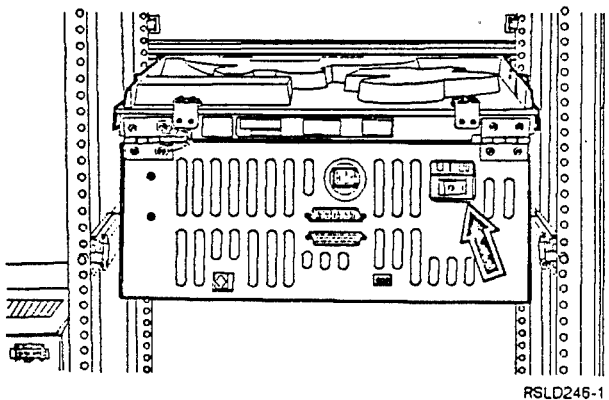
2. Verify that the circuit breaker is set to the On (|) position. If it is not on, set it to the On (|) position.
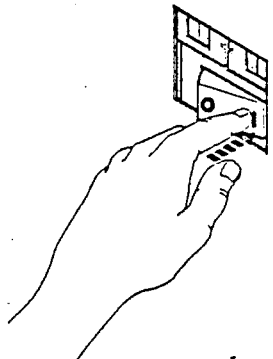
3. Push in the power cable to ensure that it is correctly seated.
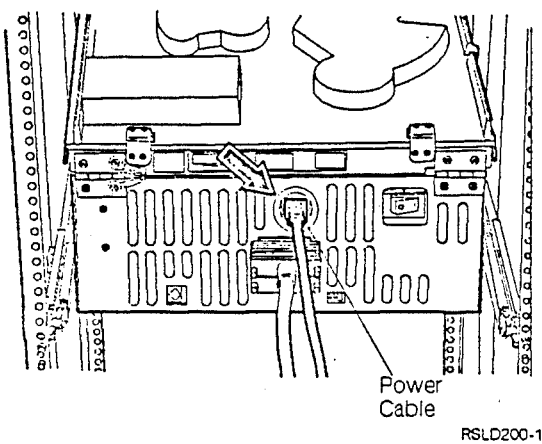

(PDCC200)

F ☐ 23 Observe the cards in the card enclosure at EIA 07 in
F      rack A.

F Detailed verification is not
F necessary. However, some
F of these cards are used in                Back View
F the next tasks.

F To become familiar with
F the card enclosure con-
F tents, observe approxi-
F mately where the various
F cards are.

| A | 3 | 3 | 2 | 2 | 6 | 6 | 6 | 6 | 6 | 6 | 6 | A |
|---|---|---|---|---|---|---|---|---|---|---|---|---|
| F | 0 | 0 | 5 | 5 | 0 | 1 | 0 | 0 | 1 | 0 | 0 | F |
| 0 | 5 | 5 | 0 | 0 | 1 | 3 | 3 | 3 | 3 | 3 | 4 | 1 |
| 4 | 5 | 4 | 0 | 4 | 0 | 0 | 4 | 1 | 0 | 2 | 0 | 2 |
| 1 | 2 | 3 | 4 | 5 | 6 | 7 | 8 | 9 | 10 | 11 | 12 | 13 |

9396-630

F Slot numbers ———→
F are found across the
F bottom of the enclosure.

F Go to the next task.                     Card Enclosure (PNLC123)

☐ 24 Locate, label, and place a communications cable.

1. Find a cable with part
   number 70X8655.

2. Get 2 cable labels
   from the parts in the
   shipping group.

3. Print the following
   information on both
   labels:

EID: 016

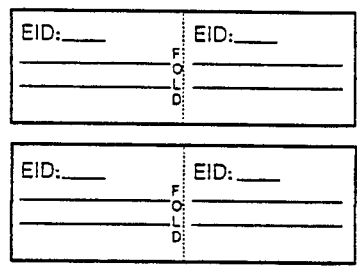

4. Fasten one label to
   each end of the cable,
   as shown. Fold the
   label around the cable
   and press together.

F 5. Select the end of the
F     cable with holes
F     visible.

F 6. Push this end of the
F     cable into rack A, as
F     shown.

This end of the cable will
be installed by the task on
the next page. The other
end will be connected
later.

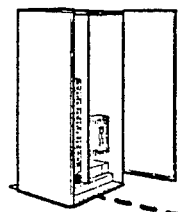
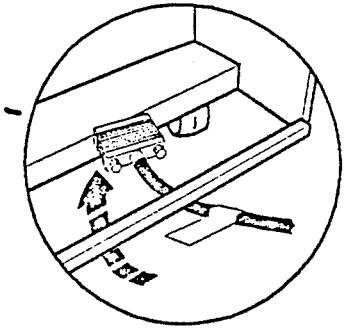

(ACSC200)

F ☐ 25  Attach the cable to port 01 on the 6031 card in slot 09
F        of the card enclosure at EIA 07 in rack A.

F 1. Find the 6031 card in
F    slot 09 in the card
F    enclosure at EIA 07.

2. Connect the cable
F    labeled EID: 016 to
F    port 01 on the 6031
F    card, as shown.

3. Turn the thumbscrews
     on the connector
     clockwise until they
F    are finger tight.

4. Verify that the cable
     is held tightly.

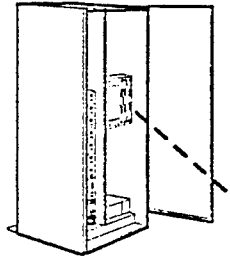
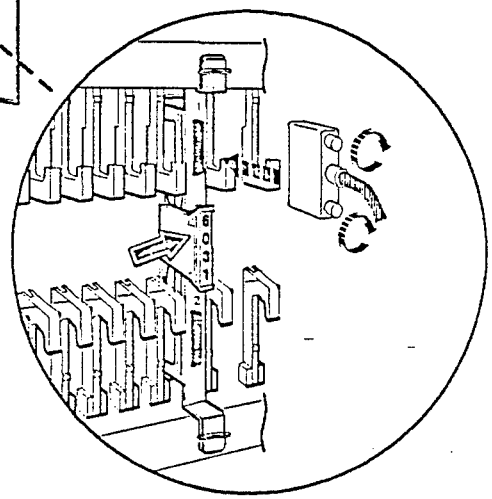

F ☐ 26  Locate, label, and place a cable with a twinaxial work
F      station attachment.

F 1. Find a cable with part
F    number 2438316.
F    This cable has a
F    twinaxial work station
F    attachment on one
F    end.

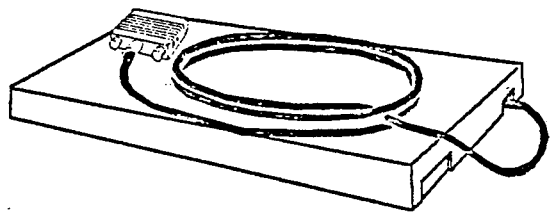

2. Get 2 labels from the parts in the shipping group.

3. Print the following information on both labels:

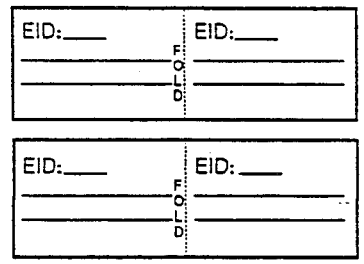

EID: 012

4. Fasten one label to each end of the cable, as shown. Fold the label around the cable and press together.

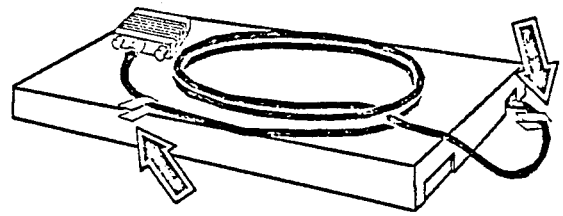

5. Put the twinaxial work station attachment on the floor, out of the way.

6. Push the loose end of the cable into rack A, as shown.

This end of the cable will be installed by the task on the next page.

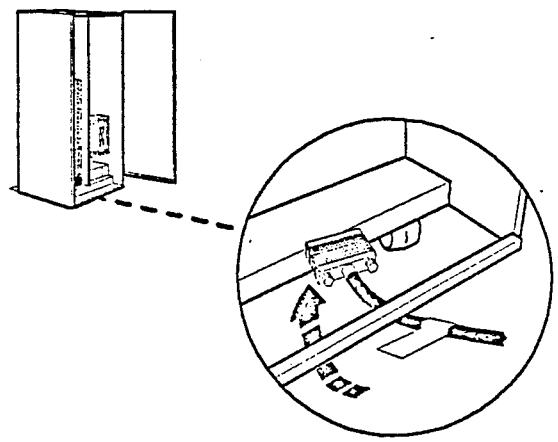

(ACSC100)
F ☐ 27 Attach the cable to the 6040 card in slot 12 of the card
F enclosure at EIA 07 in rack A.
F 1. Find the 6040 card in
F slot 12 of the card
F enclosure at EIA 07.
2. Connect the cable
F labeled EID: 012 to
F the port on the 6040
F card, as shown.
3. Turn the thumbscrews
on the connector
clockwise until they
F are finger tight.
4. Verify that the cable
is held tightly.
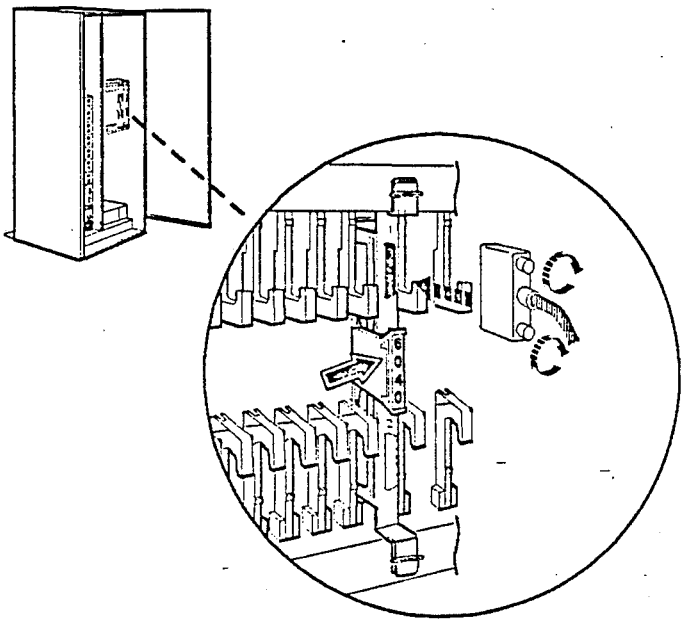

F ☐ 28 Prepare a twinaxial work station attachment for connection to the system console device.

F 1. Find the twinaxial work station attachment that has a cable labeled EID: 012

F 2. Remove the cover, as shown.

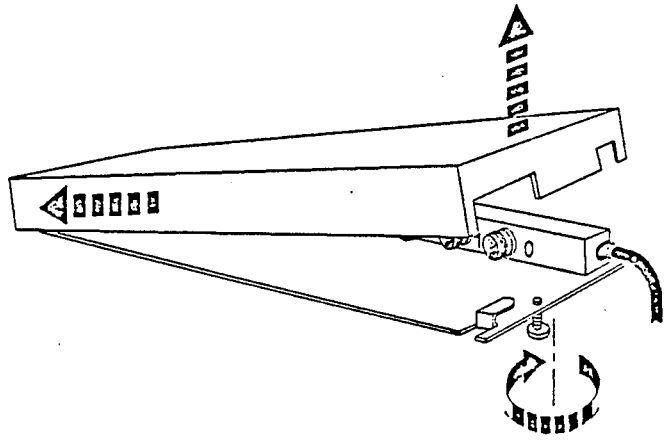

F 3. Find the customer's twinaxial cable that is to be used to connect the console display to the twinaxial work station attachment.

F 4. Connect one end of the twinaxial cable to socket 0, as shown. The other end of this cable will be connected by the task on the next page.

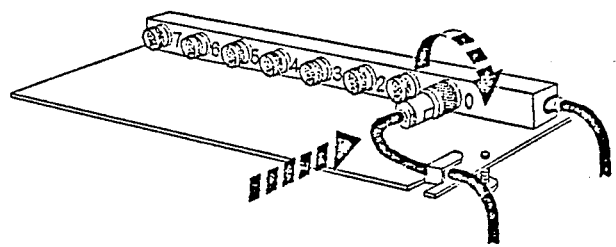

F 5. Reinstall the cover, as shown.

F 6. Place the twinaxial work station attachment where it will be out of the way.

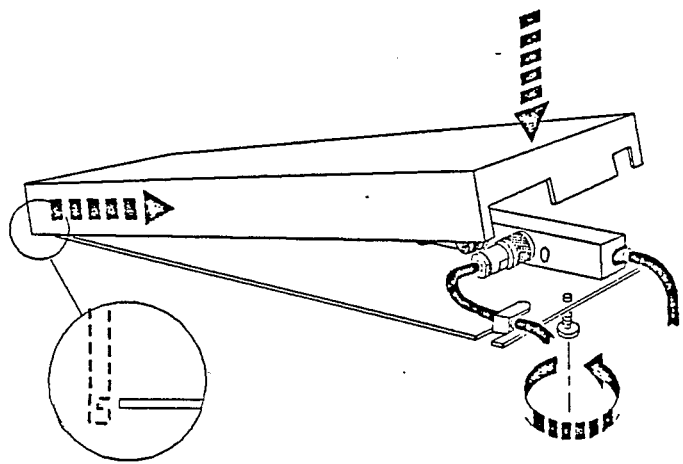

F ☐ 29 Prepare the system console device.

F Many different device
F types can be used as the
F system console. For the
F following instructions, see
F the setup manual for the
F device type that is being
F used as the system
F console on this system.

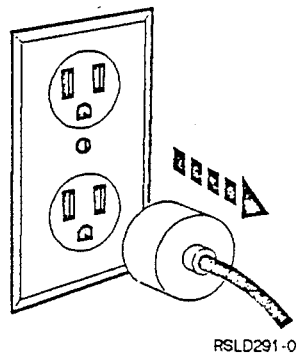

F 1. Ensure that the
F    console display is
F    unplugged from its
F    outlet.

F 2. Connect the loose end
F    of the twinaxial cable
F    to the console display
F    (one end was con-
F    nected to the
F    twinaxial work station
F    attachment by the
F    task on the previous
F    page).

F 3. Ensure that the
F    twinaxial cable is cor-
F    rectly terminated.

F 4. If the system console
F    device has *address*
F    switches, ensure that
F    they are set to 0.

(ASEM100)

F ☐ 30 Install the system support modem.

F 1. Locate the system support modem and the installation documentation for
F     that modem.

F 2. Ensure that the modem power cable is unplugged from the power source.

F 3. Find the end of a communications cable labeled:

F     EID: 016

F 4. Connect the cable labeled EID: 016 to the modem. Tighten the
F     thumbscrews finger tight and ensure that the cable is fastened tightly.

F 5. Connect the modem to the telephone network.

F 6. Connect the modem to the telephone, if a telephone is present for that
F     purpose.

F 7. Plug the modem power cable into the power source.

F 8. Use the modem documentation to determine if the modem has switches
F     (internal or external) that must be set.

F     • The modem may have no switches. If that is the case, ignore the steps
F       below where you are told to "Set the switches . . .".

F     • The modem may have switches for some or all of the following func-
F       tions.

F 9. Set the switches, if present, to provide the following functions:

F     a. Circuit 108 (Data Terminal Ready) is controlled through the V.24 inter-
F       face.

F     b. Circuit 106 (Clear to Send) follows Circuit 105 (Request to Send).

F     c. Circuit 109 (DCD) going inactive forces Circuit 104 (RXD) inactive.

F     d. Circuit 126 (Channel Select) is disabled.

F     e. Data rate is controlled by the Data Terminating Equipment (DTE)
F       through Circuit 111.

F     f. Transmit and Receive clocks are supplied by the modem.

F     g. Auto answer is enabled.

F     h. Circuit 112 (Data Rate Indicate) is not supported.

F     i. Neither Circuit 107 nor Circuit 109 should be forced on all the time.

F     j. Dialing is bit synchronous.

F k. Protocol is high-level data link control (HDLC) with American
F National Standard Code for Information Interchange (ASCII) code.

F l. Call origination by the modem is enabled.

F m. Local digital loopback in response to a remote test request should occur
F automatically.

F 10. If the modem has switches for the following, contact the telephone company
F (or Postal Telephone and Telegraph) about how to set the switches for the
F following:

F a. Injected tone

F b. Answer tone

F c. Carrier disconnect wait time

F d. Time to wait after start of ring before the modem goes off hook

F e. Receiver sensitivity

F 11. Any other switches that may be present should be left as set by the modem
F manufacturer.

(ARPC100)

F ☐ 31 Install the rack power cable in rack A.

1. Ensure that the main circuit breaker (CB1) in the power control section is set to Off.

F 2. Find the rack power
F cable. One is shipped
F with each rack.

F 3. Select the end with
F slots visible.

F 4. This cable goes over
F the bar, as shown.

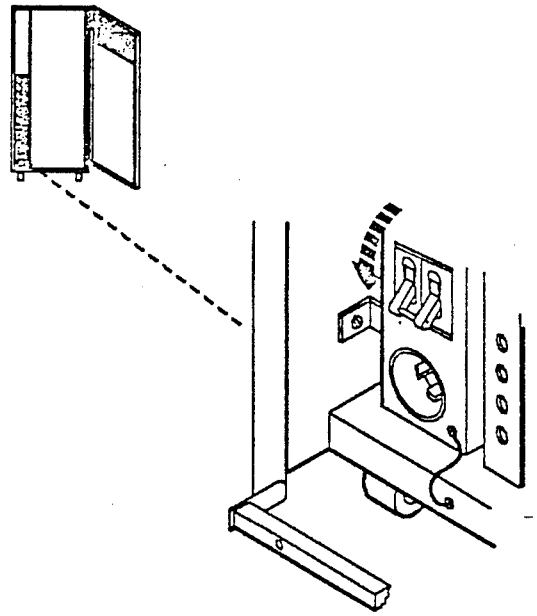

F 5. Align the slots with
F     the pins in the main
F     line connector.

F 6. Push the power cable
F     end into the main line
F     connector and turn
F     the power cable end
F     clockwise as far as
F     you can (it will not
F     turn very far; less
F     than 1/16 turn).

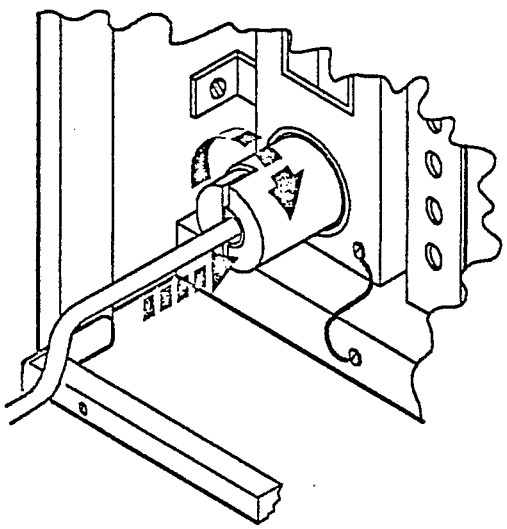

(ARPC100)

F 7. Fasten the power
F     cable to the rear bar
F     of the rack:

F     a. Place the power
F        cable between the
F        holes in the bar,
F        as shown.

F     b. Use the
F        thumbscrews to
F        fasten the clamp
F        over the cable.

F     c. Tighten the
F        thumbscrews with
F        the tightening
F        rod.

F 8. Check to ensure the
F     cable is held tight.

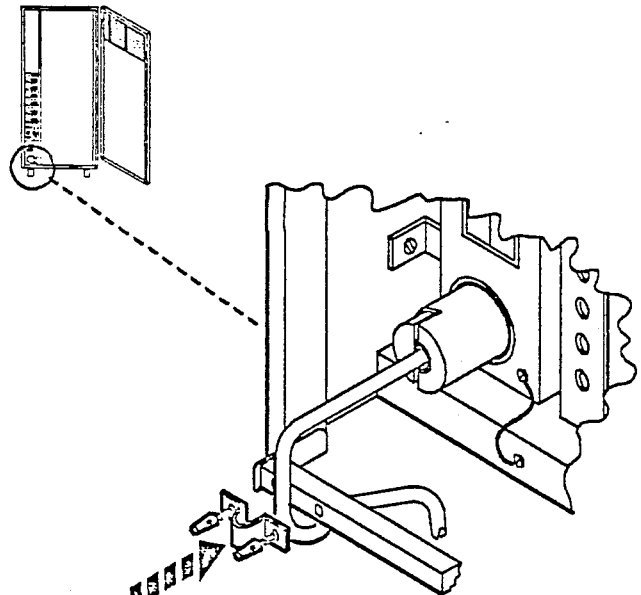

F ☐ 32 Verify proper seating of the device power cables in
F         rack A.

Ensure that all device power cables plugged into sockets in the power control section are correctly seated.

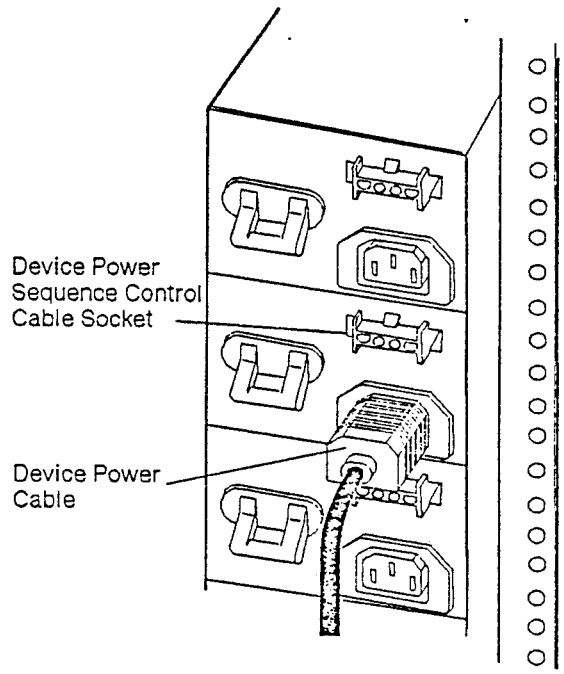

Rack Power Control Section

F ☐ 33 Set the circuit protectors On in rack A.

F For CP1 through CP6 in
F the power control section:

F Set each circuit protector
F switch to On (|) if there is
F a power cable plugged in
F beside it. *Do this if a*
F *power sequence control*
F *cable is, or is not, present.*

If there is no power cable, leave the switch set to Off (0).

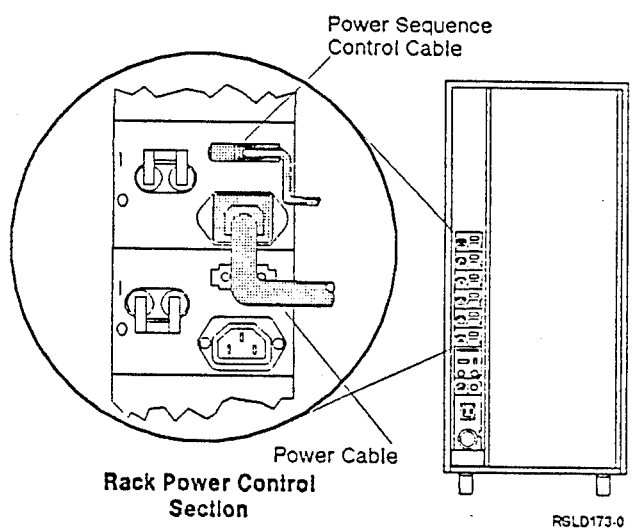

Rack Power Control Section

F ☐ 34  Go to the front of rack A for the next tasks.

F Detailed verification of the
F rack contents is not neces-
F sary.

F However, to become
F familiar with the rack
F contents, observe where
F each device is located.

F The machine type number
F of each device is located
F in the upper left corner
F on the front of each
F device.

F The numbers to the right
F in this figure are the EIA
F values, indicating the
F device locations. They
F are shown for reference
F only; these numbers are
F normally visible only
F from the back of the rack.

F Go to the next task.

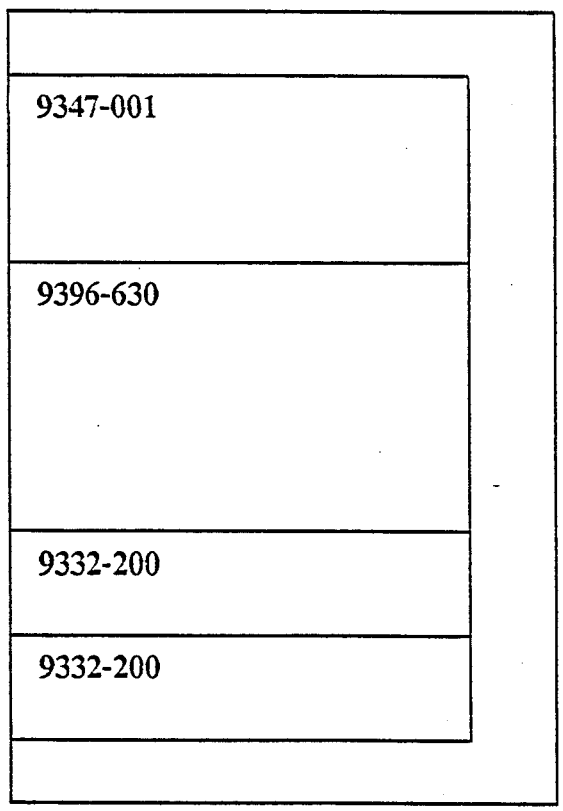

Front View -- Rack A

9309 Rack Enclosure

F ☐ 35  Prepare the 9347 at EIA 15 in rack A for operation.
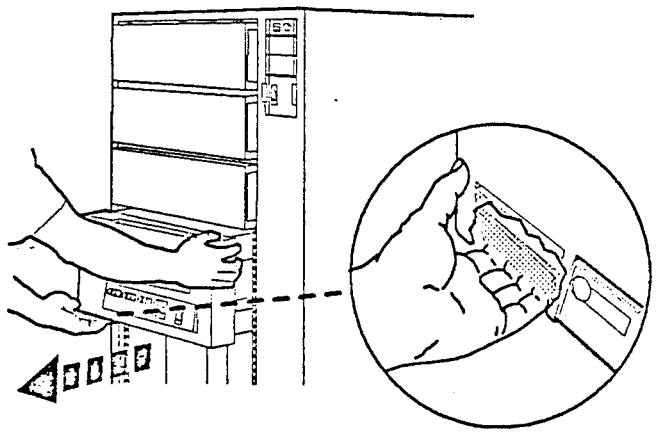
1. Pull the release lever under the front bottom left side of
F    the front panel of the
F    9347, as shown. Pull
F    the 9347 out of the
F    rack until the slide locking tabs lock.
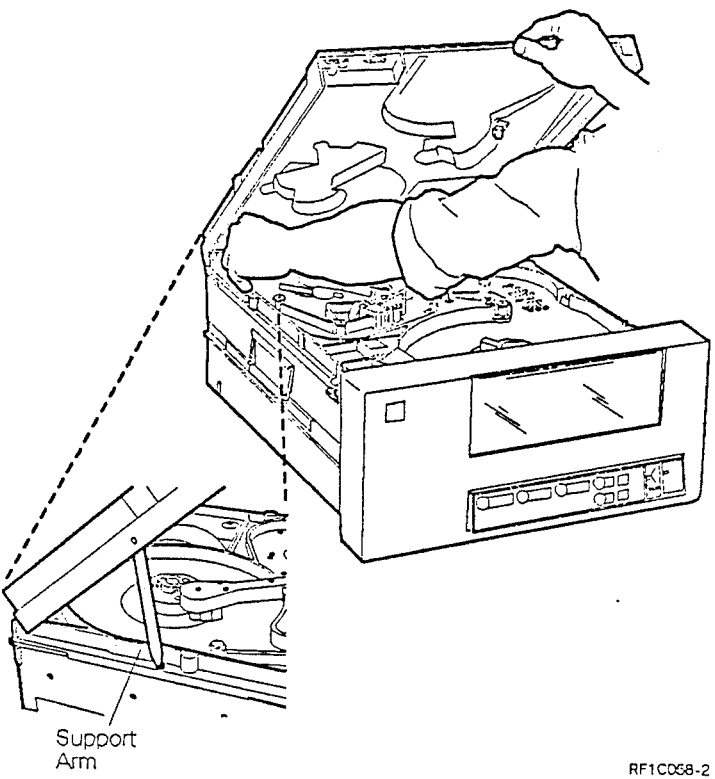
2. Open the top cover:
   • Lift and hold the top cover.
F    • Set the support
F      arm, as shown.

(UDSH400)
Warning: Do not let go of the tachometer while holding it away from the take-up hub. The tachometer may become damaged if it hits the hub.
F 3. *Carefully* pivot the
F     tachometer away from
F     the take-up hub and
      hold it tightly. The
      tachometer does not
      lift up.
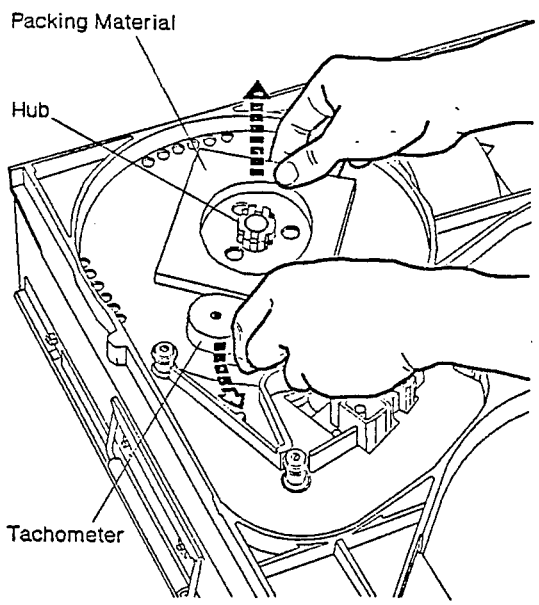
F 4. Remove the packing
F     material and discard
F     it.
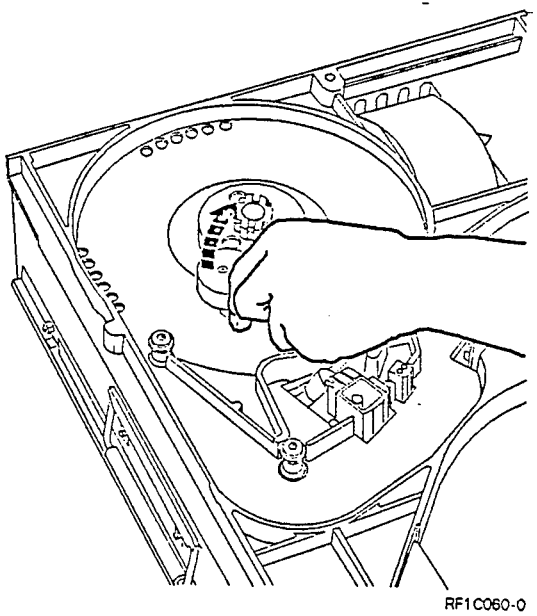
F 5. *Carefully* pivot the
F     tachometer back
F     against the take-up
      hub.

(UDSH400)
6. Close the top cover.
   a. Lift the cover.
   b. Push the support arm to the rear.
   c. Lower the cover.
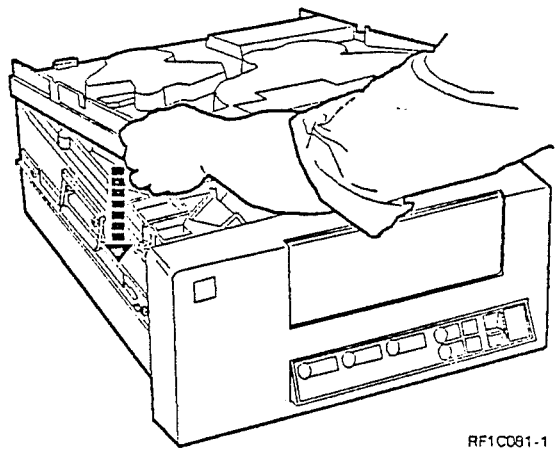

(UDSH400)
7. Press the slide locking tab on the outside of each slide, as shown.
F
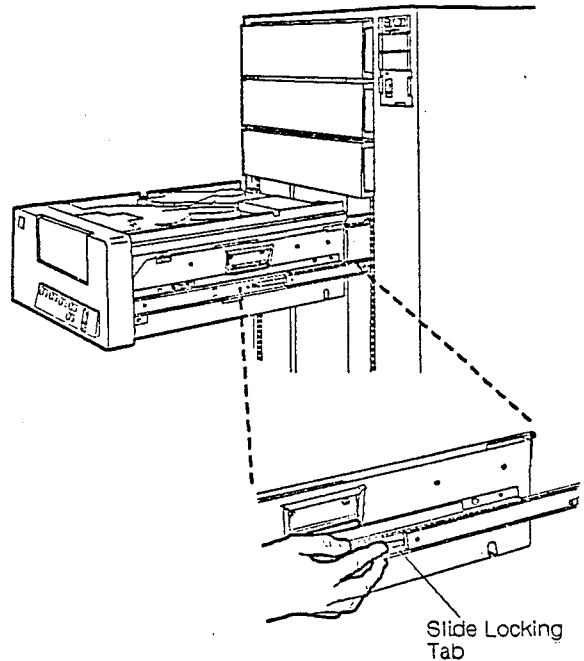
8. Push the 9347 into the rack until the release lever locks.
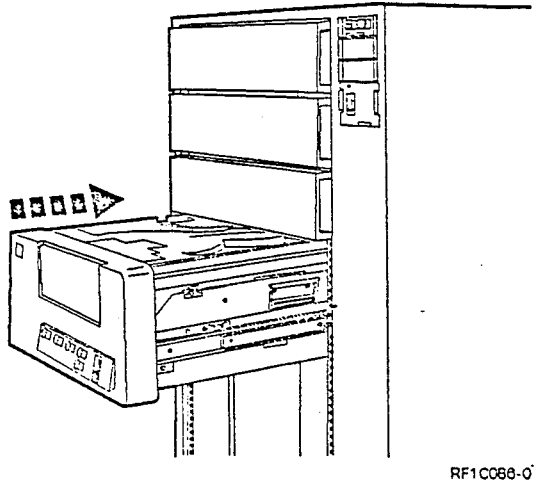

(UDSH200)
F ☐ 36  Prepare all 9332s in rack A for operation.
F  1. For the 9332 located
F     at EIA 04, remove the
F     front cover, as shown.
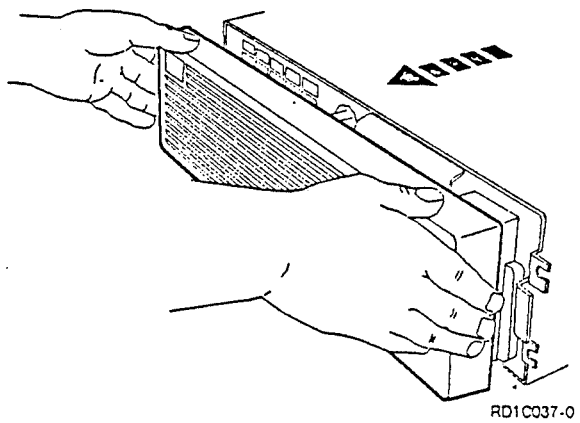
2. Unlock the shock
   protection by turning
   the locking stud
   counterclockwise at
   least 10 full turns.
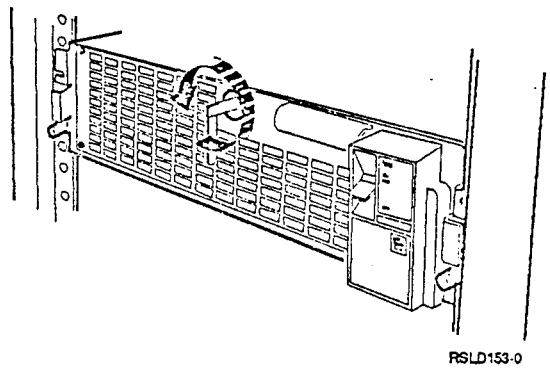
3. Reinstall the front
   cover, as shown.
4. Perform all steps in
   this task for each 9332
F    unit in this rack; there
F    are 2.
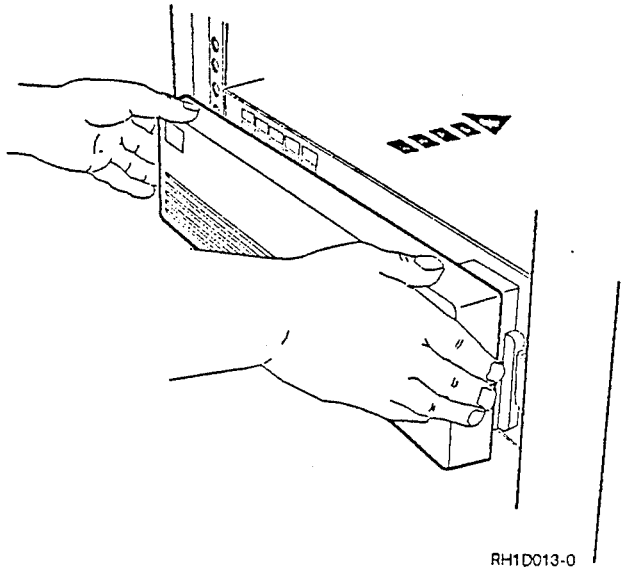

(SDSR100)
□ 37 Set the Unit Emergency switch for rack A to the On position.
Set the Unit Emergency switch to the On position.
Nothing occurs; system power has not been turned on yet.
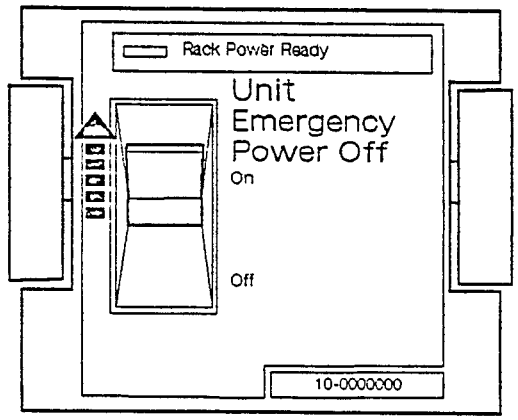
(SDSR600)
F □ 38 Set the Power switch on the 9347 at EIA 15 in rack A.
F Set the Power switch to
F the On position, as
F shown.
Nothing occurs; the system has not been powered on yet.
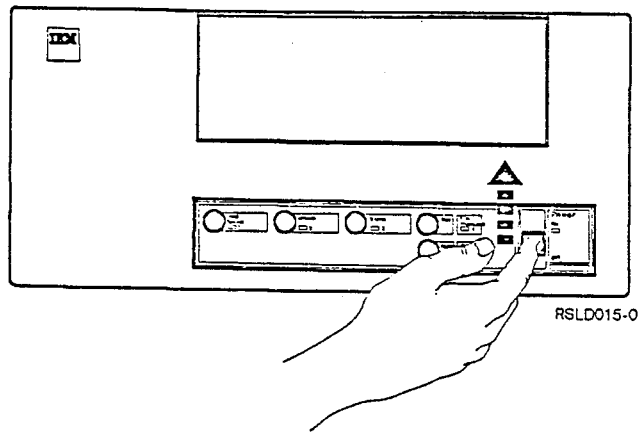

(SDSR400)
F ☐ 39  Set the Power switches on all 9332s in rack A.
F 1. Set the Power switch
F    on the 9332 at EIA 04
F    to the On position, as
F    shown.
   Nothing occurs; the
   system has not been
   powered on yet.
  2. Perform this task for
     each 9332 unit in this
F    rack; there are 2.
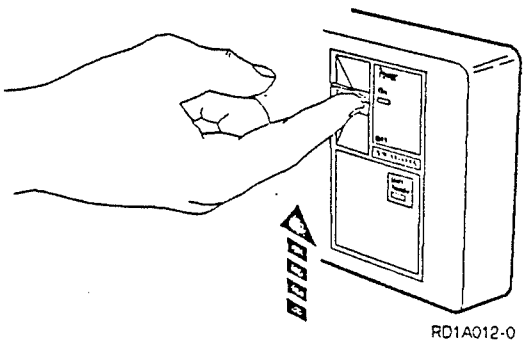

(ADSB100)
F ☐ 40  Connect the battery cable and put the key in the 9396
F     at EIA 07 in rack A.
1. Remove the front cover from the 9396 located at EIA 07.
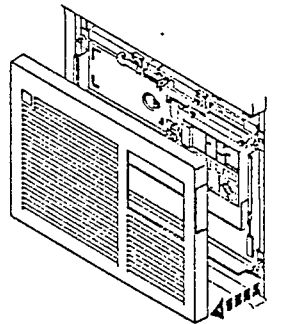
2. Connect the battery cable, as shown.
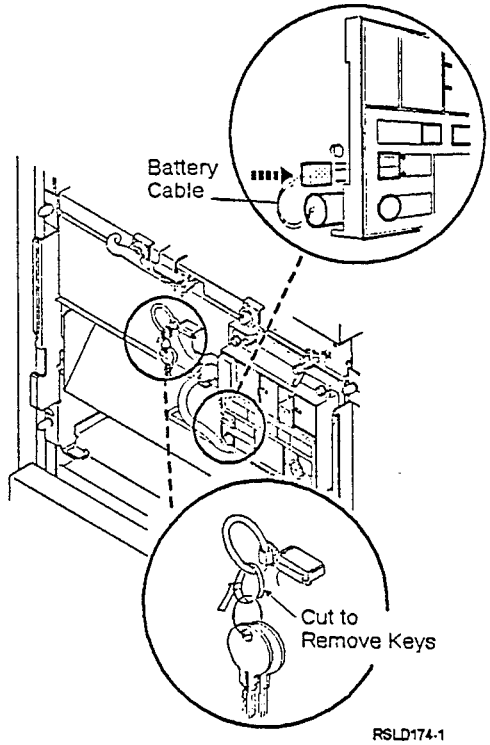
F 3. Cut the cable tie, as
F    shown, and remove
F    the keys.

(ADSB100)
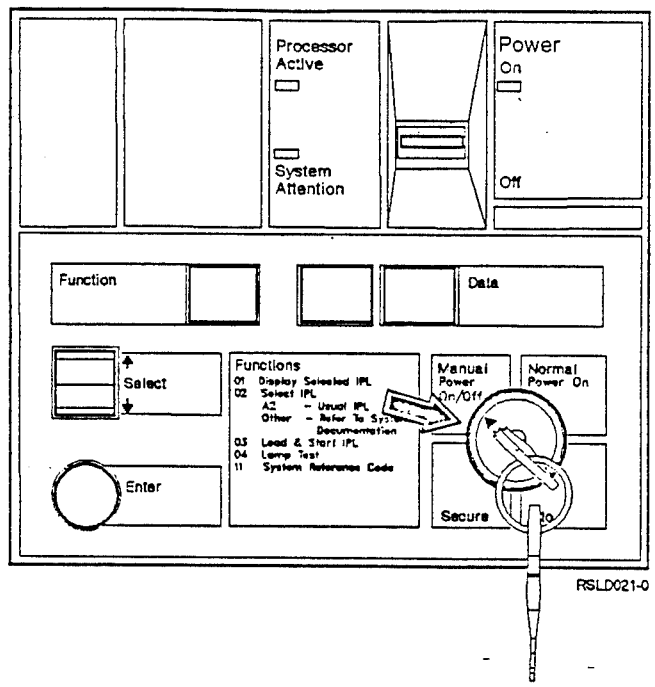
F 4. Insert the key into the
F    9396 keylock.
F 5. Turn the key so that
F    the small black tri-
F    angle on the keylock
F    points to the Manual
F    Power On/Off posi-
F    tion, as shown.
6. Reinstall the 9396
   front cover.
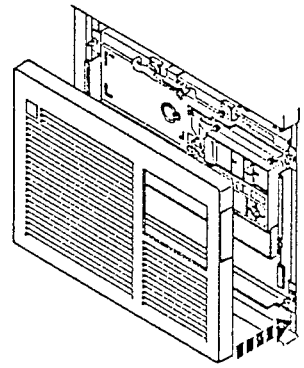

(ASACI00)
F ☐ 41  Provide AC power to rack A.
F 1. Plug the rack power
F    cable into the custom-
F    er's receptacle for AC
F    power.
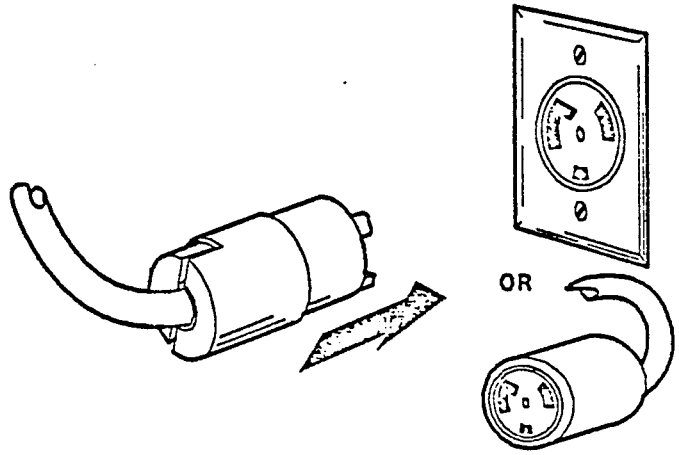
2. Set CP7, the circuit
   protector for the
   power supply, to the
   On (|) position, as
   shown.
3. Set the main circuit
   breaker (CB1) in the
   power control section
   to the On (|) position,
   as shown.
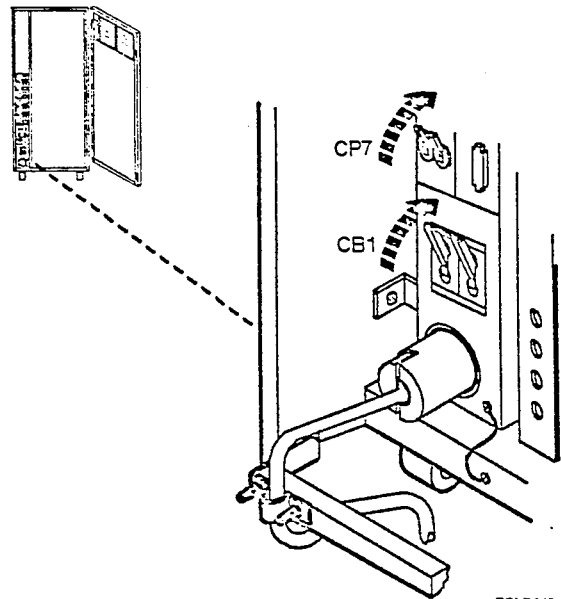

(ASCP100)
F ☐ 42 Power on the system console display.
F 1. Plug the power cable
F    for the console
F    display into a
F    customer-supplied
F    electrical outlet.
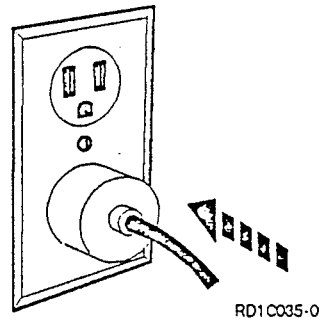
F 2. Set the Power switch
F    for the display to the
F    On (|) position.
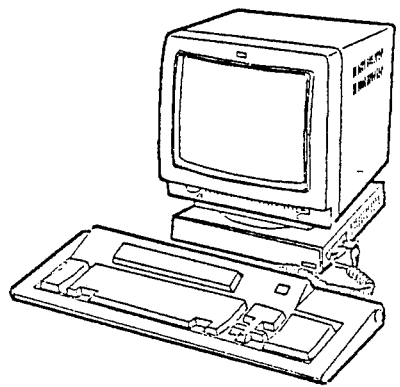

(ASYP100)

F ☐ 43 Power on the system from the 9396 at EIA 07 in rack A.

On the 9396 device located at EIA 07:

F 1. Verify that 01 A is
F visible in the control
F panel windows, as
F shown.

F If 01 A is not visible
F in the windows, go to
F *Analyzing Problems*,
F SY31-9063.

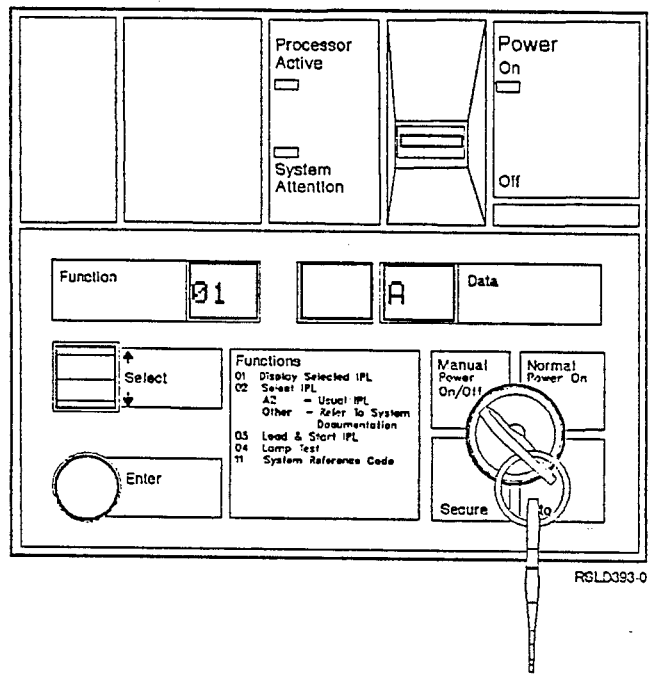

2. Push the 9380 Power switch up, as shown.

This switch will return to the center position when you release it.

F The Power On light
F will come on. If it
F does not, go to Task
F 54.

Fans and disk drives will start to turn, making noise; other lights will also go on.

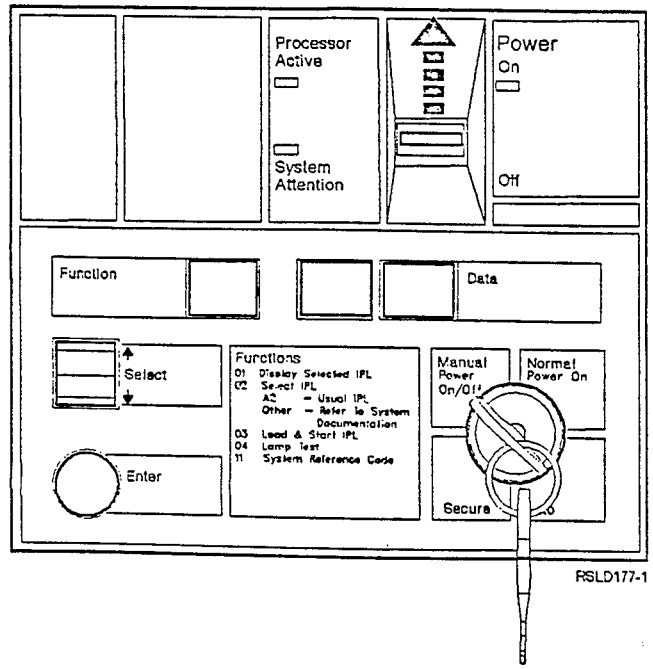

(VPOR100)
F ☐ 44  Verify rack power-on status from the front of rack A.
The Rack Power Ready
light will flash until all
devices in the rack have
started to power up.
F Wait for the Rack Power
F Ready light to remain on
F continuously before going
F to the next task.
F If the Rack Power Ready
F light is not on contin-
F uously after 2 minutes, go
F to Task 54.
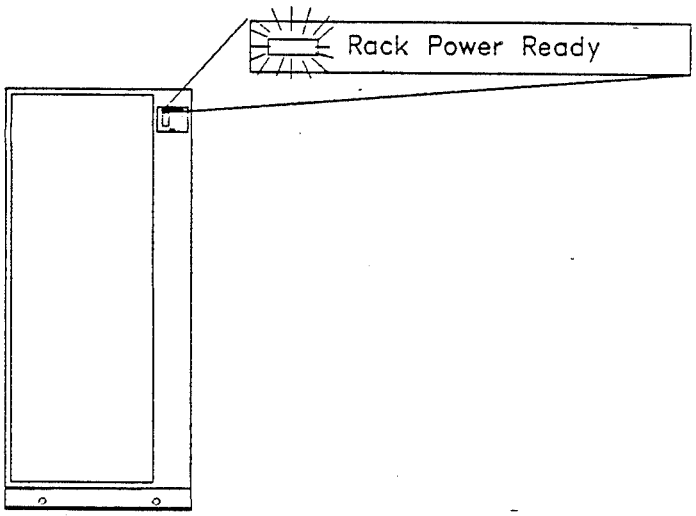

(VPOR700)

F ☐ 45  Verify power-on status for the 9347 at EIA 15 in rack A.

F Observe the indicators for
F the 9347 at EIA 15:

1. In 2 minutes or less from power-on time for this rack, the Power light and control panel light 2 should be on continuously. If not, go to Task 54.

2. During part of those 2 minutes, control panel light 2, the Reset light, and the Write Enable light will blink sometimes.
F   It is not important
F   that this be observed.

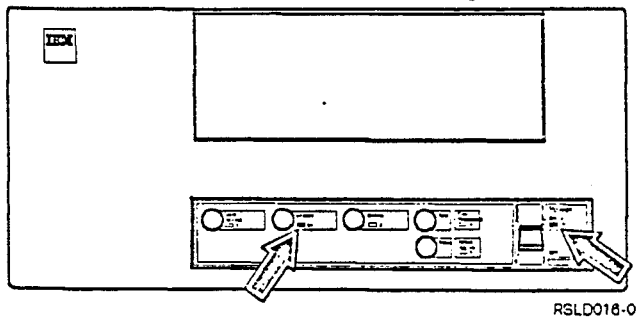

(VPOR500)

F ☐ 46 Verify power-on status for all 9332s in rack A.

F Observe the indicators for
F the 9332 at EIA 04:

1. In 2 minutes or less from power-on time for this rack, the Power On light and the Unit Ready light should be on continuously. If not, go to Task 54.

2. During part of those 2 minutes, the Unit Ready light will flash.
F It is not important
F that this be observed.

F 3. Perform this task for
F each 9332 in the rack;
F there are 2.

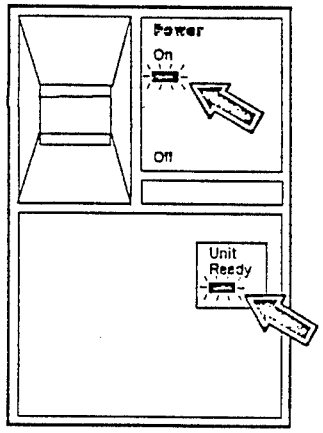

RSLD152-0

(VSTD100)

F ☐ 47 Verify tape load operation for the 9347 at EIA 15 in rack
F     A.

For the 9347 at EIA 15:

F 1. Locate a scratch tape
F    (one that does not
F    contain valuable
F    information).

2. Remove any covering from around the reel.

3. Verify that the tape is wound completely on the reel.

4. Ensure that a write-enable ring is on the reel.

5. Open the front door of the 9347 unit.

6. Insert the tape reel:

- Hold the tape reel in a horizontal position with the write-enable ring facing downward.

F    - Insert the tape
F      reel into the 9347,
F      as shown.

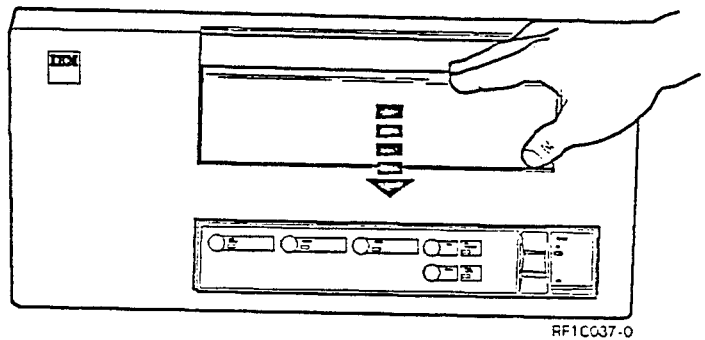

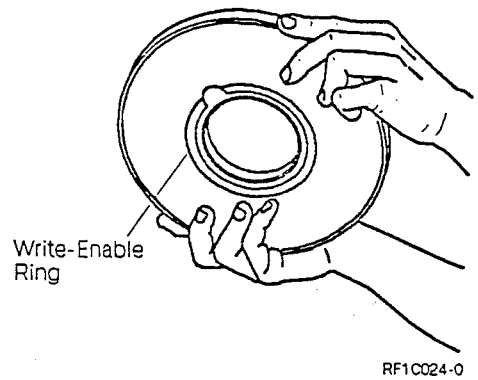

Write-Enable Ring

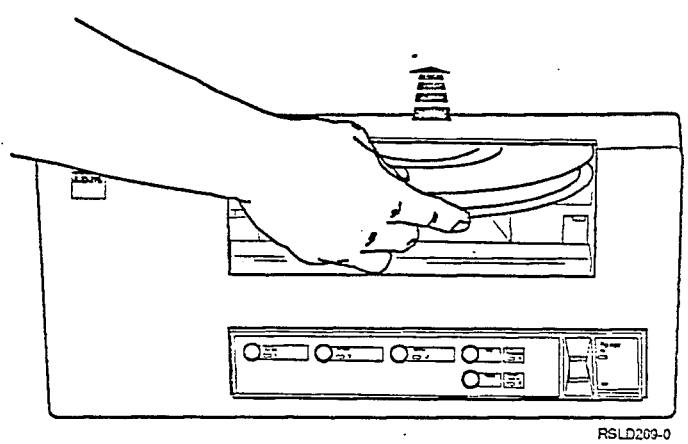

(VSTD100)
7. Close the front door.
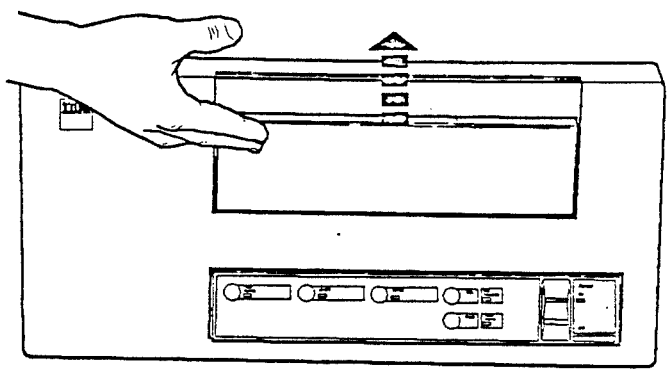
8. Push the Load/Rewind pushbutton. Control panel light 1 will flash for a short time, then remain on.
    Control panel light 4 will come on if a write-enable ring has not been placed on the tape.
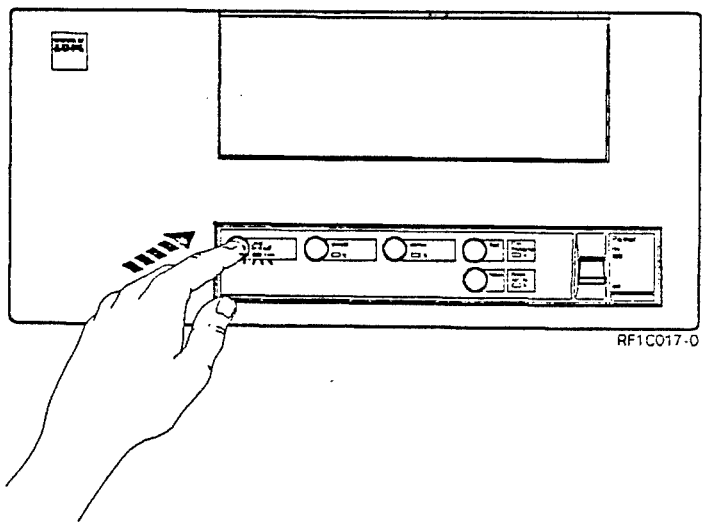
9. Push the Online pushbutton. Control panel light 3 will come on after approximately 15 to 30 seconds.
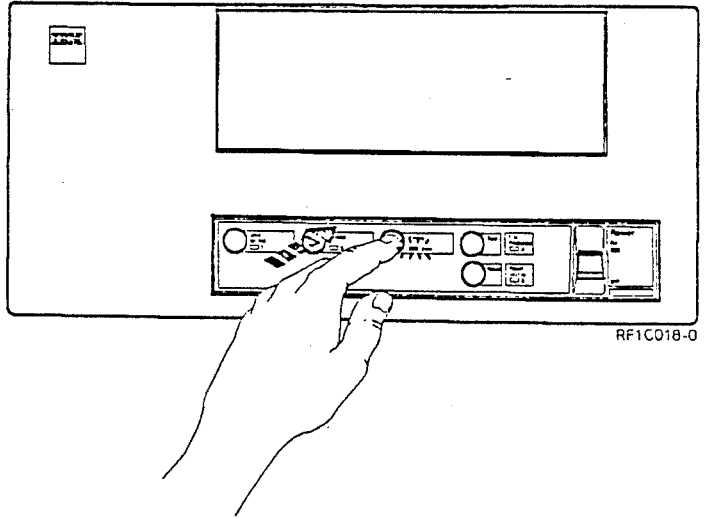

(VSTD100)
10. Push the Online pushbutton again. Control panel light 3 will go off.
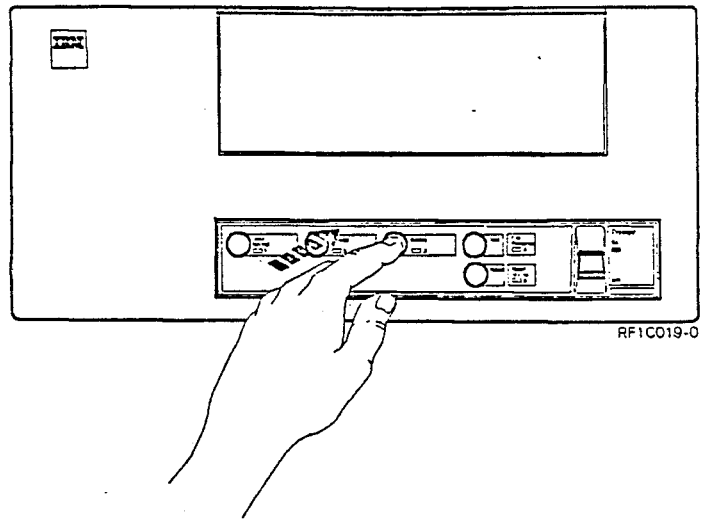
11. Push the Unload pushbutton. Control panel light 2 will flash as the tape unloads, and will remain on when unloading is complete.
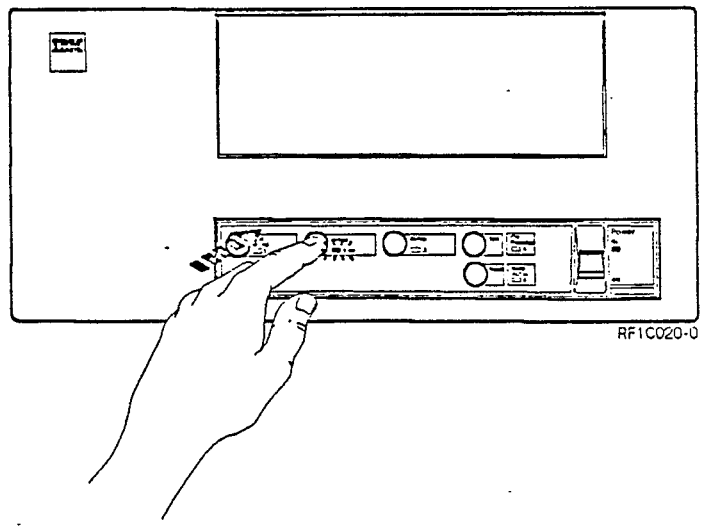

(VSTD100)

12. When control panel light 2 remains on, remove the tape from the 9347 unit and close the front door. Put the covering back on the reel to protect the tape.

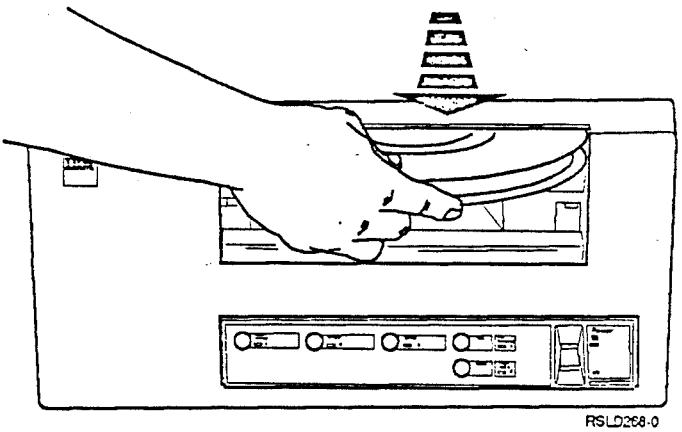

13. If any condition in this task does not occur correctly, repeat the task at least once. If the problem remains, perform
F problem analysis on
F the 9347, using *Ana-*
F *lyzing Problems Guide,*
F SY31-9063.

(AIPL100)

☐ 48 Verify that IPL is complete.

F
F
F When IPL is complete,
F the sign-on display
F appears on the system
F console. If this does not
F occur in a reasonable
F time interval, go to Task
F 55.

F A reasonable time interval
F would be 3 minutes multi-
F plied by the number of
F racks in the system.
F

```
                    Sign On
                              System  . . . . . :
                              Subsystem . . . . : QBASE
                              Display . . . . . : QCONSOLL User ID . . . . . . . . . . . . . .   _____

Program/procedure . . . . . . . .    _____
          Menu            . . . . . . . . . .   _____
          Current library . . . . . . . . .    _____

(C) COPYRIGHT IBM CORP. 1988, 1988.
```

(VSEM100)
F ☐ 49 Test the system support modem.
F 1. Power off the system
F     from the 9396 at EIA
F     07 in rack A.
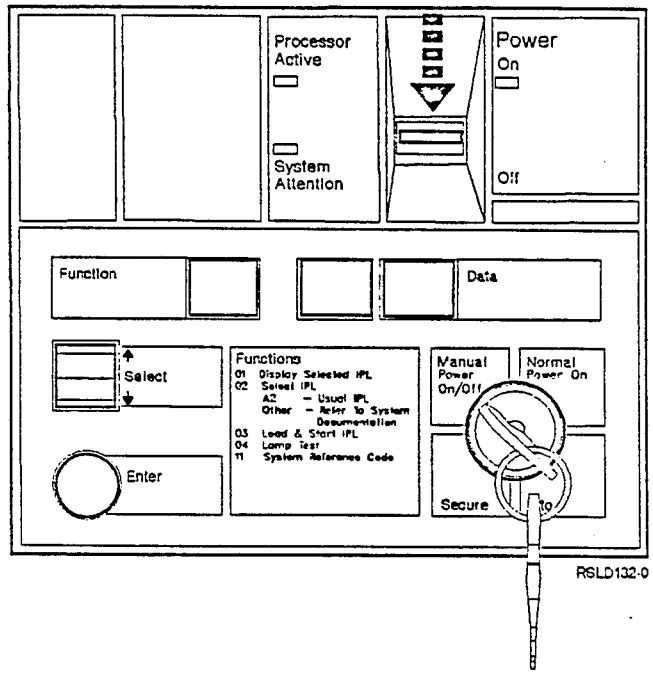
F 2. Turn the key so that
F     the small black tri-
F     angle points to the
F     Normal position, as
F     shown.
F 3. Power on the system.
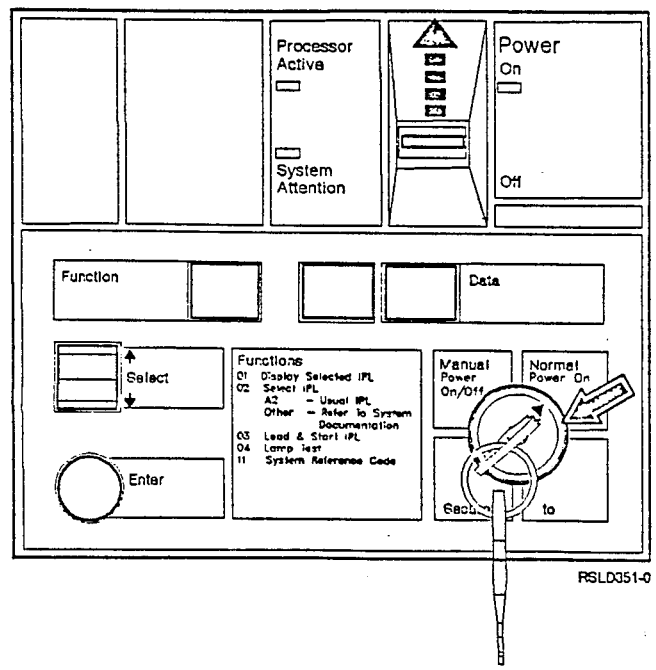

4. Wait for IPL to complete.

The sign on display appears on the system console, as shown, when IPL is complete.

```
                    Sign On
                           System  . . . . . :
                           Subsystem . . . . :   QBASE
                           Display . . . . . :   QCONSOLL User ID . . . . . . . . . . . . .   _____

Program/procedure . . . . . . . .   _____
        Menu      . . . . . . . . . . . .   _____
        Current library . . . . . . . . .   _____

(C) COPYRIGHT IBM CORP. 1980, 1988.
```

5. On the User ID line, type CE.
6. Press Enter.

```
                    Sign On
                           System  . . . . . :
                           Subsystem . . . . :   QBASE
                           Display . . . . . :   QCONSOLL User ID . . . . . . . . . . . . .   CE_____

Program/procedure . . . . . . . .   _____
        Menu      . . . . . . . . . . . .   _____
        Current library . . . . . . . . .   _____

(C) COPYRIGHT IBM CORP. 1980, 1988.
```

7. On the Command line on the next display, type chgctlappc ctld(qesctl) cnnnbr(X), as shown, where X stands for all the digits in the data telephone number of RETAIN. Type the number as you would dial it.

Note: If you do not have this telephone number, contact your support group.

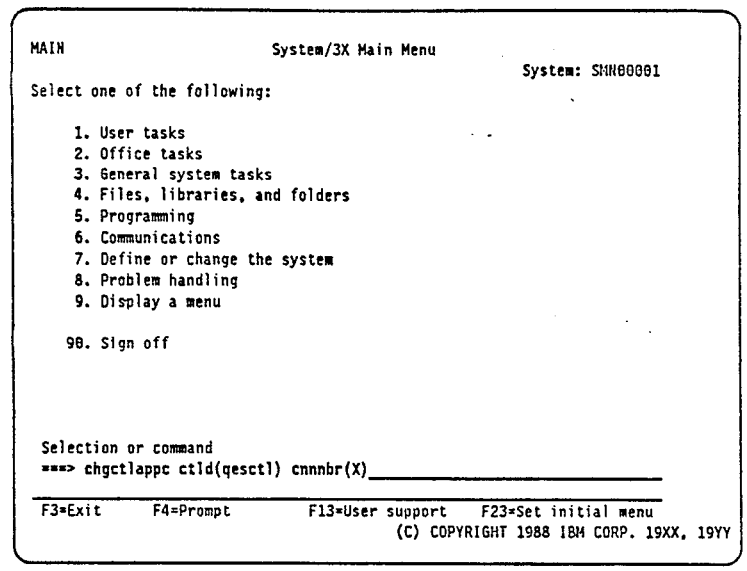

8. Verify that you have typed this information correctly.

9. Press Enter.

10. On the command line of the next display, type **sndsrvrqs *tst**, as shown.

11. Verify that you have typed this information correctly.

12. Press Enter.

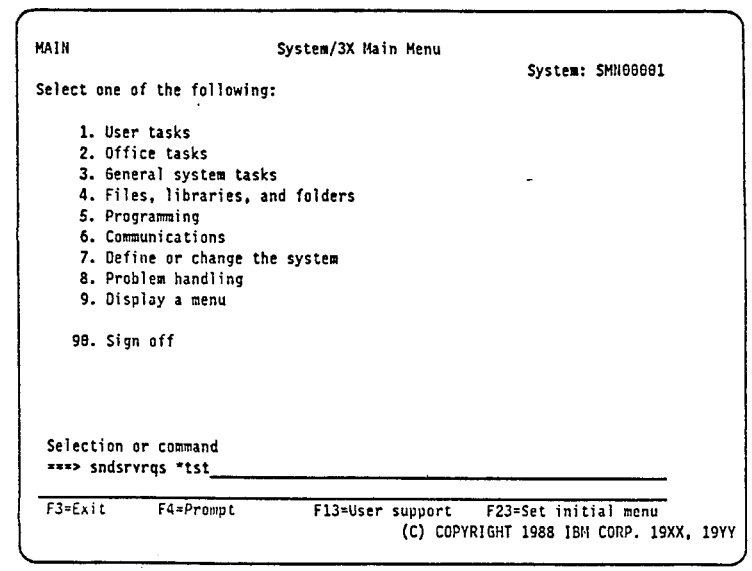

F 13. Wait a few minutes for the telephone connection to be made.

F 14. The message Test request successful. should appear.

F 15. If any other message appears, or if any problem occurs, go to Task &MTP..

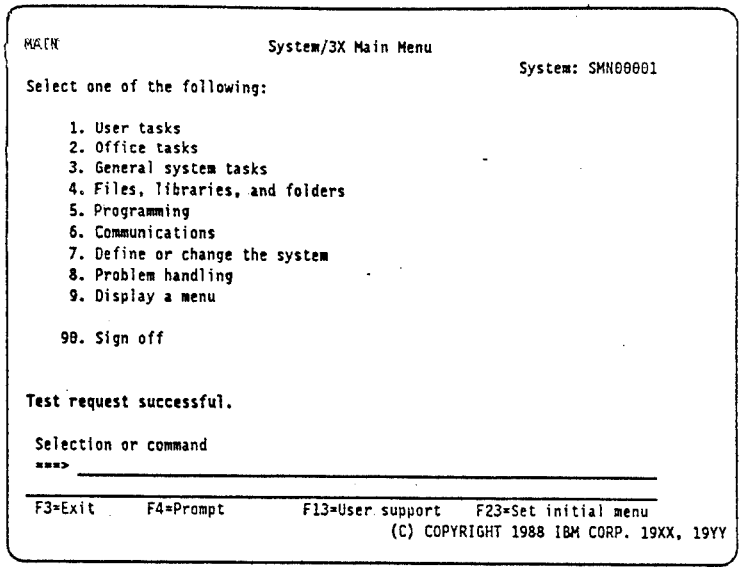

(VSEM100)

(PNSA100)

F ☐ 50 System is available.

F Although some cables remain to be attached, the system is available for cus-
F tomer use.

F NOTE: If any rack or device shows that it is not powered on, go to Task 54,
F then return here.

F 1. Inform the customer that the system is available for use.

F 2. Explain that you will be attaching the remaining cables.

F 3. Inform the customer to begin with the manual *Attaching Work Station*
F    *Cables to Your System*, SA21-9957.

F 4. Continue with the next task in these instructions.

(ACMC100)

F ☐ 51 Install remaining communications cables.

F 1. Locate the Communication Cable Chart on page 75 at the back of these
F     instructions.

F 2. Note that cables with an * by the EID number have already been installed.

F 3. For each additional cable listed in that chart:

F     a. Find a cable (in the shipping group parts) with the specified part
F        number.

F     b. Get 2 labels from the shipping group parts.

F     c. Print the EID number (from the chart) on each label.

F     d. Fasten a label near each end of the cable.

F     e. Find the card enclosure at the specified EIA location.

F     f. Find the card in the specified slot.

F     g. Compare the ends of the cable with the port on the card.

F         • If the port has holes visible, select the cable end with pins visible.
F         • If the port has pins visible, select the cable end with holes visible.

F     h. Push the selected end of the cable under the bar and into the rack.

F     i. Attach the cable to the specified port on that card.

F     j. Verify that the cable is fastened tightly.

F If you are not sure about how to do any of the above steps, see Task 24 and
F Task 25 in these instructions. (Make reference to those tasks as examples
F only; do not use the specific information given there.)

F ☐ 52  Install cable ties in the rack.
F ALL cables entering or
F leaving a rack should be
F tied tightly to the bar at
F the bottom of the rack.
F They do not have to be
F tied separately; they can
F be tied in groups.
F Do not pull the cables
F tight; let them hang
F naturally.
F 1. Get the cable ties
F    from the shipping
F    group parts.
F 2. Tie the cables to the
F    bar, as shown.
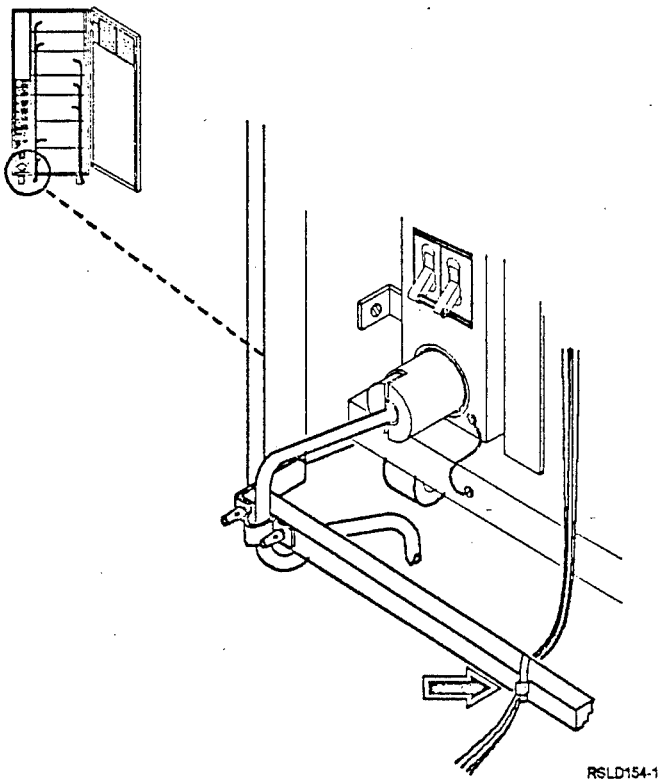

F ☐ 53  Job is complete.

F If any rack or device
F shows that it is not
F powered on, go to Task
F 54.

F 1.  Close all open covers.

F 2.  Inform the customer
F     that system hardware
F     installation is com-
F     plete.

F 3.  Inform the customer
F     to use the manual
F     *Attaching Work*
F     *Station Cables to Your*
F     *System*, SA21-9957.

F 4.  Perform normal clean
F     up tasks.

F 5.  Keep the last few
F     pages of these
F     instructions (starting
F     with page 72) with the
F     system. Put them in
F     the binder supplied
F     for the *Analyzing*
F     *Problems Guide*,
F     SY31-9063.

F 6.  Destroy the other
F     pages of these
F     instructions.

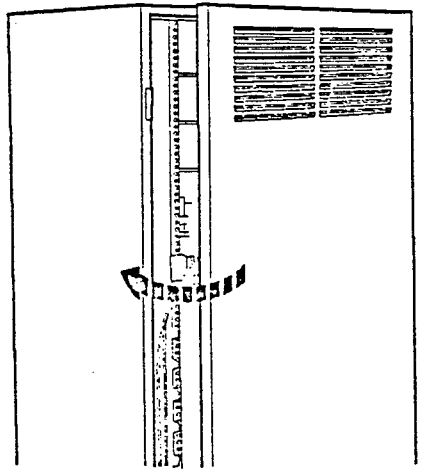

RSLD184-0

(PNSC100)

(SPUP100)

☐ 54 If there is a problem at power-on time . . .

F Decide which condition below best describes the conditions and follow the
F instructions given.

F 1. If the display windows on the operator's control panel showed something
F  but nothing else occurred, or if nothing at all occurred when you attempted
F  to power on the system, do the following:

F  a. Verify that:

F ☐ The Keylock switch is set to the Manual Power On/Off position.
F ☐ The rack Unit Emergency switch is set On.
F ☐ There is a terminating plug correctly installed in socket J10.
F ☐ The rack power cable is correctly installed and plugged in to the
F   power source.
F ☐ CB1 and CP7 in the rack power control section are set On.
F ☐ A device power cable is plugged into the 9396 located at EIA 07
F   with the other end plugged in the rack power control section.
F ☐ CP1-CP6 circuit protectors are set On for all devices plugged into
F   the power control section.
F ☐ The device CB on the back of the 9396 located at EIA 07 in rack A
F   is set On.
F ☐ Correct AC voltage is present at the power source.

F  b. Attempt to power on the system once more. If the failure remains,
F   perform analysis using the *Analyzing Problems Guide*, SY31-9063.

F  c. If the problem has been corrected, return to the task that sent you here.

F 2. If some, but not all, racks powered on, perform the following steps:

F  a. Note which rack(s) did not power on.

F  b. Power off the system at the operator's control panel of the 9396 located
F   at EIA 07 in rack A.

(SPUP100)

F   c. For each rack that did not power on correctly, verify that:

F      ☐ The rack power cable is correctly installed and plugged into the
F         power source.
F      ☐ CB1 and CP7 in the power control section are set On.
F      ☐ Correct AC voltage is present at the power source.

F   d. Attempt to power on the system once more. If the failure remains,
F     perform analysis using the *Analyzing Problems Guide*, SY31-9063.

F   e. If the problem has been corrected, return to the task that sent you here.

F 3. If all racks powered on, and some, but not all, devices powered on, do the
F    following:

F   a. Make a note of any device(s) that failed to power on as expected.

F   b. Power off the system at the operator's control panel of the 9396 located
F     at EIA 07 in rack A.

F   c. For each device that did not power on correctly, verify that:

F      ☐ The power switch on the front of the device is set On.
F      ☐ The circuit breaker on the device is set On.
F      ☐ The power cable is installed and both ends are correctly seated (at
F         the device and in the power control section).
F      ☐ The circuit protector in the rack power control section is set On.

F   d. Power on the system.

F      ☐ If any of the devices that did not power on correctly are card enclo-
F         sures, press their Power On switch upward (the switch will return to
F         the center position when released).

F   e. If the failure remains, perform analysis using the *Analyzing Problems
F     Guide*, SY31-9063.

F   f. If the problem has been corrected, return to the task that sent you here.

F 4. If any of the device Unit Ready lights do not remain on continuously after
F    flashing, perform analysis using the *Analyzing Problems Guide*, SY31-9063.

(SIPP100)

☐ 55 If there is a problem at IPL time . . .

F If power on occurred correctly for all devices but the system failed to IPL, do
F the following:

F 1. Power off the system at the operator's control panel on the 9396 located at
F    EIA 07 in rack A.

F 2. Verify that:

F    ☐ The Keylock switch is set to the Manual Power On/Off position.
F    ☐ The signal cables that go from one device to another device are cor-
F       rectly installed. All connections must be tight. See the Cable List on
F       page 74 at the back of these instructions.
F    ☐ The signal cable terminating plugs are correctly installed and are tight.
F       See the Cable List on page 74 at the back of these instructions.
F    ☐ The address switches on all devices are set correctly. See the Cable List
F       on page 74 at the back of these instructions.

F    DANGER
F    If a disconnected cable is found in the next step, DO NOT attempt to connect
F    it until the work station console device (and all other devices connected to it)
F    are powered off and unplugged.

F    ☐ The system console signal cable is attached correctly to the twinaxial
F       work station attachment that is connected to a 6040 card in the card
F       enclosure located at EIA 07 in rack A. See the Cable List on page 74
F       at the back of these instructions.
F    ☐ The system console power cable is plugged into the power source and
F       the system console power switch is set to the On position.

F 3. Power on the system from the operator's control panel on the 9396 located
F    at EIA 07 in rack A. IPL occurs as part of the power on process.

F 4. If the problem remains, use *Analyzing Problems*, SY31-9063 to analyze fail-
F    ures.

F 5. If the problem has been corrected, return to the task that sent you here.

(PARHDR)
The remaining pages of these instructions should be used for problem analysis resolution purposes during installation.
(RCKCL)
Rack Configuration List
Back View -- Rack A
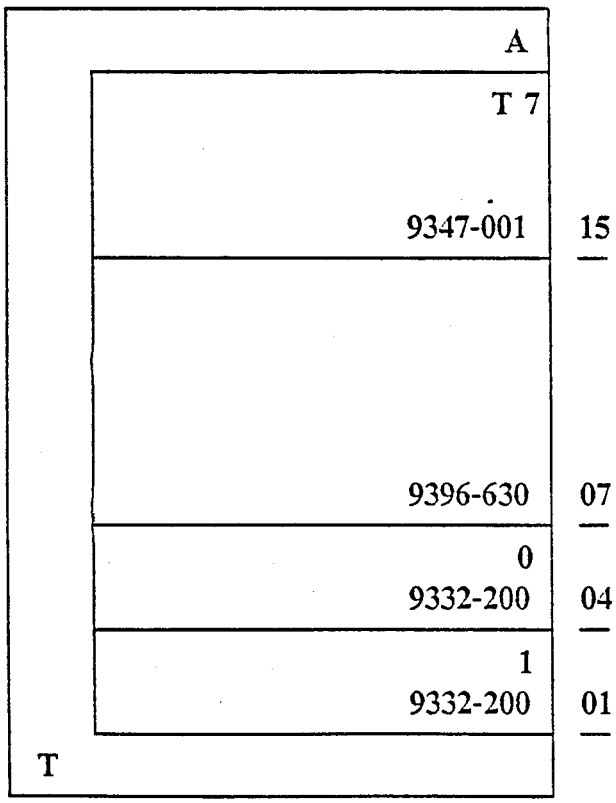
9309 Rack Enclosure
Card Enc = 9396
EIA Loc = 07
| ADDR | SLOT | CARD |
|------|------|------|
|      | 01   | AF04 |
|      | 02   | 3055 |
|      | 03   | 3054 |
|      | 04   | 2500 |
|      | 05   | 2504 |
| 0010 | 06   | 6010 |
| 0020 | 07   | 6130 |
| 0030 | 08   | 6034 |
| 0040 | 09   | 6031 |
| 0050 | 10   | 6130 |
| 0060 | 11   | 6032 |
| 0070 | 12   | 6040 |
|      | 13   | AF12 |

(DCABCT)

Cable List

Signal Cable Chart

| EID# | Cable P/N | Path | Rack ID | Device Type-Model | EIA Loc | Card FN | Slot | Port | System Address |
|------|-----------|------|---------|-------------------|---------|---------|------|------|----------------|
| 029* | 6495254   | from | A       | 9396-630          | 07      | 6010    | 06   | 1    |                |
|      |           | to   | A       | 9332-200          | 04      |         |      | In   | 0              |
| 030* | 6495253   | from | A       | 9332-200          | 04      |         |      | Out  | 0              |
|      |           | to   | A       | 9332-200          | 01      |         |      | In   | 1              |
| 028* | 6495250   | from | A       | 9332-200          | 01      |         |      | Out  | 1              |
|      |           | to   | A       | 9347-001          | 15      |         |      | In   | 7              |
|      | TERM      | term | A       | 9347-001          | 15      |         |      | Out  | 7              |

TERM = Terminating plug

EID# = Element ID number which uniquely identifies each cable. Inter-rack cables may have been labeled.

FN = Feature Number.

* = Previously Installed Cable.

(DCABCT)

Cable List

Communication Cable Chart

| EID# | Cable P/N | Path | Rack ID | Device Type-Model | EIA Loc | Card FN | Slot | Port | System Address |
|---|---|---|---|---|---|---|---|---|---|
| 016* | 70X8655 | from | A | 9396-630 | 07 | 6031 | 09 | 1 | |
| 015 | 70X8655 | from | A | 9396-630 | 07 | 6031 | 09 | 2 | |
| 014 | 92X2785 | from | A | 9396-630 | 07 | 6032 | 11 | 1 | |
| 013 | 6165837 | from | A | 9396-630 | 07 | 6034 | 08 | 1 | |

TERM = Terminating plug
EID# = Element ID number which uniquely identifies each cable. Inter-rack cables may have been labeled.
FN = Feature Number.
* = Previously Installed Cable.

(DCABCT)

Cable List

Work Station Attachment Cable Chart

| EID# | Cable P/N | Path | Rack ID | Device Type-Model | EIA Loc | Card FN | Slot | Port | System Address |
|---|---|---|---|---|---|---|---|---|---|
| 012* | 2438316 | from | A | 9396-630 | 07 | 6040 | 12 | 1 | |

TERM = Terminating plug
EID# = Element ID number which uniquely identifies each cable. Inter-rack cables may have been labeled.
FN = Feature Number.
* = Previously Installed Cable.

What is claimed is:

1. A system for generating installation instructions for a device made up of a variable number of components, comprising:
   means for specifying desired components for a device;
   sorting means coupled to the specifying means for identifying a plurality of installation tasks dependent on the components specified;
   sequencing means for sequencing the tasks in a desired order for installation of the components;
   memory means for storing individual assembly instructions corresponding to each task; and
   instruction generation means coupled to the sequencing means and to the memory means for assembling the individual assembly instructions for installation of the components, said assembled instructions being different dependent on the particular components specified.

2. The system of claim 1 wherein the means for specifying desired components for a device comprises a topology file which comprises representations corresponding to a complete set of components for installation of a complete computer system.

3. The system of claim 2 wherein the topology file representations define the placement of components within the device.

4. The system of claim 3 wherein the topology file representations define the connection of components within the device.

5. The system of claim 2 wherein the topology file comprises a set of records, each record corresponding to a component,
   one of said records being divided into at least five versions, comprising:
   a rack version for a rack component;
   a storage media version for storage media components within a rack;
   a card cage version for card cage components within the rack;
   a card version for card components within a card cage; and
   a cable version for cables connecting the racks, card cages and cards.

6. The system of claim 5 wherein the topology file further comprises a representation of the parentage of the storage media, card cages, cards and cables.

7. The system of claim 1 wherein the means for specifying desired components for a device comprises a pair of topology files which describe a set of components for an existing computer system and a set of components for a desired computer system.

8. The system of claim 7 wherein the sorting means comprises means for determining which components need to be added to the existing computer system, and which components need to be removed from the existing computer system, which components need to be moved, from the information contained in the pair of topology files to install the desired computer system.

9. The system of claim 8 wherein the sorting means identifies tasks associated with the addition movement, and the removal of components.

10. The system of claim 1 and further comprising a task file coupled to the sorting means and containing representations of installation tasks associated with each component.

11. The system of claim 10 wherein the task file further contains representations of pseudo tasks not associated with any particular task.

12. The system of claim 10 wherein the task file further contains an estimate of the time for completion of each task.

13. The system of claim 12 wherein the task file further contains an estimate of the time for completion of a task when it is performed in conjunction with other like tasks.

14. The system of claim 10 wherein the task file further comprises a representation of a perspective for a task.

15. The system of claim 10 wherein the task file further indicates a subcomponent associated with a task, for which a further task is defined.

16. The system of claim 1 wherein the sequencing means comprises an expert system program using a set of rules for sequencing the tasks, said rules comprising:
   arranging tasks which can be performed with the device powered on first;
   grouping tasks which are physically located together into a group to be performed together; and
   avoiding scheduling tasks which would make further tasks more difficult.

17. The system of claim 1 and further comprising a translator means coupled to the sequencer means for further defining the individual assembly instructions.

18. The system of claim 1 wherein the means for specifying desired components comprises a topology file which comprises representations corresponding to selected characteristics of each component.

19. The system of claim 18 wherein the memory means stores multiple assembly instructions for some components, and wherein the translator means selects one of the instructions for a component based on characteristics of the component.

20. The system of claim 19 wherein the assembly instructions stored in the memory means comprise:
   modules of text; and
   modules of graphic representations of the components.

21. The system of claim 20 wherein the translator means selects instructions from a plurality of text and graphic modules for one a task.

22. The system of claim 1 wherein the instruction generation means comprises a task to graphics manager for creating line drawings for the instructions based on the components specified.

23. The system of claim 22 and further comprising an element description file containing a record for each component, said records identifying physical characteristics and naming information for each component.

24. The system of claim 23 wherein the task to graphics manager is coupled to the element description file, and comprises means to identify variable information from the element description file for each instruction.

25. The system of claim 24 wherein the variable information comprises the physical characteristics of a component, and the task to graphics manager further comprises means coupled to the element description file to create scaled line drawing definitions from the information.

26. The system of claim 25 wherein the task to graphics manager further comprises means coupled to the element description file for inserting names from the element description file into the scaled line drawings to identify the components therein.

27. A system for identifying tasks associated with installation of a device made up of a variable number of components, comprising:
- at least one topology file for identifying desired components for a device, said at least one topology file defining the placement of each component within the device;
- a component task file identifying installation tasks corresponding to the possible components in the device;
- a task generator coupled to the
- at least one topology file and to the component task file for generating a list of tasks corresponding to the components in the topology file; and
- a sequencer coupled to the task generator for sequencing the tasks in the order they are to be performed for installation of the device.

28. The system of claim 27 wherein each topology file comprises a set of records, each record corresponding to a component, said records being divided into at least five versions comprising:
- a rack version for a rack component;
- a storage media version for storage media components within a rack;
- a card cage version for card cage components within the rack;
- a card version for card components within a card cage; and
- a cable version for cables connecting the racks, card cages and cards.

29. The system of claim 28 wherein the topology file further comprises a representation of the parentage of the storage media, card cages, cards and cables.

30. The system of claim 27 wherein the task generator is coupled to a first topology file for identifying components of an existing computer system, and to a second topology file for identifying components of the modified existing computer system, wherein the task generator further comprises means for determining which components need to be added to the existing computer system, which components need to be moved, and which components need to be removed from the existing device to create the modified existing computer system.

31. The system of claim 27 wherein the component task file further contains representations of pseudo tasks not associated with any particular task.

32. The system of claim 31 wherein the component task file further comprises an estimate of the time for completion of each task.

33. The system of claim 32 wherein the component task file further comprises an estimate of the time for completion of a task when it is performed in conjunction with other like tasks.

34. The system of claim 27 wherein the component task file further comprises a representation of a perspective for a task.

35. The system of claim 27 wherein the task file further indicates a subcomponent associated with a task, for which a further task is defined.

36. The system of claim 27 wherein the sequencer comprises an expert system program using a set of rules for sequencing the tasks, said rules comprising:
- arranging tasks which can be performed with the device powered on first;
- grouping tasks which are physically located together into a group to be performed together; and
- avoiding scheduling tasks which would make further tasks more difficult.

37. A system for generating installation instructions for devices made up of a variable number of specified components having different characteristics, the comprising:
- means for identifying a sequenced series of tasks related to installing each of the components;
- translator means coupled to the means for identifying the sequenced tasks for further defining the individual assembly instructions; and
- memory means for storing multiple versions of assembly instructions for some components, wherein the translator means selects one of the instructions for a component based on characteristics of the component.

38. The system of claim 37 wherein the assembly instructions stored in the memory mean comprise:
- modules of text; and
- modules of graphic representations of the components.

39. The system of claim 38 wherein the translator means selects instructions from a plurality of text and graphic modules for one a task.

40. The system of claim 37 and further comprising a task to graphics manager for creating line drawings for the instructions based on the components specified.

41. The system of claim 40 and further comprising an element description file containing a record for each component, said records identifying physical characteristics and naming information for each component.

42. The system of claim 41 wherein the task to graphics manager is coupled to the element description file, and comprises means to identify variable information from the element description file for each instruction.

43. The system of claim 42 wherein the variable information comprises the physical characteristics of a component, and the task to graphics manager further comprises means coupled to the element description file to create scaled line drawing definitions from the information.

44. The system of claim 43 wherein the task to graphics manager further comprises means coupled to the element description file for inserting names from the element description file into the scaled line drawings to identify the components therein.

* * * * *